(12) United States Patent
Sadiq et al.

(10) Patent No.: US 11,899,622 B2
(45) Date of Patent: Feb. 13, 2024

(54) MANAGEMENT OF ERASURE OR RETENTION OF USER DATA STORED IN DATA STORES

(71) Applicant: PayPal, Inc., San Jose, CA (US)

(72) Inventors: Suhail Sadiq, Singapore (SG); Alejandro Picos, New York, NY (US); Vladimir Bacvanski, Portola Valley, CA (US); Devdatta Rivonkar, Chennai (IN); Rahul Mahendrakumar, Chennai (IN)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/372,839

(22) Filed: Jul. 12, 2021

(65) Prior Publication Data

US 2022/0382713 A1    Dec. 1, 2022

(30) Foreign Application Priority Data

May 28, 2021   (IN) .............................. 202141023781

(51) Int. Cl.
| | | |
|---|---|---|
| *G06F 16/00* | (2019.01) | |
| *G06F 16/16* | (2019.01) | |
| *G06F 16/901* | (2019.01) | |
| *G06F 16/27* | (2019.01) | |
| *G06F 16/2458* | (2019.01) | |

(52) U.S. Cl.
CPC ........ *G06F 16/162* (2019.01); *G06F 16/2471* (2019.01); *G06F 16/27* (2019.01); *G06F 16/9024* (2019.01)

(58) Field of Classification Search
None
See application file for complete search history.

(56) References Cited

U.S. PATENT DOCUMENTS

| | | | | |
|---|---|---|---|---|
| 8,364,817 B1* | 1/2013 | John | ....................... | H04L 63/10 |
| | | | | 709/225 |
| 8,375,427 B2* | 2/2013 | Alavandar | ............ | G06F 21/577 |
| | | | | 726/21 |
| 9,130,941 B2* | 9/2015 | John | ....................... | H04L 63/10 |

(Continued)

OTHER PUBLICATIONS

"General Data Protection Regulation GDPR," https://gdpr-info.eu/, 7 pages.

(Continued)

*Primary Examiner* — Jean M Corrielus
(74) *Attorney, Agent, or Firm* — Greenberg Traurig LLP

(57) ABSTRACT

Techniques for managing erasure of data are presented. In response to receiving a request for erasure of data from a set of data stores, an erasure component can analyze a set of rules and information relating to the user account, including an account status and erasure hold status associated with the user account. The set of rules can be based on legal or contractual obligations applicable to the set of data stores, and can indicate various conditions under which data associated with a user account of a user can be eligible to be erased from the set of data stores or an associated data vault repository. The erasure component can determine eligibility for erasure of all or a portion of the set of data from the set of data stores based on the analysis results. Erasure component can determine erasure eligibility scores to pre-qualify user accounts for erasure eligibility.

20 Claims, 47 Drawing Sheets

(56) References Cited

U.S. PATENT DOCUMENTS

| | | | | |
|---|---|---|---|---|
| 9,699,192 | B2 * | 7/2017 | John | G06F 21/6218 |
| 2011/0265162 | A1 * | 10/2011 | Alavandar | G06Q 99/00 |
| | | | | 726/7 |
| 2012/0092185 | A1 * | 4/2012 | Hayashi | B60Q 5/008 |
| | | | | 340/904 |
| 2013/0212273 | A1 * | 8/2013 | John | H04L 63/10 |
| | | | | 709/225 |
| 2015/0339490 | A1 * | 11/2015 | John | G06F 13/00 |
| | | | | 726/1 |
| 2016/0004649 | A1 * | 1/2016 | Choi | G06F 11/273 |
| | | | | 710/51 |
| 2016/0269417 | A1 * | 9/2016 | Saxena | H04L 63/06 |
| 2016/0293244 | A1 * | 10/2016 | Mohammad | G11C 11/409 |
| 2019/0294707 | A1 * | 9/2019 | Ramaswamy | G06Q 10/10 |
| 2019/0394322 | A1 * | 12/2019 | Pai | G06F 9/44505 |
| 2020/0334379 | A1 * | 10/2020 | DeRosa-Grund | G06F 21/645 |

OTHER PUBLICATIONS

O., Nicole, "The Eight User Rights Under the GDPR," https://www.privacypolicies.com/blog/gdpr-eight-user-rights/, 15 pages.
B., Robert, "8 User Rights Under the GDPR," https://www.termsfeed.com/blog/gdpr-8-user-rights/, 9 pages.
International Search Report and Written Opinion issued for Application PCT/US2021/064127, dated Mar. 16, 2022, 17 pages.

* cited by examiner

US 11,899,622 B2

MANAGEMENT OF ERASURE OR RETENTION OF USER DATA STORED IN DATA STORES

CROSS-REFERENCE TO RELATED APPLICATION

This application claims priority to India Provisional Patent Application No. 202141023781, filed on May 28, 2021, and entitled "MANAGEMENT OF ERASURE OR RETENTION OF USER DATA STORED IN DATA STORES," the entirety of which application is hereby incorporated by reference herein.

TECHNICAL FIELD

The subject disclosure relates generally to electronic information and communications, and more specifically to management of erasure or retention of user data stored in data stores.

BACKGROUND

Data can be electronically communicated (e.g., via communication networks), exchanged, stored, and displayed in connection with various types of communications, transactions (e.g., purchases, subscriptions, exchanges, etc.), or other interactions. For example, users can utilize various online and digital services to manage financial accounts, make payments on bills from financial accounts, purchase goods and services from businesses via websites of businesses, or send or transfer money to another person. For instance, there are digital wallet services that enable a person to use a communication device (e.g., mobile phone or computer) and an application (e.g., mobile digital wallet application) to transfer money, via an electronic transfer, from the person's digital wallet to another digital wallet of another entity, such as a friend or business. Users also can make online purchases for products or services where such purchases can be paid via electronic payment from bank accounts or credit accounts of the users.

In connection with the various types of online interactions, the data of users, businesses, and other entities can be communicated to various parts of the world and/or stored in various databases in various parts of the world. The data can include sensitive and/or personal data of individuals and/or entities (e.g., financial account numbers, financial information, Social Security Numbers, personal identification information, authentication information, and/or transaction information of individuals or entities). It can be desirable to maintain the security and privacy of the data of users, businesses, and other entities, to ensure that only authorized entities are able to access and use the data, particularly sensitive and/or personal data, so that unauthorized and/or malicious users are not able to gain access to the data and/or so such data is not otherwise undesirably exposed and used. Further, laws and agreements have been implemented that can condition the access and use of data, particularly sensitive and/or personal data, in an effort to protect such data (e.g., protect the privacy and security of such data).

DETAILED DESCRIPTION

Figure 1:
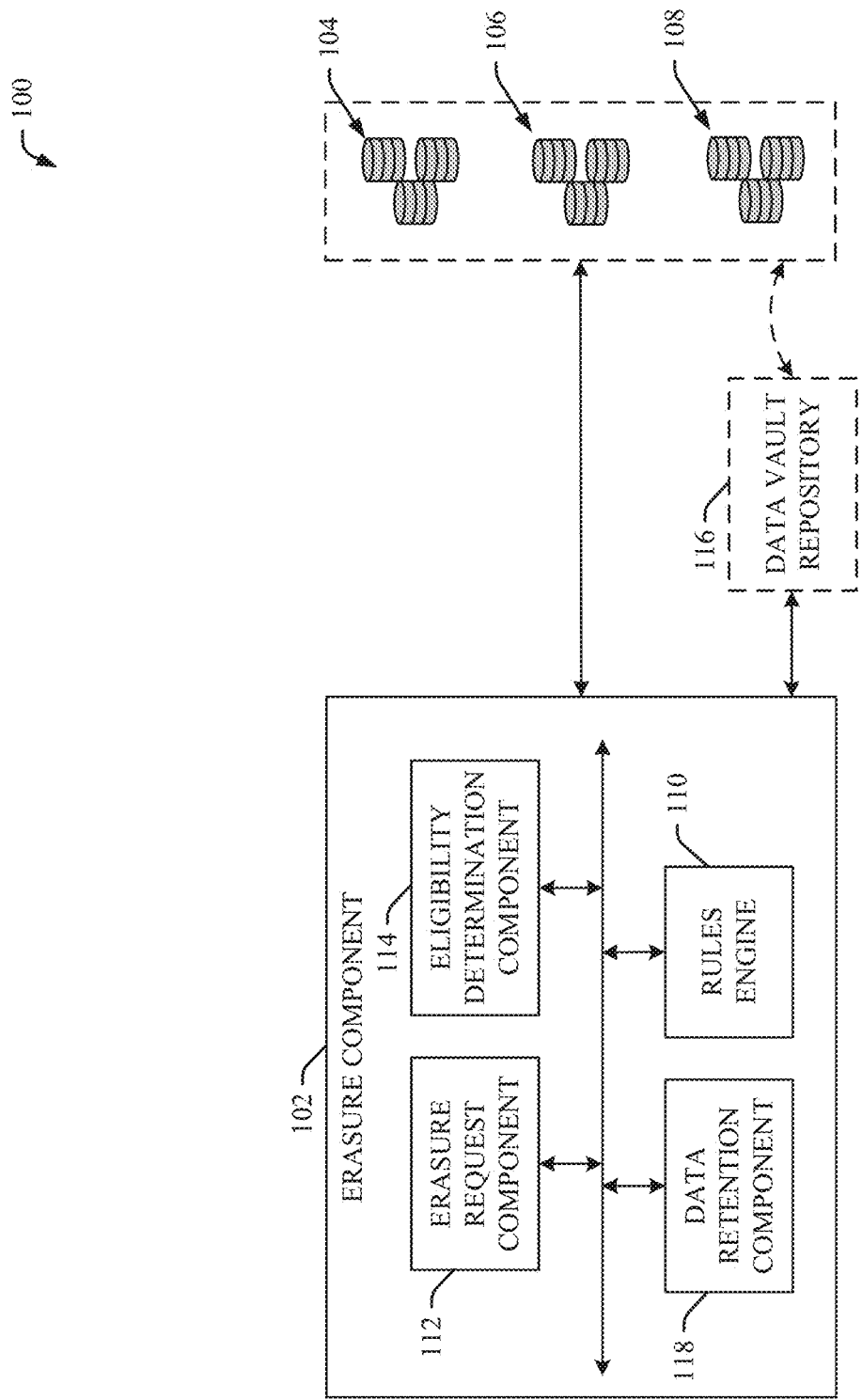
FIG. 1 illustrates a block diagram of an example, non-limiting system that can employ an erasure component that can desirably manage erasure and/or retention of data associated with user accounts stored in a set of data stores or an associated data vault repository, in accordance with various aspects and embodiments of the disclosed subject matter.

The following detailed description is merely illustrative and is not intended to limit embodiments and/or application or uses of embodiments. Furthermore, there is no intention to be bound by any expressed or implied information presented in the preceding Background section or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In accordance with various embodiments, the disclosed subject matter can comprise systems, methods, apparatuses, computer program products, and/or techniques for managing and enforcing various rights of users relating to their data (e.g., personal or sensitive data, or other data), including erasure rights of users relating to erasure of data of users maintained in one or more data stores associated with one or more entities (e.g., one or more companies, businesses, enterprises, organizations, or other entities), to facilitate desirable data protection, including data security and privacy, of data of users. For instance, under user data privacy laws and regulations, such as the General Data Protection Regulation (GDPR) in Europe and the California Consumer Privacy Act (CCPA) in California in the United States of America, data subjects (e.g., users) can have and enjoy certain rights with regard to their data. One of these rights is a right to erasure of data of the user, which also can be referred to as the right to be forgotten. Exercising this right, a user (e.g., customer) can request that an entity (e.g., a business) to erase (e.g., delete) his or her personal data that has been collected by the entity (e.g., collected by the entity and stored in a data store of or associated with the entity). The entity has an obligation (e.g., a legal and/or contractual obligation) under the applicable laws, regulations, and/or contractual agreement (e.g., service-level agreements (SLAs)) to intake such data erasure request from the user and act on the data erasure request in accordance with the applicable laws, regulations, and/or contractual agreement.

To facilitate desirably (e.g., appropriately, suitably, or optimally) processing data erasure requests received from users, the disclosed subject matter can determine rules relating to management of data of users, including management of erasure of data of users, based at least in part on laws and/or agreements that can be applicable to the one or more data stores associated with the one or more entities, as more fully described herein. The disclosed subject matter can implement and enforce such rules to erase data of users from the one or more data stores, or other data storage, when doing so is appropriate and/or to retain data of users in the one or more data stores, or other data storage, even when erasure of data of a user is requested by the user, when retention of such data of the user is appropriate, in accordance with such rules (and accordingly, the applicable laws, regulations, and/or agreements), as more fully described herein.

Data can be electronically communicated (e.g., via communication networks), exchanged, stored, and displayed in connection with various types of communications, transactions (e.g., purchases, subscriptions, exchanges, etc.), or other interactions. In connection with the various types of online interactions, the data of users, businesses, and other entities can be communicated to various parts of the world and/or stored in various data stores in various parts of the world. The data can include sensitive data, private data, personal data, protected data, and/or personally identifiable information (PII) of users or other entities (e.g., financial account numbers, financial information, Social Security Numbers, personal identification information, authentication information, and/or transaction information of users or other entities), and/or information relating to such data. It can be desirable to maintain the security of the data of users, businesses, and other entities, and information relating to such data, to ensure that only authorized entities are able to access and use the data, particularly sensitive data, private data, personal data, protected data, and/or PII, so that unauthorized and/or malicious users are not able to gain access to the data and/or so such data is not otherwise undesirably exposed and used. Further, governmental agencies of various jurisdictions have implemented various laws and regulations that can condition the access and use of data, particularly sensitive data, private data, personal data, protected data, and/or PII, and/or can otherwise specify particular data protections, in an effort to protect such data. Also, there often can be agreements (e.g., contracts) between entities that can specify how data is to be handled, can condition the access and use of data, particularly sensitive data, private data, personal data, protected data, and/or PII, and/or can otherwise provide for the protection of data.

Existing techniques, applications, and online and digital services relating to the communication, exchange, storage, access, and display of data can be deficient in protecting data of users, businesses, and other entities, can be inefficient in implementation, can be undesirably limited in scope, can be lacking in robustness, and can fail to provide sufficient information regarding the handling and usage of data by entities, each and all of which can negatively impact the protection of such data. Systems, methods, and/or techniques that can ameliorate one or more of these and other deficiencies of existing technology can be desirable.

Various embodiments of the disclosed subject matter can address one or more of these issues/problems by facilitating desirable (e.g., efficient, enhanced, robust, and/or optimal) data lifecycle discovery and management, management of data access rights, management of erasure rights, and governance with regard to data protection, including data privacy and security. One or more embodiments described herein include systems, computer-implemented methods, apparatus, and/or computer program products that can facilitate data lifecycle discovery and management, management of data access rights, management of erasure rights, and governance with regard to data protection, including data privacy and security.

To that end, various techniques for managing data associated with a set of platforms and a set of data stores associated with the set of platforms and with one or more entities are presented. The set of platforms can comprise a data lifecycle discovery platform (DLDP), a governance platform, a rights management platform, a data subject rights platform, an erasure platform, and other platforms, such as more fully described herein. The DLDP can identify data of users, data type, and language of the data stored in data stores (e.g., database components or other data stores) of entities based at least in part on scanning of the data stored in the data stores (e.g., by a scanner component of or associated with the DLDP). The DLDP can be a multi-tenant, multi-lingual platform that can support multiple tenants and multiple languages. The DLDP or an associated platform (e.g., governance platform) can determine compliance (e.g., a level of compliance) of the DLDP and the data stores with obligations (e.g., legal and/or contractual requirements, responsibilities, duties, constraints, or provisions) relating to data protection (e.g., data protection, privacy, and security) that can arise out of applicable laws or regulations of jurisdictions (e.g., associated with the entity, data store, or DLDP) or agreements (e.g., SLAs) between entities. Based at least in part on the results of analyzing the applicable laws, regulations, and/or agreements, the DLDP or the associated platform can employ a rules engine to determine and generate rules to facilitate complying with and enforcing laws, regulations, and/or agreements.

The rights management platform can manage rights of users with regard to their data and information relating to their data, and can manage access to data stored in the data stores and the information relating thereto, as more fully described herein, wherein the data or the information relating thereto can be stored in a secure data store of the DLDP or in a data store associated with an entity. The governance platform that can determine, and present to authorized users (e.g., via a user interface), information relating to key risk indicator (KRI) metrics, which can be or can comprise risk scores relating to levels of compliance (e.g., levels of adherence), non-compliance (e.g., non-adherence), or risks associated with non-compliance or potential non-compliance of the DLDP, governance platform, rights management platform, data subject rights platform, erasure platform, or another platform of the set of platforms, or associated entities, with regard to applicable laws, regulations, or agreements. Based at least in part on the various KRI metrics, risk controls, remediation events or actions, and/or exception events (e.g., due to non-compliance or other data privacy or protection anomalies), the governance platform also can determine a privacy health index of an entity (e.g., organization) associated with the set of platforms and/or the set of data stores. Based at least in part on tracking and analysis of the handling and use of data by the set of platforms or the data stores associated with entities, and applying the set of rules with regard to the handling and use of data, the governance platform (or rights management platform) can determine non-compliance issues associated with the set of platforms, or the data stores, and can remediate or facilitate remediating issues involving non-compliance. In accordance with various embodiments, the set of platforms can utilize artificial intelligence or machine learning to enhance various functions of or associated with the set of platforms (e.g., determining risk scores, determining a privacy health index, determining or predicting a likelihood of a non-compliance issue occurring, etc.), as more fully described herein.

The erasure platform can be or can comprise an erasure component that can manage erasure and/or retention of data associated with user accounts and stored in the set of data stores or an associated data vault repository. In some embodiments, in response to receiving a request for erasure of data (e.g., PII or other user data) associated with a user account from the set of data stores, the erasure component can analyze the set of rules and information relating to the user account, wherein the information relating to the user account can include an account status and erasure hold status associated with the user account. The set of rules can be based at least in part on legal and/or contractual obligations that can be applicable to the set of data stores, wherein the legal and/or contractual obligations can arise out of, and can be determined based at least in part on, one or more laws and/or contracts that can be applicable to the set of platforms, the set of data stores, and/or one or more associated entities (e.g., service entities). The set of rules can indicate or specify various conditions under which data associated with a user account of a user can be eligible to be erased from the set of data stores or the associated data vault repository. The erasure component can determine eligibility for erasure of all or a portion of the set of data from the set of data stores or associated data vault repository based at least in part on the results of analyzing the set of rules and the information relating to the user account.

In certain embodiments, the erasure component can determine (e.g., calculate) respective erasure eligibility scores associated with respective user accounts to pre-qualify or pre-determine erasure eligibility for erasure of respective data associated with the respective user accounts from the set of data stores or associated data vault repository, based at least in part on the results of analyzing respective information relating to the respective user accounts (e.g., respective account statuses, respective erasure hold statuses, or other information associated with the respective user accounts) and the set of rules. For example, with regard to each user account, prior to receiving an erasure request from a user to request that data associated with the user account be erased, the erasure component can analyze the set of rules relating to data erasure and data retention, and information relating to the user account (e.g., user account status, a length of time that the user account has been closed or inactive (if closed or inactive), an erasure hold status associated with the data, and/or other information relating to the user account). Based at least in part on the results of the analysis of the set of rules and the information relating to the user account, the erasure component can determine (e.g., calculate) an erasure eligibility score associated with the user account, wherein the erasure eligibility score can indicate a pre-qualification and pre-erasure request erasure eligibility status of the user account for erasure of the data associated with the user account from the set of data stores and/or associated data vault repository. The erasure component can utilize the erasure eligibility score associated with the user account to facilitate making determinations (e.g., at least initial determinations) regarding eligibility for data associated with the user account to be erased from the set of data stores and/or associated data vault repository, if a request to erase the data associated with the user account from the set of data stores and/or associated data vault repository is received from the user (or another authorized user) and/or for other desired purposes.

These and other aspects and embodiments of the disclosed subject matter will now be described with respect to the drawings.

FIG. 1 illustrates a block diagram of an example, non-limiting system 100 that can employ an erasure component that can desirably manage erasure and/or retention of data associated with user accounts stored in a set of data stores or an associated data vault repository, in accordance with various aspects and embodiments of the disclosed subject matter. The system 100 can comprise an erasure component 102 that can be, or can be part of, an erasure platform of a set of platforms, such as more fully described herein. The erasure component 102 can manage, and can make determinations regarding, erasure and/or retention of respective sets of data associated with respective user accounts that can be stored in a set of data stores, such as data store 104, data store 106, and/or data store 108, that can be associated with one or more entities. The erasure component 102 can be associated with (e.g., communicatively connected to, directly or indirectly) the set of data stores (e.g., data stores 104, 106, and/or 108) to facilitate identifying user accounts that have data stored in the set of data stores, identifying respective storage locations of respective data stored in the set of data stores, and managing erasure and/or retention of data associated with user accounts stored in the set of data stores, in accordance with a set of rules relating to data erasure and data retention, and defined data management criteria.

The erasure component 102 can comprise a rules engine 110 that can enforce or facilitate enforcing the set of rules relating to data erasure and data retention, in accordance with the defined data management criteria. In some embodiments, the rules engine 110 can determine and/or generate the set of rules based at least in part on the results of analyzing a set of obligations that can be applicable to the set of data stores, the set of platforms, and/or the one or more entities. In other embodiments, the rules engine 110 can receive and maintain the set of rules, wherein the rules engine 110 can receive the set of rules or updates to the set of rules from another platform (e.g., governance platform, rights management platform, data subject rights platform, or other platform; or external policy engine) of the set of platforms, as described herein. The rules engine 110 (or another component of another platform of the set of platforms) can determine the set of obligations, and correspondingly, the set of rules, based at least in part on analyzing various laws, regulations, and/or agreements that can be applicable to the set of data stores (e.g., data stores 104, 106, and/or 108), set of platforms, and/or one or more entities.

For instance, the set of data stores (e.g., data stores 104, 106, and/or 108) can be associated with (e.g., can be subject to) one or more jurisdictions and/or can be associated with (e.g., can be subject to) one or more agreements. The rules engine 110 (or the other component of the other platform) can analyze respective laws or regulations associated with respective jurisdictions, respective agreements associated with respective entities, and/or information relating thereto. Based at least in part on the results of such analysis, the rules engine 110 (or the other component of the other platform) can determine respective obligations (e.g., legal obligations or requirements, or contractual obligations or requirements) relating to (e.g., deriving from, arising out of, or necessitated by) the respective laws or regulations associated with the respective jurisdictions or the respective agreements associated with the respective entities. The rules engine 110 (or the other component of the other platform) can determine respective rules of the set of rules for managing erasure and/or retention of sets of data associated with users accounts that are stored in the set of data stores (e.g., data stores 104, 106, and/or 108) associated with the one or more entities (e.g., first entity, second entity, or other entity), based at least in part on the respective obligations, in accordance with the defined data management criteria. Respective rules of the set of rules relating to data erasure and data retention can comprise respective conditions, threshold values, and other features, such as more fully described herein. For instance, the set of rules can indicate or specify various conditions under which data associated with a user account of a user can be eligible to be erased from the set of data stores (e.g., data stores 104, 106, and/or 108).

The erasure component 102 can comprise an erasure request component 112 that can receive and process erasure requests that can be received from users to request that data (e.g., all or some of the user data) associated with user accounts of the users that is stored in one or more data stores of the set of data stores (e.g., data stores 104, 106, and/or 108) be erased from the one or more data stores. In response to receiving an erasure request from a user (e.g., directly or indirectly from the user, via a communication device), the erasure request component 112 can analyze and process the erasure request to determine or identify information relating to the erasure request, such as, for example, the user making the erasure request, the user account associated with the user and the erasure request, the data or type(s) of data associated with the user account that the user is requesting to be erased, the date and/or time the erasure request was received, and/or other desired information relating to the erasure request.

The erasure component 102 also can comprise an eligibility determination component 114 that can process erasure requests associated with user accounts to determine whether data (e.g., PII or other user data) associated with user accounts is to be erased from or retained in the set of data stores (e.g., data stores 104, 106, and/or 108) or an associated data vault repository 116, in accordance with the set of rules. For instance, in response to the erasure component 102 receiving an erasure request to erase a set of data associated with a user account, the eligibility determination component 114 can analyze the set of rules and the information relating to the user account, wherein the information relating to the user account can comprise the information relating to the erasure request and/or information relating to the activity status associated with the user account. The activity status associated with the user account can relate to whether the user account is open or closed, how long the user account has been closed (if the user account is closed), whether there is an erasure hold that can indicate that the set of data is to be retained in, and not erased from, the set of data stores, and/or other factors relating to activity associated with the user account. Based at least in part on the results of such analysis and application of the set of rules, the eligibility determination component 114 can determine the eligibility for erasure of all or a portion of the set of data associated with the user account (e.g., data of or associated with the user) from the set of data stores (e.g., data stores 104, 106, and/or 108) or the associated data vault repository 116, as more fully described herein.

If the eligibility determination component 114 determines that the set of data associated with the user account is not eligible for erasure from the set of data stores (e.g., data stores 104, 106, and/or 108) or the associated data vault repository 116, in accordance with the set of rules, the eligibility determination component 114 can deny the erasure request, and can retain the set of data in the set of data stores or the associated data vault repository 116. If the eligibility determination component 114 determines that all or a portion of the set of data associated with the user account is eligible for erasure (e.g., deletion or removal) from the set of data stores (e.g., data stores 104, 106, and/or 108) or the associated data vault repository 116, in accordance with the set of rules, the eligibility determination component 114 can process the erasure request to erase all or the eligible portion of the set of data from the set of data stores or the associated data vault repository 116. These and other aspects of the disclosed subject matter will be further described herein.

In response to receiving an erasure request from a user to erase a set of data associated with a user account of the user, the erasure component 102, employing the eligibility determination component 114, can analyze information relating to the user account and the set of rules relating to data erasure and data retention. The information can comprise an activity status associated with the user account, wherein the activity status can include the account status associated with the user account, the erasure hold status associated with the user account, and/or other information relating to activity associated with the user account of the user. The set of rules can comprise rules that can be applicable to the set of data stores (e.g., data stores 104, 106, and/or 108), the associated data vault repository 116, the set of platforms, and/or one or more entities associated with the set of data stores.

A first rule of the set of rules can indicate that data, which is associated with a user account that is not closed or cannot be closed, is not eligible for erasure from the set of data stores. In connection with the first rule, the eligibility determination component 114 can determine whether the user account is closed, and if not closed, whether the user account can be closed, based at least in part on the results of analyzing the information relating to the account status associated with the user account. The account status can indicate whether or not the user account is closed and/or, if closed, how long the user account has been closed, and/or, if not closed, whether or not the user account can be closed. In some instances, a user account may not be able to be closed, for example, due to a legal restriction (e.g., legal hold) or contractual restriction that does not permit the user account to be closed. For instance, if there is an issue of a financial fraud or other potential illegality associated with the user account, and/or if there is some other irregularity with the user account that results in the user account and/or associated user not being in good standing with the entity or a law enforcement agency or other agency, the user account can or may be flagged with a legal restriction or contractual restriction that indicates that the user account cannot be closed, at least until the legal restriction or contractual restriction is removed.

The eligibility determination component 114 (or another component of the erasure component 102) can access information in one or more databases of or associated with one or more governmental or non-governmental organizations (e.g., law enforcement or other governmental organization, or other type of organization) associated with one or more jurisdictions to determine whether there is a legal restriction or contractual restriction associated with a user account of a user. In some embodiments, a user account restriction tag, flag, or other indicator (e.g., metadata relating to legal or contractual restriction status) can be associated with a user account if there is a legal or contractual restriction associated with the user account that restricts, prevents, or prohibits the user account from being closed (e.g., if the legal or contractual restriction status was already identified prior to receiving an erasure request). In some embodiments, when processing and considering an erasure request and/or a request to close the user account, the eligibility determination component 114 (or another component of the erasure component 102) can check to see if there is a user account restriction tag, flag, or other indicator associated with the user account and/or can access the one or more databases of or associated with one or more governmental or non-governmental organization to obtain a current user account restriction status for the user account or to confirm the user account restriction status information already associated with the user account.

If, from the analysis results, the eligibility determination component 114 determines that the user account is not closed and is not permitted to be closed (e.g., the user account is still open or active, and is not permitted to be closed) due to having a legal or contractual restriction status that indicates that the user account is not permitted to be closed, the eligibility determination component 114 can determine that the set of data associated with the user account is not eligible for erasure from the set of data stores (e.g., data stores 104, 106, and/or 108), in accordance with the first rule. As a result, the eligibility determination component 114 can determine that the erasure request is to be denied and the set of data associated with the user account is to be retained in, and not erased from, the set of data stores (e.g., data stores 104, 106, and/or 108). Accordingly, the erasure component 102 can deny the erasure request of the user, and the erasure component 102 or another component associated therewith can communicate a denial of the erasure request to the user (e.g., to a communication device associated with the user). If, instead, the eligibility determination component 114 determines that the user account can be closed, due to not having a legal or contractual restriction associated with the user account, the eligibility determination component 114 (or another component of the system 100) can close the user account.

If the eligibility determination component 114 determines that the user account is closed (e.g., was previously closed prior to the erasure request; or was permitted to be closed and was closed in connection with the erasure request), the eligibility determination component 114 can determine or identify the amount (e.g., the length) of time that the user account has been closed or inactive, based at least in part on the results of analyzing the information relating to the account status associated with the user account, which can indicate the amount of time that the user account has been closed or inactive. A user account can be considered or determined to be inactive during a period of time where there are no transactions (e.g. financial transactions, purchase transactions, service subscription transactions, or other transactions) or other substantive activity occurring in connection with the user account. In that regard, a second rule of the set of rules can indicate or specify a first defined threshold amount of time that a user account has to be closed or inactive in order for at least a certain portion of a set of data associated with a user account to be eligible (e.g., to qualify) for erasure from the set of data stores (e.g., data stores 104, 106, and/or 108). The erasure component 102 can determine and/or set the first defined threshold amount of time based at least in part on the second rule. In some embodiments, the first defined threshold amount of time can be a desired amount of time, such as two years (e.g., in accordance with an applicable law, contractual provision, or a defined data management criterion). In other embodiments, the first defined threshold amount of time can be a desired period of time that can be greater than or less than two years (e.g., in accordance with a different applicable law, different contractual provision, or a different defined data management criterion).

The eligibility determination component 114 can determine whether the amount of time that the user account has been closed or inactive satisfies (e.g., meets or exceeds; is greater than or equal to) the first defined threshold amount of time based at least in part on the results of analyzing the information relating to the account status associated with the user account. If the eligibility determination component 114 determines that the amount of time that the user account has been closed or inactive does not satisfy (e.g., does not meet or exceed; or is less than) the first defined threshold amount of time, the eligibility determination component 114 can determine that the erasure request can be denied and the set of data associated with the user account is to be retained in, and not erased from, the set of data stores (e.g., data stores 104, 106, and/or 108), in accordance with the second rule. Accordingly, the erasure component 102 can deny the erasure request of the user, the erasure component 102 or another component associated therewith can communicate a denial of the erasure request to the user (e.g., to a communication device associated with the user), and the set of data can continue to be retained in the set of data stores (e.g., data stores 104, 106, and/or 108).

If, instead, the eligibility determination component 114 determines that the amount of time that the user account has been closed or inactive satisfies the first defined threshold amount of time, the eligibility determination component 114 can determine whether there is an erasure hold associated with the user account, based at least in part on the results of analyzing the information relating to the activity status associated with the user account and a third rule of the set of rules. The information relating to the activity status can indicate or specify an erasure hold status associated with the user account. The third rule can indicate or specify that data, which is associated with a user account that has an erasure hold associated with it, is not permitted to be erased from the set of data stores. An erasure hold (e.g., an erasure or deletion restriction, a data deletion or removal hold, or a user account hold or freeze) can indicate, for example, that there is a legal, criminal, and/or contractual reason for retaining the data in the set of data stores and not erasing the data from the set of data stores (e.g., data stores 104, 106, and/or 108). The eligibility determination component 114 (or another component of the erasure component 102) can access information in one or more databases of or associated with one or more governmental or non-governmental organizations (e.g., law enforcement or other governmental organization, or other type of organization) associated with one or more jurisdictions to determine whether there is an erasure hold associated with a user account of a user. In some embodiments, an erasure hold tag, flag, or other indicator (e.g., metadata relating to erasure hold status) can be associated with a user account if there is an erasure hold associated with the user account (e.g., if the erasure hold status was already identified prior to receiving an erasure request). In certain embodiments, when processing and considering the erasure request, the eligibility determination component 114 (or another component of the erasure component 102) can check to see if there is an erasure hold tag, flag, or other indicator associated with the user account and/or can access the one or more databases of or associated with one or more governmental or non-governmental organization to obtain a current erasure hold status for the user account or to confirm the erasure hold status information already associated with the user account. In accordance with various embodiments, a user account restriction tag, flag, or other indicator associated with a user account that can restrict closing the user account also can be same as and/or act as an erasure hold tag, flag, or other indicator that can indicate an erasure hold associated with the user account; or the user account restriction tag, flag, or other indicator associated with the user account can be separate and/or different from the erasure hold tag, flag, or other indicator associated with the user account.

If the eligibility determination component 114 determines that there is an erasure hold associated with the user account, the eligibility determination component 114 can determine that erasure of the set of data associated with the user account is not permitted and the erasure request is to be denied, in accordance with the third rule. In response to such determination by the eligibility determination component 114, the erasure component 102 can deny the erasure request of the user, the erasure component 102 or another component associated therewith can communicate a denial of the erasure request to the user (e.g., to a communication device associated with the user), and the set of data can continue to be retained in the set of data stores (e.g., data stores 104, 106, and/or 108).

If, instead, the eligibility determination component 114 determines that there is no erasure hold associated with the user account, the eligibility determination component 114 can determine whether the amount of time the user account has been closed satisfies (e.g., meets or exceeds; is greater than or equal to) a second defined threshold amount of time, in accordance with a fourth rule of the set of rules. The fourth rule can indicate or specify that data (e.g., personal data or other data associated with a user), which is associated with a user account that does not have an erasure hold associated with (e.g., applicable or linked to) such user account, is eligible (e.g., permitted) to be erased, and/or is to be erased, from the set of data stores (e.g., data stores 104, 106, and/or 108), if the second defined threshold amount of time is satisfied; and, if the second defined threshold amount of time is not satisfied, and there is no erasure hold associated with the user account, a certain portion of the data (e.g., marketing data or other data) associated with the user account is eligible to be erased, and/or is to be erased, from the set of data stores. The erasure component 102 (or another component) can determine or set the second defined threshold amount of time, in accordance with (e.g., in compliance with) the fourth rule. In some embodiments, the second defined threshold amount of time can be ten years (e.g., in accordance with an applicable law or contractual provision). In other embodiments, the second defined threshold amount of time can be a desired period of time that can be greater than or less than ten years (e.g., in accordance with a different applicable law or different contractual provision).

If the eligibility determination component 114 determines that the amount (e.g., length) of time the user account has been closed satisfies the second defined threshold amount of time, the eligibility determination component 114 can determine that the set of data (e.g., personal data and/or other data of or associated with the user) associated with the user account is eligible for erasure from the set of data stores (e.g., data stores 104, 106, and/or 108). In response to the eligibility determination component 114 determining that the set of data associated with the user account is eligible for erasure from the set of data stores (e.g., data stores 104, 106, and/or 108), the eligibility determination component 114 can erase (e.g., delete) the set of data associated with the user account from the set of data stores (e.g., data stores 104, 106, and/or 108). In response to erasure of the set of data associated with the user account, the erasure component 102 or another component associated therewith can communicate a notification of completion of the erasure request to the user (e.g., to a communication device associated with the user).

If, instead, the eligibility determination component 114 determines that the amount of time the user account has been closed does not satisfy the second defined threshold amount of time, the eligibility determination component 114 can determine that only a certain portion (e.g., marketing-related information or other type of information) of the set of data associated with the user account is eligible to be erased from the set of data stores (e.g., data stores 104, 106, and/or 108), in accordance with the fourth rule. If the eligibility determination component 114 determines that only the certain portion of the set of data associated with the user account is eligible to be erased from the set of data stores (e.g., data stores 104, 106, and/or 108), in accordance with the fourth rule, the erasure component 102 can erase the certain portion of the data from the set of data stores (e.g., data stores 104, 106, and/or 108).

In connection with erasing the certain portion of the set of data from the set of data stores (e.g., data stores 104, 106, and/or 108), the erasure component 102 can employ a data retention component 118 that can transfer the remaining portion (e.g., a copy of the personal data of or associated with the user) of the set of data associated with the user account from the set of data stores to the data vault repository 116 for retention of the remaining portion of the set of data in the data vault repository 116, for example, until the remaining portion of the set of data is eligible for erasure from the data vault repository 116. In certain embodiments, the data retention component 118 can tag or flag (e.g., with a tag indicator or flag indicator and/or associated information) the remaining portion of the set of data associated with the user account for erasure, or at least for evaluation for eligibility for erasure, from the data vault repository 116 at a future time when the user account will have been closed for a length of time that is determined to satisfy the second defined threshold amount of time. The metadata (e.g., tag or flag indicator and/or associated information) associated with the user account can be stored in the data vault repository 116 or other desired data store of or associated with the erasure component 102.

In some embodiments, the data vault repository 116 can be separate from the set of data stores (e.g., data stores 104, 106, and/or 108), and can have a higher security level than the set of data stores. In other embodiments, the data vault repository 116 can be part of the set of data stores (e.g., data stores 104, 106, and/or 108), but can be a separate data storage partition that can have a higher security level than the other partition(s) of the set of data stores.

As part of having a higher security level, the data vault repository 116 can have a more highly restricted access than the level of restricted access associated with the set of data stores (e.g., data stores 104, 106, and/or 108) where fewer entities associated with the service entity associated with the system 100 can have access to the data associated with user accounts and users stored in the data vault repository 116, as compared to the access such entities can have with regard to the data associated with user accounts and users stored in the set of data stores (e.g., data stores 104, 106, and/or 108). For instance, certain entities, such as service representatives or data analysists may have access to data stored in the set of data stores (e.g., data stores 104, 106, and/or 108), but not the data stored in the data vault repository, wherein other higher trusted entities or entities with higher responsibilities can have access to the data stored in the data vault repository 116 as well as the data stored in the set of data stores (e.g., data stores 104, 106, and/or 108). In some embodiments, if one of the certain entities performs a search for data associated with user accounts comprising first data stored in the set of data stores (e.g., data stores 104, 106, and/or 108) and second data stored in the data vault repository 116, the search results provided to the certain entity can enable the certain entity to access and view the first data stored in the set of data stores (e.g., data stores 104, 106, and/or 108), but will not enable the certain entity to access and view the second data stored in the data vault repository 116.

While the remaining portion of the data associated with the user account is stored in the data vault repository 116 and not yet eligible for erasure, the data retention component 118 can track the amount of time that the user account has been closed to facilitate identifying when a sufficient amount of time (e.g., the second defined threshold amount of time) has elapsed to indicate that the remaining portion of the data can or may be eligible for erasure from the data vault repository 116 (e.g., in response to the erasure request that has not yet been fulfilled completely). The data retention component 118 can continue to track the amount of time that has elapsed since the user account was closed.

If, based at least in part on the tracking, the data retention component 118 determines that the amount of time the user account has been closed satisfies (e.g., meets or exceeds; is equal to or greater than) the second defined threshold amount of time, the data retention component 118 can communicate a message or indicator to the eligibility determination component 114 to inform the eligibility determination component 114 that the user account has been closed long enough to satisfy the second defined threshold amount of time, in accordance with the fourth rule of the set of rules. In response to such message or indicator, the eligibility determination component 114 can determine whether there is an erasure hold associated with the user account. For instance, the eligibility determination component 114 can determine whether an erasure hold associated with the user account has been instituted (e.g., placed on or associated with the user account), since the last time the eligibility determination component 114 checked to see if there was an erasure hold associated with the user account.

If the eligibility determination component 114 determines that an erasure hold is associated with the user account (e.g., an erasure hold has been issued with regard to or applied to the user account since the last time the eligibility determination component 114 checked to see if there was an erasure hold associated with the user account), the eligibility determination component 114 can determine that the remaining portion of the data is not eligible to be erased from the data vault repository 116, and can decline or not take action to erase the remaining portion of the data from the data vault repository 116 to thereby retain the remaining portion of the data in the data vault repository 116, in accordance with the fourth rule.

If, instead, the eligibility determination component 114 determines that there is no erasure hold associated with the user account, the eligibility determination component 114 can determine that the remaining portion of the data associated with the user account can be erased from the data vault repository 116, because there is no erasure hold and the user account has been closed for at least the second defined threshold amount of time, in accordance with the set of rules. Accordingly, the eligibility determination component 114 can erase the remaining portion of the data associated with the user account from the data vault repository 116. In response to erasure of the remaining portion of the data associated with the user account from the data vault repository 116, and with all of the set of data associated with the user account having been erased, the erasure component 102 or another component associated therewith can communicate a notification of completion of the erasure request to the user (e.g., to a communication device associated with the user).

Figure 2:
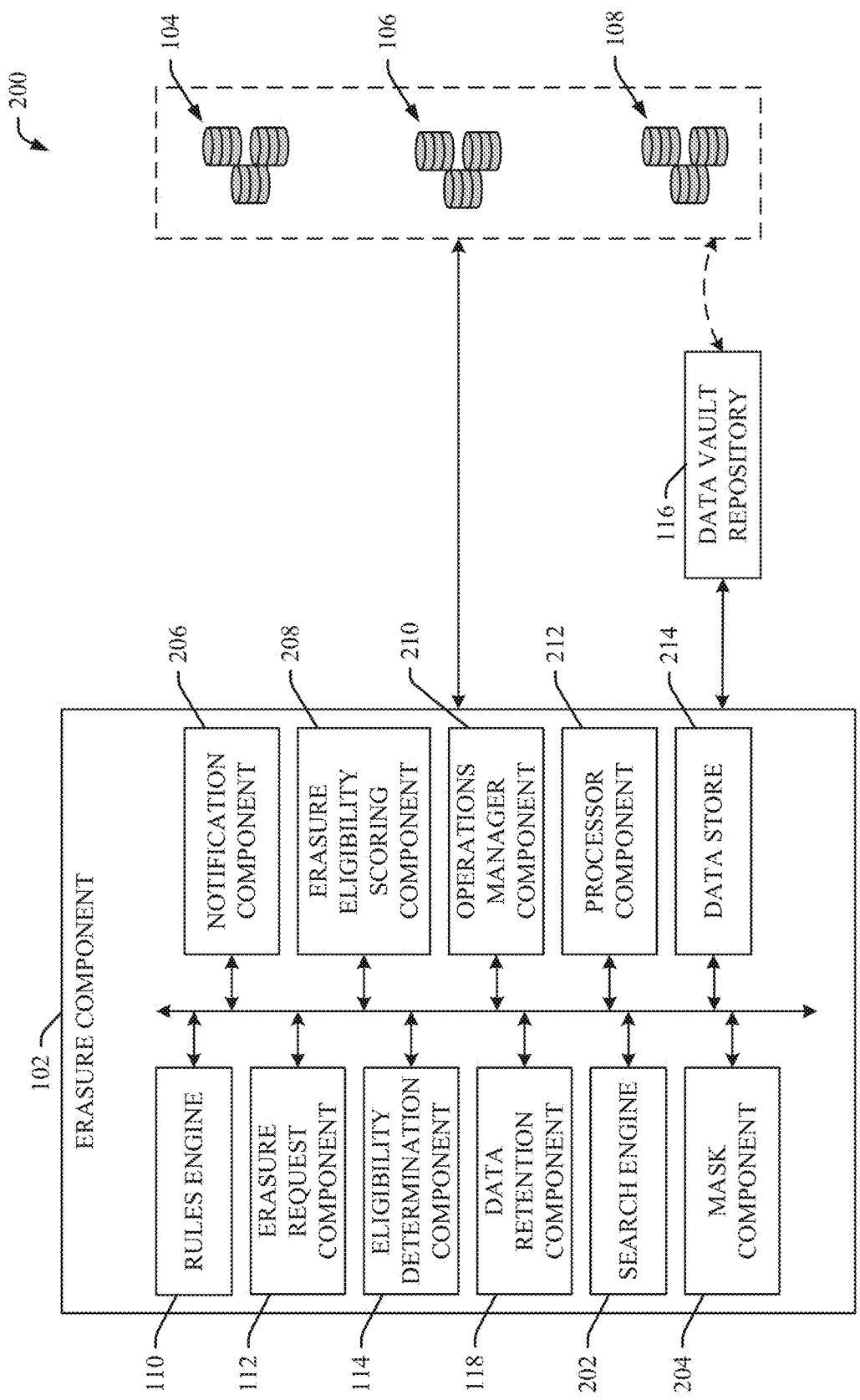
FIG. 2 depicts a block diagram of an example, non-limiting system that can employ an erasure component that can desirably manage erasure and/or retention of data associated with user accounts stored in a set of data stores or an associated data vault repository, search, initiate a search, or request a search for data associated with user accounts, and/or determine erasure eligibility scores associated with user accounts, in accordance with various aspects and embodiments of the disclosed subject matter.

Turning to FIG. 2, FIG. 2 depicts a block diagram of an example, non-limiting system 200 that can employ an erasure component that can desirably manage erasure and/or retention of data associated with user accounts stored in a set of data stores or an associated data vault repository, search, initiate a search, or request a search (e.g., by the DLDP) for data associated with user accounts, and/or determine erasure eligibility scores associated with user accounts, in accordance with various aspects and embodiments of the disclosed subject matter. The system 200 can comprise the erasure component 102, which can be, or can be part of, an erasure platform of a set of platforms, such as more fully described herein. The erasure component 102 can comprise the rules engine 110, the erasure request component 112, the eligibility determination component 114, and the data retention component 118, such as more fully described herein. The system 200 also can include the set of data stores, such as data store 104, data store 106, and/or data store 108, and the data vault repository 116 that can be associated with (e.g., communicatively connected to) the erasure component 102, as more fully described herein.

In some embodiments, the erasure component 102 can comprise a search engine 202 that can perform a search, initiate performing a search, request performing of a search, and/or facilitate performing a search for items of data of a set of data associated with a user account in the set of data stores (e.g., data stores 104, 106, and/or 108) and/or the data vault repository 116, during processing of an erasure request received from a user associated with the user account (or another authorized entity). For instance, in response to the erasure request component 112 receiving the erasure request, the search engine 202 can perform a search, initiate performing of the search, request performing of a search, and/or facilitate performing of the search for any items of data associated with the user account that can or may be stored in the set of data stores (e.g., data stores 104, 106, and/or 108) and/or the data vault repository 116, if any such items of data exist. Additionally or alternatively, during processing of the erasure request, if the eligibility determination component 114 determines that all or a portion of a set of data associated with the user account is eligible for erasure from the set of data stores (e.g., data stores 104, 106, and/or 108) and/or the data vault repository 116, in accordance with the set of rules, the search engine 202 can perform a search, initiate performing of the search, request performing of a search, and/or facilitate performing of the search for items of data of the set of data associated with the user account that are stored in the set of data stores (e.g., data stores 104, 106, and/or 108) and/or the data vault repository 116. The search engine 202 can generate or provide search results relating to the results of searching for the items of data in the set of data stores (e.g., data stores 104, 106, and/or 108) and/or the data vault repository 116, wherein the search results can indicate what items of data are associated with the user account, the storage locations or files where such items of data can be found in the set of data stores (e.g., data stores 104, 106, and/or 108) and/or the data vault repository 116, and/or other information relating to the search for the items of data and/or the user account.

In certain embodiments, the search engine 202 can generate, and present or execute, a search query to initiate a search for items of data of a set of data associated with the user account in the set of data stores (e.g., data stores 104, 106, and/or 108) and/or the data vault repository 116. In response to the search query, another component (e.g., scanner component (not shown in FIG. 2; as further described herein)) can perform the search for such items of data, for example, by scanning the set of data stores (e.g., data stores 104, 106, and/or 108) and/or the data vault repository 116 to locate such items of data stored therein, and the other component can return information relating or responsive to the search (e.g., search results) to the search engine 202 for presentation to the eligibility determination component 114, another component of the erasure component 102, or to an interface component (e.g., display screen) or communication device associated with an entity (e.g., service representative). In other embodiments, the search engine 202 can perform the search for the items of data associated with the user account itself by accessing, searching, and/or scanning the set of data stores (e.g., data stores 104, 106, and/or 108) and/or the data vault repository 116 to locate such items of data stored therein.

The erasure component 102 also can comprise a mask component 204 that can mask data entries in tables, databases, and/or storage locations of the set of data stores (e.g., data stores 104, 106, and/or 108) in instances where items of data associated with a user account have been erased (e.g., deleted) from storage location of the set of data stores (e.g., data stores 104, 106, and/or 108). Items of data stored in storage locations of the set of data stores (e.g., data stores 104, 106, and/or 108) often can be associated with (e.g., mapped or linked to) cells or fields in tables or databases. Also, those cells or fields in the tables or databases sometimes can be associated with (e.g., mapped or linked to) other cells or fields in other tables or databases. For example, a first cell of a first table can have a first data entry that indicates the item of data for that first cell is located in a first storage location in the data store 104, and/or a second cell of a second table can have a second data entry that indicates the item of data for that second cell can be located or found through the first cell of the first cell. When items of data associated with a user account are erased from storage locations of the set of data stores (e.g., data stores 104, 106, and/or 108), this can, or at least potentially can, disrupt or cause a failure with any table, database, or associated process that uses such table or database downstream from the storage locations of the set of data stores from which the items of data have been deleted, which can negatively impact system integrity. With further regard to the table example, if the item of data is erased from the first storage location in the data store 104, and there is no item of data stored in the storage location of the data store 104, when the first cell of the first table is accessed, for example, as part of a process (e.g., data analysis process), the first data entry of the first cell will not lead to any item of data, which potentially can disrupt of cause a failure of the process, and/or when the second cell of the second table is accessed, the second data entry of the second cell will not lead to any item of data because the second data entry of the second cell is mapped to the first cell of the first table, which potentially can disrupt of cause a failure of the process (or another process).

The mask component 204 can ameliorate or mitigate (e.g., eliminate, reduce, or minimize) such potential issues with tables, databases, or processes (e.g., data analysis processes, data retrieval processes, or other data-related processes) by masking data entries in tables, databases, and/or storage locations of the set of data stores (e.g., data stores 104, 106, and/or 108) when items of data associated with a user account are erased from storage locations of the set of data stores. For example, when an item of data is erased from a storage location in a data store (e.g., data store 104), the mask component 204 can replace the erased item of data by inserting or storing a default item of data (e.g., mask data) into or in the storage location so that when a table, database, or process desires to access (directly or indirectly access) the data stored in that storage location, there can be a valid item of data (e.g., the default item of data) stored in that storage location, which can prevent or mitigate disruption or failure associated with the table, database, or process that was accessing the data stored in that storage location. The default item of data generated by the mask component 204 can be a generic item of data, a randomly or pseudo-randomly generated item of data, and/or an item of data of a type that can be in a format (e.g., alphabetic text string, numeric text string, alphanumeric text string, or other type of text string) that is expected to be found in that storage location and associated with a cell or field of a table or database. The mask component 204 can generate and/or structure the default item of data (e.g., mask data) so that the default item of data does not relate in any way back to any information (e.g., personal information) associated with the user account or user.

The erasure component 102 also can include a notification component 206 that can generate and communicate various types of notification messages, which can be communicated to other components of the erasure component 102, other platforms of the set of platforms, interface components (e.g., display screen) associated with the set of platforms, and/or communication devices associated with the set of platforms. For example, when an erasure request associated with a user account has been denied (e.g., due to ineligibility for erasure), completed (e.g., data has been erased in response to the erasure request, due to eligibility for erasure), or partially completed (e.g., when only a certain portion of the data is eligible for erasure), the notification component 206 can generate a notification message that can comprise information that can correspondingly indicate the erasure request has been denied, completed, or partially completed, and/or, if denied or only partially completed, can indicate a reason for denying the erasure request or for only deleting some of the data associated with the user account. As another example, during processing of an erasure request associated with a user account, the eligibility determination component 114 can desire to obtain information regarding an erasure hold status associated with the user account. In that regard, the notification component 206 can generate a notification message and can communicate the notification message to another component of the erasure component 102 or another platform, or to an interface component or communication device associated with an entity (e.g., service representative or analyst representative), to inform or notify the other component, other platform, or the entity that the eligibility determination component 114 desires (e.g., is requesting) information regarding an erasure hold status associated with the user account, So that the other component, other platform, or the entity can take action to obtain the information regarding the erasure hold status associated with the user account.

In certain embodiments, in response to receiving an erasure request from a user (or other authorized entity) to erase data associated with a user account of the user, the erasure component 102 can determine whether any data associated with the user account has been shared (e.g., in accordance with the set of rules) with a third-party entity. If it is determined that data associated with the user account has been shared with a third-party entity, the notification component 206 can generate a notification message and communicate the notification message to a communication device associated with the third-party entity, wherein the notification message can notify the third-party entity that an erasure request has been received from the user (or other authorized entity) to request that the data associated with the user account be erased. This can enable the third-party entity to determine whether to erase the data associated with the user from its own data storage systems based on the erasure request.

Also, in some embodiments, the set of platforms of the disclosed subject matter can cease (e.g., discontinue) sharing data associated with the user account with any third-party entity, for example, if the data associated with the erasure request is determined to be eligible for erasure, or partial erasure, from the set of data stores (e.g., data stores 104, 106, and/or 108) and/or data vault repository 116, or even if the data associated with the user account is not currently eligible for erasure from the set of data stores and/or data vault repository 116, as indicated or specified by the set of rules and the defined data management criteria. In certain embodiments, if a third-party entity is able to access tables, databases, or processes associated with the set of platforms of the disclosed subject matter, where such tables, databases, or processes comprise or are associated with (e.g., mapped or linked to) data associated with the user account, and the data has been erased in response to an erasure request associated with the user account, the mask component 206 can have inserted or stored default items of data (e.g., mask data) into or in the storage locations of the set of data stores and/or data vault repository 116 from which the data associated with the user account had been erased, so the third-party entity will only be access the default items of data, which can be structured by the mask component 206 to not relate back to or be identified with the user, as more fully described herein.

The erasure component 102 further can comprise an erasure eligibility scoring component 208 that can determine erasure eligibility scores (e.g., prior to receiving erasure requests) that can pre-determine or pre-qualify eligibility for data erasure for user accounts that have data stored in the set of data stores (e.g., data stores 104, 106, and/or 108) and/or the data vault repository 116, in accordance with the set of rules. At one or more desired times (e.g., periodically, based on a condition being satisfied, and/or in response to receiving information associated with a user account, with regard to a user account associated with a user, even if an erasure request has not been received from the user (or other authorized entity) by the erasure component 102 to request erasure of data from the user account, the erasure eligibility scoring component 208 can determine (e.g., calculate) an erasure eligibility score that can indicate (e.g., preliminarily indicate, pre-determine, or pre-qualify) an eligibility for data associated with the user account to be erased (e.g., can indicate whether the data is eligible to be erased) from the set of data stores (e.g., data stores 104, 106, and/or 108) and/or the data vault repository 116, in accordance with the set of rules relating to data erasure and data retention.

For instance, with regard to all or desired user accounts associated with respective users, for each of those user accounts, prior to receiving an erasure request from a user to request that data associated with the user account be erased, the erasure eligibility scoring component 208 can analyze the user account activity status, the length of time that the user account has been closed (if closed), the erasure hold status associated with the user account, and the set of rules relating to data erasure and data retention. With regard to each user account under consideration, based at least in part on the results of the analysis of the user account activity status, the length of time that the user account has been closed (if closed), the erasure hold status associated with the user account, and the set of rules, the erasure eligibility scoring component 208 can determine (e.g., calculate) an erasure eligibility score associated with the user account, wherein the erasure eligibility score can indicate a pre-qualification and pre-erasure request erasure eligibility status of the user account for erasure of the data from the set of data stores (e.g., data stores 104, 106, and/or 108) and/or the data vault repository 116. A high or higher erasure eligibility score associated with a user account can indicate that the data associated with the user account can be eligible or can be more likely to be eligible for erasure from the set of data stores (e.g., data stores 104, 106, and/or 108) and/or the data vault repository 116, whereas a low or relatively lower erasure eligibility score associated with a user account can indicate that the data associated with the user account may not be eligible or can be more likely to not be eligible for erasure from the set of data stores (e.g., data stores 104, 106, and/or 108) and/or the data vault repository 116.

For example, if a user account is determined to still be open or determined to only have been closed for a relatively short amount of time (e.g., less than the first defined threshold amount of time), and/or if the user account is determined to have an erasure hold associated with it, the erasure eligibility scoring component 208 can determine that the erasure eligibility score for that user account is relatively low, as such factors associated with the user account can indicate that the data associated with the user account and stored in the set of data stores is not eligible to be erased from the set of data stores (e.g., data stores 104, 106, and/or 108). If, instead, a user account is determined to have been closed for a relatively longer period of time (e.g., longer than the first defined threshold amount of time, but less than the second defined threshold amount of time), and if the user account is determined to not have an erasure hold associated with it, the erasure eligibility scoring component 208 can determine that the erasure eligibility score for that user account can be in a mid-level range of eligibility scores, as such factors associated with such user account can indicate that, while all of the data associated with the user account and stored in the set of data stores is not eligible to be erased from the set of data stores, currently, a certain portion of the data can be eligible for erasure from the set of data stores and the other portion of the data may be eligible for erasure from the set of data stores (e.g., data stores 104, 106, and/or 108) and/or the data vault repository 116 in the future (e.g., since there currently is no erasure hold associated with the user account). If, instead, a user account is determined to have been closed for a relatively long period of time (e.g., longer than the second defined threshold amount of time), and if the user account is determined to not have an erasure hold associated with it, the erasure eligibility scoring component 208 can determine that the erasure eligibility score for that user account can be relatively high (e.g., very high), as such factors associated with such user account can indicate that, currently, all of the data associated with the user account can be eligible for erasure from the set of data stores (e.g., data stores 104, 106, and/or 108) and/or the data vault repository 116.

The erasure eligibility scoring component 208 can determine and generate erasure eligibility scores associated with user accounts to have a desired level of granularity. In some embodiments, the erasure eligibility scoring component 208 can determine and generate erasure eligibility scores associated with user accounts that can comprise a low erasure eligibility score that can indicate a user account is not eligible for erasure of data, a medium erasure eligibility score that can indicate a user account may be eligible or soon may be eligible for erasure of data or partial erasure of data, and a high erasure eligibility score that can indicate a user account can be eligible (e.g., at least preliminarily eligible) for erasure of data. In other embodiments, the erasure eligibility scoring component 208 can determine and generate erasure eligibility scores associated with user accounts that can have a higher level of granularity (e.g., low level erasure eligibility score, lower mid-level erasure eligibility score, mid-level erasure eligibility score, upper mid-level erasure eligibility score, and high level erasure eligibility score; or erasure eligibility scores that can range from 0 to 10 (e.g., 0, 1, 2, . . . , 6, 7, . . . , 9, or 10) or 0 to 100 (e.g., 0, 1, 2, 3, . . . , 10, . . . , 20, . . . , 50, . . . , 90, . . . 99, or 100)).

In response to receiving an erasure request associated with a user account, the eligibility determination component 114 can utilize an erasure eligibility score associated with the user account to make a preliminary determination regarding whether the user account is eligible to have all or a portion of the set of data associated with the user account erased from the set of data stores (e.g., data stores 104, 106, and/or 108) and/or the data vault repository 116. In many cases, this can save time and resources with regard to the eligibility determination component 114 and/or other components of the erasure component 102 processing an erasure request. For example, if the erasure eligibility scoring component 208 already has determined that the amount of time a user account has been closed satisfies the second defined threshold amount of time (or the first defined threshold amount of time), during processing of an erasure request associated with that user account, the eligibility determination component 114 typically does not have to utilize the time and resources to determine whether the amount of time that the user account has been closed satisfies the second defined threshold amount of time (or the first defined threshold amount of time). As determined to be desired (e.g., suitable, wanted, warranted, or necessary) by the eligibility determination component 114, while working from the erasure eligibility score associated with a user account as a starting point for determining erasure eligibility, the eligibility determination component 114 can perform further analysis or inquiries relating to determining the eligibility status for data erasure associated with a user account to make a final determination regarding the eligibility status for data erasure associated with the user account.

The erasure eligibility scoring component 208 can update erasure eligibility scores associated with user accounts, for example, on periodic basis and/or in response to receiving information associated with a user account where such information can or may impact the erasure eligibility score and erasure eligibility status associated with the user account. Such information associated with a user account can comprise, for example, the user account closes, an amount of time the user account has been closed reaches a point where the first or second defined threshold amount of time has been satisfied, an erasure hold has been associated with the user account, or an erasure hold has been removed from the user account.

In some embodiments, the erasure component 102 can comprise an operations manager component 210 that can control (e.g., manage) operations associated with the erasure component 102. For example, the operations manager component 210 can facilitate generating instructions to have components of or associated with the erasure component 102 perform operations, and can communicate respective instructions to respective components (e.g., rules engine 110, erasure request component 112, eligibility determination component 114, data retention component 118, search engine 202, mask component 204, notification component 206, erasure eligibility scoring component 208, processor component 212, data store 214, or other component) of or associated with the erasure component 102 to facilitate performance of operations by the respective components of or associated with the erasure component 102 based at least in part on the instructions, in accordance with the defined data management criteria and the defined data management algorithm(s) (e.g., data management algorithms as disclosed, defined, recited, or indicated herein by the methods, systems, and techniques described herein). The operations manager component 210 also can facilitate controlling data flow between the respective components of the erasure component 102 and controlling data flow between the erasure component 102 and another component(s) or device(s) (e.g., components or platforms of the set of platforms, communication devices, tables, databases, applications, the set of data stores (e.g., 104, 106, and 108), the data vault repository 116, or devices or components of a communication network) associated with (e.g., connected to) the erasure component 102.

The erasure component 102 also can include or be associated with a processor component 212 that can work in conjunction with the other components (e.g., rules engine 110, erasure request component 112, eligibility determination component 114, data retention component 118, search engine 202, mask component 204, notification component 206, erasure eligibility scoring component 208, operations manager component 210, data store 214, or other component) to facilitate performing the various functions of the erasure component 102. The processor component 212 can employ one or more processors, microprocessors, or controllers that can process data, such as information relating to erasure of data, eligibility determinations for erasure of data, data retention, activity status, account status, erasure hold status, erasure requests, user accounts, users, laws, regulations, agreements, obligations, rules, masking of data, data searches, search results, erasure eligibility scores, communication devices, identifiers or authentication credentials associated with users or communication devices, notifications, alerts, data parsing, data filtering, data classification, data or user security, data vault repository security, parameters, traffic flows, policies, defined data management criteria, algorithms (e.g., data management algorithms, filtering algorithms, data classification algorithms AI algorithms, machine learning algorithms, or other algorithms, including as one or more of these algorithms are expressed in the form of the methods and techniques described herein), protocols, interfaces, tools, and/or other information, to facilitate operation of the erasure component 102, as more fully disclosed herein, and control data flow between the erasure component 102 and other components (e.g., a communication device, an interface component, another component or platform of the set of platforms, databases, data sources, or applications) associated with the erasure component 102.

The erasure component 102 further can comprise or be associated with a data store 214 that can store data structures (e.g., user data, metadata), code structure(s) (e.g., modules, objects, hashes, classes, procedures) or instructions, information relating to erasure of data, eligibility determinations for erasure of data, data retention, activity status, account status, erasure hold status, erasure requests, user accounts, users, laws, regulations, agreements, obligations, rules, masking of data, data searches, search results, erasure eligibility scores, communication devices, identifiers or authentication credentials associated with users or communication devices, notifications, alerts, data parsing, data filtering, data classification, data or user security, data vault repository security, parameters, traffic flows, policies, defined data management criteria, algorithms (e.g., data management algorithms, filtering algorithms, data classification algorithms AI algorithms, machine learning algorithms, or other algorithms, including as one or more of these algorithms are expressed in the form of the methods and techniques described herein), protocols, interfaces, tools, and/or other information, to facilitate controlling operations associated with the erasure component 102. In an aspect, the processor component 212 can be functionally coupled (e.g., through a memory bus) to the data store 214 in order to store and retrieve information desired to operate and/or confer functionality, at least in part, to the rules engine 110, erasure request component 112, eligibility determination component 114, data retention component 118, search engine 202, mask component 204, notification component 206, erasure eligibility scoring component 208, operations manager component 210, processor component 212, data store 214, or other component, and/or substantially any other operational aspects of the erasure component 102.

Figure 3:
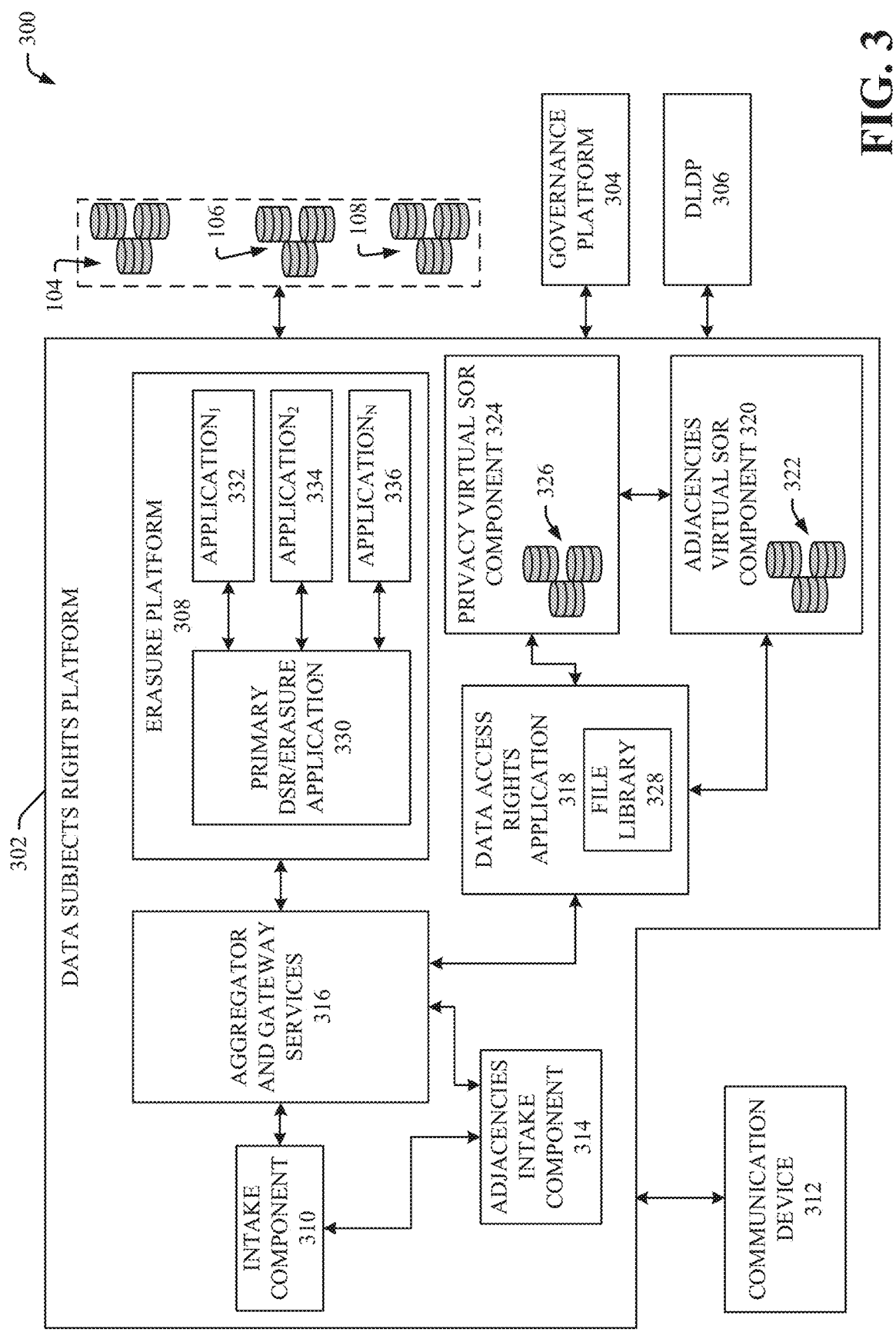
FIG. 3 depicts a block diagram of an example, non-limiting system that can desirably process erasure requests or other data subject rights requests associated with user accounts of users, in accordance with various aspects and embodiments of the disclosed subject matter.

Referring to FIG. 3 (along with FIGS. 1 and 2), FIG. 3 depicts a block diagram of an example, non-limiting system 300 that can desirably (e.g., efficiently, quickly, suitably, or optimally) process erasure requests or other data subject rights (DSR) requests associated with user accounts of users, in accordance with various aspects and embodiments of the disclosed subject matter. The system 300 can comprise a data subject rights platform 302 that can manage and process data associated with user accounts of users stored in various data stores associated with one or more entities, in accordance with a set of rules relating to data security and data privacy, in accordance with a set of rights (e.g., GDPR rights or other rights), as determined from laws, regulations, and/or agreements (e.g., SLAs) applicable to the system 300 and the data of users managed, processed, or stored by the data subject rights platform 302 or other platforms (e.g., governance platform 304, DLDP 306, or other platform) of the set of platforms, as more fully described herein.

The data subject rights platform 302 can comprise an erasure platform 308 that can manage and process erasure requests received from users requesting to have their data associated with their user accounts erased from data stores, such as the set of data stores (e.g., 104, 106, and/or 108) or other data stores (e.g., data vault repository 116, secure data store, or other data store) of or associated with the data subject rights platform 302 or other platforms of the set of platforms, as more fully described herein. In accordance with various embodiments, the erasure platform 308 can be or can comprise the erasure component 102 (e.g., as shown in FIGS. 1 and 2, and described herein) that can manage erasure and/or retention of data associated with the user accounts and stored in the set of data stores (e.g., 104, 106, and/or 108), the data vault repository 116, or other data stores, in accordance with the set of rules relating to data erasure and data retention. The set of rules relating to data security and data privacy can comprise the set of rules relating to data erasure and data retention.

The data subject rights platform 302 can comprise an intake component 310 that can receive or intake erasure requests or other types of DSR requests from users (or other authorized entities). The intake component 310 can comprise and utilize various (e.g., multiple) intake and fulfillment channels and applications that can enable the intake component 310 to receive the erasure requests or other types of DSR requests, for example, from communication devices, such as communication device 312, associated with users or via physical letters, comprising the requests, and process (e.g., pre-process) such requests. The intake component 310 can receive such requests from users (or other authorized entities) via phone call, email, text message, online chat, physical letter, web interface or application, or other desired channel. In some embodiments, the intake component 310 can comprise or utilize a certification and specialization (CS) application (e.g., Compass or other desired CS application) to receive and process such requests.

The set of platforms can be can support or handle multiple entities (e.g., multiple tenants) and multiple languages to manage data and data protection for respective data stores of respective entities in respective locations, as more fully described herein. In that regard, in some embodiments, the data subject rights platform 302 can comprise or be associated with an adjacencies intake component 314 that can be associated with (e.g., communicatively connected to) the intake component 310. The adjacencies intake component 314 can receive erasure requests or other types of DSR requests from users with regard to one or more other data stores associated with one or more other entities (e.g., one or more adjacent entities, such as another organization or company) that can be associated or affiliated with the entity (e.g., service entity) that operates the set of platforms and the set of data stores (e.g., 104, 106, and/or 108), wherein the set of platforms also can monitor and/or manage (e.g., partially or wholly manage) the one or more other data stores of the one or more other entities, as more fully described herein. The adjacencies intake component 314 can receive such requests via one or more channels, which can be similar to the channels employed by the intake component 310 to receive such requests. The adjacencies intake component 314 can communicate (e.g., forward or send) the erasure requests or other types of DSR requests it receives, and/or information relating thereto, to the intake component 310 for pre-processing of such requests by the intake component 310 and processing of such requests by the data subject rights platform 302 or other platform of the set of platforms. In some embodiments, the adjacencies intake component 314 can forward the erasure requests or other types of DSR requests it receives, and/or information relating thereto, to the intake component 310 via the CS application.

The data subject rights platform 302 also can include an aggregator and gateway component 316 that can utilize desired aggregator and gateway services to aggregate information, including information relating to erasure requests or other types of DSR requests, to facilitate processing of such requests by the erasure platform 308, the data subject rights platform 302, or other platform. The aggregator and gateway component 316 can be associated with (e.g., communicatively connected to) the intake component 310 and the adjacencies intake component 314 to receive the information relating to such requests. In some embodiments, application programming interfaces (APIs) can be employed to facilitate the communication of information relating to such requests from the intake component 310 to the aggregator and gateway component 316. For example, there can be an API that can be utilized to facilitate communicating information relating to a request received by the intake component 310 via a web interface to the aggregator and gateway component 316. As another example, there can be an API that can be utilized to facilitate communicating information relating to a request, which is received by the intake component 310 using the CS application, from the CS application to the aggregator and gateway component 316. One or more APIs also can be utilized to facilitate communicating information, including information relating to requests, between the adjacencies intake component 314 and the aggregator and gateway component 316.

The aggregator and gateway component 316 also can be associated with (e.g., communicatively connected to) the erasure platform 308, wherein the aggregator and gateway component 316 can operate as a gateway (and information aggregator) between the erasure platform 308 and the intake component 310 and adjacencies intake component 314, as well as other components. The aggregator and gateway component 316 also can be associated with (e.g., communicatively connected to), and can operate as a gateway for a data access rights application 318 that can process and forward information relating to the other data stores associated with the other entities, wherein such other data stores can be monitored and managed by the set of platforms employing the multi-tenant architecture.

For instance, the data subject rights platform 302 can comprise, generate, maintain, access, and/or be associated with an adjacencies virtual system of record (SOR) component 320 that can comprise a virtual SOR storage system, including a data store 322 and associated database, that can receive and maintain (e.g., store) information, including data associated with user accounts that can be stored in the other data stores of the other entities associated with the set of platforms. In some embodiments, the adjacencies virtual SOR component 320 can communicate information relating to the other data stores to the data access rights application 318 (e.g., using a desired API).

In certain embodiments, additionally or alternatively, the data subject rights platform 302 also can comprise, generate, maintain, access, and/or be associated with a privacy virtual SOR component 324 that can be associated with the entity (e.g., service entity) and can comprise a virtual SOR storage system, including a data store 326 and associated database, that can receive and maintain information relating to the other data stores associated with the other entities. Data lake and/or SOR integration can be employed to facilitate communication and aggregation of desired information relating to the other data stores from the adjacencies virtual SOR component 320 to the privacy virtual SOR component 324. The privacy virtual SOR component 324 can communicate information relating to the other data stores to the data access rights application 318 (e.g., using a desired API).

With further regard to the data access rights application 318, the data access rights application 318 can comprise a file library 328 that can comprise information and applications relating to various types of content and formats of data that can be associated with various types of databases or utilities that can be associated with or utilized by the other data stores associated with the other entities. The data access rights application 318, employing the file library 328, can provide desirable (e.g., efficient, flexible, and adaptable) data processing services (e.g., pluggable software services) that can flexibly manage data of various content and formats (e.g., file content and file formats), and can be customizable to manage and process data in accordance with applicable, different, and/or changing laws, regulations, or provisions (e.g., contractual provisions). The data access rights application 318 can communicate information relating to the other data stores, or other desired information, to the aggregator and gateway component 316 (e.g., using a desired API).

With further regard to the erasure platform 308, the erasure platform 308 can comprise a set of applications (e.g., product applications) that can be utilized to facilitate desirably (e.g., efficiently, flexibly, suitably, or optimally) processing erasure requests and other types of DSR requests with respect to various types of databases utilized with the set of data stores (e.g., 104, 106, and/or 108) associated with the entity (e.g., service entity). For instance, the set of data stores (e.g., 104, 106, and/or 108) can comprise and utilize various types of databases and database frameworks, such as, for example, Oracle, TDW, Teradata, NoSQL, Hadoop, or other desired types of database frameworks. To desirably (e.g., suitably or optimally) manage, retrieve, process, erase, and/or store data, such as data associated with user accounts, from, to, or associated with the various databases of the set of data stores (e.g., 104, 106, and/or 108) in connection with processing the erasure requests and other types of DSR requests, the erasure platform 308 can employ the set of applications, which can comprise a primary DSR/erasure application 330 and respective applications, such as application$_1$ 332, application$_2$ 334, and application$_N$ 336, that can be used with regard to the respective types of databases of the set of data stores (e.g., 104, 106, and/or 108). The primary DSR/erasure application 330 can receive the information relating to the erasure requests and other types of DSR requests from the aggregator and gateway component 316, and can coordinate with the respective applications (e.g., 332, 334, and/or 336) to perform respective operations on respective data stored in the respective databases of the set of data stores (e.g., 104, 106, and/or 108) to facilitate processing respective erasure requests and other types of DSR requests.

For example, if an erasure request to erase data associated with a user account is to be performed (e.g., because the data is eligible for erasure), and a first portion of the data is stored in a first database of a first type in a first data store (e.g., data store 104) and a second portion of the data is stored in a second database of a second type in a second data store (e.g., data store 106), the primary DSR/erasure application 330 can analyze the information relating to the erasure request, and can determine that the first portion of the data is stored in the first database of the first type in the first data store (e.g., data store 104) and the second portion of the data is stored in the second database of the second type in the second data store (e.g., data store 106). The primary DSR/erasure application 330 can coordinate with the application$_1$ 332 to have the application$_1$ 332 interact with (e.g., perform erasure operations on) the first database of the first type in the first data store (e.g., data store 104) to erasure the first portion of the data from the first database, in accordance with the format (e.g., data or file format), procedures, programming language, or other features that can be compatible with the first database. The primary DSR/erasure application 330 also can coordinate with the application$_2$ 334 to have the application$_2$ 334 interact with (e.g., perform erasure operations on) the second database of the second type in the second data store (e.g., data store 106) to erasure the second portion of the data from the second database, in accordance with the format, procedures, programming language, or other features that can be compatible with the second database.

The erasure platform 308 can communicate erasure results information, which can indicate the erasure request was processed and the data was erased, to the aggregator and gateway component 316. The aggregator and gateway component 316 can communicate the erasure results information to the intake component 310. The intake component 310 can communicate information relating to the erasure results information to the user (e.g., via communication device 312 or a messaging account of the user) to inform the user that the erasure request has been processed and the data associated with the user account of the user has been erased from the set of data stores (e.g., 104, 106, and/or 108) associated with the entity.

In some embodiments, the erasure platform 308 can manage and process erasure requests (or other DSR requests) and/or perform erasure of data associated with other user accounts, or facilitate managing and processing erasure requests and/or performing erasure of such data, stored in the other data stores (e.g., other databases of the other data stores) associated with the other entities, in accordance with the set of rules relating to data erasure and data retention. For instance, the erasure platform 308 can analyze the information relating to the other data associated with the other users accounts stored in the other data stores associated with the other entities, as received from the adjacencies virtual SOR component 320, via the data access rights application 318 and the aggregator and gateway component 316, and can analyze information relating to an erasure request relating to one of the other user accounts. Based at least in part on the results of such analyses, the erasure platform 308 can desirably process the erasure request, and if the other data associated with the other user account is eligible for erasure, the erasure platform 308 can perform or facilitate performing the erasure of the other data associated with the other user account from one or more of the other data stores associated with one or more of the other entities, in accordance with the set of rules relating to data erasure and data retention.

Figure 4:
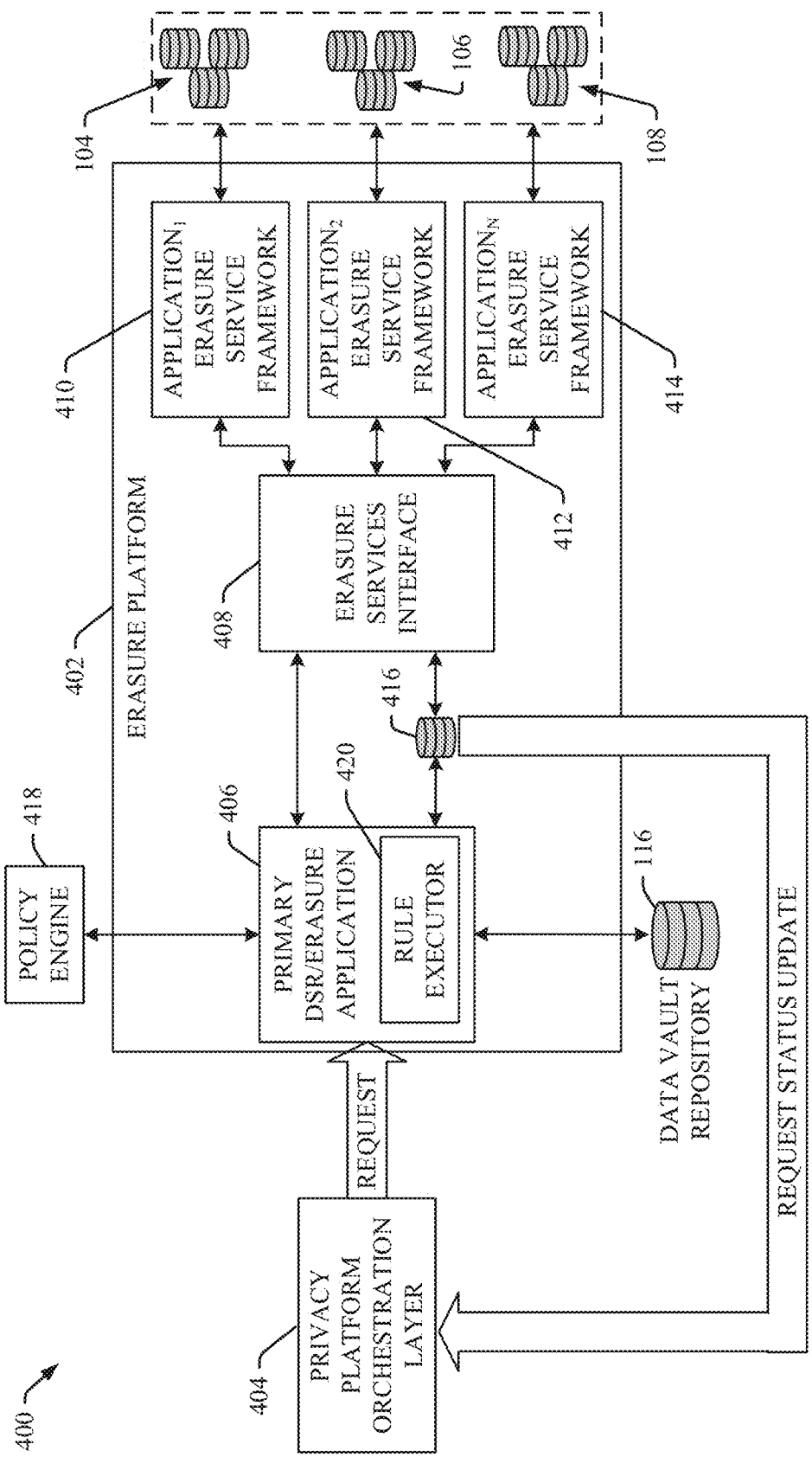
FIG. 4 illustrates a block diagram of an example, non-limiting system that can desirably process erasure requests associated with user accounts of users, in accordance with various aspects and embodiments of the disclosed subject matter.

Turning to FIG. 4 (along with FIGS. 1, 2, and 3), FIG. 4 illustrates a block diagram of an example, non-limiting system 400 that can desirably (e.g., efficiently, quickly, suitably, or optimally) process erasure requests associated with user accounts of users, in accordance with various aspects and embodiments of the disclosed subject matter. In some embodiments, the system 400 comprise an erasure platform 402 that can employ a de-centralized erasure architecture to facilitate processing erasure requests and/or erasing data (e.g., when eligible for erasure) from respective databases, platforms, tables, or other data storage systems associated with the entity.

The erasure platform 402 can be associated with (e.g., communicatively connected to) a privacy platform orchestration layer 404. The erasure platform 402 can receive erasure requests associated with user accounts, and/or information relating thereto, from the privacy platform orchestration layer 404. The erasure platform 402 can process the erasure requests requesting erasure of data (e.g., PII or other user data) associated with the user accounts stored in the set of data stores (e.g., 104, 106, and/or 108), and databases, tables, platforms, or other data storage systems (e.g., data vault repository 116) of or associated therewith, in accordance with the set of rules relating to data erasure and data retention, as more fully described herein. The databases, tables, platforms, or other data storage systems can employ various types of database frameworks, such as, for example, Oracle, TDW, Teradata, NoSQL, Hadoop, or other desired types of database frameworks To facilitate processing and managing the processing of the erasures requests (e.g., in a de-centralized manner), the erasure platform 402 can comprise a primary DSR/erasure application 406, an erasure services interface 408, a set of desired application erasure service frameworks, comprising application) erasure service framework 410, application$_2$ erasure service framework 412, and application$_N$ erasure service framework 414, and a request status database 416.

In some embodiments, the primary DSR/erasure application 406 can be a centralized application for DSR and data erasure. In certain embodiments, the primary DSR/erasure application 406 can receive the set of rules relating to data erasure and data retention from a policy engine 418 (e.g., rules engine), wherein such set of rules can be determined (e.g., by the erasure component 102 or other component) as more fully described herein. The primary DSR/erasure application 406 can process information, including information relating to erasure requests, in accordance with a desired product application catalog and/or user defined code (UDC), to facilitate having such information in a desired (e.g., suitable, understandable, compatible, or optimal) format for processing the erasure requests, and communicating and coordinating with the set of desired application erasure service frameworks (e.g., 410, 412, and/or 414) to perform operations in connection with the erasure requests.

In response to receiving erasure requests and information relating thereto, the primary DSR/erasure application 406 can analyze the information relating to the erasure requests, can process or re-format information relating to the erasure requests, based at least in part on the desired product application catalog and/or UDC, to generate information relating to the erasure requests in a desired format(s) (e.g., a desired format(s) that can be compatible with one or more of the application erasure service frameworks (e.g., 410, 412, and/or 414)). The erasure platform 402 (e.g., the primary DSR/erasure application 406; and/or the eligibility determination component 114, as described herein) can apply the set of rules relating to data erasure and data retention to determine whether data is eligible for erasure from the set of data stores (e.g., 104, 106, and/or 108) or other data store (e.g., data vault repository 116, secure data store, or other data store), in response to erasure requests. For instance, in connection with processing an erasure request associated with a user account, the eligibility determination component 114 (e.g., as depicted in FIGS. 1 and 2, and as described herein) can comprise or utilize the primary DSR/erasure application 406 to facilitate performing an erasure eligibility determination regarding whether data associated with the user account is eligible for erasure, in accordance with the set of rules. The primary DSR/erasure application 406 can utilize a rule executor 420 to apply and enforce the rules of the set of rules relating to data erasure and data retention with regard to the erasure requests to determine whether respective items of data associated with the user accounts of the erasure requests are eligible to be erased from the set of data stores (e.g., 104, 106, and/or 108) or other data store.

To facilitate processing or executing erasure requests, the primary DSR/erasure application 406 can initiate an interaction or service (e.g., can call) with the erasure services interface 408 (e.g., using a desired API). The primary DSR/erasure application 406 can communicate information (e.g., processed or re-formatted information) relating to the erasure requests to the erasure services interface 408. The information, for example, can indicate or specify which cells or fields in databases or tables in the set of data stores (e.g., 104, 106, and/or 108) or other data store are to be erased for a given user account (e.g., as determined based at least in part on the results of application of the set of rules by the rule executor 420) for respective product application services. The erasure services interface 408 can communicate such information to the respective application erasure service frameworks (e.g., 410, 412, and/or 414) to coordinate with the respective application erasure service frameworks to have the respective application erasure service frameworks perform respective operations on respective data stored in the respective databases and/or tables of the set of data stores (e.g., 104, 106, and/or 108) or other data store to facilitate processing the respective erasure requests (e.g., erasing data, transferring data to the data vault repository 116, or performing other operations on the data). For instance, based at least in part on such information received from the primary DSR/erasure application 406, via the erasure services interface 408, one or more of the respective application erasure service frameworks (e.g., 410, 412, and/or 414) (e.g., employing one or more of the applications (e.g., 332, 334, and/or 336) as depicted in FIG. 3, and as described herein) can invoke its respective application database erasure functions to perform the erasure operations and/or other desired operations on the respective databases or tables of the set of data stores (e.g., 104, 106, and/or 108) or other data store to erase the desired items of data associated with user accounts.

For example, if an erasure request to erase data associated with a user account is to be performed (e.g., because the data is eligible for erasure), and a first portion of the data is stored in a first database of a first type in a first data store (e.g., data store 104) and a second portion of the data is stored in a second database of a second type in a second data store (e.g., data store 106), the primary DSR/erasure application 406 can analyze the information relating to the erasure request, and can determine that the first portion of the data is stored in the first database of the first type in the first data store (e.g., data store 104) and the second portion of the data is stored in the second database of the second type in the second data store (e.g., data store 106). The primary DSR/erasure application 406, via the erasure services interface 408, can coordinate with the application$_1$ erasure service framework 410 (e.g., employing application$_1$ 332 as depicted in FIG. 3, and as described herein) to have the application$_1$ erasure service framework 410 interact with (e.g., perform erasure operations on) the first database of the first type in the first data store (e.g., data store 104) to erasure the first portion of the data from the first database, in accordance with the format (e.g., data or file format), procedures, programming language, or other features that can be compatible with the first database. The primary DSR/erasure application 406 also can coordinate with the application$_2$ erasure service framework 412 (e.g., employing application$_2$ 334 as depicted in FIG. 3, and as described herein) to have the application$_2$ erasure service framework 412 interact with (e.g., perform erasure operations on) the second database of the second type in the second data store (e.g., data store 106) to erasure the second portion of the data from the second database, in accordance with the format, procedures, programming language, or other features that can be compatible with the second database.

The de-centralized architecture of the system 400 can provide desirable (e.g., suitable or optimal) erasure execution accountability with the respective localized application erasure service frameworks (e.g., 410, 412, and/or 414) and associated databases and data stores. The de-centralized architecture of the system 400 also can desirably ensure data and application integrity and security can be at a localized level, which can provide more control and accountability at a localized level with regard to management of the stored data and erasure of data.

The erasure services interface 408 also can communicate (e.g., using a desired API) erasure request update information to provide updates regarding the statuses of erasure requests associated with user accounts (e.g., erasure request being processed, erasure of data completed for an erasure request, or other status information) to the request status database 416, which can store such update information. The request status database 416 can provide respective erasure request update information relating to respective erasure requests associated with respective user accounts to the privacy platform orchestration layer 404 to facilitate providing desired updates regarding the processing of erasure requests associated with user accounts.

In some embodiments, the primary DSR/erasure application 406 can update the data vault repository 116 with an erasure log that can detail erasures of data associated with user accounts from the set of data stores (e.g., 104, 106, and/or 108) or other data stores of or associated with the entity. The primary DSR/erasure application 406 also can securely store a copy of data (e.g., PII or other user data), such as a remaining portion of data associated with a user account that is not yet eligible for erasure (e.g., in accordance with the set of rules), in case an erasure hold was initiated or will be initiated against the user account, wherein the erasure hold can relate to, for example, a fraud investigation, an anti-money laundering investigation, or other criminal or civil investigation, in accordance with the set of rules and applicable laws or regulations.

Figure 5:
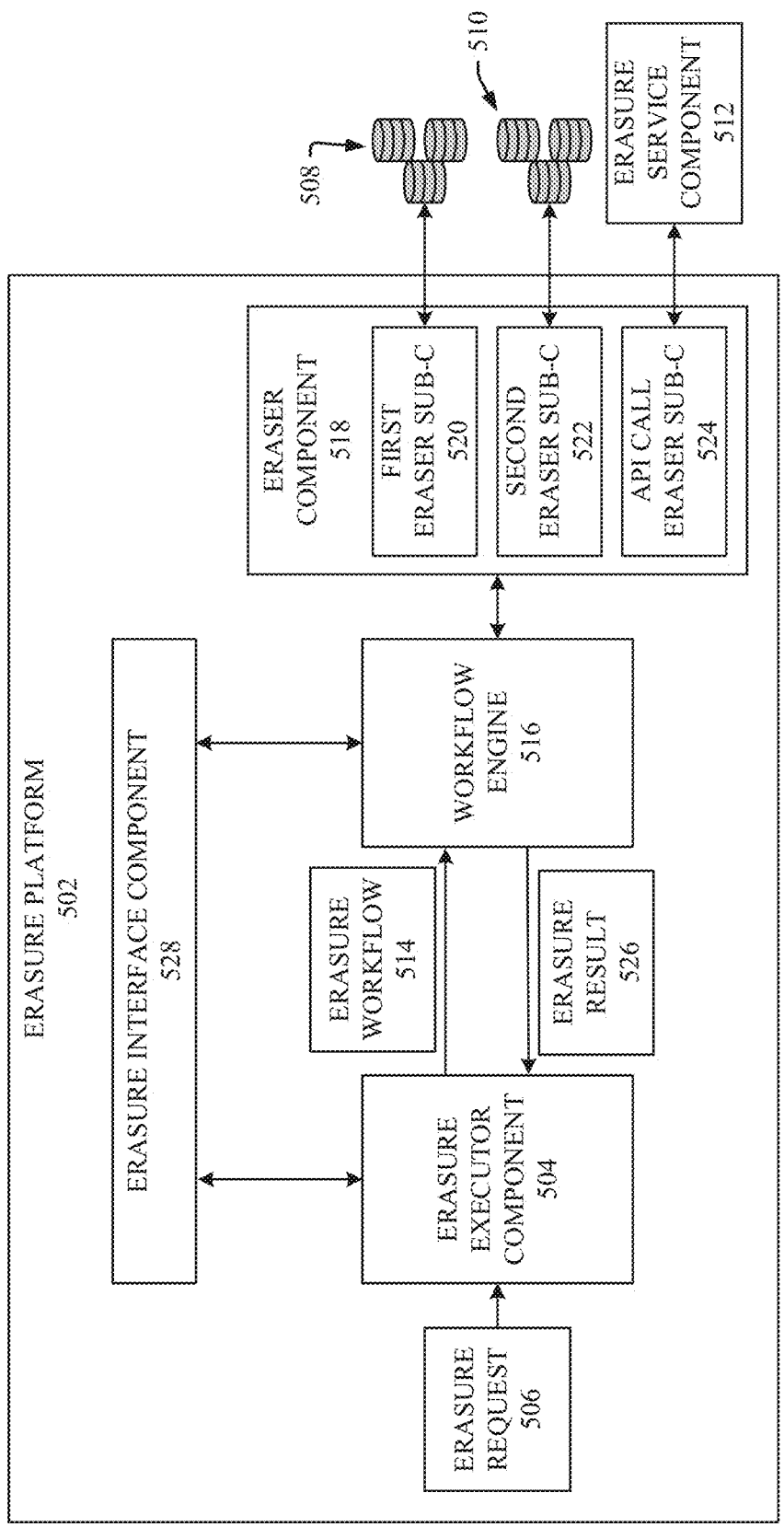
FIG. 5 illustrates a block diagram of an example, non-limiting system that can process erasure requests to erase (e.g., delete) data of users from different types of data stores, in accordance with various aspects and embodiments of the disclosed subject matter.

Referring to FIG. 5 (along with FIGS. 1-4), FIG. 5 illustrates a block diagram of an example, non-limiting system 500 that can process erasure requests to erase (e.g., delete) data of users from different types of data stores, in accordance with various aspects and embodiments of the disclosed subject matter. The system 500 can comprise an erasure platform 502 that can employ a de-centralized erasure architecture to facilitate processing erasure requests and/or erasing data of users (e.g., when data is eligible for erasure) from respective databases, platforms, tables, data stores, or other data storage systems associated with one or more entities. The erasure platform 502 can comprise an erasure executor component 504 that can receive erasure requests, such as erasure request 506, requesting to erase data of users from one or more data stores, such as data store 508, data store 510, or one or more other data stores (not shown in FIG. 5) that can be part of one or more external systems and can be associated with an erasure service component 512.

In some embodiments, an erasure request (e.g., erasure request 506) can be received by the erasure executor component 504 from the primary DSR/erasure application (e.g., primary DSR/erasure application 406 of FIG. 4), which can generate the erasure request based at least in part on, and in response to, a user-provided erasure request, which can be received from the user (e.g., via the intake component 310 of FIG. 3). The primary DSR/erasure application can generate the erasure request (e.g., erasure request 506) in a desired format and to comprise desired information relating to the erasure request. For instance, the erasure request (e.g., 506) can comprise information regarding the items of data of or associated with the user that are to be erased (e.g., deleted) from one or more of the data stores (e.g., data store 508, data store 510, and/or one or more of the data stores associated with the erasure service component 512), the one or more data stores, tables, and columns where the one or more items of data of or associated with the user are stored, data management properties (e.g., NoSQL properties or other data management properties), one or more erasure service calls for the erasure service component 512 with regard to one or more external systems (e.g., one or more other data stores of the one or more external systems), and/or other desired information relating to the erasure request.

In some embodiments, the data store 508 and data store 510 can be associated with an entity, and the one or more other data stores can be associated with one or more other entities. The data store 508 can comprise databases, tables, other data storage, and/or a platform(s) that can have or can be in a first type of format and/or can employ a first type of data management system (e.g., first type of database management system). In certain embodiments, the first type of data management system can be an Oracle data management system employing an Oracle-type of format for formatting data, or can be another desired data management system employing another type of format for formatting data. The data store 510 can comprise databases, tables, other data storage, and/or a platform(s) that can have or can be in a second type of format and/or can employ a second type of data management system (e.g., second type of database management system). In certain embodiments, the second type of data management system can be a MySQL data management system employing a MySQL-type of format for formatting data, or can be another desired data management system employing another type of format for formatting data. The one or more other data stores, which can be associated with the erasure service component 512, can comprise databases, tables, other data storage, and/or a platform(s) that can have or can be in desired type of format and/or can employ a desired type of data management system (e.g., desired type of database management system), wherein the desired type of format and/or desired type of data management system can be different from or same as the first type of format and/or first type of data management system associated with the data store 508, or different from or same as the second type of format and/or second type of data management system associated with the data store 510.

The erasure executor component 504 can analyze the information in the erasure request (e.g., 506). Based at least in part on the results of analyzing the information in the erasure request, the erasure executor component 504 can determine and generate (e.g., create or construct) an erasure workflow 514 that can indicate or specify respective erasure operations (e.g., erasure actions) for one or more respective data stores (e.g., data store 508, data store 510, and/or other data store of the entity) and/or for one or more respective erasure service calls to be performed by the erasure service component 512 to facilitate erasure of the respective items of data associated with the user from the one or more respective data stores (e.g., data store 508, data store 510, and/or other data store) and/or one or more other data stores associated with the erasure service component 512. In some embodiments, the erasure workflow 514 can be agnostic with regard to the respective types of formats and/or respective types of data management systems associated with the data store 508, data store 510, and/or the one or more other data stores associated with the erasure service component 512.

The erasure platform 502 can comprise a workflow engine 516 that can receive the erasure workflow 514 associated with the erasure request (e.g., erasure request 506) from the erasure executor component 504. The erasure platform 502 also can comprise an eraser component 518 that can be associated with (e.g., communicatively connected to) the workflow engine 516 and can comprise erasure sub-components, such as a first eraser sub-component (first eraser sub-c) 520 (e.g., an Oracle eraser sub-component or other desired type of eraser sub-component), a second eraser sub-component (second eraser sub-c) 522 (e.g., a MySQL eraser sub-component or other desired type of eraser sub-component), and an API call eraser sub-component (API call eraser sub-c) 524. In some embodiments, the workflow engine 516 can be part of or associated with the erasure services interface 408 of FIG. 4, and the respective erasure sub-components (e.g., 520, 522, and/or 524) can be part of or associated with the respective application erasure frameworks (e.g., 410, 412, and/or 414) of FIG. 4. The API call eraser sub-component 524 can interface and/or interact with one or more APIs associated with the one or more other data stores associated with the one or more external systems.

Based at least in part on the results of analyzing the information contained in the erasure workflow 514, the workflow engine 516 can initiate or trigger execution of the erasure workflow 514 to have one or more of the respective erasure sub-components (e.g., first eraser sub-component 520, second eraser sub-component 522, and/or another eraser sub-component) erase the desired items of data associated with the user from the one or more data stores (e.g., data store 508, data store 510, and/or another data store associated with the entity) and/or to have the API call eraser sub-component 524 initiate an erasure service call by the erasure service component 512 to facilitate erasure of desired items of data associated with the user from one or more other data stores associated with one or more external systems, in accordance with the erasure workflow 514. In some embodiments, the workflow engine 516 can initiate or trigger the execution of the erasure workflow 514 to have the one or more of the respective erasure sub-components (e.g., first eraser sub-component 520, second eraser sub-component 522, and/or another eraser sub-component) perform their respective erasure operations and/or to have the API call eraser sub-component 524 initiate the erasure service call by the erasure service component 512 and/or perform other erasure service call-related operations in parallel and/or concurrently (e.g., simultaneously and/or substantially simultaneously), if and as desired. The erasure workflow 514 can comprise one or more respective portions (e.g., first portion, second portion, third portion, and/or other portion) of the erasure workflow to facilitate performing of the respective erasure-related operations by the respective erasure sub-components (e.g., first eraser sub-component 520, second eraser sub-component 522, the API call eraser sub-component 524, and/or another eraser sub-component), wherein each portion of the erasure workflow can comprise one or more respective erasure workflow instances relating to erasure of one or more respective items of data associated with the user from the one or more respective data stores (e.g., data store 508, data store 510, and/or another data store associated with the entity; and/or one or more other data stores associated with one or more external systems).

In certain embodiments, the workflow execution performed by the workflow engine 516 and associated eraser component 518 desirably can be interruptible, fault tolerant, and scalable (e.g., horizontally scalable). For instance, the workflow engine 516, the eraser component 518, and/or another associated component can desirably manage and process one or more interrupts during a workflow execution of an erasure workflow (e.g., erasure workflow 514), and/or the workflow execution of the erasure workflow can desirably (e.g., suitably or acceptably) continue operating (e.g., continue operating or being performed without interruption) even if one or more components fail or have a performance issue. With regard to scalability, the workflow engine 516, the eraser component 518, and/or associated component, and the workflow execution of the erasure workflow, can be desirably scalable (e.g., desirably increased in scale) to process virtually any desired number of erasure workflow operations (e.g., in parallel) with regard to virtually any desired number and types of eraser sub-components (e.g., first eraser sub-component 520, second eraser sub-component 522, API call eraser sub-component 524, and/or another eraser sub-component) and virtually any desired number and types of data stores.

Each of the one or more respective eraser sub-components (e.g., first eraser sub-component 520, second eraser sub-component 522, the API call eraser sub-component 524, and/or another eraser sub-component), as applicable, can receive its respective portion of the erasure workflow from the workflow engine 516. Based at least in part on its respective portion of the erasure workflow, each of the one or more respective eraser sub-components (e.g., first eraser sub-component 520, second eraser sub-component 522, the API call eraser sub-component 524, and/or another eraser sub-component) can perform one or more erasure operations to erase or facilitate erasing one or more items of data associated with the user from the one or more respective data stores (e.g., data store 508, data store 510, and/or another data store associated with the entity; and/or one or more other data stores associated with one or more external systems). For instance, the first eraser sub-component 520 can perform one or more erasure operations to erase or facilitate erasing one or more items of data associated with the user from one or more data storage locations of the data store 508 (e.g., Oracle-based data store or other data management system-type of data store) based at least in part on performance of one or more erasure workflow instances of the first portion of the erasure workflow. Additionally or alternatively, depending on the erasure workflow, the second eraser sub-component 522 can perform one or more erasure operations to erase or facilitate erasing one or more items of data associated with the user from one or more data storage locations of the data store 510 (e.g., MySQL-based data store or other data management system-type of data store) based at least in part on performance of one or more erasure workflow instances of the second portion of the erasure workflow. Additionally or alternatively, depending on the erasure workflow, the API call eraser sub-component 524 and the erasure service component 512 can perform one or more erasure operations to facilitate erasing (e.g., with such erasing performed by one or more external erasure services) one or more items of data associated with the user from one or more data storage locations of one or more other data stores 510 associated with one or more external systems based at least in part on performance of one or more erasure workflow instances of the third portion of the erasure workflow. For example, the API call eraser sub-component 524 can execute or perform an erasure workflow instance to have or cause the erasure service component 512 to invoke an external erasure service to erase an item of data associated with the user from a storage location of a data store associated with an external system. The actual way such item of data is erased from the data store associated with an external system can be the responsibility of the external service and/or external system and this way of erasing such item of data may be opaque or unknown to the erasure executor component 504.

In some embodiments, each of the one or more respective eraser sub-components (e.g., first eraser sub-component 520, second eraser sub-component 522, the API call eraser sub-component 524, and/or another eraser sub-component) can be a respective containerized eraser sub-component that can be language independent or agnostic. The erasure platform 502 can employ a desired number of eraser sub-components with there being an eraser sub-component for each type of data store. The erasure platform 502 can add or create new and compatible eraser sub-components when new data stores are added, wherein the new data stores can be dynamically added without having to redeploy the erasure application (e.g., without having to redeploy the primary DSR/erasure application 330 of FIG. 3).

The workflow engine 516 can receive respective erasure result information from the one or more respective erasure sub-components (e.g., first eraser sub-component 520, second eraser sub-component 522, the API call eraser sub-component 524, and/or another eraser sub-component). The respective erasure result information can indicate the respective results of the performing of the one or more respective erasure operations by the one or more respective erasure sub-components. For instance, the erasure result information can indicate that one or more items of data associated with the user have been successfully erased from a data store; or, if there was a problem erasing an item of data, the erasure result information can indicate that there was a problem erasing such item of data, such item of data was not erased, and/or the type of problem that occurred. The workflow engine 516 can generate an erasure result 526 comprising the respective erasure result information, and can communicate the erasure result 526 to the erasure executor component 504 to inform the erasure executor component 504 of the respective erasure results from the performing of the erasure workflow 514 associated with the erasure request 506.

The erasure platform 502 also can comprise an erasure interface component 528 that can be associated with (e.g., communicatively connected to) the erasure executor component 504, the workflow engine 516, and/or another component of the erasure platform 502. The erasure interface component 528 can receive information relating to erasure requests (e.g., erasure request 506) associated with users, erasure results (e.g., erasure result 526) from the erasing of data associated with users in response to the erasure requests, and/or other desired information relating to the erasure requests. The erasure interface component 528 can generate and provide (e.g., present or display) one or more interfaces (e.g., user interfaces) and/or one or more dashboards that can provide desired information relating to the erasure requests (e.g., erasure request 506), erasure results (e.g., erasure result 526), and/or other desired information relating to the erasure requests to one or more entity representatives to inform or update them with regard to, for example, the status or progress of erasure requests and/or erasure results, statistics relating to erasure requests, and/or compliance in the processing of erasure requests (e.g., compliance with applicable laws, regulations, or agreements in the processing of erasure requests of users). The erasure interface component 528 also can receive input information (e.g., via a keyboard, mouse, trackpad, or touchscreen buttons) from an entity representative to request, search for, and/or select desired types of information. Based at least in part on the input information, the erasure interface component 528 can generate and provide (e.g., present or display) one or more desired (e.g., suitable, acceptable, and/or responsive) interfaces, dashboards, and/or items of information that can be responsive to the input information.

Figure 6:
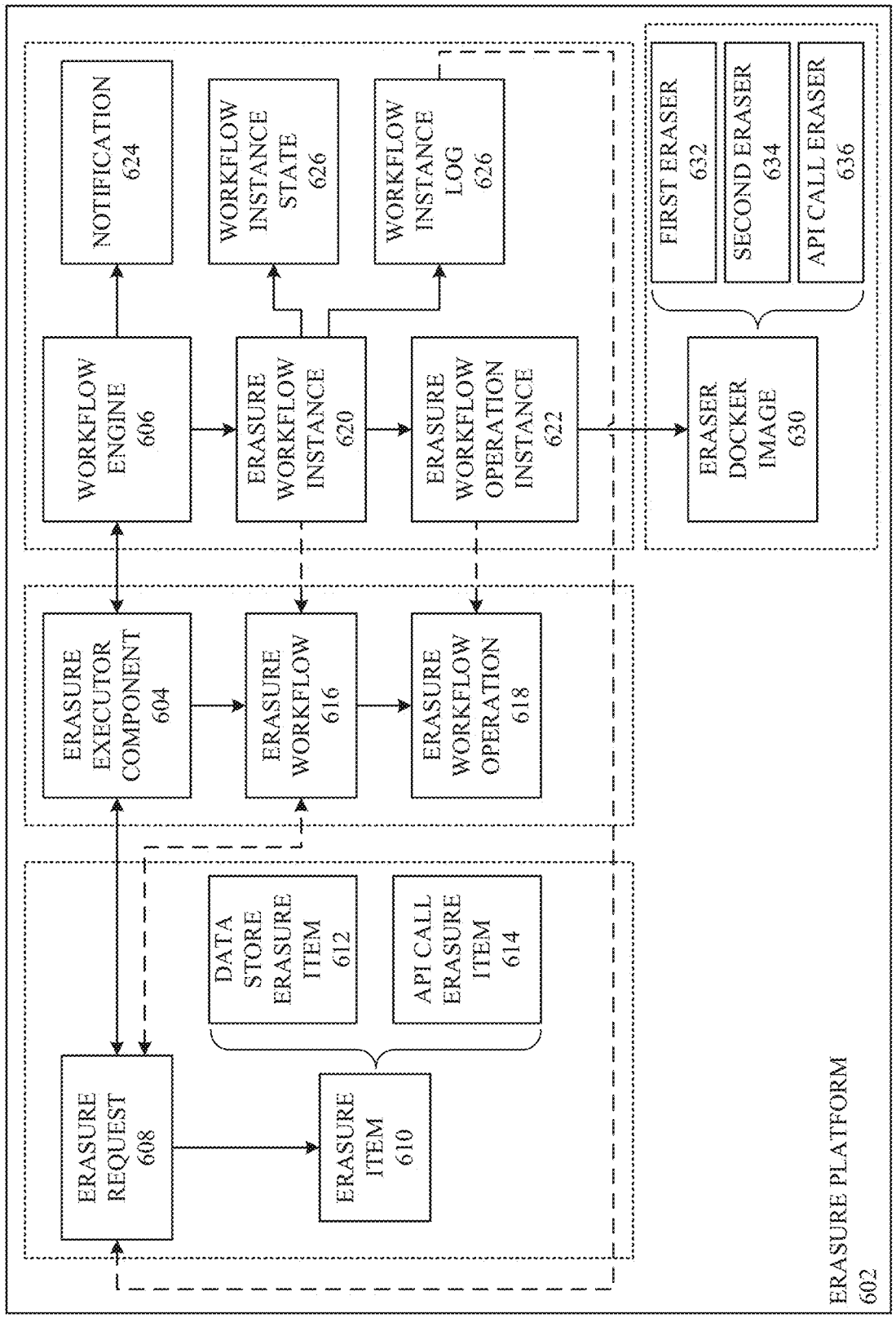
FIG. 6 depicts a block diagram of an example, non-limiting system that can employ a desired workflow process to process erasure requests to erase data associated with users from various (e.g., different) types of data stores, in accordance with various aspects and embodiments of the disclosed subject matter.

Referring to FIG. 6 (along with FIGS. 1-5), FIG. 6 depicts a block diagram of an example, non-limiting system 600 depicts that can employ a desired workflow process to process erasure requests to erase data associated with users from various (e.g., different) types of data stores, in accordance with various aspects and embodiments of the disclosed subject matter. The system 600 can comprise an erasure platform 602, which can comprise an erasure executor component 604 and workflow engine 606, wherein the erasure platform 602, erasure executor component 604, and workflow engine 606 can be the same as or similar to, and/or can comprise the same or similar functionality as, respective components (e.g., respectively named components), such as more fully described herein.

The erasure executor component 604 can receive erasure requests, such as erasure request 608, from the primary DSR/erasure application (e.g., primary DSR/erasure application 406 of FIG. 4), which can generate the erasure request based at least in part on, and in response to, a user-provided erasure request, which can be received from the user (e.g., via the intake component 310 of FIG. 3). An erasure request (e.g., erasure request 608) can request erasure of all or a portion of data associated with a user from one or more data stores (e.g., data store 508, data store 510, and/or one or more other data stores, as described with regard to FIG. 5) associated with an entity and/or one or more data stores associated with one or more external systems (e.g., as described with regard to FIG. 5). The erasure request (e.g., 608) can comprise information regarding the items of data associated with the user that are to be erased from one or more of the data stores (e.g., data store 508, data store 510, and/or one or more of the data stores associated with the erasure service component 512, as described with regard to FIG. 5), the one or more data stores, tables, and columns where the one or more items of data associated with the user are stored, data management properties (e.g., NoSQL properties or other data management properties), one or more erasure service calls for the erasure service component with regard to one or more external systems (e.g., one or more other data stores of the one or more external systems), and/or other desired information relating to the erasure request.

For instance, the erasure request 608 can comprise one or more erasure items, such as erasure item 610, that can comprise information indicating one or more items of data associated with the user that are requested to be erased. The erasure item 610 can be a data store erasure item 612 or an API call erasure item 614. The data store erasure item 612 can comprise information indicating an item of data associated with the user that is to be erased from a data store (e.g., data store 508, data store 510, or other data store) associated with the entity. The API call erasure item 614 can comprise information indicating an item of data associated with the user that is to be erased from a data store associated with an external system and/or indicating that an erasure service call (e.g., API erasure service call) is to be made to effectuate the erasure of the item of data from the data store associated with an external system.

In response to the receiving the erasure request 608, which can comprise a request for an erasure workflow, and based at least in part on the results of analyzing the information in the erasure request 608, the erasure executor component 604 can process the erasure request, and can determine and generate an erasure workflow 616 that can comprise one or more erasure workflow operations (e.g., erasure workflow actions), such as erasure workflow operation 618, that can be performed to erase or facilitate erasing one or more items of data associated with the user from one or more data stores (e.g., data store 508, data store 510, or other data store) associated with the entity and/or one or more data stores associated with an external system, such as more fully described herein. The erasure executor component 604 can communicate the erasure workflow 616 to the workflow engine 606 for processing by the workflow engine 606.

The workflow engine 606 can receive the erasure workflow 616. Based at least in part on the results of analyzing the erasure workflow 616, the workflow engine 606 can determine and generate (e.g., create) one or more erasure workflow instances, such as erasure workflow instance 629, which can be defined by the erasure workflow 616, wherein each erasure workflow instance (e.g., 616) can comprise one or more erasure workflow operation instances, such as erasure workflow operation instance 622, that can be defined by the erasure workflow operation 618. Each erasure workflow instance (e.g., 620) can relate to erasure of an item of data associated with the user from a data store (e.g., data store 508, data store 510, or other data store) associated with the entity or an erasure service call to facilitate erasure of an item of data from another data store associated with an external system. Each erasure workflow operation instance (e.g., 622) can relate to one operation to be performed in connection with erasing or initiating an erasure service call to facilitate erasing an item of data associated with the user.

The workflow engine 606 can generate desired notifications, such as notification 624, relating to performance of the erasure-related operations associated with an erasure request (e.g., 608). The notifications (e.g., 624) can be communicated to another component (e.g., erasure executor component 604) and/or a desired interface (e.g., an interface of the erasure interface component 528 of FIG. 5). Also, each erasure workflow instance 620 of the erasure workflow 616 can have a workflow instance state 626 that can indicate the state of performance of that erasure workflow instance 620 by the workflow engine 606 and/or associated eraser sub-component (e.g., first eraser sub-component 520, second eraser sub-component 522, or the API call eraser sub-component 524 of FIG. 5) performing the erasure-related operation instance(s) 622. The workflow engine 606 also can generate a workflow instance log 628 that can log information relating to the performance of the erasure workflow instances (e.g., 620) by the workflow engine 606 and/or associated eraser sub-component (e.g., first eraser sub-component 520, second eraser sub-component 522, or the API call eraser sub-component 524 of FIG. 5). The workflow engine 606 can communicate the workflow instance log 628 and/or information relating thereto to the erasure executor component 604 and/or a desired interface (e.g., an interface of the erasure interface component 528 of FIG. 5), wherein the erasure request 608 associated with the user can comprise a request for the workflow instance log 628 relating to erasure of data associated with the erasure request 608.

With regard to each erasure workflow operation instance 622, the workflow engine 606 can execute or facilitate executing a desired (e.g., appropriate, suitable, or optimal) eraser docker image 630, which can relate to, for example, a first type of eraser (first eraser) 632 to facilitate performing of the erasure workflow operation instance 622 in connection with the first eraser sub-component (e.g., first eraser sub-component 520 of FIG. 5) erasing an item of data associated with the user (and the erasure request 608) from a first data store (e.g., data store 508 of FIG. 5), a second type of eraser (second eraser) 634 to facilitate performing of the erasure workflow operation instance 622 in connection with the second eraser sub-component (e.g., second eraser sub-component 522 of FIG. 5) erasing an item of data from a second data store (e.g., data store 510 of FIG. 5), or an API call eraser (API call eraser) 636 to facilitate performing of the erasure workflow operation instance 622 in connection with the API call eraser sub-component (e.g., API call eraser sub-component 524 of FIG. 5) performing invoking an erasure service of the erasure service component (e.g., erasure service component 512 of FIG. 5) to facilitate erasure of an item of data from another data store associated with an external system. The workflow engine 622 can update the workflow instance state 626 and/or the workflow instance log 628 based at least in part on the performance of the erasure workflow operation instance 622.

Figure 7:
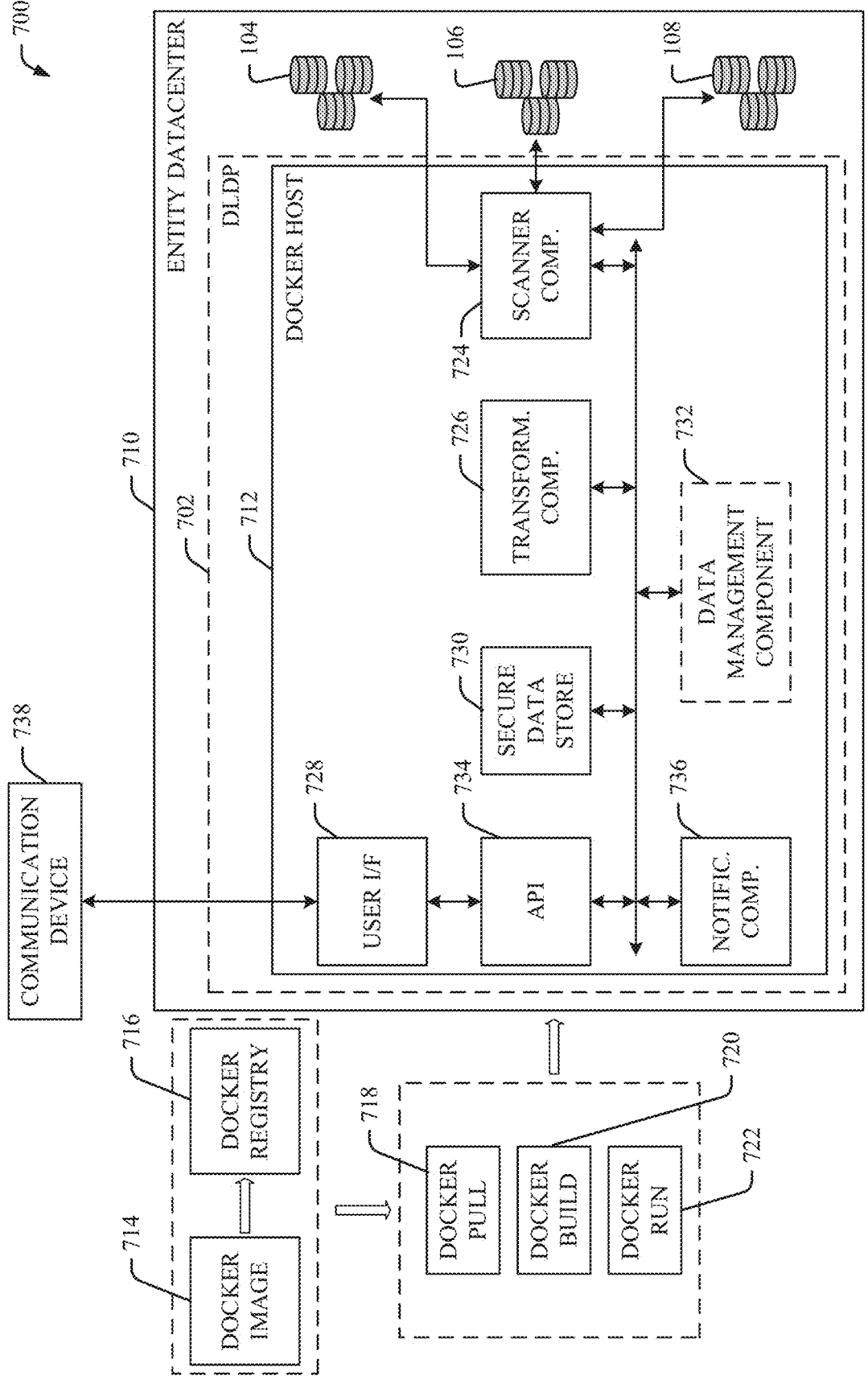
FIG. 7 illustrates a block diagram of an example, non-limiting system that can employ a data lifecycle discovery platform (DLDP) that can desirably discover and track data stored in various data stores and manage the data, in accordance with various aspects and embodiments of the disclosed subject matter.

FIG. 7 illustrates a block diagram of an example, non-limiting system 700 that can employ a DLDP that can desirably (e.g., efficiently or optimally) discover and track data stored in various data stores and manage the data, in accordance with various aspects and embodiments of the disclosed subject matter. The system 700 can comprise the DLDP 702 that can be employed to facilitate data protection, including data security and protecting data privacy, of data stored in the DLDP 702 or data stores (e.g., database components or other data stores), such as, data store 104, data store 106, and/or data store 108, associated with (e.g., communicatively connected to) the DLDP 702 and associated with an entity or entities (not shown in FIG. 7), wherein an entity can be, for example, an organization, a business, a company, a corporation, a user, or other type of entity. The DLDP 702 can employ a configurable design and solution that can satisfy (e.g., meet or exceed) global or regional data protection goals, standards, demands, or obligations of an entity or entities.

The DLDP 702 can be entity (e.g., company, organization, user, or other entity) and environment agnostic, and can readily be employed or deployed for use for any desired entity. The DLDP 702 also can be scalable to handle data and data protection for one or more entities and associated amounts of data of virtually any size. For instance, the DLDP 702 can be structured or designed to have a modular design and development model that can include a desirable technology stack (e.g., cutting edge technology stack), and can have the ability to incorporate future technology as well.

In some embodiments, the DLDP 702 and the data stores (e.g., data stores 104, 106, and/or 108) can be part of an entity datacenter 710 of or associated with an entity (e.g., as depicted in FIG. 7). In certain embodiments, additionally or alternatively, the DLDP 702 can be associated with one or more respective entity datacenters (e.g., entity datacenter 710 and/or one or more other entity datacenters (not shown in FIG. 7)) associated with one or more respective data stores of one or more respective entities. In that regard, the DLDP 702 can be multi-tenant (e.g., can support or handle multiple entities) and multi-lingual. For instance, the DLDP 702 can be utilized to handle data and data protection for respective data stores of respective entities in respective locations, and the DLDP 702 can recognize and/or identify respective languages of the data stored in the respective data stores of the respective entities, as more fully described herein.

In accordance with various embodiments, the DLDP 702 can be, can be part of, or can comprise a docker host 712 that can be or can comprise a server component (e.g., one or more servers) on which a docker daemon can run, wherein the server component can be or can comprise one or more physical machines (e.g., physical or hardware servers) and/or one or more virtual machines (VMs) that can operate as servers. The docker host 712 can comprise the docker engine and can operate as an operating system (OS) server where the OS and other processes can be run.

The docker host 712 can employ containerized applications, and can manage various containers and docker images, such as docker image 714, wherein the docker images can be part of or registered with a docker registry 716, which can be a storage and content delivery subsystem. In accordance with the modular design capabilities of the DLDP 702, every module of the application can be deployed as a container (e.g., docker container), wherein based on the infrastructure capacity of the system 700, the deployment of the application can be bundled, as desired, to utilize the resources of the system 700 in a desirably efficient manner. The disclosed subject matter can enable portability via dockerization such that every module of the application can be deployed as an independent component, for example, to facilitate supporting rolling upgrades of the modules. As desired, the containers can be isolated from each other and can bundle their respective software, libraries, and/or configuration files, wherein containers can communicate with each other through certain channels. The system 700, including the DLDP 702, can utilize the applications and associated containers to perform or implement the various aspects of the disclosed subject matter, as described herein.

In one embodiment, a docker image 714 can be a template that can be utilized to construct build containers. The docker image 714 can comprise one or more files (e.g., one or more read-only or unchangeable files) that can have no state. The docker image 714 can also comprise one or more layers. A container can be an instantiation of a docker image (e.g., a runtime instantiation of a docker image). A docker pull 718 can be employed to pull one or more images (e.g., docker image 714) from the docker registry 716 to facilitate instantiating one or more containers. For instance, using the docker pull 718, a desired docker image can be pulled from the docker registry 716 using a name and/or tag associated with the docker image. A docker build 720 can be utilized to build images (e.g., docker image 714) from a file (e.g., docker file) and a context, wherein a context of a build can comprise one or more files. A docker run 722 can be utilized (e.g., executed or performed) to run respective processes in respective containers (e.g., isolated containers). For instance, when a docker run 722 is utilized with regard to a container, the process for the container that runs can employ its own file system, networking, and/or process tree, which can be desirably isolated and separate from the docker host 712.

It is to be appreciated and understood that, while various aspects of the disclosed subject matter are being described with regard to docker-type implementations, the disclosed subject matter is not so limited, and, in accordance with various embodiments, the various aspects of the disclosed subject matter, including the system 700 and DLDP 702, can be implemented utilizing other types of architectures, models, features, and/or platform as a service (PaaS) products, as desired.

The system 700 also can include a scanner component 724 (SCANNER COMP.) that can scan data stored in the data stores 104, 106, and/or 108 to facilitate identifying the data that is stored in the data stores 104, 106, and/or 108, including identifying the data type of each item of data, the data format of each item of data, the language of each item of data, and/or other features (e.g., data attributes, data identifiers, and/or other metadata, etc.) of or associated with each item of data. The scanner component 724 can generate scan results based at least in part on the scanning of the data stored in the data stores 104, 106, and/or 108, wherein the scan results can comprise information relating to the data (e.g., scanned data), including information relating to the data type, data format, language, and/or the other features of or associated with each item of data, and/or other metadata relating to the data. The data stored in the data stores 104, 106, and/or 108 can comprise structured data (e.g., data contained in a relational database) and/or unstructured data (e.g., data contained in emails; image data (e.g., visual images, such as digital images, photographs, video images, or other type of image data); or other type of unstructured data). In some embodiments, the scanner component 724 can be located locally with respect to the DLDP 702 (e.g., as depicted in FIG. 7), whereas, in other embodiments, one or more scanner components (e.g., scanner component 724) can be deployed at or near the respective locations of respective data stores of the entity (e.g., organization or company) and/or one or more other entities (e.g., other tenants). The scanner component 724 can comprise or be associated with a classifier component (not shown in FIG. 7) that can analyze items of data scanned from the data stores 104, 106, and/or 108, and, based at least in part on the results of such analysis, can determine or identify each item of data, including the data type, data format, language, and/or other features of or associated with each item of data. In some embodiments, the DLDP 702 can employ artificial intelligence or machine learning to facilitate enhancing the performance of various aspects of the DLDP 702, including classification of items of data by the classifier component, as more fully described herein.

The DLDP 702 can include a transformation component 726 (TRANSFORM. COMP.) that can transform or modify data, such as data scanned from the data stores 104, 106, and/or 108, to put such data in a desired format, for example, for presentation of the data in the desired format via a user interface component 728 (USER I/F or UI) to a user (e.g., authorized and/or authenticated user), as more fully described herein. For instance, the transformation component 726 can receive items of data scanned from one or more of the data stores 104, 106, and/or 108. The transformation component 726 can analyze the items of data, and based at least in part on such analysis, can identify respective numeric values of the respective items of data and/or can identify numeric values relating to the respective items of data. For example, if an item of data is an address of a person (e.g., customer), the transformation component 726 can identify the numeric characters that can represent an address number and/or postal code (e.g., zip code) of the address, where the classifier component can classify the item of data as an address of the person, and the transformation component 726 can transform the item of data to facilitate presentation of the address of the person in a desirable form via the user interface component 728. As another example, if a group of items of data were scanned from a particular data set in a data store (e.g., 104), the transformation component 726 can identify the number of items of data in the group of items of data, based at least in part on the results of classification of the group of items of data by the classifier component, and can facilitate presenting the number of items of data in the group of items of data via the user interface component 728.

The DLDP 702 also can comprise a secure data store 730 (e.g., privacy data store) that can desirably (e.g., securely, suitably, and/or optimally) store desired data, such as certain items of data scanned from the data stores 104, 106, and/or 108 and/or information relating to items of data stored in the data stores 104, 106, and/or 108, wherein the information relating to the items of data can comprise scan results obtained from scanning the items of data, data attributes or features, and/or other metadata relating to the items of data. The secure data store 730 can be a multi-tenant, multi-lingual data store that can support a data aggregation model (e.g., centralized data aggregation model) and can support desirably (e.g., securely, suitably, or optimally) storing data associated with one or more desired entities (e.g., tenants), wherein data can be stored in one or more languages in the secure data store 730.

The DLDP 702 can include a data management component 732 that can manage and secure the data stored in the secure data store 730, can manage the compliance of the DLDP 702, its constituent or associated platforms, and the data stores (e.g., data stores 104, 106, and/or 108) associated with the DLDP 702 with the respective laws and regulations of the respective jurisdictions (e.g., legal and/or geographical jurisdictions) associated with the DLDP 702 and data stores and with the respective agreements (e.g., contracts or SLAs) associated with the DLDP 702 and data stores, wherein the laws and regulations can relate to data protection (e.g., data protection, privacy, and security), and wherein the agreements can relate to data protection. The data management component 732 also can manage various other operations and components of or associated with the DLDP 702, such as described herein. The constituent or associated platforms of the DLDP 702 can comprise, for example, a rights management platform (also referred to herein as rights management component), a governance platform (also referred to herein as governance component), and/or another desired platform that can be utilized to facilitate providing desirable data privacy, protection, and security. The rights management platform can manage various rights of users with regard to their data, or information relating to their data, stored in the secure data store 730 and/or data stores (e.g., data stores 104, 106, and/or 108) associated with the DLDP 702), as more fully described herein. The governance platform can track and manage laws and regulations associated with the various jurisdictions associated with the DLDP 702, associated data stores (e.g., data stores 104, 106, and/or 108), and associated entities, and can track and manage agreements associated with the DLDP 702, associated data stores, and associated entities, to facilitate compliance of the DLDP 702, associated data stores, and associated entities with applicable laws, regulations, and/or agreements, as more fully described herein.

The laws and regulations can comprise, for example, the GDPR, Personal Information Protection and Electronic Documents Act (PIPEDA), Fair Credit Reporting Act (FCRA), Electronic Communications, Privacy Act (ECPA), Health Insurance Portability and Accountability Act of 1996 (HIPAA), Children's Online Privacy Protection Act (COPPA), Racketeer Influenced and Corrupt Organization (RICO) Act, Family Educational Rights and Privacy Act (FERPA), U.S. Privacy Act, Medical Computer Crime Act, Federal Computer Crime Act, Computer Fraud and Abuse Act, Video Privacy Protection Act, Digital Millennium Copyright Act (DMCA), Economic and Protection of Proprietary Information Act, the CCPA, California Consumer Privacy Act, People's Republic of China (PRC) Cybersecurity Law, Philippines Data Privacy Act, United Kingdom Computer Misuse Act, Australia Data Privacy Act, India Information Technology Act, India Information Technology Rules, Japan Act on Protection of Personal Information Amendment, Israel Privacy Protection Law, Mexico Federal Law on the Protection of Personal Data held by Private Properties, and/or any other law or regulation that has been enacted or that may be enacted through new legislation, new regulation, amendment to a law, or amendment to a regulation.

The laws, regulations, or agreements can relate to, specify, or indicate how data is to be handled or secured by an entity or the DLDP 702 (e.g., based on the type of data and/or a sensitivity, privacy, or protected status of data); various rights of users with regard to data of users or information relating thereto (e.g., information derived from, based on, or associated with the data of users); processing of data; sharing of data with third party entities; consents and choices of users (e.g., user consent to receiving of emails or text messages from an entity, or user consent to allow use of cookies by an entity, etc.); removal or unsubscription of users from receiving electronic communications; length of time to comply with request to remove or unsubscribe; length of time to remedy or mitigate non-compliance with provision of a law, regulation, or agreement (e.g., safe harbor); encryption of data; security of communication channels; authentication requirements to access data, obtain copies of data, write data, modify data, or erase data; anonymization of data; and/or other aspects or factors relating to data protection of data of users and information relating thereto.

In some embodiments, the DLDP 702 can comprise an application programming interface component 734 (API) that can provide various interfaces (e.g., APIs) that can enable desirable communication of information between the secure data store 730 and the user interface component 728, the data management component 732, a notification component 736 of the DLDP 702, and/or other components of or associated with the DLDP 702, in accordance with various protocols and data formats supported by the API 734.

The notification component 736 can generate and provide (e.g., communicate) various types of notifications (e.g., notification or alert messages) to users via the user interface component 728, as more fully described herein. For example, when the DLDP 702 detects that an anomaly (e.g., data protection anomaly and/or breach) has occurred with regard to certain data of a user(s), a certain data store(s) (e.g., data store(s) 104, 106, and/or 108), the secure data store 730, the DLDP 702, or its constituent or associated platforms (e.g., the governance platform or rights management platform of or associated with the DLDP 702), the notification component 736 can generate a notification message that can notify a user (e.g., service representative of or associated with an entity) that the anomaly has occurred, can indicate that a remediation action is being performed to remedy or mitigate the anomaly, and/or can request that a remediation action be performed to remedy or mitigate the anomaly, wherein the anomaly can indicate non-compliance or potential non-compliance with an applicable law, regulation, or agreement has occurred. The notification component 736 can facilitate communicating the notification message to the user via the user interface component 728 to notify or alert the user that the anomaly has been detected by the DLDP 702, a remediation action is being performed, and/or performance of a remediation action is requested.

In some embodiments, the system 700 comprise one or more communication devices, such as communication device 738, that can be a client device(s) that can be associated with (e.g., communicatively connected to) the DLDP 702 via, for example, a communication network(s) (e.g., a packet-based (e.g., an Internet protocol (IP)-based) communication network, such as the Internet, an intranet, a local area network (LAN), a wide area network (WAN), a wireless network, a core or cellular network, or other type of communication network). The communication device 738 can connect to the DLDP 702 via a wireline or wireless communication connection or channel. A user (e.g., service representative of or associated with the entity; or user who has data being handled by the entity) can utilize the communication device 738 to communicate with the DLDP 702, authenticate with the DLDP 702, request information from the DLDP 702 and/or a data store (e.g., data store 104) associated with the DLDP 702, receive notifications or alerts from the DLDP 702, etc., such as more fully described herein.

Communication devices (e.g., communication device 738) can refer to or can include, but are not limited to, for example, a computer (e.g., a desktop computer, a laptop embedded equipment (LEE), a laptop mounted equipment (LME), or other type of computer), a tablet or pad (e.g., an electronic tablet or pad), an electronic notebook, a cellular and/or smart phone, a mobile terminal, a mobile device, a mobile communication device, user equipment (UE), a landline phone, a Personal Digital Assistant (PDA), an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a media player (e.g., media player having communication functionality), speakers (e.g., powered speakers having communication functionality), a set-top box, an IP television (IPTV), a communication device associated or integrated with a vehicle (e.g., automobile, bus, train, or ship, or other type of vehicle), a virtual assistant (VA) device, and/or any other type of communication device (e.g., other types of Internet of Things (IoTs)).

These and other aspects and embodiments of the disclosed subject matter will be described with regard to the other drawings and/or FIG. 7.

Figure 8:
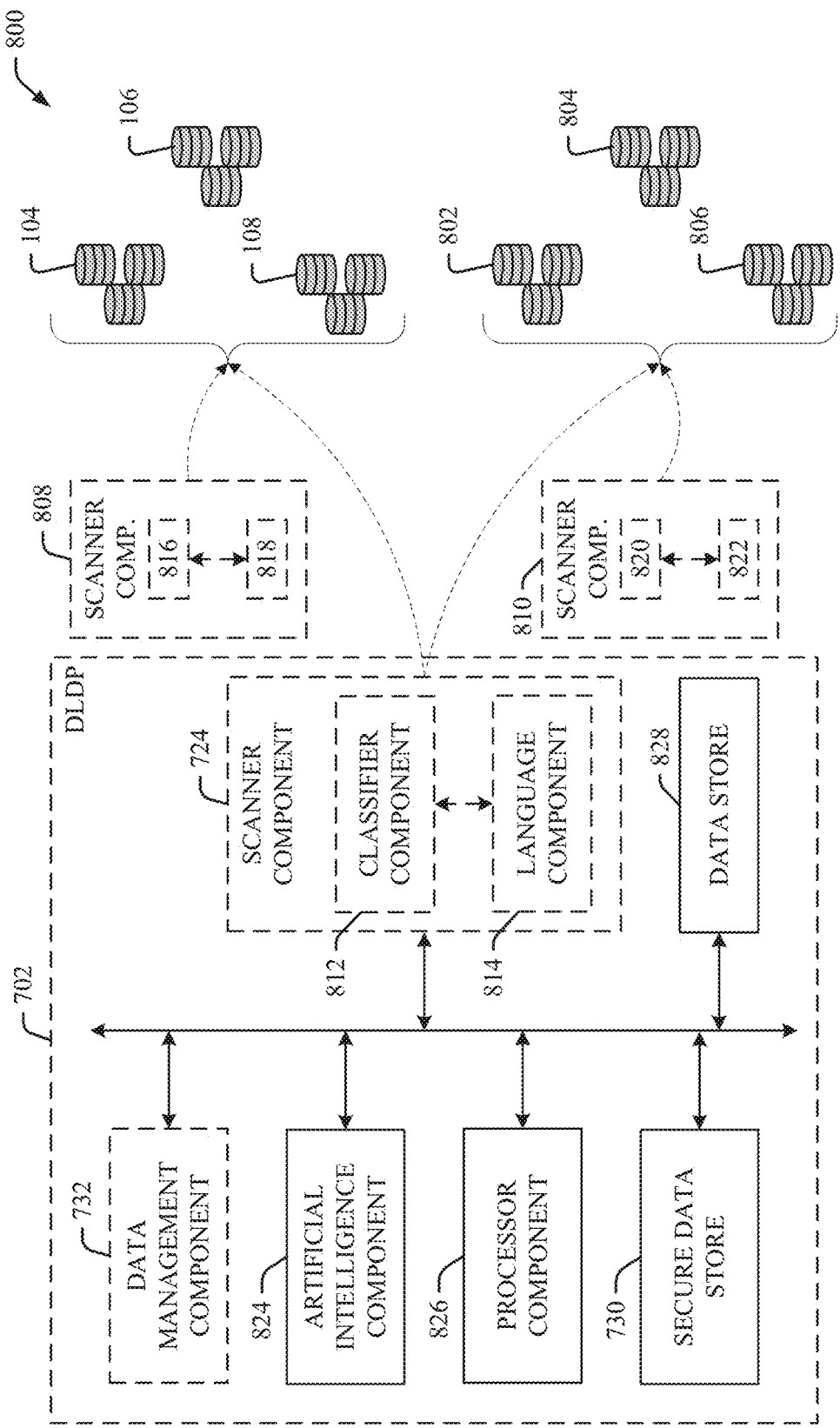
FIG. 8 depicts a block diagram of an example system that can utilize classification techniques, and artificial intelligence and machine learning techniques, to facilitate classifying or identifying data scanned from data stores to facilitate desirably discovering and tracking data stored in various data stores and managing the data, in accordance with various aspects and embodiments of the disclosed subject matter.

Referring to FIG. 8 (along with FIG. 7), FIG. 8 depicts a block diagram of an example system 800 that can utilize classification techniques, and artificial intelligence and machine learning techniques, to facilitate classifying or identifying data scanned from data stores to facilitate desirably (e.g., efficiently or optimally) discovering and tracking data stored in various data stores and managing the data, in accordance with various aspects and embodiments of the disclosed subject matter. The system 800 can comprise DLDP 702, which can be employed to facilitate data protection, including data security and protecting data privacy, of data stored in the DLDP 702 or data stores associated with (e.g., communicatively connected to) the DLDP 702. The system 800 can comprise a first set of data stores, including data store 104, data store 106, and/or data store 108, associated with a first entity (e.g., first organization or company), and a second set of data stores, including data store 802, data store 804, and/or data store 806, associated with a second entity (e.g., second organization or company). The first set of data stores (e.g., 104, 106, and/or 108) and the first entity can be located in or associated with a first jurisdiction, and the second set of data stores (e.g., 802, 804, and/or 806) and the second entity can be located in or associated with a second jurisdiction.

The DLDP 702 can comprise the secure data store 730 (e.g., privacy data store), which can desirably store desired data, such as certain items of data scanned from the first set of data stores (e.g., 104, 106, and/or 108), the second set of data stores (e.g., 802, 804, and/or 806), and/or information relating to items of data stored in the first set of data stores and/or second set of data stores, wherein the information relating to the items of data can comprise scan results obtained from scanning the items of data, data attributes or data features, and/or other metadata relating to the items of data. The secure data store 730 can be a multi-tenant, multi-lingual data store that can support desirably storing data associated with one or more desired entities (e.g., tenants), such as the first entity and second entity, wherein data can be stored in one or more languages in the secure data store 730. For instance, a first set of data stored in the first set of data stores (e.g., 104, 106, and/or 108) can be in a first language, and a second set of data stored in the second set of data stores (e.g., 802, 804, and/or 806) can be in a second language. It is to be appreciated and understood that a set of data stores (e.g., 104, 106, and/or 108) can store items of data that can be in more than one language.

The DLDP 702 can include the data management component 732 that can manage and secure the data stored in the secure data store 730, can manage the compliance (e.g., adherence) of the DLDP 702, its constituent or associated platforms (e.g., governance platform and rights management platform), and the first set of data stores (e.g., 104, 106, and/or 108) and second set of data stores (e.g., 802, 804, and/or 806) associated with the DLDP 702 with the respective laws and regulations of the respective jurisdictions (e.g., legal and/or geographical jurisdictions) associated with the DLDP 702 and data stores and with the respective agreements (e.g., contracts or SLAs) associated with the DLDP 702 and data stores, wherein the laws and regulations can relate to data protection, and wherein the agreements can relate to data protection. For instance, the first set of data stores (e.g., 104, 106, and/or 108) and first entity can be associated with a first set of laws and regulations associated with (e.g., applicable to) the first jurisdiction and/or a first agreement between the first entity and another entity(ies) and relating to data stored in the first set of data stores. The second set of data stores (e.g., 802, 804, and/or 806) and second entity can be associated with a second set of laws and regulations associated with (e.g., applicable to) the second jurisdiction and/or a second agreement between the second entity and another entity(ies) and relating to data stored in the second set of data stores.

In accordance with various aspects and embodiments, the system 800 can comprise the scanner component 724, a scanner component 808, and/or a scanner component 810. The scanner component 724 can be located locally with respect to the DLDP 702 (e.g., can be part of or in relatively close proximity to the DLDP 702); the scanner component 808 can be deployed at a first location that can be in proximity to the first set of data stores (e.g., 104, 106, and/or 108); and/or the scanner component 810 can be deployed at a second location that can be in proximity to the second set of data stores (e.g., 802, 804, and/or 806). The scanner component 724 and/or scanner component 808 can be associated with (e.g., communicatively connected to) the first set of data stores (e.g., 104, 106, and/or 108). The scanner component 724 and/or scanner component 810 can be associated with (e.g., communicatively connected to) the second set of data stores (e.g., 802, 804, and/or 806). In some embodiments, the scanner component 810 can be owned, managed, or operated by the first entity, but can be located at a location in proximity to the second set of data stores.

The scanner component 724 and/or scanner component 808 can scan data (e.g., all or a desired portion of the first set of data) stored in the first set of data stores (e.g., 104, 106, and/or 108) to facilitate identifying the data that is stored in the first set of data stores, including identifying the data type, the data format, the language (e.g., the first language), and/or other features (e.g., data attributes, data identifiers, and/or other metadata, etc.) of or associated with each item of data. The scanner component 724 and/or scanner component 808 can generate scan results based at least in part on the scanning of the data stored in the first set of data stores (e.g., 104, 106, and/or 108), wherein the scan results can comprise information relating to the data (e.g., data scanned from the first set of data stores), including information relating to the data type, data format, language, and/or the other features of or associated with each item of data, and/or other metadata relating to the data.

The scanner component 724 and/or scanner component 810 can scan data (e.g., all or a desired portion of the second set of data) stored in the second set of data stores (e.g., 802, 804, and/or 806) to facilitate identifying the data that is stored in the second set of data stores, including identifying the data type, the data format, the language (e.g., the second language), and/or other features of or associated with each item of data. The scanner component 724 and/or scanner component 810 can generate scan results based at least in part on the scanning of the data stored in the second set of data stores (e.g., 802, 804, and/or 806), wherein the scan results can comprise information relating to the data (e.g., data scanned from the second set of data stores), including information relating to the data type, data format, language, and/or the other features of or associated with each item of data, and/or other metadata relating to the data.

In accordance with various aspects and embodiments, the scanner component 724 can comprise a classifier component 812 and language component 814, the scanner component 808 can comprise a classifier component 816 and language component 818, and/or the scanner component 810 can comprise a classifier component 820 and language component 822. The classifier component 812 and/or classifier component 816 can analyze all or a desired portion of the first set of data that was scanned from the first set of data stores 104, 106, and/or 108. Based at least in part on the results of the analysis, the classifier component 812 and/or classifier component 816 can determine, identify, or classify items of data of the first set of data, including determining, identifying, or classifying the data type, the data format, the language, and/or the other features of or associated with each of those items of data. Similarly, the classifier component 812 and/or classifier component 820 can analyze all or a desired portion of the second set of data that was scanned from the second set of data stores 802, 804, and/or 806. Based at least in part on the results of such analysis, the classifier component 812 and/or classifier component 820 can determine, identify, or classify items of data of the second set of data, including determining, identifying, or classifying the data type, the data format, the language, and/or the other features of or associated with each of those items of data.

The language component 814 of scanner component 124 and/or the language component 818 of scanner component 808 can facilitate identifying or determining the language (e.g., first language) of the items of data scanned from the first set of data stores 104, 106, and/or 108. The language component 814 of scanner component 724 and/or the language component 822 of scanner component 810 can facilitate identifying or determining the language (e.g., second language) of the items of data scanned from the second set of data stores 802, 804, and/or 806. A language component (e.g., 814, 818, or 822) can comprise libraries, dictionaries, or other language or grammar related information regarding various different languages. The languages that can be identified, determined, or recognized by the scanner component(s) (e.g., 724, 808, and/or 810) can comprise, for example, English, Spanish, French, Italian, Portuguese, Scottish Gaelic, German, Greek, Romanian, Hungarian, Chinese, Japanese, Korean, Vietnamese, Taiwanese, Thai, Indonesian, Malay, Javanese, Filipino, Tagalog, Dutch, Russian, Ukrainian, Arabic, Kurdish, Persian, Hebrew, Hindi, Bengali, Sinhala, Tamil, Turkish, Bosnian, Serbian, Croatian, African, Icelandic, Nordic, Native American languages, and/or any other desired language, and/or respective language dialects relating thereto. A classifier component (e.g., 812, 816, or 820) can access such libraries, dictionaries or other language or grammar related information, and, based at least in part on an analysis of items of data scanned from a data store(s) and the information in the libraries, dictionaries or other language or grammar related information, the classifier component (e.g., 812, 816, or 820) can determine, identify, or classify the characters (e.g., letters, numbers, symbols, accents, punctuation, or other characters) of each item of data, the language of each item of data, and/or the grammar of each item of data, as well as determine, identify, or classify the data type, data format, or other features of or associated with each item of data.

In some embodiments, the DLDP 702 can comprise an artificial intelligence (AI) component 824 that can utilize (e.g., apply) artificial or machine learning to facilitate enhancing the performance of various aspects of the DLDP 702, including classification of items of data by the classifier component(s) (e.g., 812, 816, or 820). The AI component 824 can be associated with (e.g., communicatively connected to) the other components (e.g., secure data store 730, data management component 732, scanner component(s) (e.g., 724, 808, or 810), processor component 826, or other component) of the system 800 to enable the AI component 824 to communicate with such other components and facilitate performance of operations by the system 800. The AI component 824 can employ artificial intelligence techniques and algorithms, and/or machine learning techniques and algorithms, to facilitate determining or inferring characters of an item of data, language of the item of data, grammar of the item of data, data type of the item of data, data format of the item of data, or other features of or associated with the item of data, determining or inferring a likelihood or probability of an anomaly (e.g., non-compliance issue) occurring (e.g., within a defined amount of time) with regard to an obligation(s) (e.g., arising out of an applicable law, regulation, or agreement), determining or inferring a level of compliance with an obligation(s) or a risk score with regard to a risk indicator metric (e.g., a key risk indicator (KRI) metric), a platform (e.g., DLDP 702, governance platform, rights management platform, data discovery platform, data subject rights platform, third party management platform, and/or notice and consents platform, etc.), a data store associated with an entity, or an entity, determining or inferring a remediation that can be performed to remedy or mitigate an anomaly, and/or automating one or more functions or features of the disclosed subject matter, as more fully described herein.

The machine learning techniques and algorithms can comprise, for example, a random forest technique, a linear regression technique, a regression boosting technique, a gradient boosting technique, a support vector machine technique, a Bayesian technique (e.g., a Bayesian-type or Bayesian-based technique), a k-means technique, a k-nearest neighbor (kNN) technique, a classification and regression tree technique, or other desired type of machine learning technique or algorithm. Employing the desired machine learning technique(s) and algorithm(s), and based at least in part on the results of analyzing items of data scanned from a data store(s) or historical information relating to data, types of characters, types of languages, types of grammar, data types, data formats, or other features of data, the AI component 824 can learn over time to more desirably and progressively determine, identify, or classify characters, language, grammar, data type, data format, or other features of or associated with items of data. Based at least in part on such learning (e.g., progressive machine learning), the performance of the AI component 824 and associated classifier component(s) (e.g., 812, 816, or 820) can be enhanced (e.g., progressively enhanced or improved) over time with regard to classification of items of data.

In certain embodiments, additionally or alternatively, the AI component 824 can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 824 can examine the entirety or a subset of the data (e.g., data scanned from a data store(s) by a scanner component(s) (e.g., 724, 808, or 810), data stored in the secure data store 730, data in or associated with the data management component 732, data in or associated with the processor component 826, or other data) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data)) as well as implicitly trained (e.g., via observing behavior, preferences, historical information, receiving extrinsic information, and so on) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, zn)$, to a confidence that the input belongs to a class, as by $f(z)=$confidence (class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

The processor component 826 can work in conjunction with the other components (e.g., secure data store 730, data management component 732, scanner component(s) (e.g., 724, 808, or 810), AI component 824, or data store 828, etc.) to facilitate performing the various functions of the system 800. The processor component 826 can employ one or more processors, microprocessors, or controllers that can process data, such as information relating to the DLDP 702, governance platform, rights management platform, users (e.g., users associated with items of data, users who are attempting to access items of data or information relating to items of data), items of data scanned from data stores, laws, regulations, agreements, obligations, rules, communication devices, identifiers or authentication credentials associated with users or communication devices, KRI metrics, privacy principles, risk scores, privacy health index, non-compliance with obligations, notifications, alerts, remediation, data parsing, data filtering, data classification, data or user security, parameters, traffic flows, policies, defined data management criteria, algorithms (e.g., data management algorithms, filtering algorithms, data classification algorithms AI algorithms, machine learning algorithms, etc., including as one or more of these algorithms are expressed in the form of the methods and techniques described herein), protocols, interfaces, tools, and/or other information, to facilitate operation of the system 800, as more fully disclosed herein, and control data flow between the system 800 and other components (e.g., a communication device, a base station or other network component or device of the communication network, data sources, or applications, etc.) associated with the system 800.

The data store 828 can store data structures (e.g., user data, metadata), code structure(s) (e.g., modules, objects, hashes, classes, procedures) or instructions, information relating to the DLDP 702, governance platform, rights management platform, users (e.g., users associated with items of data, users who are attempting to access items of data or information relating to items of data), items of data scanned from data stores, laws, regulations, agreements, obligations, rules, communication devices, identifiers or authentication credentials associated with users or communication devices, KRI metrics, privacy principles, risk scores, privacy health index, non-compliance with obligations, notifications, alerts, remediation, data parsing, data filtering, data classification, data or user security, parameters, traffic flows, policies, defined data management criteria, algorithms (e.g., data management algorithms, filtering algorithms, data classification algorithms AI algorithms, machine learning algorithms, etc., including as one or more of these algorithms are expressed in the form of the methods and techniques described herein), protocols, interfaces, tools, and/or other information, to facilitate controlling operations associated with the system 800. In an aspect, the processor component 826 can be functionally coupled (e.g., through a memory bus) to the data store 828 in order to store and retrieve information desired to operate and/or confer functionality, at least in part, to the DLDP 702, secure data store 730, data management component 732, scanner component(s) (e.g., 724, 808, or 810), AI component 824, data store 828, or other component, and/or substantially any other operational aspects of the system 800.

Figure 9:
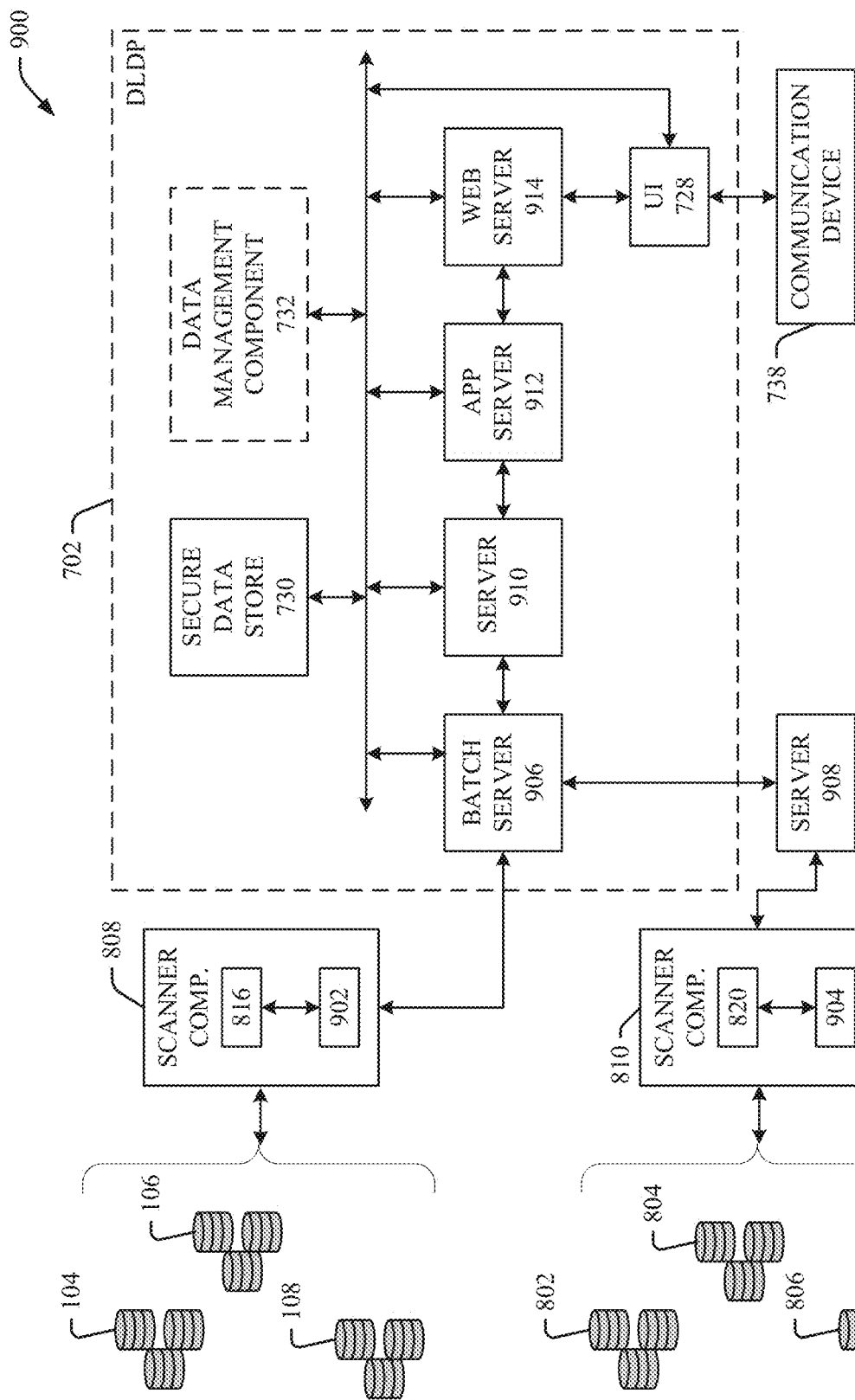
FIG. 9 depicts a block diagram of an example system that can illustrate a DLDP process flow in connection with the DLDP desirably discovering and tracking data stored in various data stores and managing the data, in accordance with various aspects and embodiments of the disclosed subject matter.

Turning to FIG. 9 (along with FIGS. 7 and 8), FIG. 9 depicts a block diagram of an example system 900 that can illustrate a DLDP process flow in connection with the DLDP desirably (e.g., efficiently or optimally) discovering and tracking data stored in various data stores and managing the data, in accordance with various aspects and embodiments of the disclosed subject matter. The system 900 can comprise the DLDP 702, the user interface component 728 (UI), the secure data store 730, and the data management component 732. The DLDP 702 can comprise and can provide various cloud services relating to data discovery, data tracking, data management, user rights management, governance, and data protection, as such cloud services can be provided by the first entity, which can own, manage, or operate the DLDP 702. In some embodiments, the DLDP 702 can comprise or be part of a docker container, such as described herein.

The system 900 also can comprise the first set of data stores (e.g., 104, 106, and 108) associated with the first entity, and the second set of data stores (e.g., 802, 804, and 806) associated with the second entity. The first set of data stores (e.g., 104, 106, and 108) can store a first set of data that can comprise data stored in databases (e.g., relational databases), files, images (e.g., digital videos or photographs), files, emails, and/or messages (e.g., text or multimedia messages), audio data or files, etc., associated with users (e.g., first group of users). The second set of data stores (e.g., 802, 804, and 806) can store a second set of data that can comprise data stored in databases, files, images, files, emails, and/or messages, audio data or files, etc., associated with users (e.g., second group of users).

The system 900 also can comprise scanner component 808 and scanner component 810 that can be associated with (e.g., communicatively connected to) the DLDP 702. The scanner component 808 can comprise classifier component 816 and data store 902, and scanner component 810 can comprise classifier component 820 and data store 904. In some embodiments, a scanner component(s) (e.g., 724, 808, and/or 810) can be or can comprise a split-post dielectric resonator (SPDR) scanner. In certain embodiments, the first set of data stores (e.g., 104, 106, and 108), the scanner component 808, and the DLDP 702 can be associated with the first entity (e.g., owned, managed, or operated by the first entity), and the second set of data stores (e.g., 802, 804, and 806) and/or the scanner component 810 can be associated with the second entity.

The scanner component 808 can scan all or a desired portion of the first set of data stored in the first set of data stores (e.g., 104, 106, and 108), in accordance with the first set of laws and regulations associated with the first jurisdiction and/or the first agreement that are associated with the first set of data stores, the first entity, and/or the DLDP 702. The classifier component 816 can analyze the scanned data of the first set of data to classify the scanned data to generate first classification results, such as more fully described herein. The scanner component 808 can store the first scan results, comprising the first scanned data, or portion thereof, first information relating to the first scanned data, and/or the first classification results, in the data store 902.

The scanner component 810 can scan all or a desired portion of the second set of data stored in the first set of data stores (e.g., 802, 804, and 806), in accordance with the second set of laws and regulations associated with the second jurisdiction and/or the second agreement that are associated with the second set of data stores, the second entity, and/or the DLDP 702. The classifier component 820 can analyze the second scanned data of the second set of data to classify the second scanned data to generate second classification results, such as more fully described herein. The scanner component 810 can store the second scan results, comprising the second scanned data, or portion thereof, second information relating to the second scanned data, and/or the second classification results, in the data store 904.

With regard to the first scan results obtained by the scanner component 808, the DLDP 702 can receive the first scan results from the scanner component 808. In certain embodiments, the DLDP 702 can comprise a batch server component 906 that can establish a communication connection with the scanner component 808, wherein the batch server component 906 (BATCH SERVER) can read the first scan results from the data store 902 of the scanner component 808. The batch server component 906 can be located in a highly restricted zone (HRZ) of the DLDP 702, to facilitate desirably securing the data. The HRZ of the DLDP 702 can be a desirably (e.g., highly) secure area of the DLDP 702 where data of users, including sensitive data of users, protected data of users, PII of users, and/or information relating to the data of users, can be desirably and securely stored (e.g., in the secure data store 730), protected, and/or processed by the DLDP 702. The DLDP 702 can desirably prevent or inhibit unauthorized access of the DLDP 702, particularly the HRZ of the DLDP 702, and the data stored therein, by unauthorized users, entities, or devices, as more fully described herein. In some embodiments, the batch server component 906 can utilize a desired (e.g., standard) API, such as, for example, native open database connectivity (ODBC), to facilitate establishing the communication connection and transferring the first scan results from the scanner component 808 to the batch server component 906. The native ODBC can be an open standard API that can be utilized to facilitate accessing the data store 902 and communicating data (e.g., first scan results). In certain embodiments, the batch server component 906 can be an extract, transform, load (ETL) server that can utilize an ETL batch process to facilitate reading and transferring the first scan results from the scanner component 808 to the batch server component 906.

With regard to the second scan results obtained by the scanner component 810, the system 900 can employ a server component 908 (SERVER), which can be utilized as an intermediary server or a drop zone server that can receive the second scan results from the scanner component 810. In some embodiments, the scanner component 810 can establish a communication connection with the server component 908 and can utilize a desired data transfer process and protocol, such as, for example, a secure file transfer protocol (SFTP) push process and protocol (SFTP also can refer to secure shell protocol (SSH) file transfer protocol), to transfer the second scan results to the server component 908. The batch server component 906 can establish a communication connection with the server component 908, and can utilize a desired data transfer process and protocol, such as, for example, an SFTP pull process and protocol, to transfer the second scan results from the server component 908 to the batch server component 906.

The batch server component 906 can store the first scan results and the second scan results in the secure data store 730. The secure data store 730 can be associated with, or can comprise, a server component 910 (SERVER) (e.g., a database server). The server component 910 can utilize a desired (e.g., suitable or optimal) common data model to facilitate storage of the first scan results and second scan results in the secure data store 730. The secure data store 730 also can be located in the HRZ of the DLDP 702. In some embodiments, the batch server component 906 and secure data store 730 (e.g., server component 910 of the secure data store 730) can utilize native ODBC to facilitate establishing the communication connection and transferring the first scan results and second scan results from the batch server component 906 to the secure data store 730.

The DLDP 702 also can comprise an application server component 912 (APP SERVER) that can provide various services relating to servicing data requests for data stored in the secure data store 730. In some embodiments, the services provided by the application server component 912 can include representational state transfer (REST)ful (RESTful) services that can have a RESTful architectural style and associated constraints to facilitate creation of web services. The application server component 912 can reside in the HRZ.

The DLDP 702 further can include a web server component 914 (WEB SERVER) that can employ a web application and provide web-related services to communication devices, such as communication device 738, associated with (e.g., communicatively connected to) the DLDP 702. The web server component 914 can be part of or associated with the user interface component 728. The web server component 914 can be situated at a point within or between the HRZ and a demilitarized zone (DMZ), which can be a perimeter network that can be a network area that can be positioned between the internal network of the DLDP 702 (e.g., the HRZ or other desirably secure internal network or area of the DLDP 702) and an external network, and can facilitate providing desirable isolation between the internal network of the DLDP 702 and the external network to facilitate desirable security of the internal network of the DLDP 702.

When a user desires to access information regarding the first set of data stores (e.g., 104, 106, and/or 108) associated with the first entity and/or the second set of data stores (e.g., 802, 804, and/or 806) associated with the second entity from the DLDP 702, the user can utilize the communication device 738 to connect to the DLDP 702 via the user interface component 728 (e.g., via the web server component 914 of or associated with the user interface component 728). The user and/or associated communication device 738 can provide authentication information (e.g., authentication credential(s) and/or an identifier, such as a device identifier) to facilitate authenticating the user and/or communication device 738 with the web server component 914. The web server component 914 can employ a desired authentication protocol(s) to authenticate the user and/or communication device 738. In accordance with various embodiments, the web server component 914 can utilize a single sign-on (SSO) authentication protocol, which can allow the user to log in and authenticate with the DLDP 702 using a user identification (user ID) and password, or can utilize multi-factor (e.g., two-step) authentication, which can have a user go through multiple steps, factors, or layers of authentication in order to authenticate the user and/or communication device 738 with the DLDP 702. In certain embodiments, the web server component 914 also can employ (e.g., can utilize or apply) identity and access management (IAM) policies, procedures, and technologies to facilitate ensuring that the proper (e.g., authorized) people of or associated with an entity (e.g., first entity or second entity) have the appropriate access (e.g., access that is authorized) to the data and resources of or associated with the DLDP 702 (e.g., DLDP 702, including the secure data store 730, the first set of data stores, or the second set of data stores, etc.). In accordance with IAM policies, the access to data and resources that is authorized for a person can be based at least in part on a role of that person in or in relation to an entity or can be based at least in part on another factor (e.g., a subscription level of a subscription of a user with an entity).

If the user and/or communication device 738 fail to provide proper authentication information to the web server component 914, the web server component 914 can deny the user and/or communication device 738 access to the DLDP 702. If, instead, the user and/or communication device 738 provide proper authentication information to the web server component 914, the web server component 914 can authenticate (e.g., approve access) to the DLDP 702, in accordance with the access level permitted for the user and/or communication device 738. The user, via the communication device 738, can submit a request for data to the DLDP 702 (e.g., via the user interface component 728 and web server component 914). In response to the request for data, the web server component 914 can initiate a secure API call to the application server component 912 (e.g., can call services or API endpoints in a secure manner) using a desired authentication protocol and service. In some embodiments, the web server component 914 can initiate the secure API call to the application server component 912 to facilitate authenticating the web server component 914 with the application server component 912, wherein the authentication can secure all communication endpoints (e.g., hypertext transfer protocol (HTTP) endpoints) with a desired level of authentication. The web server component 914 also can convey (e.g., communicate) the data request to the application server component 912.

If the application server component 912 receives proper authentication information from the web server component 914, the application server component 912 can authenticate the web server component 914 and associated user and/or communication device 738 with the application server component 912. In response to authenticating the web server component 914 (and associated user and/or communication device 738), and in response to the data request, the application server component 912 can call the server component 910 of or associated with the secure data store 730 using a desired data access API or other suitable data access mechanism. For example, the application server component 912 can call the server component 910 using Java database connectivity (JDBC) and/or a close function callback (e.g., Oracle Close Callback (OCC)), wherein the JDBC can be a Java-based data access API that can define how a client (e.g., application server component 912) can access the server component 910 (e.g., database of the server component 910).

The data management component 732 and/or server component 910 can determine whether the data request is permitted based at least in part on the level of access granted to the user and/or communication device 738, in accordance with a set of rules that can be based at least in part on the applicable law(s), regulation(s), and/or agreement(s) (e.g., first set of laws and regulations and/or first agreement; and/or second set of laws and regulations and/or second agreement). In response to determining that the data requested by the data request is permitted to be accessed by the user and/or communication device 738, the data management component 732 and/or server component 910 can determine the data that is responsive to the data request, and can provide such data to the communication device 738 and associated user via a secure communication channel, wherein, via the secure communication channel, the data management component 732 and/or server component 910 can forward the data to the application server component 912, which can forward the data to the web server component 914, which can forward the data to the communication device 738. The data management component 732 and/or user interface component 728 can present (e.g., display) the data in a desired format and desired user interface that can be desirable (e.g., suitable or optimal) with regard to the data requested.

Figure 10:
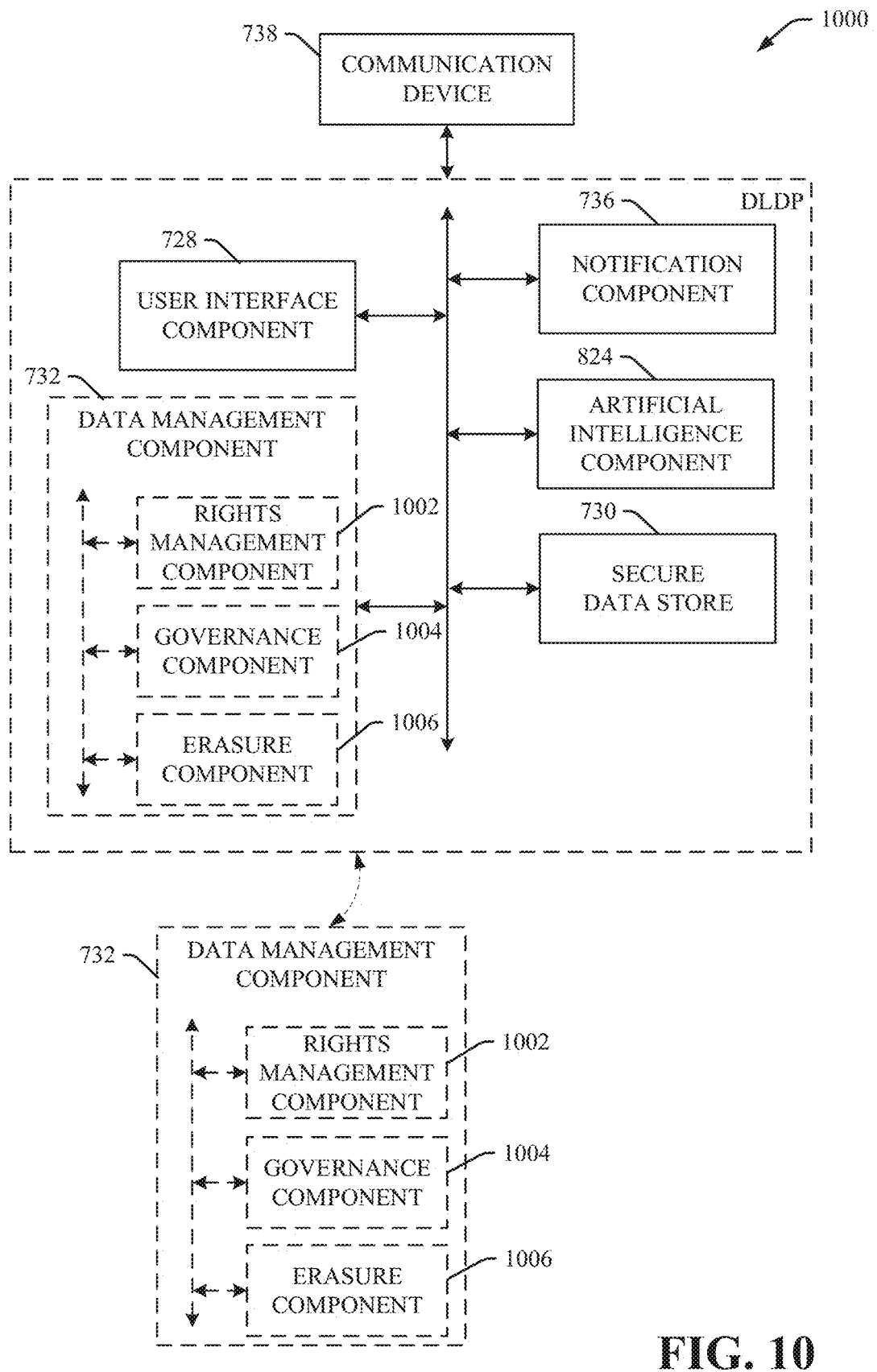
FIG. 10 illustrates a block diagram of an example system that can manage user data rights, governance, and data discovery with regard to data of users and information relating to the data of users that is stored in the DLDP or in data stores associated with the DLDP to facilitate desirably protecting and securing data of users and information relating thereto, in accordance with various aspects and embodiments of the disclosed subject matter.

Turning to FIG. 10 (along with FIGS. 7 and 8), FIG. 10 illustrates a block diagram of an example system 1000 that can manage user data rights, governance, and data discovery with regard to data of users and information relating to the data of users that is stored in the DLDP or in data stores associated with the DLDP to facilitate desirably protecting and securing data of users and information relating thereto, in accordance with various aspects and embodiments of the disclosed subject matter. The system 1000 can comprise the DLDP 702, the user interface component 728 of the DLDP, the secure data store 730 of the DLDP 702, the data management component 732 of the DLDP 702, and the AI component 824 of the DLDP 702. The system 1000 also can comprise communication device 738, which can be associated with (e.g., communicatively connected to) the DLDP 702.

The data management component 732 can manage (e.g., control) scanning of, and discovery of the presence of, data of users, and information relating thereto, stored in data stores (e.g., the first set of data stores (e.g., 104, 106, and/or 108) or the second set of data stores (e.g., 802, 804, and/or 806), etc.) associated with entities, in accordance with the defined data management criteria. The data management component 732 can control a scanner component(s) (e.g., 724, 808, or 810) to scan desired data stores (e.g., the first set of data stores (e.g., 104, 106, and/or 108) or the second set of data stores (e.g., 802, 804, and/or 806), or other data stores) in real time, or substantially in real time, on a rolling basis, at periodic times, dynamically (e.g., in response to a condition or event), or as otherwise desired. The frequency or amount of scanning performed by the scanner component(s) (e.g., 724, 808, or 810) to scan respective data stores, as controlled by the data management component 732, can be based at least in part on applicable laws, regulations, or agreements.

In accordance with various embodiments, the data management component 732 can comprise a rights management component 1002, a governance component 1004, and erasure component 1006. The erasure component 1006 can be, can comprise, or can be part of the erasure platform, and can manage erasure and/or retention of respective data associated with respective users accounts stored in the first set of data stores (e.g., 104, 106, and/or 108), the second set of data stores (e.g., 802, 804, and/or 806), and/or other data stores (e.g., the data vault repository 116, the secure data store 730, or other data store of or associated with the set of platforms), in accordance with the set of rules relating to data erasure and data retention, and the defined data management criteria, such as more fully described herein.

The rights management component 1002 can be, can comprise, or can be part of a rights management platform that can determine and facilitate enforcing rights of users with regard to their data and the information relating thereto that is stored in the secure data store 730 and/or data stores (e.g., the first set of data stores (e.g., 104, 106, and/or 108) or the second set of data stores (e.g., 802, 804, and/or 806)) associated with the DLDP 702, in accordance with the set of rules and the defined data management criteria. The rights management component 1002 also can manage access of the data and the information relating thereto by users in the secure data store 730 and/or data stores (e.g., the first set of data stores or the second set of data stores) associated with the DLDP 702, in accordance with the set of rules and the defined data management criteria.

The rights management component 1002 and/or the governance component 1004 can analyze the respective laws and regulations associated with respective jurisdictions that are associated with respective users and respective entities, and respective agreements associated with respective users and respective entities, to facilitate determining respective sets of rights of respective users with regard to their data and information relating thereto. The rights management component 1002 and/or the governance component 1004 can determine the respective sets of rights of respective users with regard to their data and information relating thereto, based at least in part on the results of such analysis of the laws, regulations, and agreements.

For example, a first law or regulation associated with a first jurisdiction, and/or a first agreement, can provide users with a first set of rights with regard to their data and/or information relating thereto that is in the custody or control of entities (e.g., a first entity's data stores or systems) associated with the first jurisdiction, wherein the first set of rights can have a first scope (e.g., a scope that can indicate or specify how broad, extensive, or expansive each of the rights of the first set of rights is). A second law or regulation associated with a second jurisdiction, and/or a second agreement, can provide users with a second set of rights with regard to their data and/or information relating thereto that is in the custody or control of entities (e.g., a second entity's data stores or systems) associated with the second jurisdiction, wherein the second set of rights can have a second scope. Based at least in part on the results of the analysis of the first law and regulation, and/or first agreement, the rights management component 1002 and/or the governance component 1004 can identify the first set of rights of users with regard to their data and/or information relating thereto, the first scope of the first set of rights, and the first obligations of entities associated with (e.g., subject to) the first jurisdiction with regard to the first set of rights of users. Also, based at least in part on the results of the analysis of the second law and regulation, and/or the second agreement, the rights management component 1002 and/or the governance component 1004 can identify the second set of rights of users with regard to their data and/or information relating thereto, the second scope of the second set of rights of users, and the second obligations of entities associated with (e.g., subject to) the second jurisdiction with regard to second set of rights of users.

The rights of users with regard to their data and/or information relating thereto can comprise, for example, the right of access to their data and/or information relating thereto, the right to information, the right to rectification, the right of erasure, the right to restriction of processing, the right to data portability, the right to object, the right to avoid automated decision making, and/or other rights of users that can be specified in applicable laws, regulations, or agreements.

The right of access can allow a user to access his or her data, including personal or sensitive data, PII, and/or information relating thereto that belongs to the user and is in possession of or is processed by an entity via the systems, data stores, etc., of the entity. The personal or sensitive data can be or can comprise, for example, personal data elements or PII of the user, wherein PII can include any data (e.g., phone number, residential or mailing address, Social Security number, email address, biometric information, username, password, passcode, personal identification number (PIN), IP address, geolocation data, social media data, or digital images, etc.) that can be used to identify the user. The right of access also can allow the user the right to ask an entity why and how it processes the user's data, categories of the data of the user involved in the data processing, who (e.g., entity, what representatives of the entity, third-party entity, etc.) has access to the user's data, the length of time the entity intends to store the user's data, whether the entity uses automated decision making with regard to the user's data, and/or other rights of access the user can have with regard to their data as specified in the particular law, regulation, or agreement that provides such right of access.

The right to information can involve the right of users to information that an entity has to provide users when the entity is collecting data (e.g., personal or sensitive data) from users (e.g., data subjects). For instance, a user can have the right to inquire an entity (e.g., entity storing or controlling data of users) what types of data (e.g., data of or associated with users) the entity processes and why the entity wants such data. The right to information in a law, regulation, or agreement also can specify when (e.g., at time of or prior to collecting the data; or within a defined time thereafter) the entity has to provide a use the information that is to be disclosed or provided to the user pursuant to the right of information. The right of information can include, for example, identity information regarding the identity of the entity, legal basis and purposes for processing the data of users, identification of the country where the processing of data will occur, identification of legitimate interests of the entity and third party entities with regard to the data of users, identification of recipients of data (e.g., personal or sensitive data) of users, information regarding the intent of an entity to transfer data of users outside of the identified country to a third country for processing, information regarding the data retention policy of the entity, information explaining the various rights of users with regard to their data, information explaining a right of the user to withdraw consent with regard to their data, tracking of activity of the user or electronic communications between the entity and the user, information regarding the existence of automated decision making with regard to data of users, and/or other information relating to the right of information.

The right to rectification can provide a user with the right to modify (e.g., alter, revise, or change) their data when the user believes or finds that their data in custody of (e.g., stored or processed by) an entity is wrong, inaccurate, out of date, or otherwise not valid. The right to rectification also can specify how long an entity has to respond to, address, process, or complete an action relating to a user's right to rectification when the user exercises such right (e.g., when the user requests that incorrect or invalid data of the user be modified). The right of rectification also can indicate the mechanisms or ways that the entity is provide to a user in order to enable the user to exercise the right to rectification.

The right of erasure (also colloquially known as the right to be forgotten) provides a user the right to request an entity to delete data (e.g., personal or sensitive data) of the user of which the entity has custody (e.g., data of the user that is stored in a data store of the entity). The right to erasure also can specify how long an entity has to respond to, address, process, or complete an action (e.g., deleting the user's data) relating to a user's right to erasure when the user exercises such right (e.g., when the user requests that the user's data be deleted by the entity). The right of erasure also can indicate the mechanisms or ways that the entity is provide to a user in order to enable the user to exercise the right to erasure. As part of the scope of the right of erasure, the right of erasure also can indicate or specify instances, situations, or circumstances under which the right of erasure does not apply, such as, for example, when the entity is required by applicable law or regulation to retain the data of users in their data stores or systems for at least a defined period of time, when retaining the data of the user is determined to be necessary for public health interests or in the public interest, when retaining the data of the user is determined to be necessary to perform preventative or occupational medicine, or when the data of the user is being used to exercise legal claims or establish a legal defense to a legal claim.

The right to restriction of processing can provide a user the right to request that an entity restrict processing of data of user under certain conditions. For instance, the user can exercise the right to restriction of processing of data of the user that the user contends or believes is inaccurate, when the user objects to unlawful processing of the user's data, or when the entity does not have to have the user's data for processing, but does have to retain the user's data in its systems or data stores by law or to enable the entity to exercise a legal claim or establish a legal defense to a legal claim. The length of time of the restriction of processing can be temporary (e.g., for a defined or undefined period of time) or can be permanent.

The right to data portability can provide that a user have a right to obtain (e.g., obtain a copy of) the data (e.g., personal or sensitive data) of the user that is in the custody of (e.g., stored in the systems or data stores of or associated with) the entity, under certain conditions or circumstances. Under such certain conditions or circumstances, the user can exercise right to data portability, for example, to obtain the user's data for personal use or purposes, or to provide the user's data to another entity for storage or processing. The right to data portability also can indicate or specify a data or file format(s) that can or is to be utilized when providing the user's data to the user or can indicate or specify that the entity is to provide the user's data to the user in a structured, commonly used, and machine-readable format. The right to data portability also can specify how long an entity has to respond to, address, process, or complete an action relating to a user's right to data portability when the user exercises such right to request that the entity provide the user's data to the user or another entity.

The right to object can allow a user to object to the processing of data of the user, including profiling, by an entity, under certain conditions or circumstances. For instance, the user can exercise the right to object to processing of the user's data by the entity when the processing of the user's data relates to direct marketing to the user (e.g., entity sending marketing emails to the user). The right to object also can specify how long an entity has to respond to, address, process, or complete an action relating to a user's right to object when the user exercises such right (e.g., can specify how long the entity has to cease sending marketing emails to the user). The right to object (or another right of the user) can indicate or specify that the entity has to disclose the user's right to object (and/or disclose the other rights the user has) to the user (e.g., in a privacy policy statement).

The right to avoid automated decision making can provide a user the right to not be subject to a decision of the entity based solely on automated processing or decision making, including profiling, except under certain circumstances, as defined by law, regulation, or agreement. As part of exercising the right to avoid automated decision making, the user can request to have human intervention to have a human user (e.g., human representative of or associated with the entity) intervene and interact with the user.

In addition to or as an alternative to these rights of users, depending on the applicable law, regulation, or agreement, a user can have certain other rights relating to the use, storage, or processing of the user's data by an entity, consent (e.g., explicit or implicit consent) or withdrawal of consent with regard to the user's data or electronic communications between the entity and the user, and personalization of the user's data or of the user by the entity, etc.

The rights management component 1002 or governance component 1004 can monitor and track the exercising of the various rights of users by users and the responses or actions taken by entities in response to the exercising of the various rights of users by users. Based at least in part on the monitoring and tracking, the rights management component 1002 or governance component 1004 can determine whether respective entities are desirably (e.g., suitably, sufficiently, or acceptably) complying with the respective sets of rights of respective users, in accordance with respective applicable laws, regulations, or agreements, as more fully described herein.

With further regard to the governance component 1004, the governance component 1004 (e.g., governance platform) can determine and enforce the set of rules, which the governance component 1004 can determine based at least in part on respective laws and regulations of respective jurisdictions and/or respective agreements, in accordance with the defined data management criteria, as more fully described herein. The governance component 1004 also can determine levels of compliance (e.g., with laws, regulations, or agreements) and/or risk scores for or with regard to KRI metrics, the DLDP 702, the rights management platform, the governance platform, another platform, a set of data stores (e.g., the first set of data stores (e.g., 104, 106, and/or 108) or the second set of data stores (e.g., 802, 804, and/or 806)), and/or an entity (e.g., the first entity or the second entity), etc., as more fully described herein.

In some embodiments, the rights management component 1002, the governance component 1004, and the erasure component 1006 can be part of the DLDP 702. In other embodiments, the rights management component 1002, the governance component 1004, and/or the erasure component 1006 can be separate from and associated with (e.g., communicatively connected to) the DLDP 702.

Figure 11:
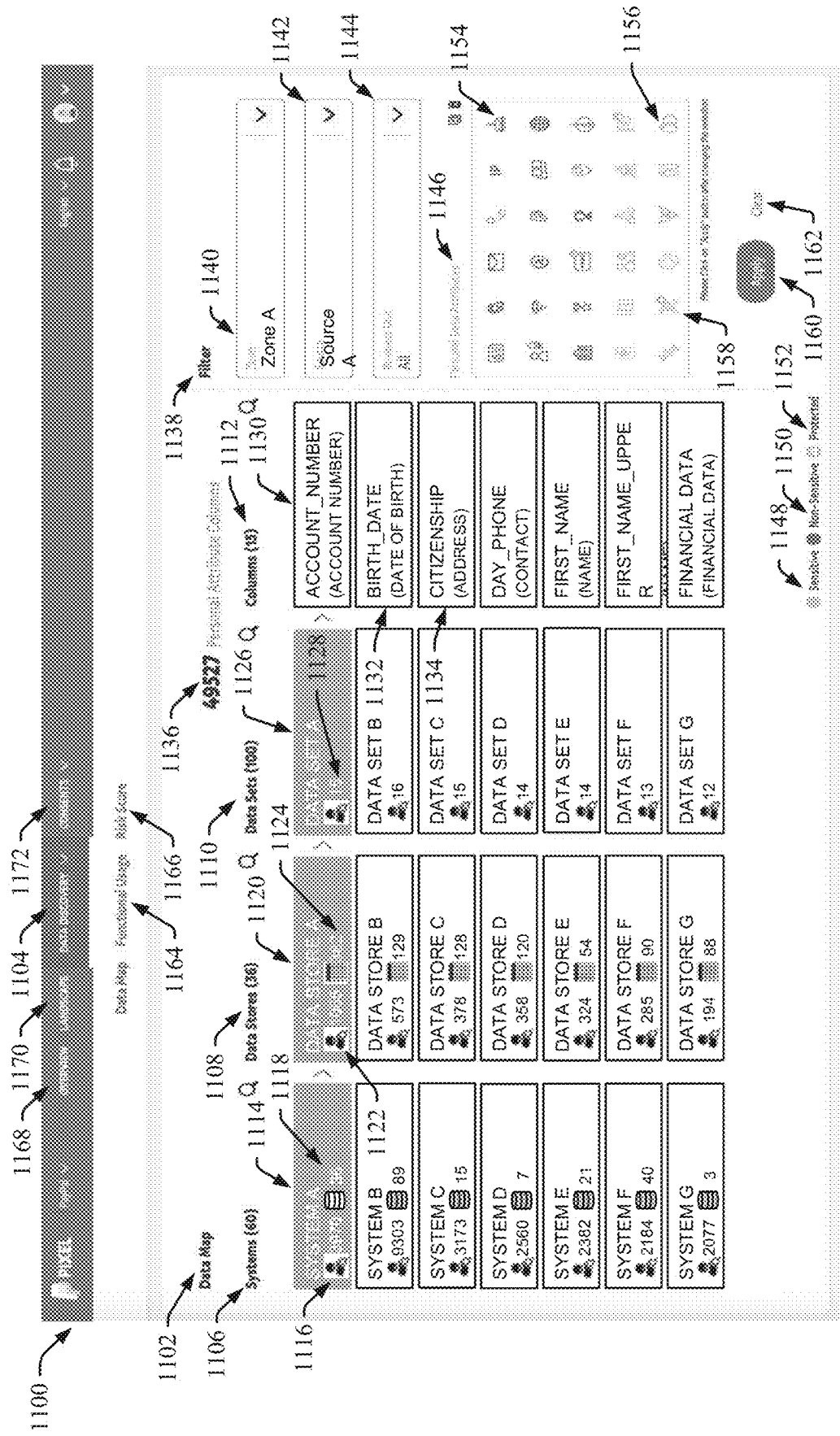
FIG. 11 presents a diagram of an example user interface relating to example data that can be presented to a user by the DLDP 102 in response to a data request, in accordance with various aspects and embodiments of the disclosed subject matter.

Referring to FIG. 11 (along with FIGS. 7, 8, and 10), FIG. 11 presents a diagram of an example user interface 1100 relating to example data that can be presented to a user by the DLDP 702 in response to a data request, in accordance with various aspects and embodiments of the disclosed subject matter. For instance, a user can desire to view or obtain certain data associated with the first entity and stored in the first set of data stores (e.g., 104, 106, and/or 108) associated with the first entity. The user, using communication device 738, can authenticate with the DLDP 702, as more fully described herein. In response to being authenticated by the DLDP 702, the rights management component 1002 can determine what access rights the user and/or communication device 738 is permitted to have to access data tracked and/or managed by the DLDP 702 in the secure data store 730 and data stores (e.g., the first set of data stores (e.g., 104, 106, and/or 108)) associated with the DLDP 702, based at least in part on the authentication information provided by the user and/or communication device 738, a role of the user with or in relation to the first entity, and/or another desired factor. The rights management component 1002 can grant the user and/or communication device 738 a set of access rights, in accordance with the determination regarding the access rights the user and/or communication device 738 is permitted to have.

The user, via the communication device 738, can submit a data request to request certain data. Example user interface 1100 can be example results to the data request. The example user interface 1100 can comprise a data map 1102 that can provide information regarding data associated with the first entity, as stored in the first set of data stores (e.g., 104, 106, and/or 108), or portion thereof, and/or the secure data store 730, as part of data discovery 1104 of the DLDP 702. The data map 1102 can provide information regarding, for example, the systems 1106 of or associated with the first entity, data stores 1108 for each of the systems 1106, data sets 1110 for each of the data stores 1108, and columns 1112 for each of the data sets 1110 (e.g., as such information has been filtered by the selected filters, such as described herein). With regard to each system, such as SYSTEM A 1114, of the systems 1106, the DLDP 702 can provide information regarding the number of personal data elements 1116 (e.g., 3970 personal data elements) and the number of data stores 1118 (e.g., 36 data stores) in which those personal data elements are stored. With regard to each data store, such as DATA STORE A 1120, of the data stores 1108, the DLDP 702 can provide information regarding the number of personal data elements 1122 (e.g., 1065 personal data elements) and the number of data sets 1124 (e.g., 15 data sets) in which such personal data elements are stored. With regard to each data set, such as DATA SET A 1126, of the data stores 1108, the DLDP 702 can provide information regarding the number of personal data elements 1128 (e.g., 15 personal data elements) that are stored in that data set. The columns 1112 portion of the user interface 1100 can present various personal data elements, such as, for example, account number 1130, birth date 1132, and/or citizenship 1134, etc. Other types of personal data elements (e.g., PII elements or personal attributes) can include, for example, full name (e.g., first name, last name, and/or maiden name), phone number (e.g., day phone number, home phone number, work phone number, and/or cell phone number), home address, work address, email address, Social Security Number, passport number, driver's license number or other government ID number, financial information (e.g., bank or credit account information, loan information, income information, or wealth information, etc.), age, education, gender, race, ethnicity, national origin, religion, genetic information, health information, political affiliation, trade union membership, location information, transaction history information, marital status information, family information, communication services provider (e.g., Internet service provider), log in or authentication information, biometric information, and/or other desired information regarding users or entities.

The user interface 1100 also can present information indicating the overall number of personal attribute columns 1136 (e.g., 49527 personal attribute columns (or personal data element columns)) contained in the systems 1106 (e.g., as such information has been filtered by the selected filters, such as described herein). The data management component 732 can facilitate presenting various types of filters 1138 to the user via the user interface 1100, and the user can apply desired filters to the information to filter out undesired information. For instance, as shown in the example user interface 1100, there can be a zone filter 1140 that can filter the information by zone(s). In the example user interface 1100, a filter for ZONE A has been applied to filter the information to include information relating to ZONE A. Also, as shown in the example user interface 1100, there can be a source filter 1142 that can filter the information by source(s) of the information. In the example user interface 1100, a filter for SOURCE A has been applied to filter the information to include information relating to SOURCE A. Further, as shown in the example user interface 1100, there can be a business unit filter 1144 that can filter the information by business unit(s) associated with the information. In the example user interface 1100, an all filter for all business units has been applied to filter the information to include information relating to all of the business units.

In some embodiments, the user interface 1100 can present personal data attributes filters 1146, which can be presented in a desired form, such as, icons, as depicted in the user interface 1100. Respective icons can represent respective types of personal data attribute filters. In certain embodiments, the icons of the personal data attributes filters 1146 can be colored, highlighted, or modified to represent different types of information or different types of information statuses (e.g., data privacy status or attribute). For example, sensitive personal data can be represented by a first color 1148 to indicate that the personal data is considered to be sensitive, non-sensitive data can be represented by a second color 1150 to indicate that such personal data is considered to be non-sensitive, and/or protected data can be represented by an icon modified to have a lock 1152 to indicate that such personal data can be protected personal data. In the example user interface 1100, the birth date filter icon 1154 can have the second color 1150 to indicate that birth date information regarding users is considered to be non-sensitive; the birth date filter icon 1154 can have the second color 1150 to indicate that birth date information regarding users is considered to be non-sensitive; the marital status filter icon 1156 can have the first color 1148 to indicate that marital status information regarding users is considered to be sensitive; and the biometric information filter icon 1158 can have the first color 1148 and a lock to indicate that biometric information regarding users is considered to be sensitive and protected personal data. It is to be appreciated and understood that different types of data can be considered to be sensitive, non-sensitive, or protected data based at least in part on applicable laws, regulations, and/or agreements, and/or as desired by the entity (as permitted by the applicable laws, regulations, and/or agreements), in accordance with the defined data management criteria.

To apply one or more filters to the information, the user can select one or more desired filters and press the apply button 1160 to apply the one or more filters to the information. To remove or clear filters, the user can select the clear button 1162 to remove or clear any filters that had been applied to the information.

As also can be observed in the example user interface 1100, in accordance with various aspects and embodiments, as desired, and when in accordance with the set of access rights granted to the user, the user can access information regarding functional usage 1164, which can indicate the functions of the DLDP 702 or system that the user has access rights to access and/or that the user is utilizing, and/or the user can access information regarding risk scores 1166, which can indicate the risk scores (e.g., risk levels or ratings) of various parts of the system (e.g., risk scores of KRI metrics, risk score of the DLDP 702, risk score of the access rights platform, risk score of the governance platform, and/or risk score for the third party management platform, etc.).

The example user interface 1100 also can enable the user, when in accordance with the set of access rights, to view an overview 1168 of the information associated with the first entity that is tracked and managed by the DLDP 702, a landscape 1170 of the physical and/or logical relationships between various systems, data stores, databases, data sets, and/or other data layers or types associated with the first entity. The example user interface 1100 also can enable the user, when in accordance with the set of access rights, to view information relating to consents 1172 of users including information regarding types of consents that can be given by users and/or types of consents that have been given by users with regard to data (e.g., personal data) of users.

Figure 12:
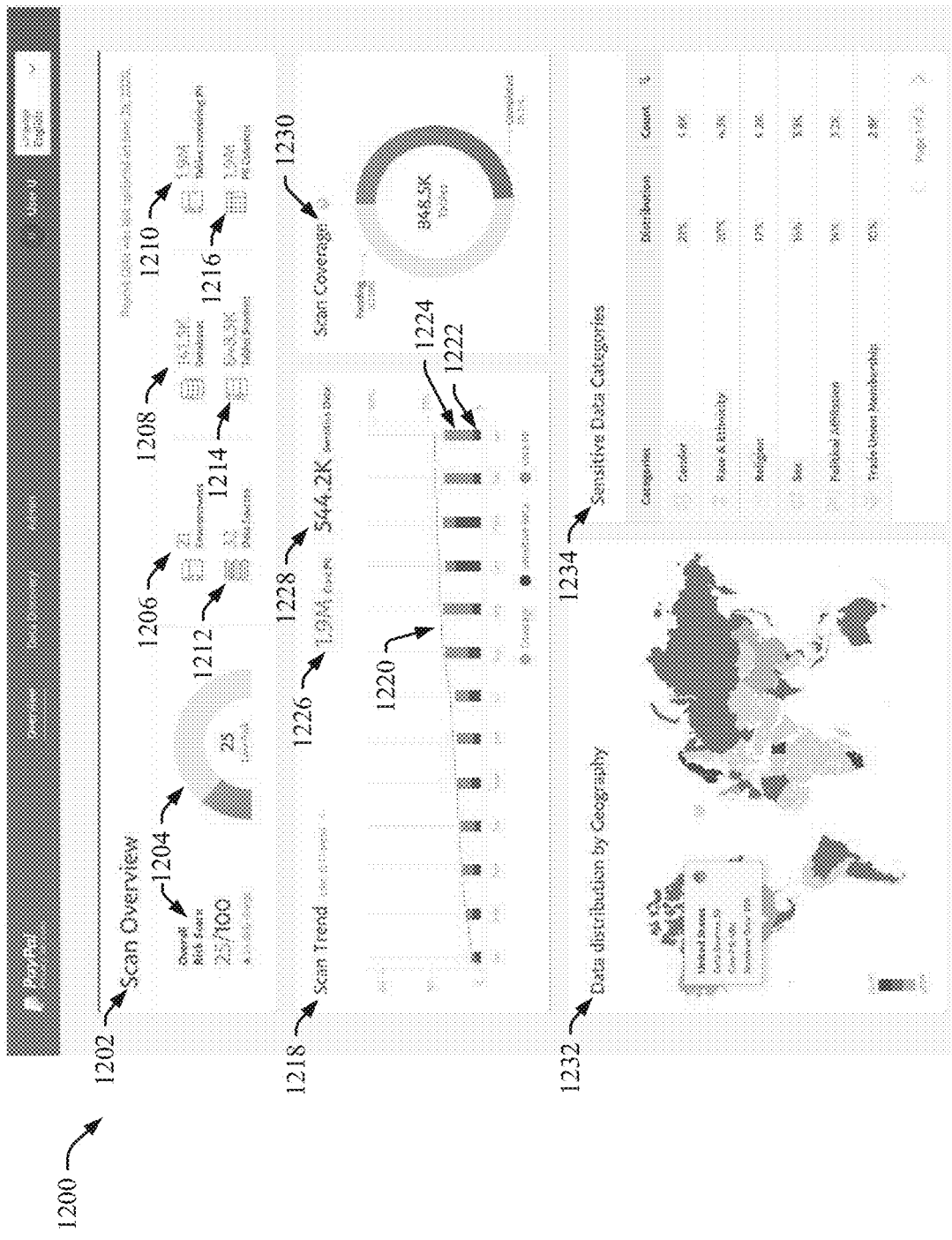
FIG. 12 presents a diagram of an example user interface relating to example data that can be presented in a first language to a user by the DLDP in response to a data request, in accordance with various aspects and embodiments of the disclosed subject matter.
Figure 13:
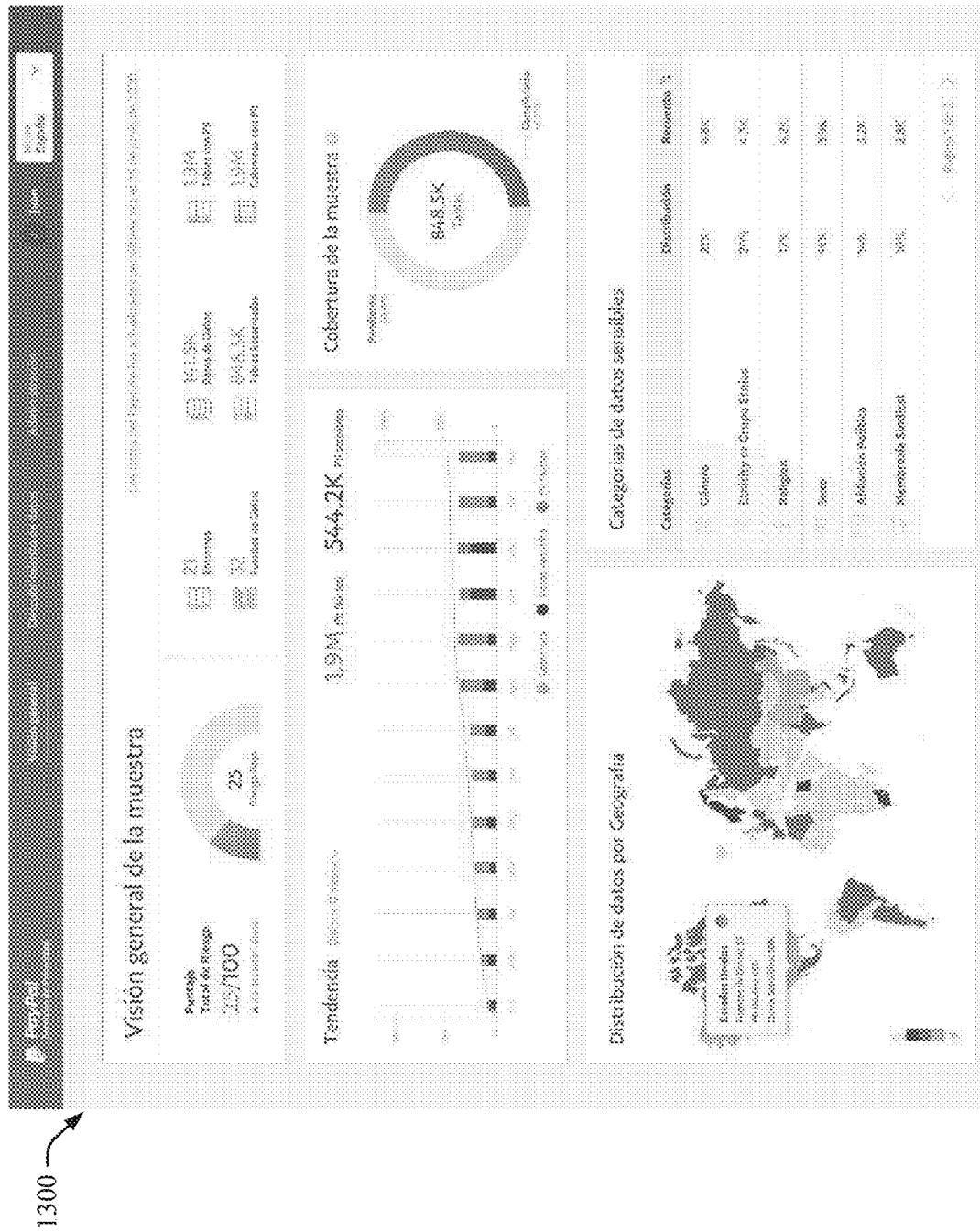
FIG. 13 presents a diagram of an example user interface relating to example data that can be presented in a second language to a user by the DLDP in response to a data request, in accordance with various aspects and embodiments of the disclosed subject matter.

Turning to FIGS. 12 and 13 (along with FIGS. 6, 8, and 10), FIG. 12 presents a diagram of an example user interface 1200 relating to example data that can be presented in a first language to a user by the DLDP 702 in response to a data request, and FIG. 13 presents a diagram of an example user interface 1300 relating to example data that can be presented in a second language to a user by the DLDP 702 in response to a data request, in accordance with various aspects and embodiments of the disclosed subject matter. In the example user interface 1200, in response to a data request from the user, and when in accordance with the set of access rights granted to the user by the rights management component 1002, the data management component 732 can determine and generate the example data in the first language (e.g., English) and can present the example data via the user interface 1200. For instance, based on the data request, the data management component 732 can generate a scan overview 1202 associated with the first entity and relating to the scanning performed of the systems, including the first set of data stores (e.g., 104, 106, and/or 108), associated with the first entity. The scan overview 1202 can include an overall risk score 1204 (e.g., 25/100, low risk) associated with the first entity (e.g., associated with the systems, data stores, or data, etc.) associated with the first entity, and other information, such as, for example, information relating to the number of environments 1206, information relating to the number of databases 1208, information relating to the number of tables containing PII 1210, information relating to the number of data sources 1212, information relating to the number of tables scanned 1214, and information relating to the number of PII columns 1216, as all such information was discovered as a result of scanning of the systems, data stores, etc., by the scanner component (e.g., 724 or 1208).

Also, based on the data request, the data management component 732 can determine and generate a scan trend 1218 over a defined period of time (e.g., last 12 months) of the scanning of the systems, data stores, etc., associated with the first entity, where the scan trend 1218 can indicate the coverage 1220 of the scanning at given times (e.g., each month) over the defined time period, the amount of sensitive data 1222 discovered through scanning at the given times, and the core PII 1224 discovered through scanning at the given times, as well as the total number of items of core PII 1226 and total number of items of sensitive data 1228 discovered through scanning over the defined time period.

The data management component 732 also can determine and generate a scan coverage 1230 that can indicate the percentage of tables associated with the first entity that have been scanned and the percentage of tables associated with the first entity for which scanning is still pending. Further, as desired, in response to the data request, the data management component 732 can determine and generate a data distribution by geography 1232 that can provide information regarding the distribution of sensitive data, core PII, number of data sources, etc., per geographical region (e.g., continent, country, state, territory, or province, etc.), with regard to the first entity. Also, as desired, in response to the data request, the data management component 732 can determine and generate information relating to sensitive data categories 1234 that, for each of desired categories of sensitive data, can indicate a distribution of each such type of sensitive data and/or a number of items of each such type of sensitive data.

With regard to the example user interface 1300 of FIG. 13, the data management component 732 can present the same example data as presented in the example user interface 1200 of FIG. 12, except that the data management component 732 can generate the example data in a second language (e.g., Spanish), and can present the example data in the second language in the example user interface 1300 to the user. The language that the data management component 732 utilizes to present the information to the user via a user interface (e.g., user interface 1200, or user interface 1300, or other user interface) can be determined by the data management component 732 based at least in part on the language employed in the data as it is collected through scanning, a language preference of the user, a location of the user, and/or another desired factor. For example, if the language of the data was in Spanish as it was scanned from the systems, data stores, etc., associated with an entity, the data management component 732 can present the data, or portion thereof, or information relating to or based on the data, in Spanish in a user interface. As another example, alternatively, if there is a user preference to have information conveyed in a first language (e.g., English), and the data is in a second language (e.g., Spanish) when it is scanned from the systems, data stores, etc., associated with an entity, based on the user preference, the data management component 732 can translate the data, or portion thereof, or information relating to or based on the data, from the second language to the first language, and can present the data and/or associated information in the first language in the user interface to the user.

Figure 14:
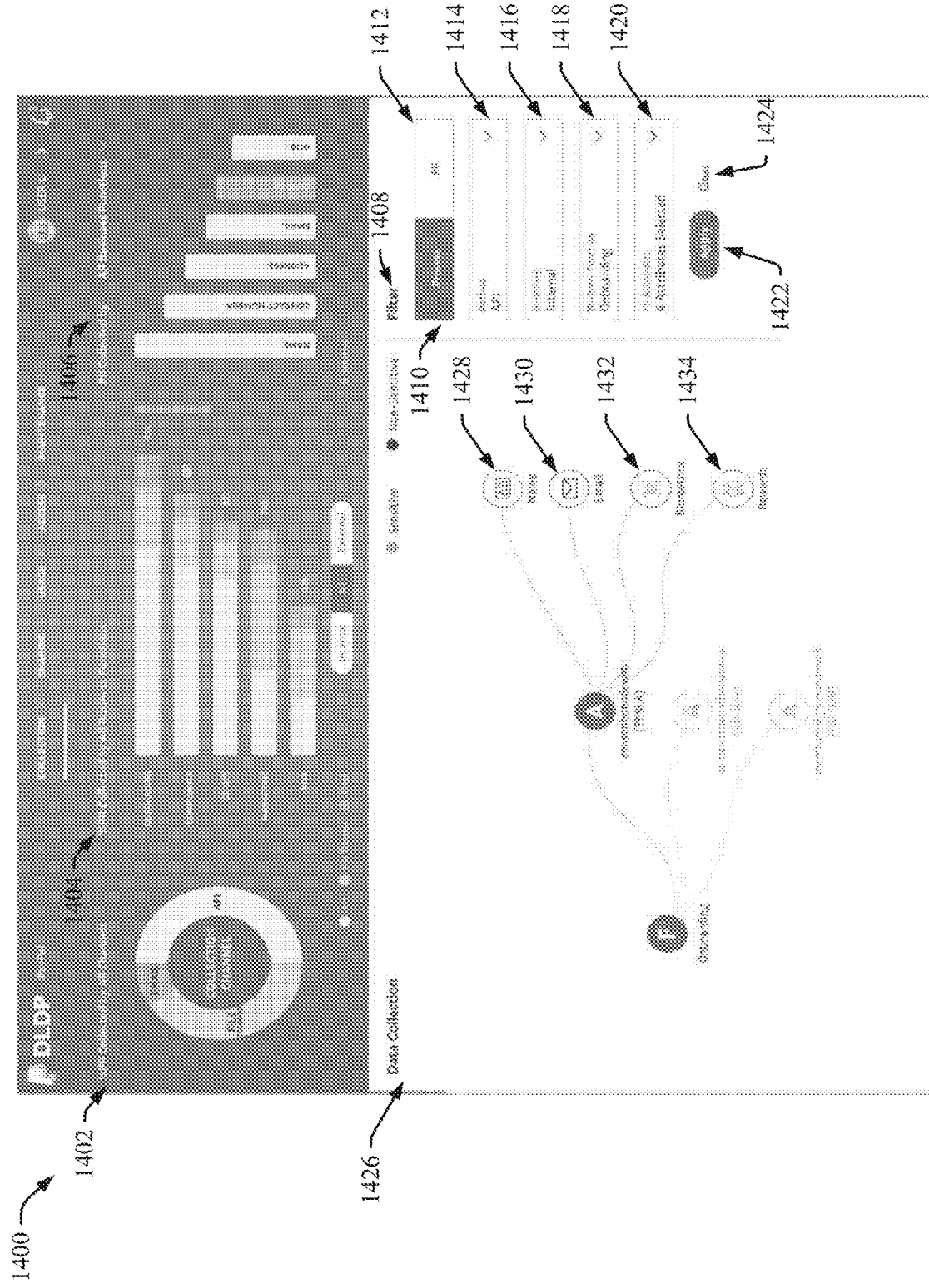
FIG. 14 depicts a diagram of an example user interface that can comprise information relating to data collection with regard to data associated with an entity, in accordance with various aspects and embodiments of the disclosed subject matter.

Referring to FIG. 14 (along with FIGS. 7, 8, and 10), FIG. 14 depicts a diagram of an example user interface 1400 that can comprise information relating to data collection with regard to data associated with an entity, in accordance with various aspects and embodiments of the disclosed subject matter. The data management component 732 can determine and generate the data presented in the user interface 1400 in response to a request from a user (e.g., authorized and/or authenticated user), and in accordance with a set of access rights that can be granted to the user based at least in part on a set of rules, in accordance with the defined data management criteria. For instance, in response to the data request, and based at least in part on a results of the scanning of the data from the systems, data stores (e.g., 104, 106, and/or 108), and/or other components, associated with the first entity, and an analysis of such data, the data management component 732 can determine and generate information regarding the PII collected by all channels 1402, which can include, for example, the percentage of the PII that was collected by the DLDP 702 via API, the percentage of the PII obtained by the DLDP 702 via file transfer, and the percentage of PII obtained by the DLDP 702 via email.

Also, based at least in part on the results of the data scanning, and the analysis of such data, the data management component 732 can determine and generate information regarding PII collected by all business functions 1404 associated with the first entity, including, for example, information regarding PII collected by onboarding, compliance, customer success operations (CS-OPS), marketing, and risk, wherein, for each business function, the information regarding such PII can be aggregated or broken down by the amount or percentage of PII collected by channel (e.g., API, file transfer, or email).

As desired, and based at least in part on the results of the data scanning, and the analysis of such data, the data management component 732 also can determine and generate information regarding PII attributes 1406 for PII collected by all business functions associated with the first entity, including, for example, information regarding PII collected by name, contact number, address, email gender, and date of birth (DOB), and/or can indicate which types of PII (e.g., gender information) are considered sensitive information (e.g., by using a color code or other type of emphasis to indicate the type of information is sensitive information).

In connection with data collection, the DLDP 702 can enable the user to apply desired filters 1408 to filter the data collection to have the DLDP 702 collect desired data based at least in part on one or more selected filters. For instance, as presented in the example user interface 1400, the DLDP 702 can enable filtering by process 1410 (e.g., process of data collection) or PII 1412, method 1414 of data collection (e.g., method or channel of data collection, such as, for example, API, file transfer, or email, etc.), boundary 1416 of the data collection (e.g., internal or external), business function 1418, and PII attributes 1420. The apply button 1422 can be utilized to apply the selected filters, and the clear button 1424 can be utilized to clear any filters that had been applied. As depicted in the example user interface 1400, process 1410 has been selected, API has been selected as the method, the boundary that is selected is internal, the business function that is selected is onboarding, and there are four PII attributes selected. Based at least in part on the selected filters, the DLDP 702 can filter the collected data to present filtered information 1426 comprising information regarding onboarding with regard to the four selected PII attributes, name 1428, email 1430, biometrics 1432, and rewards 1434, wherein the information regarding name 1428 and email 1430 can be non-sensitive information, and wherein the information regarding biometrics 1432 and rewards 1434 can be sensitive information. The user can select a PII attribute(s) (e.g., name 1428, email 1430, biometrics 1432, or rewards 1434) in the user interface 1400 to obtain further information (e.g., to drill down to see additional information) regarding the selected PII attribute(s).

Figure 15:
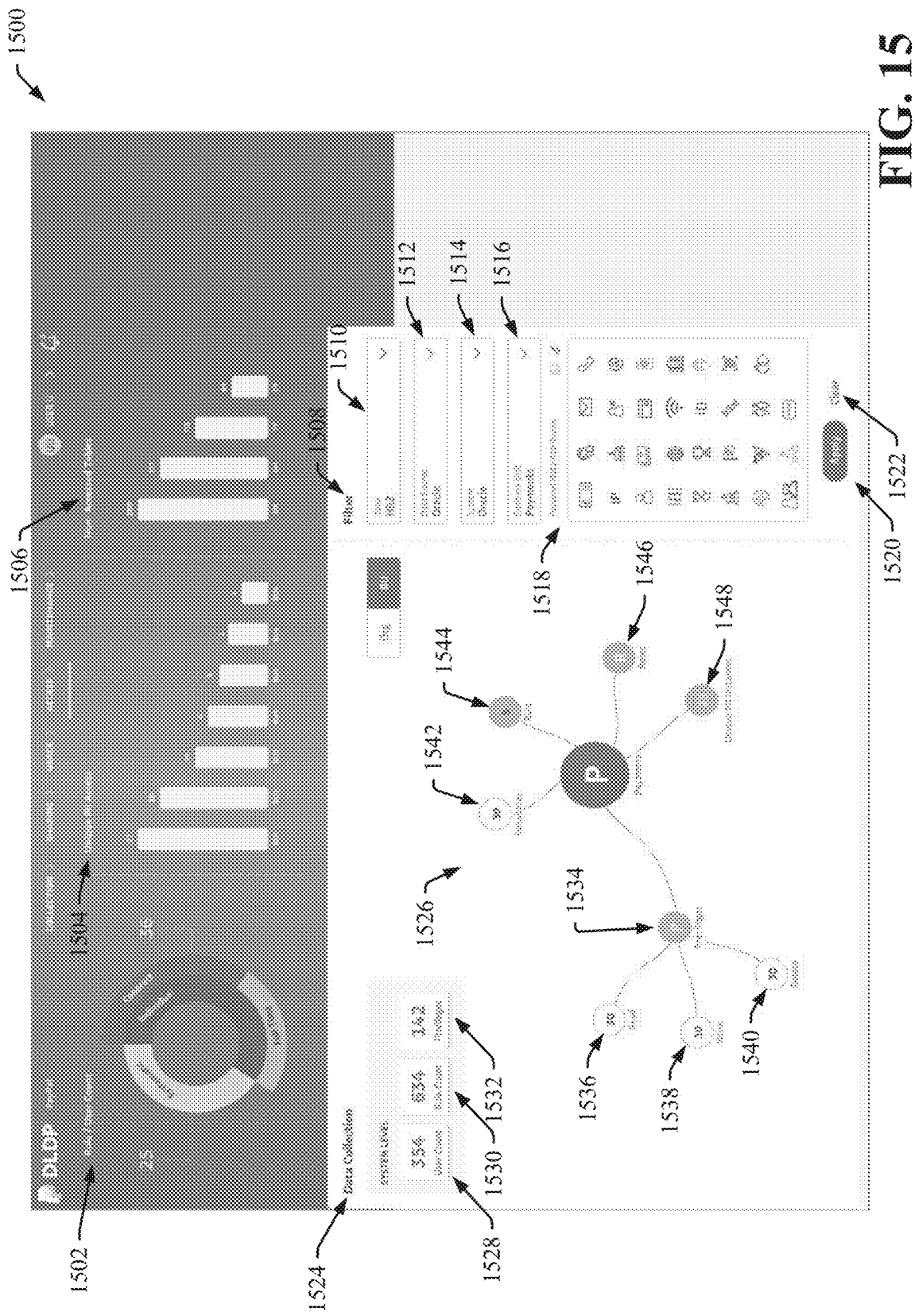
FIG. 15 illustrates a diagram of an example user interface that can comprise information relating to access of data and access controls to control access to data associated with an entity, in accordance with various aspects and embodiments of the disclosed subject matter.

Turning to FIG. 15 (along with FIGS. 7, 8, and 10), FIG. 15 illustrates a diagram of an example user interface 1500 that can comprise information relating to access of data and access controls to control access to data associated with an entity, in accordance with various aspects and embodiments of the disclosed subject matter. The data management component 732 can determine and generate the data presented in the user interface 1500 in response to a request from a user (e.g., authorized and/or authenticated user), and in accordance with a set of access rights that can be granted to the user based at least in part on a set of rules, in accordance with the defined data management criteria. The data management component 732 (e.g., the rights management component 1002 of the data management component 732) can track the accessing of data, including personal, sensitive, and/or protected data of customers, associated with the first entity by users (e.g., users of or associated with the first entity, or users associated with a third party entity, etc.) and access controls implemented on the data, and can determine whether appropriate access controls have been implemented to desirably (e.g., sufficiently) protect the data of customers, particularly the personal, sensitive, and/or protected data of the customers. The data management component 732 can provide details regarding, for example, the number of users who have performed read operations, write operations, or delete operations on data (e.g., personal, sensitive, and/or protected data) of customers across the various systems, data stores (e.g., 104, 106, and/or 108), or other components, associated with the first entity and whether such read operations, write operations, or delete operations were appropriate or not (e.g., whether such access to data and such operations by the users were permitted based at least in part on the applicable laws, regulations, and/or agreements).

For instance, in response to a data request from the user, and based at least in part on a results of the scanning of the data from the systems, data stores (e.g., 104, 106, and/or 108), data, etc., associated with the first entity by the scanner component (e.g., scanner component 724 or 808), and an analysis of such data, the data management component 732 can determine and generate information regarding the role and user count 1502 of the users who accessed the data or performed operations on the data, and can present such information regarding the role and user count 1502 to the requesting user via the example user interface 1500. The information regarding the role and user count 1502 can indicate, for example, the number of individual users who have accessed the data and/or performed operations on the data over a defined period of time, the number of systematic data accesses or data operations that have been performed, the respective roles (e.g., full-time employee of the first entity, or a user who is under contract with the first entity) of the individual users who have accessed the data in the systems, data stores, etc., associated with the first entity.

Also, based at least in part on the results of the data scanning by the scanner component (e.g., scanner component 724 or 808), and the analysis of such data, the data management component 732 can determine and generate information regarding unique PII access 1504 of data (e.g., PII) of users by business unit (BU), such as BU1, BU2, BU3, etc., and information regarding non-accessed tables 1506 in the first set of data stores (e.g., 104, 106, and/or 108) to indicate which tables in the data stores have not been accessed over different time periods (e.g., in the last 3 months, last 6 months, last year, and last two years).

Further, in connection with presenting information regarding data access and access controls, the DLDP 702 can enable the user to apply desired filters 1508 to filter information relating to data access and access controls to have the DLDP 702 present desired (e.g., filtered) data based at least in part on one or more selected filters. For instance, as presented in the example user interface 1500, the DLDP 702 can enable filtering by zone 1510 (e.g., HRZ, DMZ, or HRZ-DMZ), data source 1512, system 1514 of the first entity, business unit 1516 of the first entity (e.g., the whole organization of the first entity, or one or more particular business units of the organization), and personal data attributes 1518. The apply button 1520 can be utilized to apply the selected filters, and the clear button 1522 can be utilized to clear any filters that had been applied. As depicted in the example user interface 1500, for zone 1510, HRZ has been selected, for data source 1512, Oracle has been selected, for system 1514, Oracle has been selected, and for business unit 1516, payments has been selected.

The data management component 732 can filter the information based at least in part on the selected filters. In accordance with the filters, the data management component 732 can present the filtered information, which can include, the system level information 1524 and the data mapping 1526. The system level information 1524 can comprise, with regard to the payments business unit, the user count 1528, which can indicate the number of users who have accessed the data or performed operations over the defined time period, the role count 1530, which can indicate the number of roles associated with the users, and the privilege number 1532, which can indicate the number of privileges over the defined time period. The information relating to the data mapping 1526 can include, with regard to the payments business unit, information relating to privileges 1534, and information relating to read operations 1536, write operations 1538, and delete operations 1540 performed by users, wherein the operations information can comprise the number of operations or more detailed information regarding such operations (e.g., by selecting read operations 1536, write operations 1538, or delete operations 1540). The information relating to the data mapping 1526 also can comprise information relating to the databases 1542 that contain information associated with the payments business unit and were accessed by users. The information relating to the data mapping 1526 further can include information relating to the business units 1544 associated with the payments business unit, roles information 1546 relating to roles of users who accessed data relating to the payments business unit, and information relating to unique PII instances 1548 associated with the payments business unit and data accessed by users, wherein the information relating to unique PII instances 1548 can comprise the number of unique PII instances or more detailed information regarding such unique PII instances.

Figure 16:
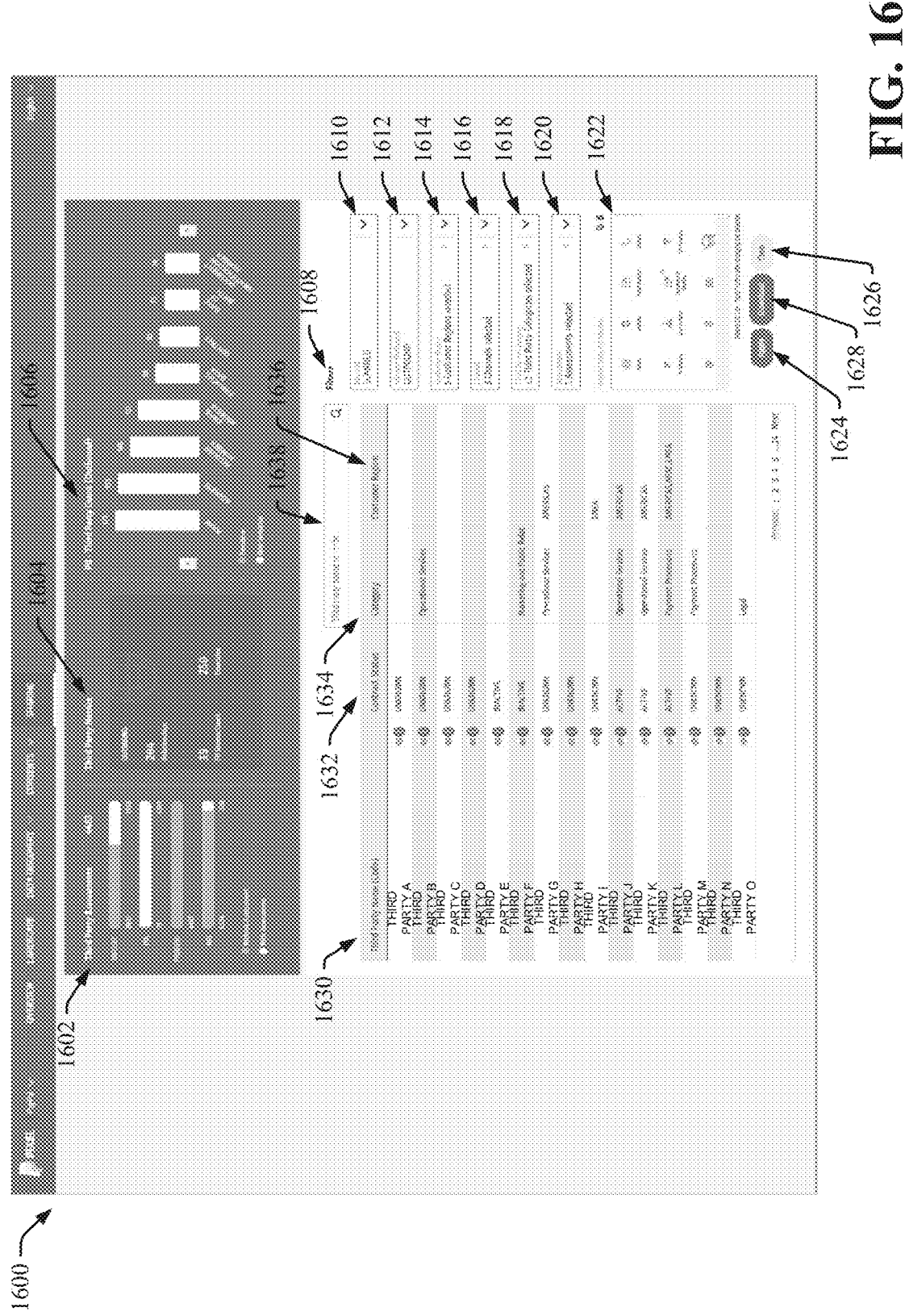
FIG. 16 depicts a diagram of an example user interface that can comprise information relating to data sharing of data associated with an entity with third party entities, in accordance with various aspects and embodiments of the disclosed subject matter.

Turning to FIG. 16 (along with FIGS. 7, 8, and 10), FIG. 16 depicts a diagram of an example user interface 1600 that can comprise information relating to data sharing of data associated with an entity with third party entities, in accordance with various aspects and embodiments of the disclosed subject matter. The data management component 732 can determine and generate the information presented in the user interface 1600 in response to a request from a user (e.g., authorized and/or authenticated user), and in accordance with a set of access rights that can be granted to the user based at least in part on a set of rules, in accordance with the defined data management criteria. The data management component 732 (e.g., the rights management component 1002 of the data management component 732) can track the accessing and sharing of data, including personal, sensitive, and/or protected data of customers, associated with the first entity with third party entities, and can determine whether the data shared with the third party entities was only for permitted purposes, in accordance with applicable laws, regulations, agreements (e.g., SLA or vendor agreement), and/or notices (e.g., notices provided to users regarding the sharing of data of users with third party entities).

In response to a data request relating to third party data sharing that is received from the user, and based at least in part on a results of the scanning of the data from the systems, data stores (e.g., 104, 106, and/or 108), and/or other components associated with the first entity by the scanner component (e.g., scanner component 724 or 808), and an analysis of such data, the data management component 732 can determine and generate information regarding third party assessments 1602, which can include information regarding, for example, information security (INFOSEC), risk or impact assessments (e.g., privacy impact assessment (PIA)), process, and/or records and information governance (RIG), and can indicate whether such information is with assessment or without assessment. The data management component 732 also can determine and generate information regarding third party metrics 1604, which can include information regarding outbound data sharing (e.g., data outbound from the first entity to third entities), such as, for example, the number of relationships of the first entity with third party entities, the PII unique count, and/or the number of countries (e.g., countries where third party entities are located). The data management component 732 can present such information regarding third party metrics 1604 to the requesting user via the user interface 1600.

In response to the data request, the data management component 732 further can determine and generate information regarding PII—third party count 1606, which can comprise information regarding respective types (e.g., attributes) of personal data of users (e.g., customers) and the number of third party entities with which the respective types of personal data have been shared. The personal data of users (e.g., name, address, account number, or email address, etc.) can be indicated as being sensitive data or non-sensitive data, for example. The data management component 732 can present such information regarding PII—third party count 1606 to the requesting user via the user interface 1600.

Further, in connection with presenting information regarding data access and access controls, the DLDP 702 can enable the user to apply desired filters 1608 to filter information relating to data sharing with third party entities to have the DLDP 702 present desired (e.g., filtered) data based at least in part on one or more selected filters. For instance, as presented in the example user interface 1600, the DLDP 702 can enable filtering by whether the data has been scanned 1610 (e.g., scanned or not scanned), inbound or outbound 1612, customer region 1614 (e.g., by continent, country, state, province, district, or other region or jurisdiction), channel 1616 of sharing of data (e.g., API, file transfer, or other channel), third party category 1618 (e.g., operational services, marketing and public relations, payment processors, or legal, etc.), assessment 1620, and personal data attributes 1622. The apply button 1624 can be utilized to apply the selected filters, and the clear button 1626 can be utilized to clear any filters that had been applied. As depicted in the example user interface 1600, for scanned 1610, scanned has been selected to indicate the information was scanned from the systems, data stores, etc., associated with the first entity, for inbound outbound 1612, outbound has been selected to indicate filtering information to include information that was shared outbound from the first entity to third party entities, for customer regions 1614, five customer regions have been selected, for channel 1616, three channels have been selected, for third party category 1618, twelve third party categories have been selected, and for assessment 1620, five assessments have been selected. In some embodiments, the user interface 1600 can include a download button 1628 that can be selected by the user to download the information (e.g., filtered information) relating to data sharing with third party entities.

The data management component 732 can filter the information based at least in part on the selected filters. In accordance with the filters, the data management component 732 can present the filtered information, which can comprise, for example, third party names 1630 (e.g., third party A, third party B, or third party C, or other third party name), contract status 1632 (e.g., active, inactive, or unknown) to indicate the respective contract statuses of the third party entities with the first entity, category 1634, which can indicate the respective categories (e.g., operational services, marketing and public relations, payment processors, or legal, etc.) of the relationships of the third party entities with the first entity, and customer region 1636, which can indicate the respective regions (e.g., Americas, including, for example, North America, Central America, and South America; Europe, Middle East, and Africa (EMEA); or Asia Pacific (APAC); etc.) covered by the third party entities. The data management component 732 can present such information (e.g., filtered information) regarding third party names 1630, contract status 1632, category 1634, customer region 1636, and/or desired filtered information to the requesting user via the user interface 1600.

In some embodiments, the user interface 1600 can provide a search function 1638 that can enable the user to enter search terms (e.g., third party name or code or other desired search term) to filter information based at least in part on the search terms entered into the search function 1638. Based at least in part on the search terms entered in the search function 1638 and/or the filters 1608 selected, the data management component 732 can filter the information (e.g., information relating to data sharing with third party entities) to present desired filtered information in the user interface 1600 or another user interface associated with (e.g., user interface that can be accessed via selection of a button on) the user interface 1600.

While enabling a requestor (e.g., user, entity, or device) to use the search function 1638 and search terms to search for data of a user(s) (e.g., the requesting user or another user), the data management component 732 can desirably (e.g., to a high degree, suitably, or optimally) secure and protect data of the user(s), and/or information relating thereto, that is stored in the secure data store 730 or in a data store (e.g., data store(s) 104, 106, and/or 108) associated with the DLDP 702, in accordance with the defined data management criteria, the corresponding set of rules, and/or corresponding applicable law, regulation, agreement, and/or consent of the user. For instance, if a requestor (e.g., requesting user, entity, or device) attempts to access data of a user (e.g., the requesting user or another user) and/or information relating thereto, using the search function 1638 or otherwise, the data management component 732 can determine what data of the user or related information (if any), and/or what type(s) of data (e.g., non-sensitive or non-protected data, personal or sensitive data, protected data, PII, and/or other type of data) or related information, the requestor is authorized to access, based at least in part on the identity or role of the requestor, and/or the authentication information of the requestor, and based at least in part on the set of rules. The data management component 732 can allow the requestor to access to only such data of the user or related information stored in the secure data store 730 and/or data store(s) (e.g., data store(s) 104, 106, and/or 108) associated with the DLDP 702 that the requestor is permitted to access, and can prevent the requestor from accessing other data of the user or related information in the secure data store 730 and/or data store(s) that the requestor is not permitted to access, based at least in part on the set of rules.

In some instances, a requestor may be permitted to access certain data of a user in the secure data store 730 or in a data store (e.g., data store(s) 104, 106, and/or 108) associated with the DLDP 702 only under (e.g., subject to) certain restrictions. In such instances, the data management component 732 can enforce the restrictions (e.g., can enforce a rule(s) of the set of rules relating to such restrictions) to allow the requestor to only access the certain data of the user in accordance with the applicable restrictions. For example, an item of data of the user may be restricted to be read-only or view-only with regard to the requestor, and the data management component 732 can enforce such restriction to only allow the requestor to view the item of data, but can restrict or prevent the requestor from overwriting, editing, deleting, erasing, downloading, or printing the item of data. Thus, the data management component 732 can maintain desirable (e.g., a high level of, suitable, applicable, or optimal) security of the data of users and information relating thereto that is stored in the secure data store 730 or in a data store (e.g., data store(s) 104, 106, and/or 108) associated with the DLDP 702 to prevent or inhibit unauthorized access, sharing, or use of the data of users and the information relating thereto, in accordance with the defined data management criteria and the corresponding set of rules, which can be based at least in part on applicable law, regulation, agreement, and/or consent of the user.

Figure 17:
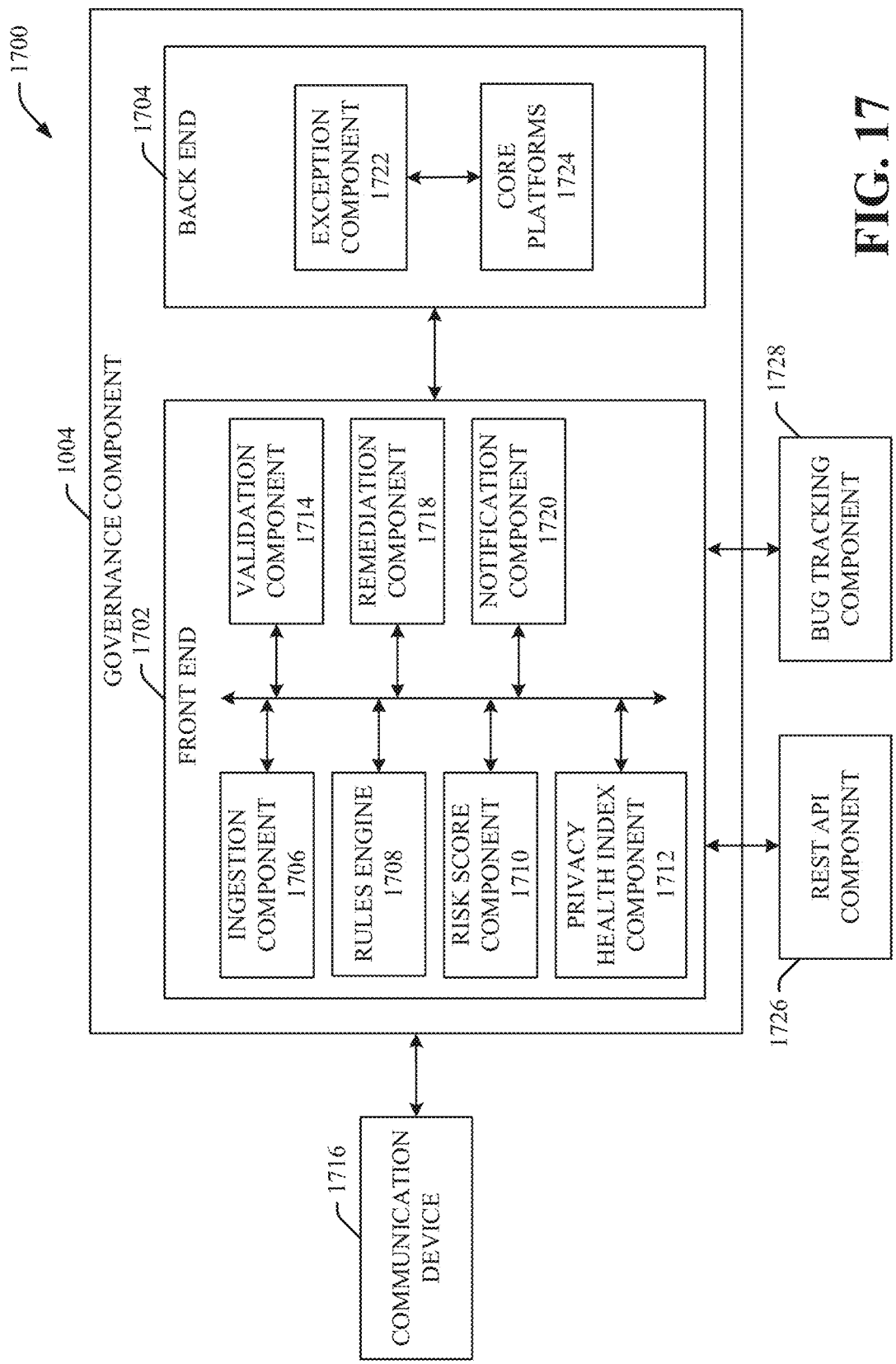
FIG. 17 illustrates a block diagram of an example system that can employ a governance component to facilitate governing the DLDP and associated systems, data stores, data, etc., of entities, data sharing, and compliance with laws, regulations, and agreements, in accordance with various aspects and embodiments of the disclosed subject matter.

Referring to FIG. 17 (along with FIGS. 7, 8, and 10), and with further regard to governance of the DLDP 702, the secure data store 730, and associated systems, data stores, data, etc., of entities associated with the DLDP 702 by the governance component 1004, FIG. 17 illustrates a block diagram of an example system 1700 that can employ a governance component to facilitate governing the DLDP 702 and associated systems, data stores, data, etc., of entities, data sharing, and compliance with laws, regulations, and agreements, in accordance with various aspects and embodiments of the disclosed subject matter. The system 1700 can comprise the governance component 1004 that can perform various governance-related operations to facilitate determining whether the DLDP 702 and associated systems, data stores, data, etc., associated with entities are in compliance (e.g., adherence) with applicable laws, regulations, and/or agreements, and/or to facilitate ensuring desirable (e.g., suitable, acceptable, or optimal) compliance of the DLDP 702 and the associated systems, data stores, data, etc., associated with the entities with the applicable laws, regulations, and/or agreements, in accordance with the defined data management criteria, such as more fully described herein. The governance component 1004 can facilitate managing the DLDP 702, secure data store 730, and/or the associated systems, data stores, data, etc., associated with the entities with regard to, for example, data discovery-related issues (e.g., issues discovered from scanning of systems, data stores, data, and/or other components associated with entities), data subject rights (DSR) request-related issues (e.g., issue relating to whether a requesting user gained improper access to data), consent-related issues (e.g., issues relating to consent to receive emails, issues relating to consent to collect data of users, issues relating to consent to share data of users, and/or other consent-related issues), and/or third party-related issues (e.g., issues relating to whether sharing of data of a user(s) with third party entities is or was permitted by an applicable law, regulation, agreement, and/or consent of the user(s)).

The governance component 1004 can comprise a front end 1702 and a back end 1704. The front end 1702 of the governance component 1004 can perform certain governance-related operations (e.g., determining rules relating to laws, regulations, and/or agreements, determining compliance with the rules, determining if and when anomalies, such as non-compliance with the rules occur, determining risk scores, determining a privacy health index, and/or performing another governance-related operation). The back end 1704 of the governance component 1004 can perform other types of governance-related operations (e.g., generating or processing exception messages relating to non-compliance, performing or facilitating performing remediation actions in response to exception messages, or notifying when remediation actions have been completed, etc.).

The front end 1702 of the governance component 1004 can comprise an ingestion component 1706 that can monitor and track information relating to respective laws and regulations associated with respective jurisdictions and respective agreements associated with respective entities. For instance, in connection with monitoring and tracking such information, the ingestion component 1706 can receive respective laws and regulations (e.g., GDPR, HIPAA, COPPA, FCRA, ECPA, FERPA, PIPEDA, CCPA, PRC Cybersecurity Law, India Information Technology Act, India Information Technology Rules, and/or other laws or regulations) relating to data protection and associated with respective jurisdictions, or other information relating thereto, and can continue to monitor and track for any updates (e.g., modifications or changes) made to any laws and regulations. The ingestion component 1706 also can receive respective agreements relating to data protection and associated with entities and/or the DLDP 702, or information relating thereto, and can continue to monitor and track for any updates made to any agreements.

Based at least in part on the laws and regulations, agreements, and other information relating thereto, the governance component 1004 can determine a set of rules relating to data protection of data associated with the DLDP 702 and systems, data stores (e.g., 104, 106, and/or 108; 802, 804, and/or 806), etc., associated with entities (e.g., first entity, second entity, or other entity) and the DLDP 702, in accordance with the defined data management criteria, as more fully described herein. The DLDP 702 can apply the set of rules with regard to the DLDP 702 and the systems, data stores, data, etc., associated with the entities to facilitate desirable management, access, and erasure of data associated therewith, in accordance with the set of rules.

The ingestion component 1706 also can monitor and track activity (e.g., data-related activity) associated with systems, data stores, data, etc., associated with entities. For instance, in connection with monitoring and tracking such activity, the ingestion component 1706 can receive information (e.g., scanning results or other information) relating to the scanning of systems, data stores (e.g., 104, 106, and/or 108; 802, 804, and/or 806), data, and/or other components associated with the entities (e.g., first entity, second entity, or other entity) that are associated with the DLDP 702. Such information can relate to or indicate data of users that has been accessed in or retrieved from the systems or data stores associated with entities, data of users that has been shared with third party entities, and/or data of users that has been erased or deleted from the systems or data stores associated with entities.

The ingestion component 1706 can monitor and track activity associated with the secure data store 730. For example, in connection with monitoring and tracking such activity, the ingestion component 1706 can track and receive information relating to accessing of data of users stored in the secure data store 730, data of users retrieved from the secure data store 730 that is shared with third party entities, and/or data of users that is erased or deleted from the secure data store 730.

The ingestion component 1706 also can monitor and track information relating to DSR requests made by users, consents made by users with regard to data, or changes in consents made by users with regard to data. For example, in connection with monitoring and tracking such information, the ingestion component 1706 can receive information regarding DSR requests made by users, who those requesting users are, what data those users were requesting, what data those users were able to gain access to, what system or data store (e.g., 104, 106, and/or 108; 802, 804, and/or 806) of an entity (e.g., first entity, second entity, or other entity) the data was retrieved from, the dates of the requests, and/or other desired information relating to DSR requests. As another example, the ingestion component 1706 can receive information regarding consents or changes in consents, or refusals (e.g., denials) of consents, provided by users with regard to data of users or online activity of users, such as consents, or refusals of consents, relating to cookies or other tracking of user data or activity, consents relating to receiving electronic communications (e.g., emails, text messages, pop-up messages, or other electronic communications) from entities, or opt in or opt out consents.

The ingestion component 1706 further can monitor and track sharing of data with third party entities by the DLDP 702 or by systems, data stores, etc., associated with entities that can be monitored by the DLDP 702. For instance, in connection with monitoring and tracking such data, the ingestion component 1706 can receive information relating to the sharing of data of user with third party entities by the DLDP 702 or by systems, data stores (e.g., 104, 106, and/or 108; 802, 804, and/or 806), etc., associated with entities (e.g., first entity, second entity, or other entity) that can be monitored by the DLDP 702.

The governance component 1004 can analyze the various information, which can be obtained as a result of the monitoring and tracking of activity and data associated with the DLDP 702 and the systems, data stores (e.g., 104, 106, and/or 108; 802, 804, and/or 806), data, etc., associated with the entities (e.g., first entity, second entity, or other entity) that are associated with the DLDP 702. Based at least in part on the results of analyzing such information, the governance component 1004 can determine whether the DLDP 702 and/or the systems, data stores, data, etc., associated with the entities are in compliance with the set of rules, and correspondingly, applicable laws, regulations, or agreements, as more fully described herein. The governance component 1004 also can determine various risk scores (e.g., relating to risk of not being in compliance) associated with various parts of the DLDP 702 or associated entities and/or a privacy health index associated with a particular entity, based at least in part on the results of analyzing such information and the set of rules, as more fully described herein. The governance component 1004 further can determine when anomalies (e.g., non-compliance issues) occur, based at least in part on the results of analyzing such information and applying the set of rules, as more fully described herein. The governance component 1004 further can initiate, perform, or facilitate performing remediation actions to remedy or mitigate any detected anomalies, in accordance with the defined data management criteria and applicable laws, regulations, or agreements, as more fully described herein.

The governance component 1004 can comprise a rules engine 1708 that can determine the set of rules based at least in part on the various laws, regulations, and/or agreements. The rules engine 1708 can analyze respective laws or regulations associated with respective jurisdictions, respective agreements associated with respective entities, and/or information relating thereto. Based at least in part on the results of such analysis, the rules engine 1708 can determine respective obligations (e.g., legal obligations or requirements, or contractual obligations or requirements) relating to (e.g., deriving from, arising out of, or necessitated by) the respective laws or regulations associated with the respective jurisdictions or the respective agreements associated with the respective entities. The rules engine 1708 can determine respective rules of the set of rules for managing or governing data and communications of data associated with the DLDP 702 and the associated systems, data stores (e.g., 104, 106, and/or 108; 802, 804, and/or 806), etc., associated with the entities (e.g., first entity, second entity, or other entity), based at least in part on the respective obligations, in accordance with the defined data management criteria.

For example, the various laws, regulations, and/or agreements can comprise a first subset of laws or regulations associated with a first subset of jurisdictions and/or a first subset of agreements between a first subset of entities, comprising the first entity, and a second subset of laws or regulations associated with a second subset of jurisdictions and/or a second subset of agreements between a second subset of entities, comprising the second entity. Based at least in part on the results of analyzing the various laws, regulations, or agreements, including the first subset of laws or regulations, the first subset of agreements, the second subset of laws or regulations, and the second subset of agreements, the rules engine 1708 can determine a set of obligations comprising a first subset of obligations and a second subset of obligations. The first subset of obligations (e.g., first subset of legal or contractual obligations or requirements) can relate to (e.g., can derive from, arise out of, be necessitated by, and/or correspond to) the first subset of laws or regulations and/or the first subset of agreements. The second subset of obligations (e.g., second subset of legal or contractual obligations or requirements) can relate to the second subset of laws or regulations and/or the second subset of agreements. Based at least in part on the set of obligations, comprising the first subset of obligations and the second subset of obligations, the rules engine 1708 can determine and generate the set of rules, comprising a first subset of rules and a second subset of rules. The first subset of rules can correspond to, and facilitate enforcement of (e.g., by the DLDP 702 and/or the governance component 1004) and compliance with, the first subset of obligations, and accordingly, the first subset of laws or regulations and/or the first subset of agreements. The second subset of rules can correspond to, and facilitate enforcement of (e.g., by the DLDP 702 and/or the governance component 1004) and compliance with, the second subset of obligations, and accordingly, the second subset of laws or regulations and/or the second subset of agreements. The rules engine 1708 also can similarly determine a third subset of rules that can correspond to a third subset of obligations based at least in part on the results of analyzing a third subset of laws or regulations associated with a third jurisdiction and/or a third subset of agreements, and/or determine a fourth subset of rules that can correspond to a fourth subset of obligations based at least in part on the results of analyzing a fourth subset of laws or regulations associated with a fourth jurisdiction and/or a fourth subset of agreements, and so on.

The laws, regulations, and/or agreements, and correspondingly the rules, can relate to the type of data, the privacy status or privacy type of data, DSRs of users with regard to their data, data subject rights of users, data access requests of users, data change requests of users, data protection requests of users, data erasure requests of users, the amount or type of data that can be collected, the users or entities that are permitted to access data of users, the type of data that users or entities are permitted to access, sharing of data with third party entities, the length of time that data associated with a user can be retained in a data store, the type or amount (e.g., number or frequency) of electronic communications (e.g., email messages, text messages, or phone calls) that are permitted to be sent to users, the amount of time within which to stop sending electronic communications after the user requests to no longer receive electronic communications, security, authentication, or encryption protocols or algorithms that are to be used to secure stored data or to securely communicate data, notices relating to data or user rights that are to be provided to users, the disposal (e.g., erasure or deletion of data), consents of users with regard to data, monitoring and enforcement relating to addressing privacy complaints or compliance with laws, rules, or agreements, and/or other aspects relating to data protection. For example, a law, regulation, or agreement can specify or indicate the type(s) and/or privacy type(s) of data regarding a user that an entity (e.g., organization) is permitted to have access to, can specify or indicate what rights users have with regard to their data (e.g., data subject rights), can specify or indicate how DSRs are to be processed, and/or can specify or indicate an amount of time (e.g., 10 days (e.g., 10 business or calendar days), 15 days, or 30 days) that an entity has to comply with a request of a user to no longer receive a particular type of electronic communication (e.g., email message, text message, or phone call) from the entity.

The types of data can be or can comprise the types of personal data elements, such as described herein. The privacy status or type of data can comprise, for example, sensitive or personal data, protected data, non-sensitive data, or other desired type of privacy status or privacy type of data.

The rules generated by the rules engine 1708 can specify or indicate particular actions or issues with regard to data are in non-compliance with an applicable law, regulation, or agreement. The rules generated by the rules engine 1708 also can comprise or relate to trends or trend spikes relating to data of users that is stored, accessed, tracked, communicated, or shared by an entity or platform. Certain rules also can comprise a defined threshold value that can indicate whether a rule is being violated and/or whether a particular data or consent issue should be checked into further to see if there is a problem to be addressed (e.g., remedied). For example, the governance component 1004 can track the trends of users (e.g., customers) opting in to or opting out of receiving electronic communications from an entity, and can apply a rule that can include a defined threshold value(s) to the trend data determined based at least in part on the tracking of such trends. The defined threshold value(s) can relate to an amount of difference between an average number of users opting in to receive electronic communications from the entity and a particular number of users opting in at a given time (e.g., a spike in users opting in at a given time), can relate to an amount of difference between an average number of users opting out from receiving electronic communications from the entity and a particular number of users opting out at a given time (e.g., a spike in users opting out at a given time), can relate to a total number of users opting in at a given time, or can relate to a total number of users opting out at a given time. The governance component 1004 can analyze the trend data and apply the rule, including the defined threshold value(s). Based at least in part on the results of the analysis and applying of the rule, the governance component 1004 can determine whether a defined threshold value(s) has been satisfied (e.g., breached or exceeded), which can indicate that there can be an anomaly (e.g., spike in the trend and/or possible non-compliance issue) with regard to opting in or opting out by users. If an anomaly is detected, the governance component 1004 can provide information (e.g., notification) to notify the entity of the anomaly and/or can facilitate remediating the anomaly, as more fully described herein.

The data management component 732, including the rights management component 1002 and governance component 1004, can utilize and apply (e.g., enforce) the respective rules of the set of rules (e.g., first subset of rules, second subset of rules, or other rules) with regard to the DLDP 702 and respective systems, respective data stores (e.g., 104, 106, and/or 108; 802, 804, and/or 806), respective data of users, and/or respective communications associated with users, etc., associated with respective entities (e.g., first entity, second entity, or other entity), to ensure or substantially ensure compliance, and/or to mitigate non-compliance, with the respective laws or regulations and/or respective agreements associated with (e.g., respectively applicable to) the DLDP 702 and the respective systems, respective data stores, respective data of users, and/or respective communications associated with users, etc., associated with the respective entities.

The governance component 1004 also can comprise a risk score component 1710 (also referred to as risk assessment component herein) that can determine (e.g., calculate) and generate risk scores (e.g., risk ratings) that can indicate risk levels associated with the securing, storing, accessing, tracking, communicating, or sharing of data of users by an entity or platform. KRI metrics can be or comprise the risk scores. KRIs can comprise leading indicators, current indicators, or lagging indicators. For instance, a leading KRI can relate to an emerging or potentially emerging risk trend regarding data protection that has some likelihood (e.g., a probability) of occurring in the future. A current KRI can relate to current data that can indicate a level of risk regarding data protection. A lagging KRI can relate to risk-related events regarding data protection that occurred in the past and have some likelihood of occurring again in the future.

The risk score component 1710 can determine or calculate a risk score of a particular aspect (e.g., KRI metric, privacy principle, or platform) of or associated with an entity as a function of the impact of an anomaly (e.g., irregularity or non-compliance issue with regard to data protection) occurring and a likelihood of the anomaly occurring (e.g., with regard to a particular KRI metric, privacy principle, or platform), in accordance with the defined data management criteria. The impact of an anomaly can be or can relate to a consequence to the entity or user if the anomaly occurs. The likelihood of the anomaly occurring can be or can relate to a probability that the anomaly will occur (e.g., will occur at any time in the future, or will occur within a defined amount of time in the future). In some embodiments, the risk score component 1710 can apply a rule-based approach, using the set of rules, to facilitate determining (e.g., calculating) an impact (e.g., an amount and/or type of impact) that an anomaly can have on an entity or user. In certain embodiments, the risk score component 1710 can apply a learning-based approach, using the artificial intelligence and/or machine learning techniques and algorithms, such as described herein, to facilitate determining (e.g., calculating) a likelihood (e.g., an amount of likelihood or probability) that an anomaly can have on an entity or user.

Figure 18:
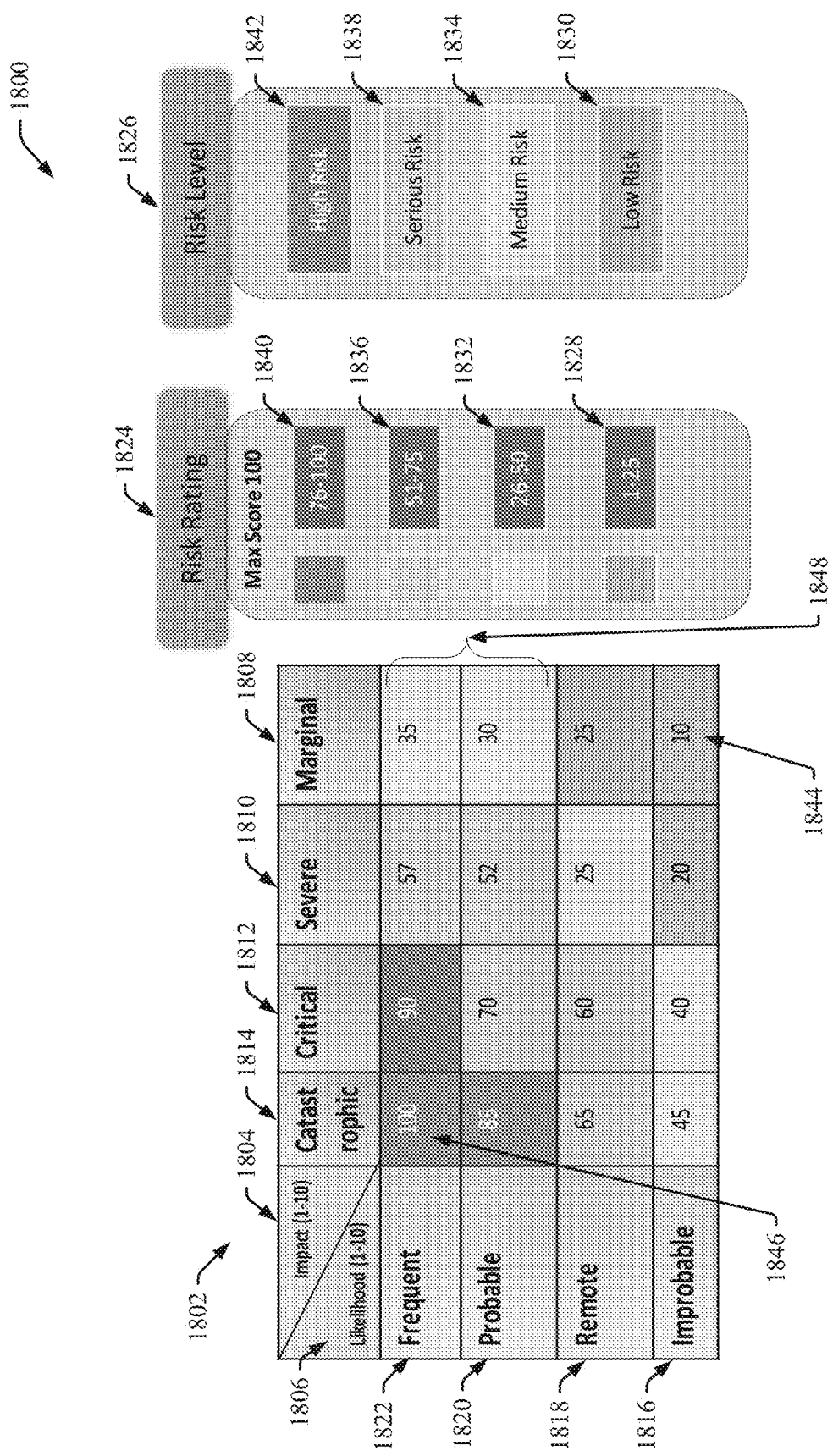
FIG. 18 presents a diagram of an example risk score matrix system that can be used to facilitate determining risk scores associated with an entity, in accordance with various aspects and embodiments of the disclosed subject matter.

In some embodiments, the risk score component 1710 can apply a risk score matrix to facilitate determining risk scores associated with an entity. Referring to FIG. 18 (along with FIGS. 7, 8, 10, and 17), FIG. 18 presents a diagram of an example risk score matrix system 1800 that can be used to facilitate determining risk scores associated with an entity, in accordance with various aspects and embodiments of the disclosed subject matter. The example risk score matrix system 1800 can comprise a risk score matrix 1802 that can be an n×n matrix that can present the impact 1804 of an occurrence of an anomaly as a function of the likelihood 1806 of the anomaly occurring, wherein n can be virtually any desired number. In the example risk score matrix 1802, n can be 4, although a number less than or greater than 4 can be utilized. It is to be appreciated and understood that, in other embodiments, if desired, the risk score matrix 1802 can be an n×m matrix or m×n matrix, wherein n and m can be virtually any desired numbers, and wherein n can be different from (e.g., greater than or less than) m.

The risk score matrix 1802 can indicate an impact 1804 on an entity or user of an occurrence of an anomaly, wherein, for example, the impact 1804 can range from 1 (or less than 1) to 10, and wherein such number can be an integer or real number. The impact 1804 can range from marginal impact 1808 to severe impact 1810 to critical impact 1812 to catastrophic impact 1814 as the number of the impact 1804 increases from 1 (or less than 1) to 10. For instance, on the lower end (e.g., 1 (or less than 1) up to 2.5) of the range of impact 1804, the impact 1804 can be marginal 1808, which can indicate that there may be a marginal impact (e.g., a marginal amount of negative impact) to an entity or user if the particular type of anomaly occurs, but relatively speaking, the amount of impact to the entity or user if the anomaly were to occur is relatively low or minimal. In the lower-middle part (e.g., 2.51 up to 5.00) of the range of impact 1804, the impact 1804 can be severe 1810, which can indicate that there may be a more significant or severe impact (e.g., severe negative impact) to an entity or user if the particular type of anomaly occurs, but relatively speaking, the amount of impact of the anomaly to the entity or user still can be manageable and/or addressable (e.g., can be mitigated, remedied, absorbable) if the anomaly occurs. In the upper-middle part (e.g., 5.01 up to 7.50) of the range of impact 1804, the impact 1804 can be critical 1812, which can indicate that there can or may be a critical, harmful, or unacceptable impact (e.g., critical or unacceptably high negative impact) to an entity or user if the particular type of anomaly occurs, wherein the amount of impact to the entity or user still may possibly be manageable, however, the consequences of such an anomaly are undesirably (e.g., unacceptably) high, it can be desirable to address (e.g., can be mitigate or remedy) such an impact if it were to occur, although it can be more difficult or problematic to address such an impact if it were to occur. In the upper part (e.g., 7.51 up to 10.00) of the range of impact 1804, the impact 1804 can be catastrophic 1814, which can indicate that such an impact to an entity or user if the particular type of anomaly occurs would be catastrophic to the entity or user, likely would not be manageable, and likely would not be able to be desirably remedied, mitigated, or corrected if such an impact were to occur.

With regard to the likelihood 1806 of an anomaly occurring, the risk score matrix 1802 can indicate relative ranges of likelihood (e.g., probability) that a particular anomaly will occur (e.g., at any time in the future, or within a defined amount of time in the future). For instance, on the lower end of the range of likelihood 1806, the likelihood 1806 can be improbable 1816, which can indicate that there is a relatively (e.g., very) low likelihood that a particular type of anomaly will occur. For example, a likelihood in the improbable range 1816 can indicate that there is less than a 1% probability (or other desirably low probability, such as, e.g., 5% probability or less) that the particular type of anomaly will occur. In the lower-middle part of the range of likelihood 1806, the likelihood 1806 can be remote 1818, which can indicate that the likelihood that a particular anomaly will occur can still be relatively low (e.g., probability of less than 50%), but such likelihood is higher than that of the improbable range 1816. In the upper-middle part of the range of likelihood 1806, the likelihood 1806 can be probable 1820, which can indicate that there can be a relatively high likelihood (e.g., greater than 50% probability, but less than 75% probability) that a particular type of anomaly will occur. In the upper part of the range of likelihood 1806, the likelihood 1806 can be frequent 1822, which can indicate that a particular type of anomaly can frequently occur and/or there can be a high probability (e.g., greater than 75% probability) that the particular type of anomaly will occur.

As can be observed in FIG. 18, the example risk score matrix 1802 includes some example risk scores that can be associated with an example type of anomaly. The example risk scores can range from 1 to 100, for example. A risk rating 1824 (e.g., risk score) can indicate an amount or degree of risk that an anomaly may occur and an associated risk level 1826 that can indicate what particular level of risk is associated with a particular risk rating. For instance, the risk rating 1824 can range from 1 up to a maximum score of 100, where 100 can indicate the most (e.g., worst) risk and 1 can indicate the lowest level of risk. A risk rating range of 1 through 25 (1828) can be associated with a low risk level 1830, a risk rating range of 26 through 50 (1832) can be associated with a medium risk level 1834, a risk rating range of 51 through 75 (1836) can be associated with a serious risk level 1838, and a risk rating range of 76 through 100 (1840) can be associated with a high risk level 1842.

With further regard to the example risk scores in the example risk score matrix 1802, as can be observed in FIG. 18, an anomaly, which is determined to have a marginal impact 1808 on an entity or user and a likelihood of improbable 1816, can have a low risk score (e.g., a risk score of 10 (1844) or other low risk score that ranges from 1 to 25) in the low risk range 1830. On the other end of the spectrum, an anomaly, which is determined to have a catastrophic impact 1814 on an entity or user and a likelihood of frequent 1822, can have a high risk score (e.g., a risk score of 100 (1846) or other high risk score that is 76 up to 100) in the high risk range 1842. For example, a risk score of 100 can indicate that the impact 1804 of the anomaly on an entity or user can be 10, and the likelihood 1806 of the anomaly occurring can be 10. As also can be observed in the example risk score matrix 1802, as indicated at reference numeral 1848, an anomaly, which is determined to have a marginal impact 1808 on an entity or user, can still pose a medium risk 1834, for example, if the likelihood 1806 of such anomaly occurring is probable 1820 or frequent 1822. Generally, as the amount of impact 1804 of an occurrence of an anomaly to an entity or user increases in relation to a particular likelihood, the risk score can increase (and vice versa), and, as the likelihood 1806 of such anomaly occurring increases in relation to a particular impact level, the risk score can increase (and vice versa).

It is to be appreciated and understood that the example risk score matrix system 1800 is but one type of risk score approach that the risk score component 1710 can use to determine risk scores. In accordance with various other embodiments, the risk score component 1710 can utilize virtually any other desired technique, algorithm, approach, calculations, or determinations to determine risk scores, determine an impact of an anomaly if it occurs, or determine a likelihood of an anomaly occurring.

Figure 19:
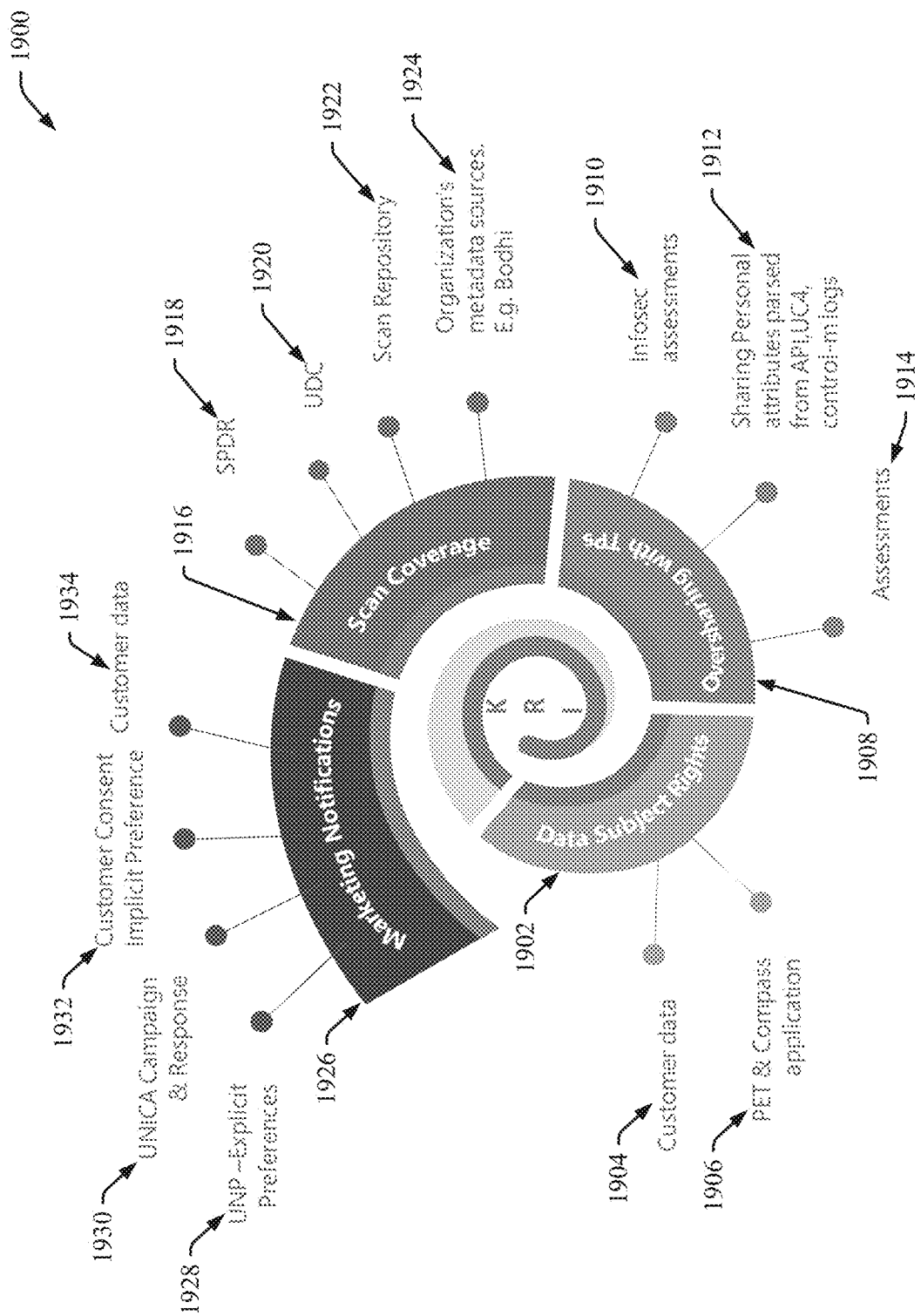
FIG. 19 presents a diagram of example sources that can be accessed to obtain data that can be used to determine key risk indicators (KRIs), in accordance with various aspects and embodiments of the disclosed subject matter.

Turning briefly to FIG. 19 (along with FIGS. 7, 8, 10, and 17), FIG. 19 presents a diagram of example sources 1900 that can be accessed to obtain data that can be used to determine (e.g., derive or calculate) KRIs, in accordance with various aspects and embodiments of the disclosed subject matter. With regard to, and to facilitate evaluating KRIs relating to, data subject rights 1902, the example sources 1900 can include customer data 1904 (e.g., user data) and privacy enhancing technology (PET) and Compass application 1906. For instance, the governance component 1004 can obtain information relating to data subject rights 1902 through the customer data 1904, which can be obtained from the customers directly or indirectly from another source, from the secure data store 730, from a data store (e.g., 104, 106, or 108; or 802, 804, or 806), or from another desired source.

The governance component 1004 also can obtain information relating to data subject rights 1902 through the PET and/or Compass application 1906. In accordance with various embodiments, the DLDP 702, data management component 732, or governance component 1004 can comprise, utilize, or access PETs, the Compass application, or another desired data security or protection technology or application to facilitate performing various aspects of the disclosed subject matter, such as described herein. The DLDP 702, data management component 732, and/or governance component 1004 can utilize PETs to facilitate desirably collecting, processing, storing, sharing, or utilizing data of users, in accordance with the set of rules and corresponding laws, regulations, and/or agreements, in accordance with the defined data management criteria. PETs can comprise technologies and/or components (e.g., modules) that can be used to facilitate protecting data of users, ensuring that users can have information that can be suitable to enable a user to give an informed consent with regard to the collecting, processing, storing, sharing, or utilization of their data. PETs also can be utilized to facilitate (e.g., enable) users to exercise their rights (e.g., data subject rights) with regard to data. The Compass application or other data security or protection application can be utilized to facilitate (e.g., enable) desirable managing of data protection of data of users. The governance component 1004 can access or obtain information utilized or generated by the PET and/or Compass application 1906 (or other desired technology or application) with regard to data subject rights 1902 of users.

With regard to, and to facilitate evaluating KRIs relating to, sharing or oversharing of data with third parties 1908 (oversharing with TPs), the governance component 1004 can obtain information from or relating to information security assessments 1910 (infosec assessments), information from or relating to sharing personal attributes 1912, and/or information from or relating to information risk assessment (IRA), privacy risk assessment (PRA), data protection impact assessment (DPIA), or other types of risk or impact assessments 1914. For instance, the governance component 1004 can obtain information from or relating to information security assessments 1910 that can be performed by the governance component 1004 or another desired service, such as, for example, Service Now or another desired security service. The governance component 1004 also can obtain information from or relating to sharing personal attributes 1912, for example, by parsing such information regarding sharing personal attributes from APIs, UC4, control-m logs, or another desired data transfer or management component or application. The governance component 1004 also can obtain information from or relating to IRA, PRA, DPIA, or other types of risk or impact assessments 1914, for example, from Hiperos or another desired risk management component, application, or provider (e.g., another desired third-party risk management component, application, or provider).

With regard to, and to facilitate evaluating KRIs relating to, scan coverage 1916 (oversharing with TPs), the governance component 1004 can obtain information relating to scan coverage 1916 from the SPDR 1918 (e.g., scanner component(s) 724, 808, or 810), universal database connector (UDC) 1920, scan repository 1922 (e.g., data store 902 or data store 904 of FIG. 9), and/or metadata resources 1924 of or associated with an entity (e.g., organization). The information relating to scan coverage 1916 can indicate what data stores or databases of an entity have been scanned (e.g., have been scanned during a defined time period), what information (e.g., what types of data and their respective data privacy statuses) has been scanned, what data stores or databases have not been scanned (e.g., have not been scanned during the defined time period), and/or other desired information relating to scan coverage 1916. A UDC 1920 can be associated with a scanner component (e.g., scanner component 724, 808, or 810), and can facilitate desirably connecting to (e.g., efficiently and/or directly connecting to) a data store (e.g., 104, 106, or 108; 802, 804, or 806) to facilitate desirable scanning of data from the data store and/or indexing of the scanned data.

With regard to, and to facilitate evaluating KRIs relating to, marketing notifications 1926, the governance component 1004 can obtain information relating to marketing notifications 1926 from a variety of data sources, such as, for example, unified notification platform (UNP)—explicit preferences 1928, UNICA campaign and response 1930, customer consent implicit preference 1932, and customer data 1934. For example, the governance component 1004 can receive data relating to preferences (e.g., explicit preferences) of customers with regard to marketing notifications 1926 from the UNP 1928 (or another desired notification platform). As another example, the governance component 1004 also can receive data relating to marketing notifications 1926 from the UNICA campaign and response 1930 (or another desired marketing campaign technology, application, or platform).

Figure 20:
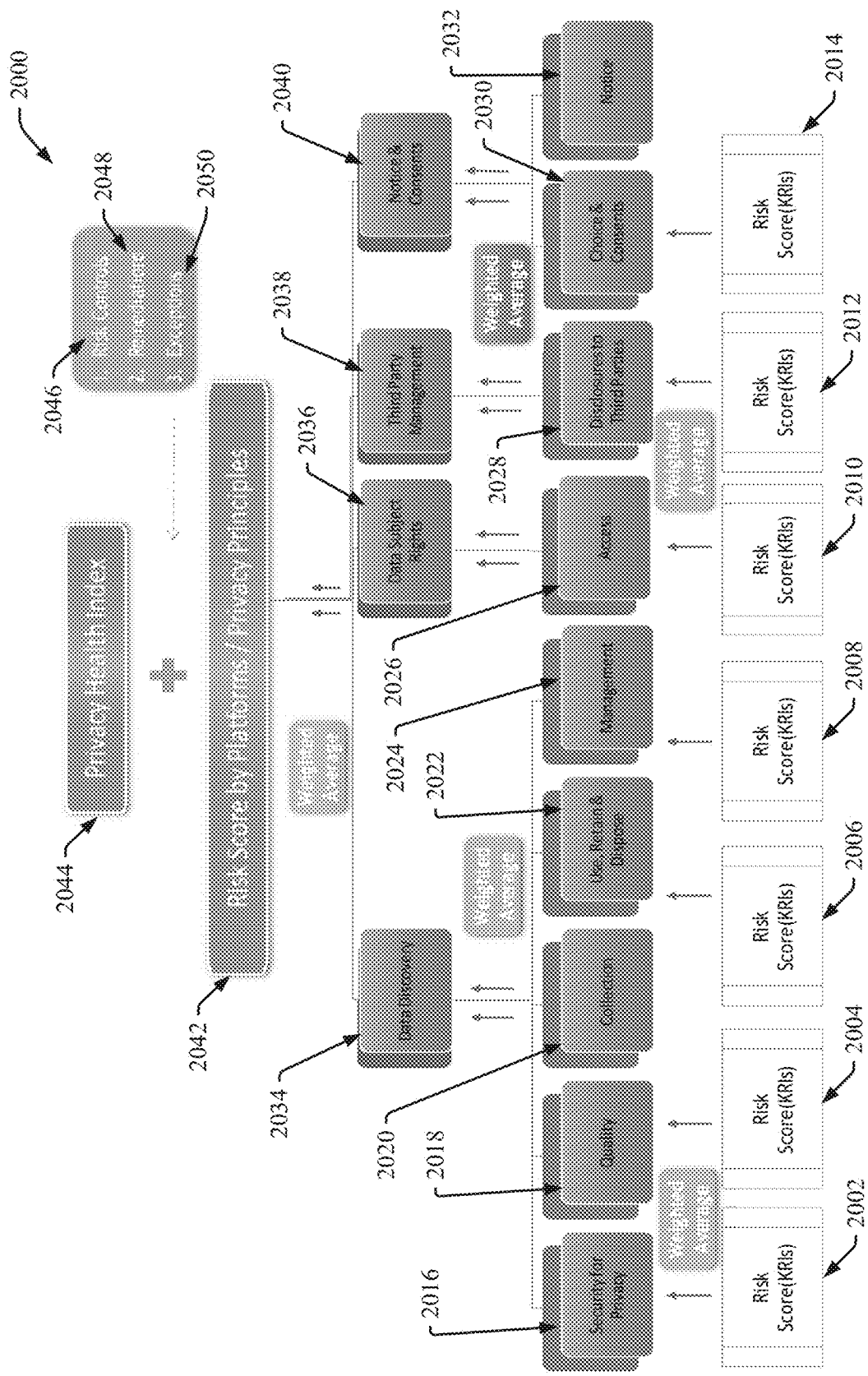
FIG. 20 depicts a block diagram of an example risk score and privacy health index process flow that can be used to facilitate determining risk scores and a privacy health index associated with an entity, in accordance with various aspects and embodiments of the disclosed subject matter.

Referring to FIG. 20 (along with FIGS. 7, 8, 10, and 17), FIG. 20 depicts a block diagram of an example risk score and privacy health index process flow 2000 that can be used to facilitate determining risk scores and a privacy health index associated with an entity, in accordance with various aspects and embodiments of the disclosed subject matter. The governance component 1004 can determine various risk scores and a privacy health index for any desired entity that is associated with the DLDP 702, data management component 732, and/or governance component 1004. For example, the entity can be an entity that is operating, owning, and/or managing the DLDP 702, data management component 732, governance component 1004, and/or one or more data stores associated with (e.g., communicatively connected to) the DLDP 702 and/or governance component 1004. As another example, an entity can operate, own, and/or manage a set of data stores located in one or more jurisdictions, wherein the set of data stores can be monitored, scanned, tracked, and/or evaluated (e.g., evaluated for compliance with applicable laws, regulations, or agreements) by the DLDP 702, data management component 732, and/or governance component 1004.

In accordance with the example risk score and privacy health index process flow 2000, the governance component 1004 (e.g., the risk score component 1710 or other component of the governance component 1004) can determine various KRIs, which can be or can comprise risk scores, relating to various risk factors relating to data protection. The risk factors, in part, can relate to risks associated with non-compliance with applicable laws, regulations, or agreements or other anomalies (e.g., irregularities) relating to data protection. The KRIs or risk scores can comprise, for example risk scores (KRIs) 2002, 2004, 2006, 2008, 2010, 2012, and/or 2014 relating to various and respective risk factors, which can be relevant to respective privacy principles.

The privacy principles can comprise, for example, security for privacy 2016, quality 2018, collection 2020, use, retain and dispose 2022, management 2024, access 2026, disclosures to third parties 2028, choice and consents 2030, notice 2032, and/or another desired privacy principle. Security for privacy 2016 can relate to or involve security for privacy of data of users, such as, for example, securing or protecting data from data breaches. Quality 2018 can involve, for example, quality relating to personal data detection accuracy or other desired quality issues or factors relating to data protection. Collection 2020 can relate to, for example, the collection of data users. Use, retain and dispose 2022 can relate to, for example, the use, retention, or disposition of data of users, scanning coverage of the scanning of data of or associated with users, or other desired factors. Management 2024 can involve management of data processing of data of users, including, for example, PIAs, data protection impact assessments (DPIAs), or another desired type of impact or risk assessment. Access 2026 can relate to access of data of users by other users or other entities, data subject requests associated with users, or other data access related issues or factors. Disclosures to third parties 2028 can relate to disclosure of data of users to third party entities, privacy complaints (e.g., privacy complaint from a regulator or user) regarding disclosure of data of users, PIAs relating to disclosure of user data to third party entities, or another issue or factor associated with disclosures to third parties. Choice and consents 2030 can relate to, for example, choices and consents of users with regard to collection and processing of their data, cookies, electronic communications to users, or another issue or factor associated with choices or consents of users. Notice 2032 can relate to notices (e.g., data privacy statement or notice) or transparency issues relating to data collection and processing of data of users, electronic communications to users, or other notice related issues or factors.

A particular risk score (e.g., risk score 2002) and associated risk factor can relate to or apply to one or more privacy principles (e.g., 2016, 2018, 2020, 2022, 2024, 2026, 2028, 2030, and/or 2032). For example, a particular risk score and associated risk factor can relate or apply to only a single privacy principle or a particular risk score and associated risk factor can relate or apply to two or more privacy principles. Also, two or more risk scores or associated risk factors can relate to or apply to a particular privacy principle.

In some embodiments, the risk score component 1710 can apply respective weights (e.g., weight values) to respective risk scores (or respective KRI metrics) to generate respective weighted risk scores (or weighted KRI metrics). For instance, the risk score component 1710 can determine respective weights to apply to respective risk scores based at least in part on the respective significance of the respective risk scores or associated risk factors to a privacy principle(s), in accordance with the defined data management criteria. The risk score component 1710 can apply the applicable weight (e.g., weight value) to a particular risk score to generate the weighted risk score. For example, the weight can be a value that is less than 1.00, equal to 1.00, or more than 1.00, and the risk score component 1710 can determine (e.g., calculate) the weighted risk score as a function of the risk score and the weight (e.g., weighted risk score=risk score×weight value). The weight to be applied to a particular risk score can be the same with regard to each privacy principle with which the particular risk score is going to be used, or the weight to be applied to a particular risk score can be determined based at least in part on the privacy principle with which it is going to be used and/or the risk factor associated with the particular risk score, as indicated or specified by the defined data management criteria.

In certain embodiments, with regard to each privacy principle (e.g., 2016, 2018, 2020, 2022, 2024, 2026, 2028, 2030, or 2032), the risk score component 1710 can determine a risk score of or associated with the privacy principle as a function of the weighted risk scores that are applicable to that privacy principle. For example, the risk score component 1710 can determine (e.g., calculate) a risk score of or associated with a privacy principle as a function of an average of the weighted risk scores that are applicable to that privacy principle. In other embodiments, the risk score component 1710 can determine a risk score of or associated with a privacy principle as or based at least in part on a median value of the weighted risk scores that are applicable to that privacy principle, a trimmed average or mean of such weighted risk scores, a normalized risk score derived from the applicable weighted risk scores, or a peak weighted risk score of all the applicable weighted risk scores, as indicated or specified by the defined data management criteria.

If and as desired, the risk score component 1710 also can determine respective risk scores of or associated with the respective platforms based at least in part on (e.g., as a function of) the respective risk scores of the respective privacy principles, as applicable to a particular platform. The platforms can comprise, for example, the data discovery platform 2034 (e.g., DLDP 702), the data subject rights platform 2036, the third party management platform 2038, the notice and consents platform 2040, and/or another desired platform of or associated with the DLDP 702 (e.g., the governance platform, or the rights management platform, etc.). In some embodiments, privacy principles, such as security for privacy 2016, quality 2018, collection 2020, use, retain and dispose 2022, management 2024, and/or another desired privacy principle can be associated with (e.g., relevant or applicable to) the data discovery platform 2034. Privacy principles, such as access 2026 and/or another desired privacy principle can be associated with the data subject rights platform 2036. Privacy principles, such as disclosures to third parties 2028 and/or another desired privacy principle can be associated with the third party management platform 2038. Privacy principles, such as choices and consents 2030, notice 2032, and/or another desired privacy principle can be associated with the notice and consents platform 2040.

The risk score component 1710 can apply respective weights (e.g., weight values) to respective risk scores associated with the respective privacy principles to generate respective weighted risk scores. For example, the risk score component 1710 can determine respective weights to apply to respective risk scores associated with the respective privacy principles based at least in part on the respective significance of the respective risk scores and associated privacy principles to the particular platform (e.g., 2034, 2036, 2038, or 2040, etc.), in accordance with the defined data management criteria. The risk score component 1710 can apply the applicable weight (e.g., weight value) to a particular risk score to generate the weighted risk score, wherein the weight value can be less than 1.00, equal to 1.00, or more than 1.00, and wherein the risk score component 1710 can determine the weighted risk score as a function of the risk score and the weight (e.g., weighted risk score=risk score×weight value). The weight to be applied to a particular risk score can be the same with regard to each platform with which the particular risk score is going to be used, or the weight to be applied to a particular risk score can be determined based at least in part on the platform with which it is going to be used and/or the privacy principle associated with the particular risk score, as indicated or specified by the defined data management criteria.

In certain embodiments, with regard to each platform (e.g., 2034, 2036, 2038, or 2040, etc.), the risk score component 1710 can determine a risk score of or associated with the platform as a function of the weighted risk scores that are applicable to that platform. For example, the risk score component 1710 can determine (e.g., calculate) a risk score of or associated with a platform (e.g., 2034, 2036, 2038, or 2040, etc.) as a function of an average of the weighted risk scores that are applicable to that privacy principle. In other embodiments, the risk score component 1710 can determine a risk score of or associated with a particular platform as or based at least in part on a median value of the weighted risk scores that are applicable to that platform, a trimmed average or mean of such weighted risk scores, a normalized risk score derived from such weighted risk scores, or a peak weighted risk score of all the applicable weighted risk scores, as indicated or specified by the defined data management criteria.

For example, the risk score component 1710 can determine a risk score of or associated with the data discovery platform 2034 as a function of (e.g., as an average of) the respective weighted risk scores of security for privacy 2016, quality 2018, collection 2020, use, retain and dispose 2022, management 2024, and/or another applicable privacy principle. The risk score component 1710 can determine a risk score of or associated with the data subject rights platform 2036 as a function of (e.g., as an average of) the respective weighted risk scores of the access 2026 and/or another applicable privacy principle (if access 2026 is the only applicable privacy principle, the weight value for that privacy principle can be 1.00 or there may be no weight value used). The risk score component 1710 can determine a risk score of or associated with the third party management platform 2038 as a function of (e.g., as an average of) the respective weighted risk scores of the disclosures to third parties 2028 and/or another applicable privacy principle (if disclosures to third parties 2028 is the only applicable privacy principle, the weight value for that privacy principle can be 1.00 or there may be no weight value used). The risk score component 1710 can determine a risk score of or associated with the notice and consents platform 2040 as a function of (e.g., as an average of) the respective weighted risk scores of choice and consents 2030, notice 2032, and/or another applicable privacy principle.

In some embodiments, the risk score component 1710 can determine an overall risk score associated with an entity or the system (e.g., risk score 2042 by platforms and privacy principles) based at least in part on the respective risk scores of the respective platforms (e.g., 2034, 2036, 2038, or 2040, etc.). For instance, the risk score component 1710 can determine respective weights for the respective platforms (e.g., 2034, 2036, 2038, or 2040, etc.) and can apply the respective weights to the respective risk scores associated with the respective platforms to generate respective weighted risk scores. For example, the risk score component 1710 can determine respective weights to apply to respective risk scores associated with the respective platforms based at least in part on the respective significance of the respective risk scores and associated platforms, in accordance with the defined data management criteria. In some embodiments, the risk score component 1710 can determine (e.g., calculate) a risk score 2042 (e.g., overall risk score) by platforms and privacy principles as a function of an average of the respective weighted risk scores of the respective platforms (e.g., 2034, 2036, 2038, or 2040, etc.). In other embodiments, the risk score component 1710 can determine the risk score 2042 by platforms and privacy principles as or based at least in part on a median value of the respective weighted risk scores of the respective platforms, a trimmed average or mean of such weighted risk scores, a normalized risk score derived from such weighted risk scores, or a peak weighted risk score of such weighted risk scores, as indicated or specified by the defined data management criteria.

The governance component 1004 also can comprise a privacy health index component 1712 that can determine a privacy health index 2044 associated with an entity (e.g., organization) or the system based at least in part on the risk score 2042 by platforms and privacy principles, risk controls 2046, remediations 2048, exceptions 2050, and/or another desired factor, in accordance with the defined data management criteria. Risk controls 2046 can relate to regulatory and operational risk controls (e.g., risk policies, procedures, protocols, technologies, processes, techniques, or devices, etc.) that can facilitate (e.g., enable) managing, reducing, or modifying risks with regard to data protection, and facilitate desirable compliance with applicable laws, regulations, and agreements with regard to data protection. The privacy health index component 1712 can quantify (e.g., determine or measure) the risk controls 2046 to generate a risk control score that can represent or indicate the relative level, status, or effectiveness of the risk controls 2046. Remediations 2048 can relate to remediation actions, policies, procedures, protocols, technologies, processes, techniques, or devices, etc., that have or can be implemented to remediate, mitigate, or rectify any non-compliance issues or other anomalies in connection with data protection. The privacy health index component 1712 can quantify the remediations 2048 to generate a remediation score that can represent or indicate the relative level, status, or effectiveness of the remediations 2048. Exceptions 2050 can relate to exceptions actions, notifications, policies, procedures, protocols, technologies, processes, techniques, or devices, etc., that can be used to identify and provide notifications regarding any non-compliance issues or other anomalies in connection with data protection to facilitate notifying an entity (e.g., entity representative) of a non-compliance issue or other anomaly and/or remediating a non-compliance issue or other anomaly. The privacy health index component 1712 can quantify the exceptions 2050 to generate an exceptions score that can represent or indicate the relative level, status, or effectiveness of the exceptions 2050. The privacy health index component 1712 can determine (e.g., calculate) the privacy health index 2044 as a function of (e.g., combination of, sum of, or average of, etc.) the risk score 2042, the quantifiable value (e.g., risk control score) of the risk controls 2046, the quantifiable value (e.g., remediation score) of the remediations 2048, and the quantifiable value (e.g., exceptions score) of the exceptions 2050, in accordance with the defined data management criteria.

The governance component 1004 can comprise a validation component 1714 (e.g., validation engine) that can monitor or track the collecting, processing, accessing, storing, sharing, or utilization of data of users, trends relating thereto, information (e.g., IRAs, PRAs, DPIAs, or other assessments, etc.) relating thereto, the set of rules (e.g., the first subset of rules associated with the first jurisdiction, or the second subset of rules associated with the second jurisdiction, etc.), DSRs, etc. The validation component 1714 can analyze the data, information, trends, rules, and/or DSRs, etc. Based at least in part on the results of such analysis, the validation component 1714 can validate or verify the compliance of the DLDP 702, its constituent or associated platforms (e.g., rights management component 1002, or governance component 1004, etc.), data stores (e.g., 104, 106, and/or 108; and/or 802, 804, and/or 806; etc.) associated with entities with the respective rules of the set of rules (and corresponding laws, regulations, and/or agreements), validate or verify the extent of such compliance, and/or determine or identify non-compliance with the set of rules or other anomalies associated with the data, information, trends, and/or DSRs, etc.

For instance, with regard to a first entity that owns, operates, or manages the DLDP 702, its constituent or associated platforms, and the first set of data stores 104, 106, and 108, the validation component 1714 can validate or verify that the first entity, including the associated DLDP 702, its constituent or associated platforms, and the first set of data stores 104, 106, and 108 are in compliance with the first subset of rules (and corresponding first set of laws and regulations associated with the first jurisdiction and/or first agreement), validate or verify the extent of such compliance, and/or determine or identify (e.g., detect and identify) non-compliance with the first subset of rules or other anomalies associated with the data, information, trends, and/or DSRs, etc., of or associated with first entity.

With regard to a second entity that owns, operates, or manages the second set of data stores 802, 804, and 806, the validation component 1714 can validate or verify that the second entity, including the second set of data stores 802, 804, and 806 (and to the extent applicable, the associated DLDP 702 and its constituent or associated platforms of the set of platforms) are in compliance with the second subset of rules (and corresponding second set of laws and regulations associated with the second jurisdiction and/or second agreement), validate or verify the extent of such compliance, and/or determine or identify non-compliance with the second subset of rules or other anomalies associated with the data, information, trends, and/or DSRs, etc., of or associated with second entity.

If the validation component 1714 detects an anomaly (e.g., a non-compliance issue or other anomaly), the validation component 1714 can present anomaly information that can indicate or specify that the anomaly has been detected, the type of anomaly, the entity, platform, and/or data store associated with the anomaly, the date(s)/time(s) of the occurrence(s) the anomaly, the date(s)/time(s) that the anomaly was detected, and/or other desired information relating to the anomaly.

In some embodiments, the governance component 1004 can be associated with (e.g., communicatively connected to) an application component 1716 (e.g., front end application) that can access certain information regarding the DLDP 702, its constituent or associated platforms, and/or data stores associated with entities, in accordance with access rights granted to users (e.g., by the rights management component 1002). The application component 1716 can be implemented or utilized by a communication device, such as, for example, communication device 738 of FIG. 7.

For example, an authorized user (e.g., associated with the first entity) can utilize the application component 1716 and/or communication device 738 to access certain information regarding the DLDP 702, its constituent or associated platforms, and/or the first set of data stores 104, 106, and/or 108 associated with the first entity, in accordance with access rights granted to such user, wherein such certain information can comprise status or snapshot information regarding the operation of the DLDP 702, its constituent or associated platforms, and/or the first set of data stores, data discovery or scanning results (e.g., real-time scan results or previously performed scanning results) associated with the first set of data stores, risk scores associated with the privacy principles, the DLDP 702, its constituent or associated platforms, and/or the first set of data stores, a privacy health index (e.g., privacy health index 2044) associated with the first entity, and/or compliance, non-compliance, and/or anomaly information relating to the DLDP 702, its constituent or associated platforms, and/or the first set of data stores, etc. The data management component 732, including the governance component 1004, can present or facilitate presenting such certain information to the application component 1716 and/or communication device 738 for viewing by the authorized user.

With regard to the second entity and associated second set of data stores 802, 804, and/or 806, if an authorized user (e.g., the authorized user associated with the first entity or another authorized user associated with the second entity) has certain access rights to access certain information (e.g., status or snapshot information; risk scores; privacy health index; and/or compliance, non-compliance, and/or anomaly information; etc.) relating to the second set of data stores 802, 804, and/or 806 associated with the second entity, the authorized user can utilize the application component 1716 and/or communication device 738 to access such certain information relating to second set of data stores associated with the second entity. Such certain information can comprise information stored in the DLDP 702 (e.g., secure data store 730 of the DLDP 702), its constituent or associated platforms (e.g., rights management component 1002, or governance component 1004, etc.) that relates to the second set of data stores and/or information obtained from scanning (e.g., real-time scanning or previously performed scanning) the second set of data stores (e.g., scanning results stored in the scanner component 810).

Depending in part on the type and/or severity of an anomaly, it can or may be desirable (e.g., wanted, appropriate, necessary, or required) to provide a notification regarding the anomaly, and/or to perform a remediation action to remedy, correct, or mitigate the anomaly, for example, when doing so is in accordance with the set of rules, corresponding laws, regulations, or agreements, and the corresponding defined data management criteria. In that regard, the governance component 1004 can comprise a remediation component 1718 and notification component 1720 (e.g., notification engine) that can facilitate addressing non-compliance issues or other anomalies. For instance, in response to detecting an anomaly (e.g., non-compliance issue or other anomaly) for which notification and/or remediation can be desirable, the validation component 1714 can initiate a remediation with the remediation component 1718 and initiate a notification with the notification component 1720 to facilitate addressing the anomaly, as more fully described herein.

The notification component 1720 can generate and provide (e.g., communicate) notification or alert messages relating to operation of the DLDP 702, its constituent or associated platforms, the first set of data stores 104, 106, and/or 108, and/or second set of data stores 802, 804, and/or 806, including notification or alert messages regarding an anomaly (e.g., non-compliance issue or other anomaly) detected by the governance component 1004. For example, in response to the validation component 1714 detecting an anomaly (e.g., a privacy breach with regard to data of users; a breach of a condition with regard to sending electronic communications to a user; a breach with regard to a consent issue involving a user(s); or a breach of a condition or threshold level relating to data of users; etc.), the validation component 1714 can present the anomaly information to the notification component 1720. The notification component 1720 can generate a notification message that can comprise the anomaly information. In some embodiments, the notification component 1720 can communicate the notification message to a user (e.g., an entity representative who can handle data privacy breaches or anomalies), for example, via a communication device, such as communication device 738, to notify the user regarding the anomaly. The notification message can be or can comprise an exception or alert ticket relating to the anomaly. The notification message also can request that the anomaly issue be reviewed to determine whether the anomaly is valid and/or determine whether a remediation action is to be performed to remedy, correct, or mitigate the anomaly.

Figure 21:
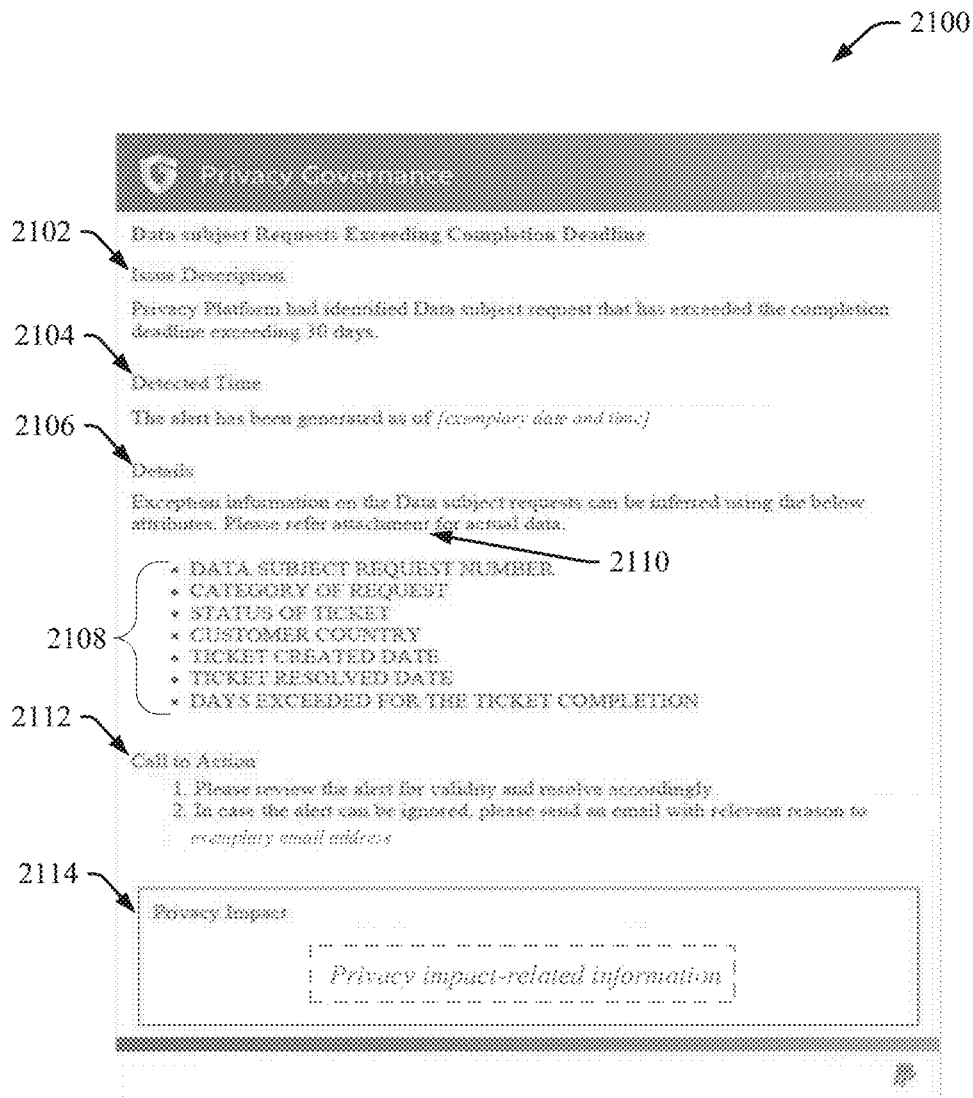
FIG. 21 presents a diagram of an example exception message relating to an example anomaly issue relating to data subject requests, in accordance with various aspects and embodiments of the disclosed subject matter.

Referring briefly to FIG. 21 (along with FIGS. 7, 8, 10, and 17), FIG. 21 presents a diagram of an example exception message 2100 (e.g., exception or alert ticket message) relating to an example anomaly issue relating to data subject requests, in accordance with various aspects and embodiments of the disclosed subject matter. The example exception message 2100 can comprise an issue description 2102 that can describe the anomaly issue that was detected. For instance, in the example exception message 2100, the issue description 2102 indicates that the Privacy Platform (e.g., governance platform) identified a data subject request(s) that exceeded the completion deadline of 30 days. The example exception message 2100 also can include a detected time 2104 that can indicate the time that the anomaly was detected and/or the alert of the anomaly was generated.

The example exception message 2100 also can comprise details 2106 regarding the anomaly. The details 2106 can comprise various attributes 2108 that can indicate and/or provide information regarding the anomaly. In the example exception message 2100 regarding the anomaly involving data subject requests exceeding the completion deadline, the attributes 2108 can comprise, for example, data subject request number, category of request, status of ticket (e.g., exception ticket), customer country, ticket creation date, ticket resolution date, and/or the days exceeded for ticket completion. In some embodiments, the example exception message 2100 can indicate that there is an attachment 2110 that can be referenced to obtain additional or more specific information (e.g., additional details) regarding the anomaly.

The example exception message 2100 further can comprise a call to action 2112 that can request that the message recipient take appropriate action (e.g., remediation action) to determine validity of the anomaly and remediate or resolve the anomaly issue. For example, the call to action 2112 can request that the message recipient review the alert (e.g., exception message 2100 and/or attached information) for validity and resolve the exception ticket and/or anomaly accordingly, and, in case the alert can be ignored (e.g., due to there being no actual problem, such as no actual non-compliance issue that has to be remedied or corrected), send a message (e.g., email message) with the reason that the exception ticket can be ignored. For instance, the call to action 2112 can request that the anomaly issue be reviewed by a user (e.g., entity representative) to determine whether the anomaly is valid and/or determine whether a remediation action is to be performed to remedy, correct, or mitigate the anomaly; and, if a remediation action is to be performed, perform the remediation action and report back that the remediation action has been performed and the anomaly issue has been resolved or otherwise remediated; and, if the anomaly is determined to not be valid (e.g., is not an issue that has to be remediated), report that the anomaly is determined to not be valid or otherwise does not have to be addressed.

The example exception message 2100 also can include a privacy impact statement 2114 that can include information (e.g., privacy impact-related information) that can indicate legal and/or contractual information relating to the anomaly issue. For example, with regard to an anomaly involving data subject requests not being completed in a timely manner, the privacy impact statement 2114 can provide information relating to an applicable privacy law and/or agreement (e.g., SLA) regarding data subject requests, and/or information relating to the impact or potential impact of failing to comply with the applicable privacy law and/or agreement.

In some embodiments, the notification component 1720 also can communicate an exception message (e.g., a different type of notification message) to an exception component 1722, which can be part of the back end 1704 of the governance component 1004. The exception message can comprise same or similar information, or additional information, regarding the anomaly that was contained in the notification message sent to the user. The exception component 1722 (e.g., exception engine) can analyze and process the exception message. Based at least in part on the results of the analysis and processing, the exception component 1722 can document the exception incident (e.g., the anomaly) and can present or make available information (e.g., anomaly information) relating to the exception incident, so that a user (e.g., entity representative) can address (e.g., check out, remediate, or take other appropriate action with regard to) the anomaly. For example, if the anomaly relates to customers, who opted out of receiving marketing emails from the entity, continuing to receive marketing emails from the entity, the exception component 1722 can present or make available, to the user, information relating to this anomaly of improperly sending marketing emails to customers who opted out of receiving such emails. As another example, if the anomaly relates to data subject requests that being completed within the applicable deadline, the exception component 1722 can present or make available, to the user, information relating to the anomaly of data subject requests not being completed by the applicable deadline.

In some embodiments, the exception component 1722 can be associated with (e.g., communicatively connected to) or can comprise core platforms 1724 that can facilitate analyzing and processing exception tickets regarding anomalies, working in conjunction with appropriate users to handle or address the exception tickets (e.g., working in conjunction with a marketing representative or a software engineer or programmer regarding a problem relating to improperly sending of marketing emails to customers; working in conjunction with a representative of the second entity regarding a privacy breach of data of users involving the second set of data stores 802, 804, and/or 806; or working in conjunction with an entity representative, who handles issues relating to data subject requests, that there are data subject requests that are not being processed and completed within the applicable time limit), performing or facilitating performing remediation actions, and/or reporting results of validation of an anomaly issue or remediation of an anomaly issue. The core platforms 1724 can comprise or employ resources, devices, user interfaces, servers, file systems, applications, technologies, processes, procedures, and protocols that can facilitate performing the various operations or actions, such as described herein, to desirably address exception tickets and resolve anomaly issues.

The remediation component 1718 can monitor and track the progress of the remediation or exception validation being performed by the exception component 1722, core platforms 1724, and/or user(s) that are addressing the anomaly issue. If the remediation component 1718 determines that the anomaly issue is not being suitably or timely addressed by the user, the remediation component 1718 or notification component 1720 can send out a reminder message or other suitable message to a communication device or messaging account (e.g., email account, or text messaging account) of the user to notify or remind the user that the anomaly issue still has not been addressed.

In response to being notified of the anomaly issue, the user or another user can check out the anomaly issue to determine whether it is valid, and, if so, can perform a remediation action to resolve or remediate the anomaly issue. For example, with regard to the improper sending of marketing emails to customers who opted out, the user may find that part of the coding relating to the sending of marketing emails contains an error that is resulting in marketing emails being sent to customers who opted out of receiving marketing emails. The user or another user can modify the coding to eliminate the error. The user can report back to the exception component 1722 or remediation component 1718 that the anomaly issue has been resolved or remediated. In response, the remediation component 1718 can close out the file on the exception ticket relating to that anomaly, noting that the anomaly issue was resolved or remediated. If, instead, the user determines that the anomaly issue is not valid or otherwise does not have to be remediated, the user can report back to the exception component 1722 or remediation component 1718 that the anomaly issue was not valid or otherwise did not have to be remediated. In response, the remediation component 1718 can close out the file on the exception ticket relating to that anomaly, noting that the anomaly issue was determined to not be valid or it was determined that the anomaly did not have to be remediated.

In certain embodiments, the system 1700 can comprise a representational state transfer (REST) API component 1726 that can comprise a set of RESTful APIs that can be web service APIs (e.g., HTTP-based APIs) that can follow or comply with certain REST architectural constraints. The REST architectural constraints can be or can comprise certain rules that can allow programs to communicate with each other, wherein, for example, an API can be created on a server and a client device (e.g., communication device) can communicate with the API on the server. For instance, the set of RESTful APIs can enable users to access content of a website or a platform(s) (e.g., DLDP 702, or governance component 1004, etc.) using their client devices to communicate with the APIs of or associated with the governance component 1004 or other components of the system 1700.

In some embodiments, the system 1700 can include a bug tracking component 1728 that can comprise various desired bug tracking tools that can enable users to detect, identify, record, and/or track bugs (e.g., a computer software, firmware, or hardware error, flaw, or fault) or potential bugs in a computer-based system. The bug tracking tools employed by the bug tracking component 1728 can comprise, for example, Jira bug tracking tools, Flowable bug tracking tools, or other desired bug tracking tools that can enable users (e.g., software developers or programmers) detect, identify, record, and/or track bugs or potential bugs in the DLDP 702 and its constituent or associated components (e.g., rights management component 1002, governance component 1004, or scanner component(s) (e.g., 724, 808, or 810), etc.), and can facilitate correcting or eliminating bugs in the DLDP 702 and its constituent or associated components. In some embodiments, one or more of the bug tracking tools employed by the bug tracking component 1728 can be open-source bug tracking tools.

Figure 22:
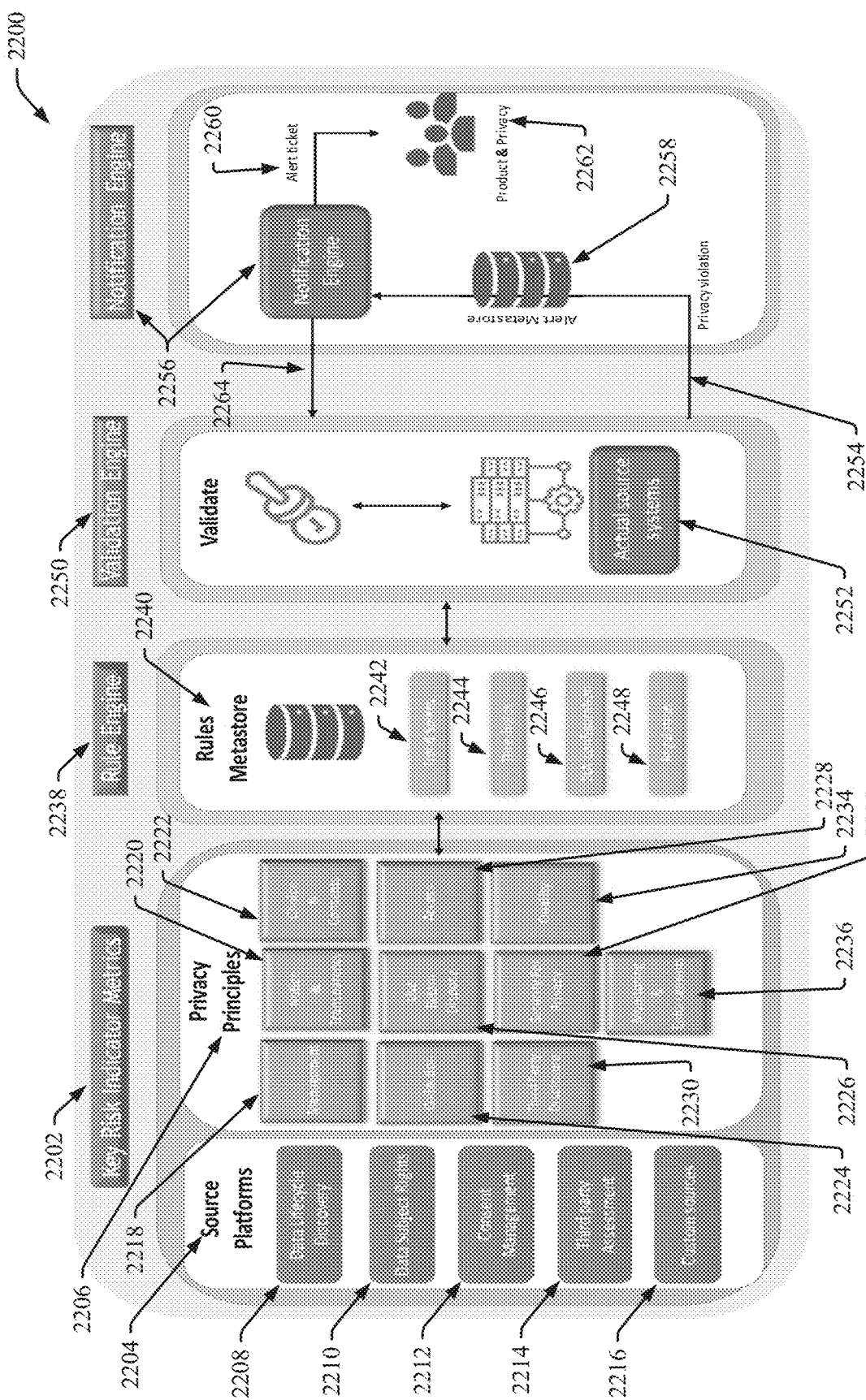
FIG. 22 illustrates a diagram of an example governance flow for governing the collecting, processing, accessing, storing, sharing, and utilization of data of users and information relating to data of users, in accordance with various aspects and embodiments of the disclosed subject matter.

Referring to FIG. 22 (along with FIGS. 7, 8, 10, and 17), FIG. 22 illustrates a diagram of an example governance flow 2200 for governing the collecting, processing, accessing, storing, sharing, and utilization of data of users and information relating to data of users, in accordance with various aspects and embodiments of the disclosed subject matter. In some embodiments, the governance component 1004 can employ the example governance flow 2200 to facilitate governing the collecting, processing, accessing, storing, sharing, and utilization of data of users, in accordance with the defined data management criteria, which can correspond to and/or be based at least in part on respective laws and regulations of respective jurisdictions and/or respective agreements between entities (e.g., between organizations and users, such as customers). The governance component 1004 can evaluate KRI metrics 2202 associated with source platforms 2204 and privacy principles 2206, such as more fully described herein. The privacy principles 2206 can be based at least in part on the laws, regulations, and/or agreements.

The source platforms 2204 can comprise, for example, the data lifecycle discovery platform (DLDP) 2208, data subject rights platform 2210, consent management platform 2212, third party assessment platform 2214, custom sources 2216, and/or other platforms (e.g., governance component 1004), such as described herein. The DLDP 2208 can manage discovery, scanning, storing, and/or processing of data, such as described herein. The data subject rights platform 2210 can manage data subject rights of users (e.g., customers) with regard to their data, access to data of users (e.g., access of users to their personal information), modification of data by users, etc., as more fully described herein. The consent management platform 2212 can manage consent of users to allow entities (e.g., organizations) to collect, process, access, store, share, and utilize data of users, send electronic communications (e.g., emails, text messages, or phone calls) to users, consent to use cookies with regard to users, etc., such as more fully described herein. The third party assessment platform 2214 can manage sharing of data of users with third party entities and performing assessments (e.g., privacy and/or risk assessments, such as IRAs or PRAs) relating to sharing of data of users with third party entities, such as described herein. Custom sources 2216 can comprise modules or platforms that can be added to facilitate collecting, processing, accessing, storing, sharing, and utilizing of data of users.

The privacy principles 2206 can comprise, for example, management 2218, notice and transparency 2220, choice and consents 2222, collection 2224, use, retain and dispose 2226, access 2228, third party disclosure 2230, security for privacy 2232, quality 2234, monitoring and enforcements 2236, and/or another desired privacy principle, such as more fully described herein. Respective privacy principles (e.g., 2220 through 2236) of the privacy principles 2206 can be applicable or relevant to respective source platforms (e.g., 2208 through 2216) of the source platforms 2204.

The rules engine 2238 can determine and generate the set of rules based at least in part on applicable laws and regulations of jurisdictions relating to data protection, and applicable agreements relating to data protection, as more fully described herein. The rules engine 2238 can incorporate or take into account the privacy principles 2206, which can be embodied in or derived from the laws, regulations, and/or agreements, when determining the rules of the set of rules. The rules engine 2238 can comprise or be associated with a rules metastore 2240 (e.g., one or more data stores) in which the rules engine 2238 can store the set of rules, or information relating to the set of rules (e.g., information relating to the laws, regulations, and/or agreements; metadata; information relating to privacy principles 2206; or information relating to source platforms 2204; or other information relating to the set of rules). The rules engine 2238 can structure various rules of the set of rules to have conditions (e.g., rule conditions) that can be utilized to indicate when anomalies (e.g., data privacy anomalies or breaches) relating to data of users are or may be occurring, wherein the rules engine 2238 can determine the conditions of the rules based at least in part on the obligations (e.g., obligations on the entity(ies)) that the rules engine 2238 can determine or derive from the laws, regulations, and/or agreements. The conditions in the rules can relate to, for example, trend spikes 2242 in information trends relating to data of users, thresholds 2244 that can be employed to facilitate determining when conditions have been satisfied (e.g., breached; met or exceeded), SLA configuration 2246 that can facilitate determining or implementing the conditions for the set of rules (e.g., in accordance with an agreement, such as an SLA), and regulation 2248 regarding the laws and regulations relating to data protection.

For instance, the rules engine 2238 can determine or formulate a condition in a rule to facilitate (e.g., enable) detecting a trend spike 2242 in information relating to user data, wherein the trend spike 2242 can indicate an anomaly that can or potentially can be a violation of an obligation (e.g., legal or contractual obligation) derived from an applicable law, regulation, or agreement. The rules engine 2238 also can determine thresholds 2244 that can be applied with regard to trend spikes 2242, time limits, data limits, consent limits, data retention limits, enforcement limits, notice limits, messaging limitations, and/or other conditions or limits relating to data protection, in accordance with applicable laws, regulations, and/or agreements.

For example, the rules engine 2238 can determine a threshold 2244, such as a defined threshold amount of time (e.g., 10 days, 15 days, 30 days, or other applicable amount of time) for completing a data subject request, in accordance with an applicable law, regulation, or agreement, and can determine and formulate a rule that can include a condition and the defined threshold amount of time, where the rule can indicate or specify that a data subject request has to be completed within the defined threshold amount of time after the data subject request has been received by the entity (e.g., received by the website or platform of or associated with the entity). As another example, the rules engine 2238 can determine a threshold 2244, such as a defined threshold amount of time (e.g., 10 days (e.g., 10 business days), 15 days, or other applicable amount of time) for discontinuing the sending of electronic communications to a user who has unsubscribed from or opted out of receiving the electronic communications, in accordance with an applicable law, regulation, or agreement. The rules engine 2238 can determine and formulate a rule that can include a condition and the defined threshold amount of time for discontinuing the sending of electronic communications to a user, where the rule can indicate or specify that the entity has to discontinue the sending of electronic communications to a user within the defined threshold amount of time after the request to unsubscribe or opt out has been received by the entity (e.g., received by the website or platform of or associated with the entity).

The set of rules determined and generated by the rules engine 2238 can be provided or made available to a validation engine 2250 (e.g., validation component 1714), as part of the governance flow 2200. The validation engine 2250 can utilize and apply respective (e.g., applicable) rules (e.g., first subset of rules, or second subset of rules, etc.) of the set of rules to respective entities associated with respective jurisdictions, as more fully described herein. The validation engine 2250 can be associated with (e.g., communicatively connected to, interfaced with) the source systems 2252 (e.g., first set of data stores 104, 106, and 108; or second set of data stores 802, 804, and 806; etc.) associated with respective entities as well as the various platforms (e.g., source platforms 2204) to facilitate monitoring and tracking the collecting, processing, accessing, storing, sharing, and utilization of data of users by the source systems 2252 associated with the entities and the various platforms. In connection with the monitoring and tracking, the validation engine 2250 can apply the respective rules of the set of rules to the respective source systems 2252 associated with the respective entities and the platforms to validate or verify whether the respective source systems 2252 and/or platforms are in compliance with applicable rules of the set of rules or whether there exist any anomalies relating to data protection associated with the collecting, processing, accessing, storing, sharing, and utilization of data of users. For instance, the validation engine 2250 can apply the respective rules of the set of rules to the respective source systems 2252 associated with the respective entities and the platforms to determine whether the respective source systems 2252 and/or platforms are in compliance with applicable rules of the set of rules or are in non-compliance with any applicable rules of the set of rules; if in non-compliance, determine to what extent a source system 2252 or platform is in non-compliance and the type(s) of non-compliance; and/or determine other anomalies or potential anomalies associated with the collecting, processing, accessing, storing, sharing, and utilization of data of users, such as more fully described herein.

As part of the governance flow 2200, if the validation engine 2250 detects an anomaly (e.g., a non-compliance or potential non-compliance issue or other anomaly, such as, for example, a privacy violation) during the validation process, the validation engine 2250 can communicate a message 2254, comprising information relating to the anomaly, to the notification engine 2256. For instance, the message 2254 can be received and stored in an alert metastore 2258 of or associated with the notification engine 2256. The notification engine 2256 can analyze the information relating to the anomaly contained in the message 2254. Based at least in part on the analysis of the information relating to the anomaly, the notification engine 2256 can generate an alert ticket 2260 (e.g., exception or alert ticket) that can comprise information (e.g., details) regarding the anomaly and a request to validate the anomaly and, if there is an actual problem, remediate or resolve the anomaly, as more fully described herein. The notification engine 2256 can communicate the alert ticket 2260 to an appropriate user 2262 (e.g., service representative, such as a product and privacy representative involved in validating and resolving anomalies).

After the user 2262 has validated and/or resolved the anomaly or potential anomaly identified in the alert ticket 2260, the user 2262 can communicate with the notification engine 2256 or other component of the governance platform to inform (e.g., provide update or remediation information to) the notification engine 2256 or other component of the governance platform that the alert ticket 2260 has been addressed (e.g., the anomaly was validated and was resolved or mitigated; or the anomaly turned out to not be valid). The notification engine 2256 (or other component of the governance platform) can send a message 2264, comprising the update or remediation information, to the validation engine 2250 to inform the validation engine 2250 that the alert ticket 2260 has been addressed.

Figure 23:
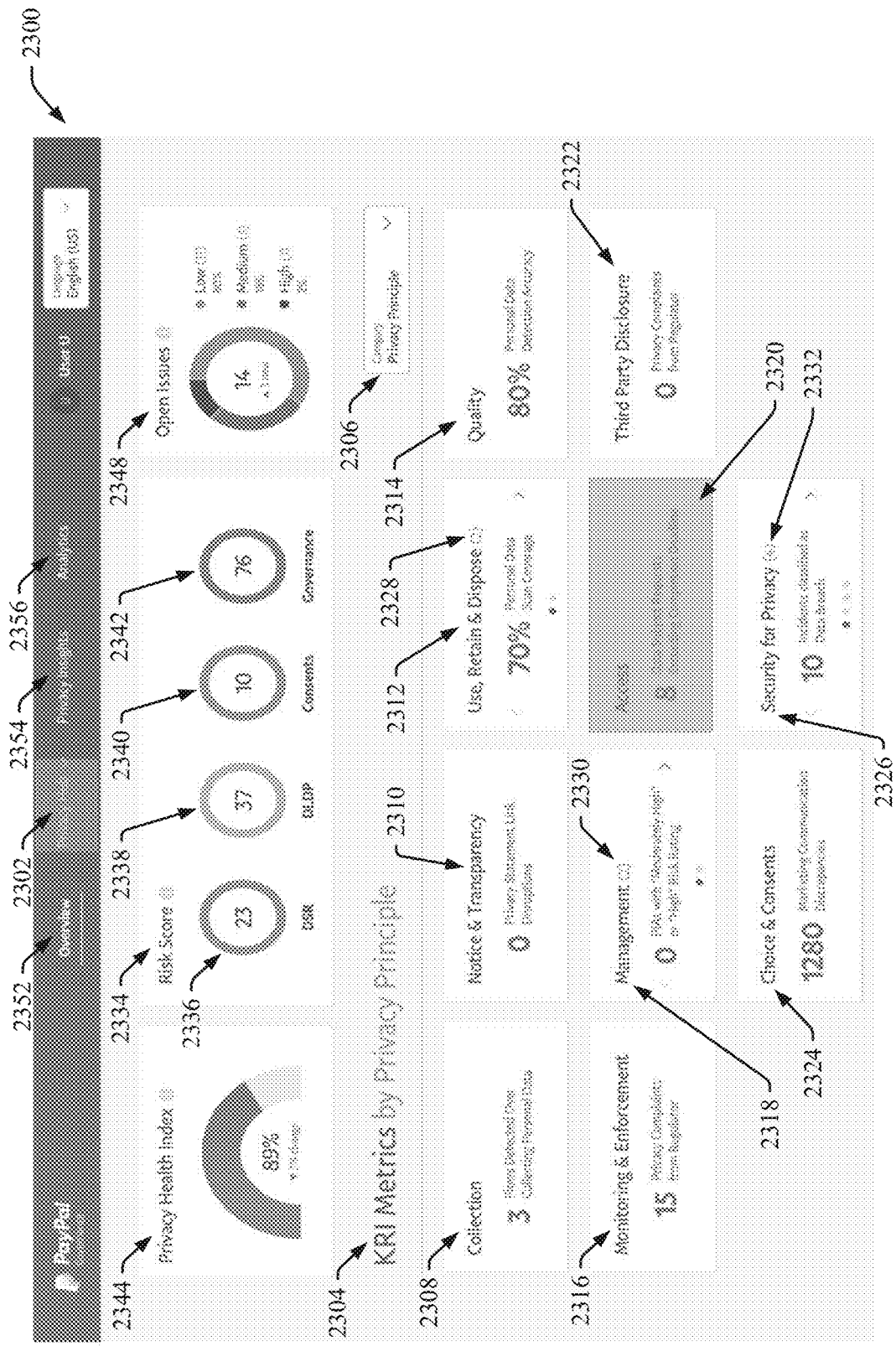
FIG. 23 illustrates a diagram of an example user interface of a privacy hub that can provide information regarding KRI metrics associated with privacy principles, risk scores, a privacy health index, and other information, in accordance with various aspects and embodiments of the disclosed subject matter.

Referring to FIG. 23 (along with FIGS. 7, 8, 10, and 17), FIG. 23 illustrates a diagram of an example user interface 2300 of a privacy hub that can provide information regarding KRI metrics associated with privacy principles, risk scores, a privacy health index, and other information, in accordance with various aspects and embodiments of the disclosed subject matter. The example user interface 2300 can comprise information that can be generated by the governance component 1004. The governance component 1004 and user interface component 728 can provide or facilitate providing the example user interface 2300 to a communication device (e.g., client device), such as communication device 738, for viewing by an authorized user.

The example user interface 2300 can be part of a privacy hub of or associated with the governance component 1004, and can be generated by the governance component 1004 in response to selection of the privacy hub button 2302. The example user interface 2300 can comprise, for example, KRI metrics 2304 by privacy principle. For instance, the user can select a category filter 2306 for privacy principle. Based at least in part on the selected category filter 2306 of privacy principle, the governance component 1004 can provide various KRI metrics 2304 associated with various privacy principles. The privacy principles can comprise, for example, collection 2308, notice and transparency 2310, use, retain and dispose 2312, quality 2314, monitoring and enforcement 2316, management 2318, access 2320, third party disclosure 2322, choice and consents 2324, and security for privacy 2326, such as more fully described herein.

The KRI metrics regarding collection 2308 can indicate, for example, a number (e.g., 3) of flows that have been detected over collecting personal data of users. The governance component 1004 also can provide other desired KRI metrics data regarding collection 2308 via the user interface 2300 or another user interface as well. The KRI metrics regarding notice and transparency 2310 can indicate, for example, that there have been zero privacy statement link disruptions detected (e.g., over a defined period of time, or since that KRI metric was last checked). Thus, there has been no detection of a disruption of the link to the privacy statement that is to be provided to users. As desired, the governance component 1004 also can provide other desired KRI metrics data regarding notice and transparency 2310 via the user interface 2300 or another user interface.

The KRI metrics regarding use, retain and dispose 2312 can indicate, for example, a percentage (e.g., 70%) of personal data scan coverage performed on a set of data stores (e.g., data stores 104, 106, and 108) associated with an entity (e.g., over a defined period of time, or since that KRI metric was last checked). As desired, the governance component 1004 also can provide other desired KRI metrics data regarding use, retain and dispose 2312 via the user interface 2300 or another user interface. For example, the user interface 2300 indicates that there are two items of KRI metrics data regarding use, retain and dispose 2312 (as indicated at reference numeral 2328). The user can select the button for use, retain and dispose 2312 to access and view a second item of KRI metrics data regarding use, retain and dispose 2312 (e.g., a second item that can indicate which particular data stores, or portions thereof, have been scanned for personal data of users, and/or indicate which particular data stores, or portions thereof, remain to be scanned for personal data).

The KRI metrics regarding quality 2314 can indicate, for example, a percentage (e.g., 80%) of personal data detection accuracy attained via the scanning of the set of data stores (e.g., data stores 104, 106, and 108) associated with the entity. As desired, the governance component 1004 also can provide other desired KRI metrics data regarding quality 2314 via the user interface 2300 or another user interface.

The KRI metrics regarding monitoring and enforcement 2316 can indicate, for example, a number (e.g., 15) of privacy complaints from a regulator (e.g., data privacy regulator) in connection with the entity (e.g., over a defined period of time, or since that KRI metric was last checked). The governance component 1004 also can provide other desired KRI metrics data regarding monitoring and enforcement 2316 via the user interface 2300 or another user interface as well.

The KRI metrics regarding management 2318 can indicate, for example, a number (e.g., 0) of PIAs that have a "moderately high" or "high" risk rating. As desired, the governance component 1004 also can provide other desired KRI metrics data regarding management 2318 via the user interface 2300 or another user interface. For example, the user interface 2300 indicates that there are two items of KRI metrics data regarding management 2318 (as indicated at reference numeral 2330). The user can select the button for management 2318 to access and view a second item of KRI metrics data regarding management 2318.

The KRI metrics regarding access 2320 can indicate, for example, that a number (e.g., 8) of data subject requests exceeding the completion deadline in connection with the entity. As desired, the governance component 1004 also can provide other desired KRI metrics data regarding access 2320 via the user interface 2300 or another user interface.

The KRI metrics regarding third party disclosure 2322 can indicate, for example, a number (e.g., 0) of privacy complaints from the regulator regarding sharing of data of users with third party entities, in connection with the entity. As desired, the governance component 1004 also can provide other desired KRI metrics data regarding third party disclosure 2322 via the user interface 2300 or another user interface.

The KRI metrics regarding choice and consents 2324 can indicate, for example, a number (e.g., 1280) of marketing communication discrepancies in connection with the entity. As desired, the governance component 1004 also can provide other desired KRI metrics data regarding choice and consents 2324 via the user interface 2300 or another user interface.

The KRI metrics regarding security for privacy 2326 can indicate, for example, a number (e.g., 10) of incidents classified as data breach associated with an entity (e.g., over a defined period of time, or since that KRI metric was last checked). As desired, the governance component 1004 also can provide other desired KRI metrics data regarding security for privacy 2326 via the user interface 2300 or another user interface. For example, the user interface 2300 indicates that there are four items of KRI metrics data regarding security for privacy 2326 (as indicated at reference numeral 2332). The user can select the button for security for privacy 2326 to access and view a second, third, or fourth item of KRI metrics data regarding security for privacy 2326.

In some embodiments, the governance component 1004 can present, via the user interface 2300, various risk scores 2334 for various platforms and/or privacy principles. For example, the governance component 804 can present, via the user interface 2300, a risk score (e.g., 23) for DSR 2336, a risk score (e.g., 37) for DLDP 2338, a risk score (e.g., 10) for consents 2340, a risk score (e.g., 76) for governance 2342 (e.g., governance platform), and/or other risk scores. The governance component 1004 also can present, via the user interface 2300, a privacy health index (e.g., 89%) 2344 associated with an entity. The governance component 1004 also can present, via the user interface 2300, also can indicate the percentage (e.g., down 3%) of change 2346 in the privacy health index (e.g., over a defined period of time, or since that KRI metric was last checked).

In certain embodiments, the governance component 1004 can present, via the user interface 2300, can present other information (e.g., governance-related information), such as information regarding a number (e.g., 14) of open issues 2348. The governance component 1004 also can present, via the user interface 2300, the respective importance levels 2350 (e.g., low, medium, and high priority or risk levels) of the open issues, and the respective numbers or percentages of open issues at the respective importance levels 2350.

The user also can select an overview button 2352 to obtain overview information relating to governance issues. In response, the governance component 1004 can present, via the user interface 2300 or another interface, the overview information relating to governance issues relating to data of users to the user. As desired, the user also can select a privacy insights button 2354 to access privacy insights information relating to governance. In response, the governance component 1004 can present, via the user interface 2300 or another interface, the privacy insights information relating to governance to the user. The user also can select an analytics button 2356 to access analytics information relating to governance. In response to selection of the analytics button 2356, the governance component 1004 can generate analytics information relating to various analytics performed on data of users and/or information relating to management of data of users (or can access previously generated analytics information), and can present, via the user interface 2300 or another interface, the analytics information to the user.

Figure 24:
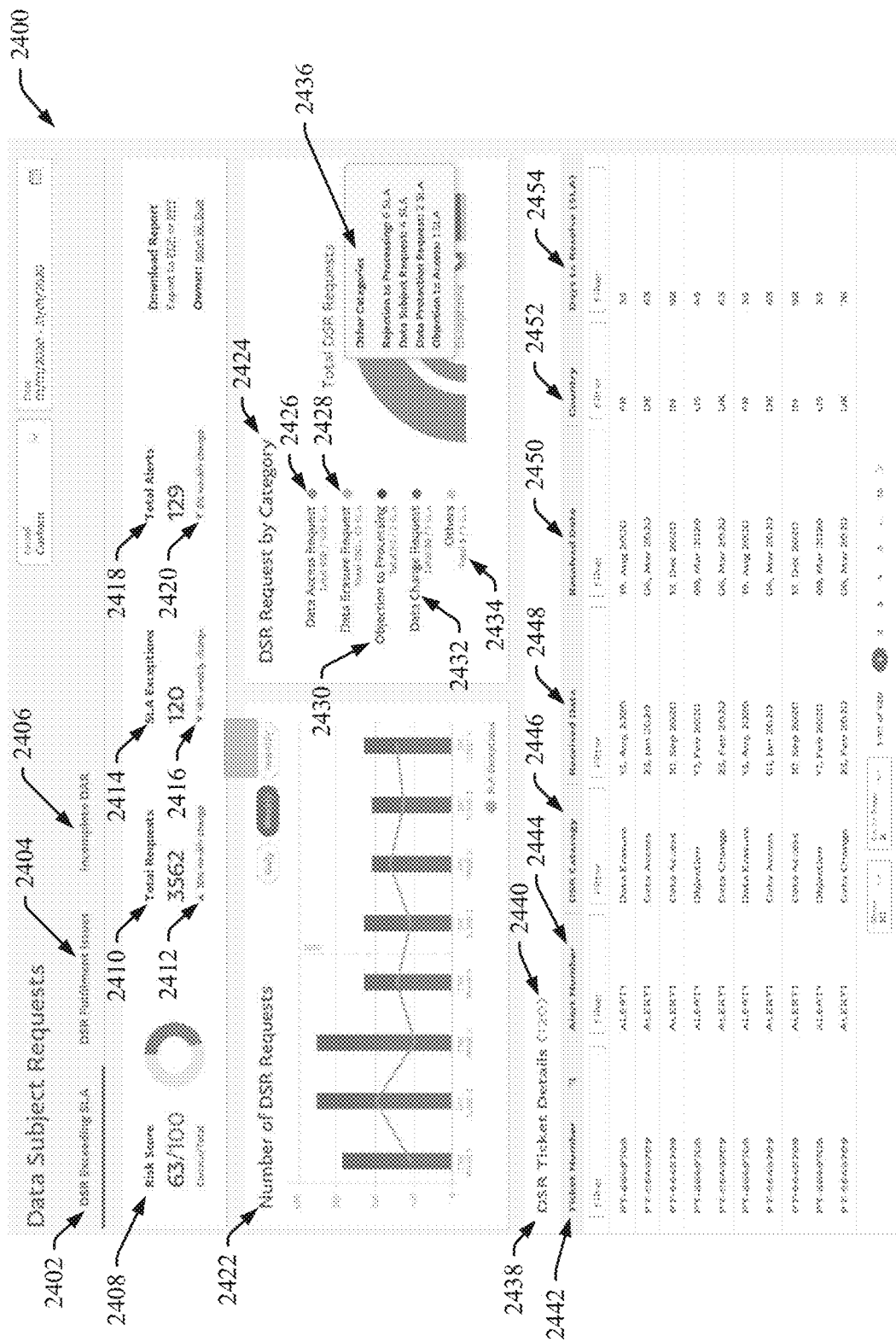
FIG. 24 depicts a diagram of an example user interface that can provide various information regarding data subject requests of users, in accordance with various aspects and embodiments of the disclosed subject matter.

Turning to FIG. 24 (along with FIGS. 7, 8, 10, and 17), FIG. 24 depicts a diagram of an example user interface 2400 that can provide various information regarding data subject requests of users, in accordance with various aspects and embodiments of the disclosed subject matter. The governance component 1004 can determine and generate the various types of information regarding data subject requests of users, based at least in part on an analysis of data of users and/or information relating to management of data of users, including information relating to the processing of data subject requests of users. In the example user interface 2400, DSR exceeding SLA 2402 has been selected, and the user interface 2400 is presenting various items of information relating to DSRs that have exceeded the SLA (e.g., exceeded the time limit to complete DSRs of users, as such time limit is specified by the SLA). As desired, a user also can select DSR fulfillment issues 2404 to obtain information regarding issues that exist with regarding to fulfilling DSR requests or incomplete data access requests (DARs) 2406 to obtain information relating to incomplete DARs.

With further regard to DSR exceeding SLA 2402, the user interface 2400 can present a risk score (e.g., 63/100) 2408 associated with DSRs with regard to an entity, as determined by the governance component 1004. The user interface 2400 also can present a total number (e.g., 3562) of requests 2410 that can provide the total number of DSR requests during the defined time period, and the percentage (e.g., up 20%) of weekly change 2412 in the total number of DSR requests, as determined by the governance component 1004. The user interface 2400 can present a number (e.g., 120) of SLA exceptions 2414 that can indicate the number of exception incidents relating to DSRs (e.g., a number of exception incidents due to DSRs not being completed within the time limit provided in the SLA) during the defined time period, and the percentage (e.g., down 18%) of weekly change 2416 in the number of SLA exceptions, as determined by the governance component 1004. The user interface 2400 further can present a total number (e.g., 129) of alerts 2418 that can indicate the total number of alerts relating to DSRs during the defined time period, and the percentage (e.g., down 6%) of weekly change 2420 in the number of alerts, as determined by the governance component 1004.

The example user interface 2400 also can provide a graph of the number of DSR requests 2422, which, as depicted, can present information regarding the number of DSR requests per week and the number of SLA exceptions per week, over a given time period (e.g., December and January), as such information has been determined by the governance component 804. As desired, the user can view a graph of the number of DSR requests per day or per month.

The governance component 1004 also can determine, and the example user interface 2400 can present, information regarding DSR requests by category 2424, including information regarding data access requests 2426 (e.g., number of data access requests and number of SLA exceptions regarding data access requests), information regarding data erasure requests 2428 (e.g., number of data erasure requests and number of SLA exceptions regarding data erasure requests), information regarding objections to processing 2430 DSRs (e.g., number of objections to processing DSRs and number of SLA exceptions regarding objections to processing DSRs), information regarding data change requests 2432 (e.g., number of data change requests and number of SLA exceptions regarding data change requests), and information regarding other requests 2434 (e.g., number of other types of requests and number of SLA exceptions regarding the other requests). The governance component 1004 further can determine, and the example user interface 2400 can present, information regarding other categories 2436 relating to DSRs, including a number of SLA exceptions relating to rejection to processing DSRs, a number of SLA exceptions relating to DSRs, a number of SLA exceptions relating to data protection requests, and a number of SLA exceptions with regard to objection to access.

In some embodiments, the governance component 1004 can determine, and the example user interface 2400 can present, DSR ticket details 2438 relating to exception tickets for exception incidents relating to DSRs during the given time period. The DSR ticket details 2438 can comprise a number (e.g., 120) of DSR tickets 2440 during the given time period. The DSR ticket details 2438 also can present specific information regarding individual DSR tickets, including, for example, a ticket number 2442 of DSR tickets, an alert number 2444 of DSR tickets, a DSR category 2446 of the DSR tickets (e.g., data access, data erasure, or objection, etc.), a received date 2448 that can indicate the date a DSR ticket was received, a resolved date 2450 that can indicate the date a DSR ticket was resolved, a country 2452 associated with the DSR ticket (e.g., the country where the DSR-related exception occurred), and a number of days to resolve 2454 the SLA exceptions relating to DSRs.

Figure 25:
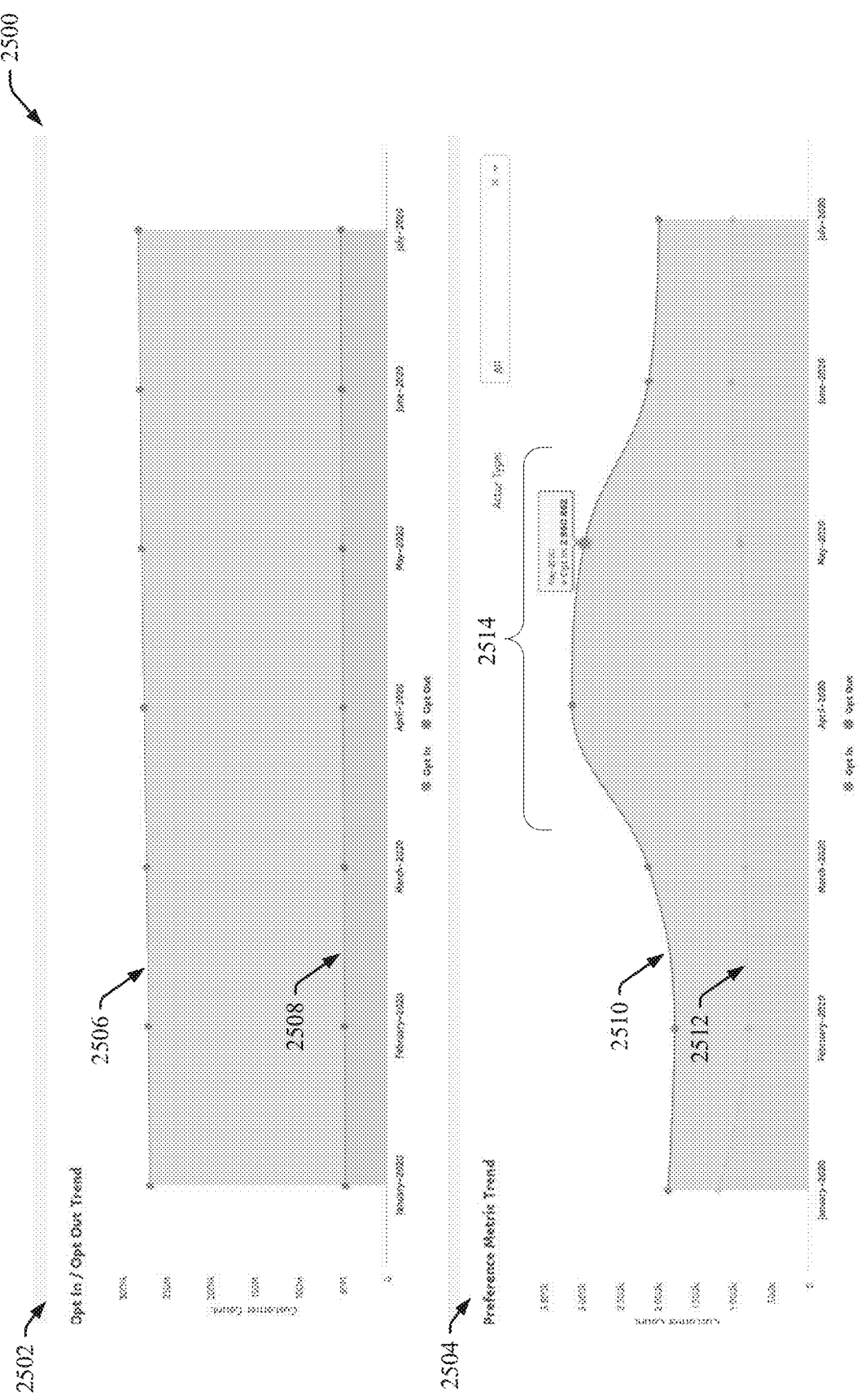
FIG. 25 presents a diagram of example graphs that can provide information regarding certain opt in and opt out trends, in accordance with various aspects and embodiments of the disclosed subject matter.

Referring briefly to FIG. 25 (along with FIGS. 10 and 17), FIG. 25 presents a diagram of example graphs 2500 that can provide information regarding certain opt in and opt out trends, in accordance with various aspects and embodiments of the disclosed subject matter. The governance component 1004 can determine and generate the information regarding opt in and opt out trends, based at least in part on an analysis of information that can indicate, for example, when users (e.g., customers) have opted in to receiving electronic communications from an entity and when users have opted out of receiving electronic communications from the entity, with regard to a given time period.

The example graphs 2500 can comprise an opt in/opt out trend graph 2502 and a preference metric trend graph 2504. The opt in/opt out trend graph 2502 can comprise opt in data 2506 (e.g., in graphical form) that can indicate the total number of users who have opted in to receiving electronic communications from the entity for each month during the given time period and opt out data 2508 (e.g., in graphical form) that can indicate the total number of users who have opted out of receiving electronic communications from the entity for each month during the given time period.

The preference metric trend graph 2504 can comprise monthly opt in data 2510 (e.g., in graphical form) that can indicate, for each month during the given time period, the number of users who have opted in to receiving electronic communications from the entity during that month and monthly opt out data 2512 (e.g., in graphical form) that can indicate, for each month during the given time period, the number of users who have opted out of receiving electronic communications from the entity during that month. As can be observed from the preference metric trend graph 2504, the governance component 1004 can identify, and the preference metric trend graph 2504 can show, any abnormal spikes, such as graph region 2514, in the user opt in/opt out trend, wherein the graph region 2514 can indicate an abnormal spike in the opt in trend data during April and May. If the governance component 1004 (e.g., validation component 1714 of the governance component 1004) determines that an abnormal spike in the number of users opting in during a particular month(s) exceeds a defined threshold number of opt in users, as provided in an applicable rule of the set of rules (e.g., a rule that applies to the entity), the governance component 1004 can generate an exception ticket regarding the anomaly (e.g., the abnormal spike) to initiate validation and/or remediation of the anomaly issue, as more fully described herein.

Figure 26:
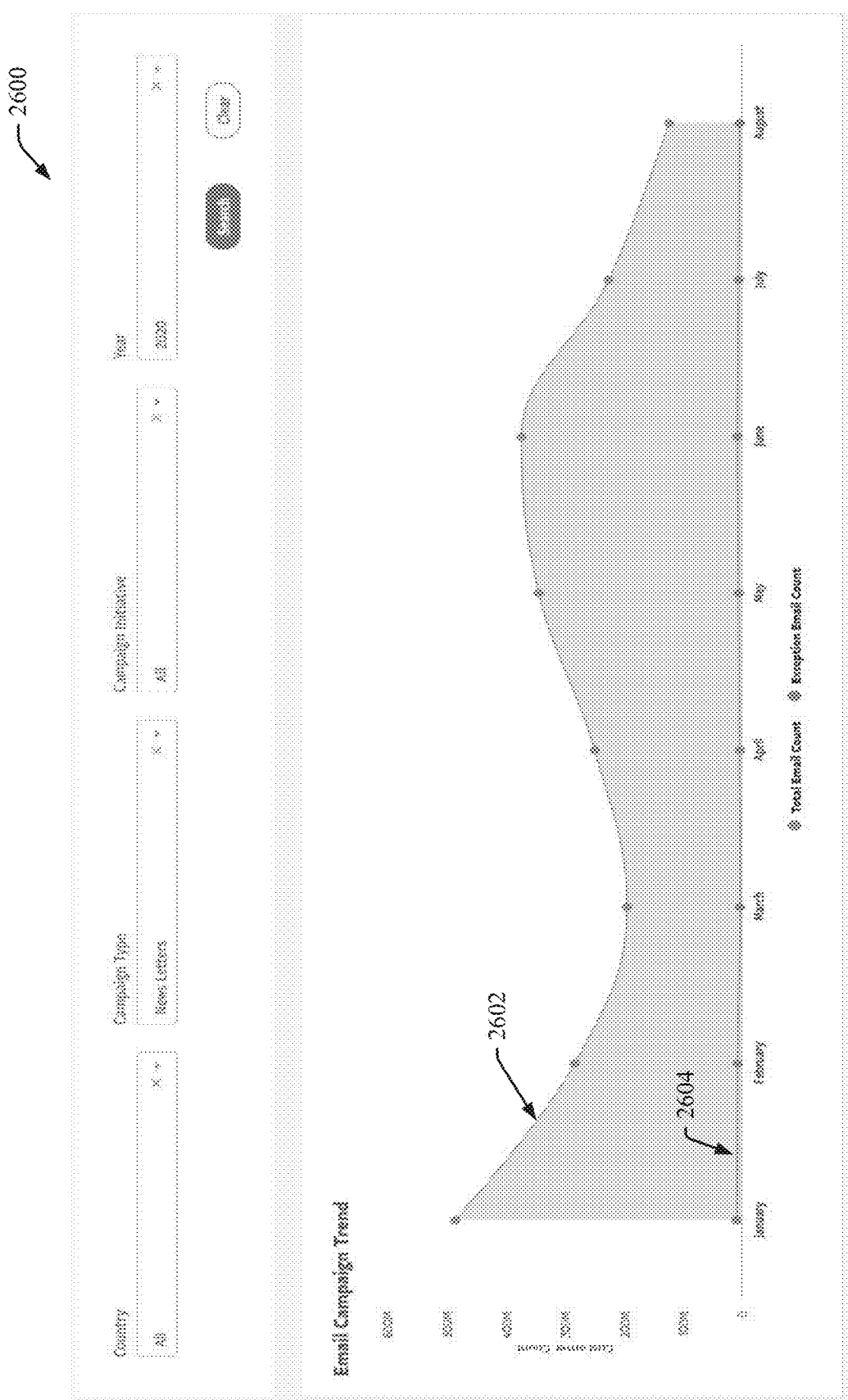
FIG. 26 presents a diagram of an example graph that can provide information regarding marketing opt-out exception incidents in relation to total email messages sent by an entity during a given time period, in accordance with various aspects and embodiments of the disclosed subject matter.

Turning briefly to FIG. 26 (along with FIGS. 10 and 17), FIG. 26 presents a diagram of an example graph 2600 that can provide information regarding marketing opt-out exception incidents in relation to total email messages sent by an entity during a given time period, in accordance with various aspects and embodiments of the disclosed subject matter. The governance component 1004 can determine and generate the information regarding the marketing opt-out exception incidents in relation to the total email messages sent by the entity during the given time period, based at least in part on an analysis of information regarding emails sent to users by the entity each month and exception tickets relating to the sending of emails to users by the entity each month, during the given time period.

The graph 2600 can comprise email count data 2602 (e.g., in graphical form) that can indicate, for each month during the given time period, the total number of emails sent to users by the entity during the month. The graph 2600 also can comprise exception email count data 2604 (e.g., in graphical form) that can indicate, for each month during the given time period, the total number of exception tickets regarding exception incidents arising out of emails improperly sent, or at least potentially improperly sent, to users by the entity during the month. As can be observed from the graph 2600, the number of exception tickets generated each month is relatively and desirably low and also is relatively and desirable steady (e.g., no abnormal spikes).

Figure 27:
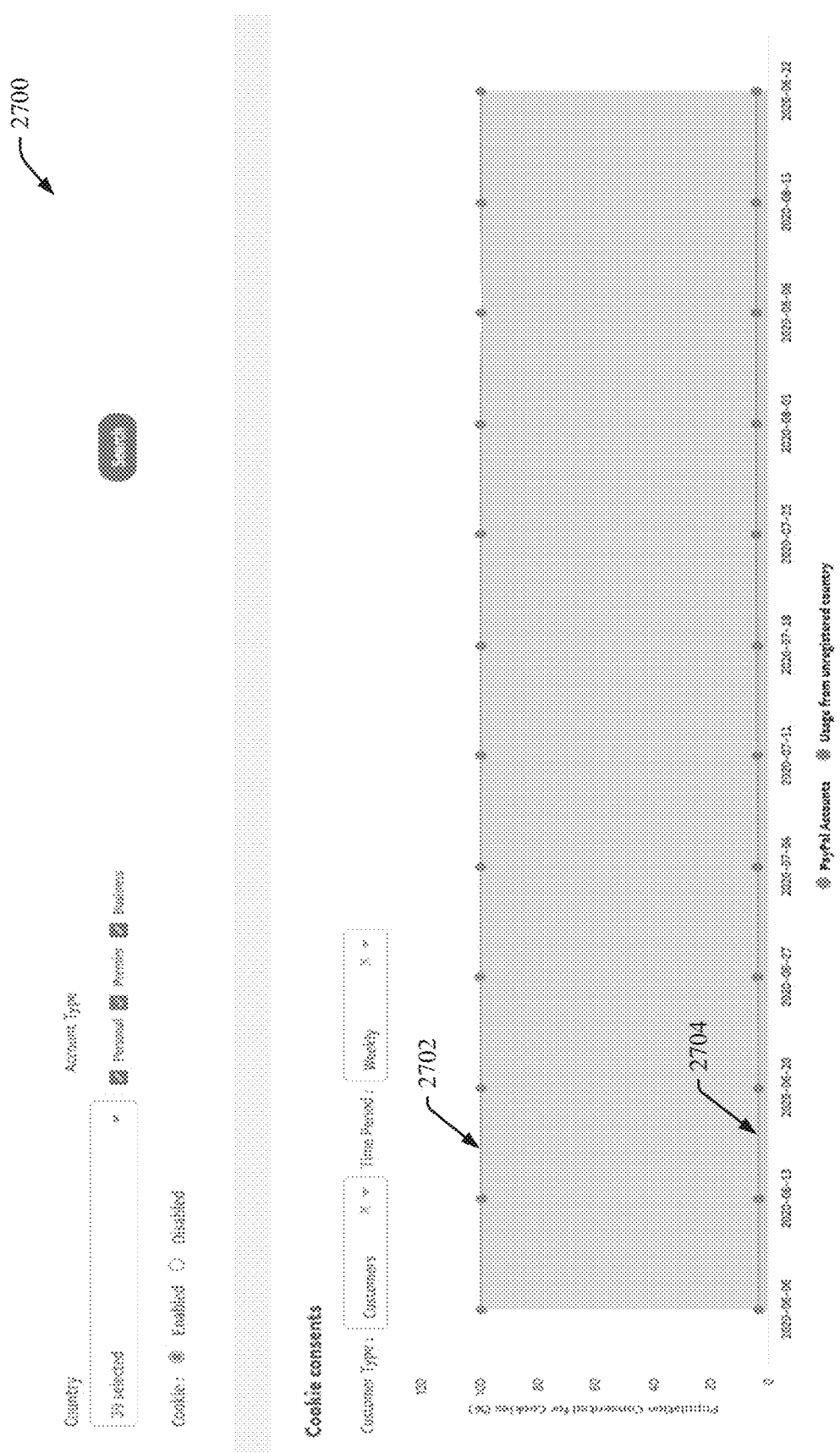
FIG. 27 presents a diagram of an example graph that can provide information regarding cookie consents of users associated with an entity in relation to consents associated with unregistered countries during a given time period, in accordance with various aspects and embodiments of the disclosed subject matter.

Referring briefly to FIG. 27 (along with FIGS. 10 and 17), FIG. 27 presents a diagram of an example graph 2700 that can provide information regarding cookie consents of users associated with an entity in relation to consents associated with unregistered countries during a given time period, in accordance with various aspects and embodiments of the disclosed subject matter. The governance component 1004 can determine and generate the information regarding the cookie consents (e.g., cookie acceptances) of users associated with the entity in relation to consents associated with unregistered countries during the given time period, based at least in part on an analysis of information regarding cookie consents of users associated with entity accounts each month and information regarding consents usage from unregistered countries each month, during the given time period.

The graph 2700 can comprise entity account consent data 2702 (e.g., in graphical form) that can indicate, for each month during the given time period, the percentage of population (e.g., users) who consented for cookies with regard to the entity during the month. The graph 2700 also can comprise usage from unregistered country data 2704 (e.g., in graphical form) that can indicate, for each month during the given time period, a percentage of population who consented for cookies with regard to unregistered countries during the month. As can be observed from the graph 2700, the percentage of population (e.g., users) who consented for cookies with regard to the entity for each month of the given time period is relatively and desirably high (e.g., at or almost 100%) and also is relatively and desirable steady (e.g., no abnormal dips (e.g., declines) in the percentage). As also can be observed from the graph 2700, the percentage of population who consented for cookies with regard to unregistered countries for each month of the given time period is relatively and desirably low (e.g., relatively close to 0%) and also is relatively and desirable steady (e.g., no abnormal spikes in the percentage).

Figure 28:
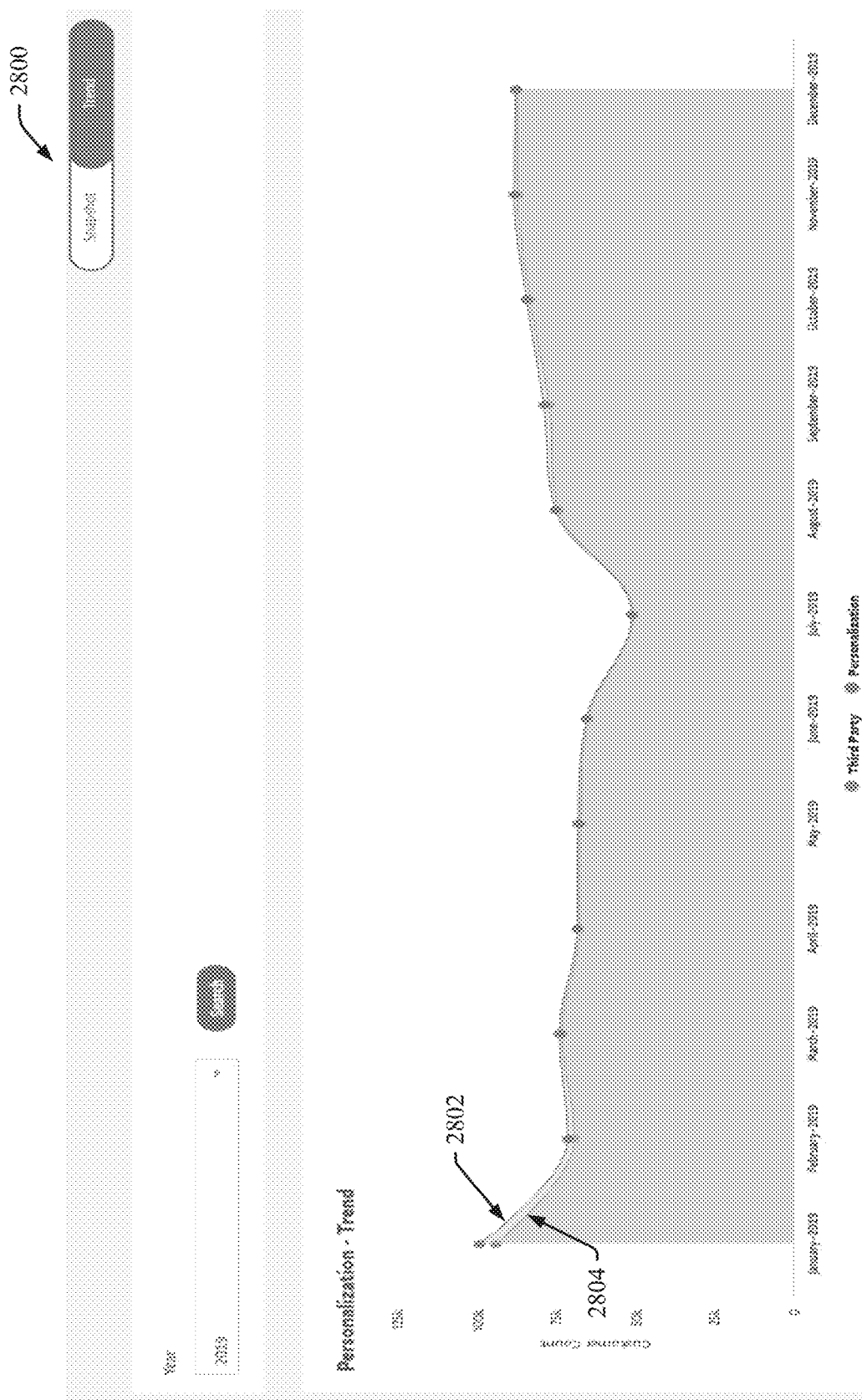
FIG. 28 presents a diagram of an example graph that can provide information regarding a personalization trend within an entity and third party entities during a given time period, in accordance with various aspects and embodiments of the disclosed subject matter.

Turning briefly to FIG. 28 (along with FIGS. 10 and 17), FIG. 28 presents a diagram of an example graph 2800 that can provide information regarding a personalization trend within an entity and third party entities during a given time period, in accordance with various aspects and embodiments of the disclosed subject matter. The governance component 1004 can determine and generate the information regarding the personalization trend associated with personalization with regard to users (e.g., customers) within the entity and third party entities (e.g., third party merchants) during the given time period, based at least in part on an analysis of information relating to personalization associated with users (e.g., personalization of experience for users through the tracking, collection, and use of personal data of users) within the entity and third party entities each month, during the given time period.

The graph 2800 can comprise entity-related customer personalization count data 2802 (e.g., in graphical form) that can indicate, for each month during the given time period, the number of customers (e.g., users) who consented to personalization (e.g., by giving one or more consents to allow the entity to track, collect, and use their personal data) with the entity during the month. The graph 2800 also can comprise third party entity-related customer personalization count data 2804 (e.g., in graphical form) that can indicate, for each month during the given time period, the number of customers who consented to personalization with third party entities during the month. As can be observed from the graph 2800, the number of customers who consented to personalization with the entity for each month is substantially consistent with the number of customers who consented to personalization with third party entities for that month. This can indicate that there are no abnormalities, or at least it is likely that there are no abnormalities, with regard to personalization for users within the entity or personalization for users within third party entities. Had there been a significant difference between the entity-related customer personalization count data 2802 and the third party entity-related customer personalization count data 2804 for a particular month, such significant difference may have been an indication that there was an abnormality with regard to personalization for users within the entity and/or with regard to personalization for users within third party entities.

Figure 29:
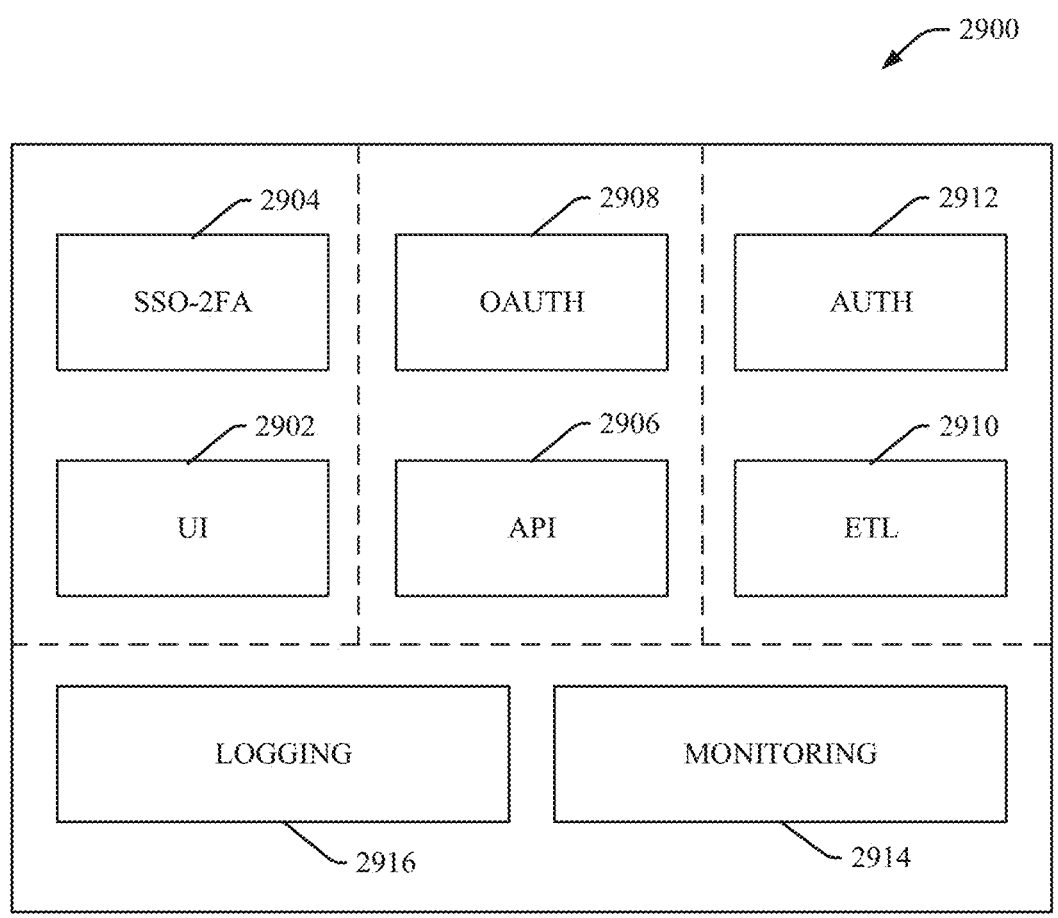
FIG. 29 depicts a block diagram of an example system that can be employed by the DLDP and its constituent or associated platforms to facilitate managing data of users, in accordance with various aspects and embodiments of the disclosed subject matter.

FIG. 29 depicts a block diagram of an example system 2900 that can be employed by the DLDP and its constituent or associated platforms to facilitate managing data of users, in accordance with various aspects and embodiments of the disclosed subject matter. The system 2900 can have a modular design that can enable flexibility to develop and roll out individual components as separate modules. The modular design of system 2900 can enable targeted adaptation of modules for external environments. The decoupled architecture, which can be enabled by employing a modular design, can provide desirable flexibility to develop interoperable modules independently.

The system 2900 can comprise a user interface component 2902 (UI) that can generate and provide various desired user interfaces that can enable users, when authenticated and as permitted, to access, perceive (e.g., view, hear, or otherwise experience), and retrieve data, including their data and information relating to their data, and/or data of other users and information relating to data of other users. The various desired user interfaces can comprise, for example, the various user interfaces described herein.

The system 2900 can employ desirable authentication protocols, technologies, and algorithms to facilitate secure authentication of users attempting to access the DLDP and its constituent or associated platforms, and access data of or relating to users. In accordance with various embodiments, the system 2900 can comprise single sign-on and two-factor authentication component 2904 (SSO-2FA). Single sign on can allow users to authenticate with and gain access to the DLDP, its constituent or associated platforms, and/or associated applications through a single log in by presenting appropriate (e.g., valid) authentication credentials (e.g., username, password, passcode, personal identification number (PIN), or biometric identification information, etc.). Two-factor authentication (or multi-factor authentication) can allow users to authenticate with and gain access to the DLDP, its constituent or associated platforms, and/or associated applications through a two-factor (or multi-factor) authentication process by presenting two (or more) types of appropriate authentication credentials (e.g., username/password, passcode, personal identification number (PIN), biometric identification information, authentication token or key, authentication credentials via a device, such as a smart phone, or user providing answers to personal questions, etc.).

The system 2900 can employ an API component 2906 (API) that can comprise various APIs that can be utilized to enable desirable interfacing and communication of information between various components (e.g., secure data store, UI component, data management component, governance platform, rights management platform, or notification component, etc.) of or associated with the DLDP, in accordance with various protocols and data formats supported by the API component 2906, such as described herein.

The system 2900 also can employ an open authorization component 2908 (OAUTH) that can provide applications, websites, and services, when authorized and/or authenticated, secure designated access to data of users. The OAUTH 2908 can be or comprise an open-standard authorization protocol or framework that can enable an application, website, or service, when authorized by a user, to access data of the user via the DLDP, its constituent or associated platforms (e.g., governance platform, or rights management platform, etc.), or associated data stores, without the user having to provide the application, website, or service the user's authentication credentials. In certain embodiments, the application, website, or service can utilize an authorization token to prove its identity and prove that it is authorized to access the data of the user via the DLDP, its constituent or associated platforms, or associated data stores.

The system 2900 can comprise an ETL component 2910 (ETL) that can employ an ETL process (e.g., ETL batch process) and/or can comprise an ETL server that can utilize an ETL process, wherein the ETL process and/or ETL server can facilitate reading and transferring scan results from a scanner component of or associated with the DLDP to the batch server component. The ETL process of the ETL component 2910 can integrate or combine data from multiple data sources into a single, consistent set of data that can be stored in a desired data store or communicated to a desired component of or associated with the DLDP. During the extraction operation of the ETL process, data can be copied and/or communicated from the source locations of the data to a staging area, wherein the data can be structured data or unstructured data (e.g., information contained in or associated with emails; image data (e.g., visual images, such as digital images, photographs, video images, or other type of image data); or other type of unstructured data), and wherein the source locations (e.g., server, data store, system, file, email, or web page, etc.) can be structured or unstructured. In the staging area, the extracted data (e.g., raw data) can be transformed to convert or format the data to a form that can be useful or suitable for analysis (e.g., by the DLDP, governance platform, or rights management platform, etc.) or to conform to a schema of a data store (e.g., relational database stored in a data store) in which the transformed data can be stored. The transformation of the data can comprise, for example, formatting, filtering, validating, authenticating, translating, summarizing, performing calculations on, encrypting or performing a data security or cryptographic process on, and/or normalizing the data. During the load operation, the transformed data can be transferred from the stage area to the target destination, which can be a data store or a component of or associated with the DLDP.

The system 2900 also can include an authentication component 2912 (AUTH) that can employ desired authentication protocols, techniques, keys, or algorithms, for example, in connection with the ETL component 2910. The authentication component 2912 can be employed to authenticate data during the transformation operation and/or authenticate with a component or interface (e.g., API) during the extraction operation to extract data via a component or interface.

The system 2900 also can include a monitoring component 2914 that can monitor activity, data traffic, operations, etc., of or associated with the DLDP, its constituent or associated platforms, data stores associated with the DLDP, or other components (e.g., scanner component, docker component, bug tracking component, or artificial intelligence component, etc.), devices (e.g., communication device), or systems associated with the DLDP. For instance, the monitoring component 2914 can monitor operations, activity, and data traffic associated with the UI component 2902, API component 2906, and ETL component 2910, as well as other desired components.

The system 2900 further can comprise a logging component 2916 that can log information relating to events of or associated with the DLDP, its constituent or associated platforms, data stores associated with the DLDP, or other components, devices, or systems associated with the DLDP. The logging component 2916 can log the time of an event, operations that were performed during or in connection with an event, errors associated with an event, components or devices associated with an event, or other desired information relating to an event. The logging component 2916 can store the information relating to events in log files, which can be stored in a desired data store.

The code for UI component 2902, API component 2906, and the common data privacy model employed by the system 2900 (e.g., employed by the DLDP and its constituent or associated platforms) can be independently designed to enable the relevant modules to be changed, modified, or replaced to enhance the performance, operation, and functionality of the modules employed in the system 2900 and, accordingly, enhance the performance, operation, and functionality of the system 2900 overall.

Figure 30:
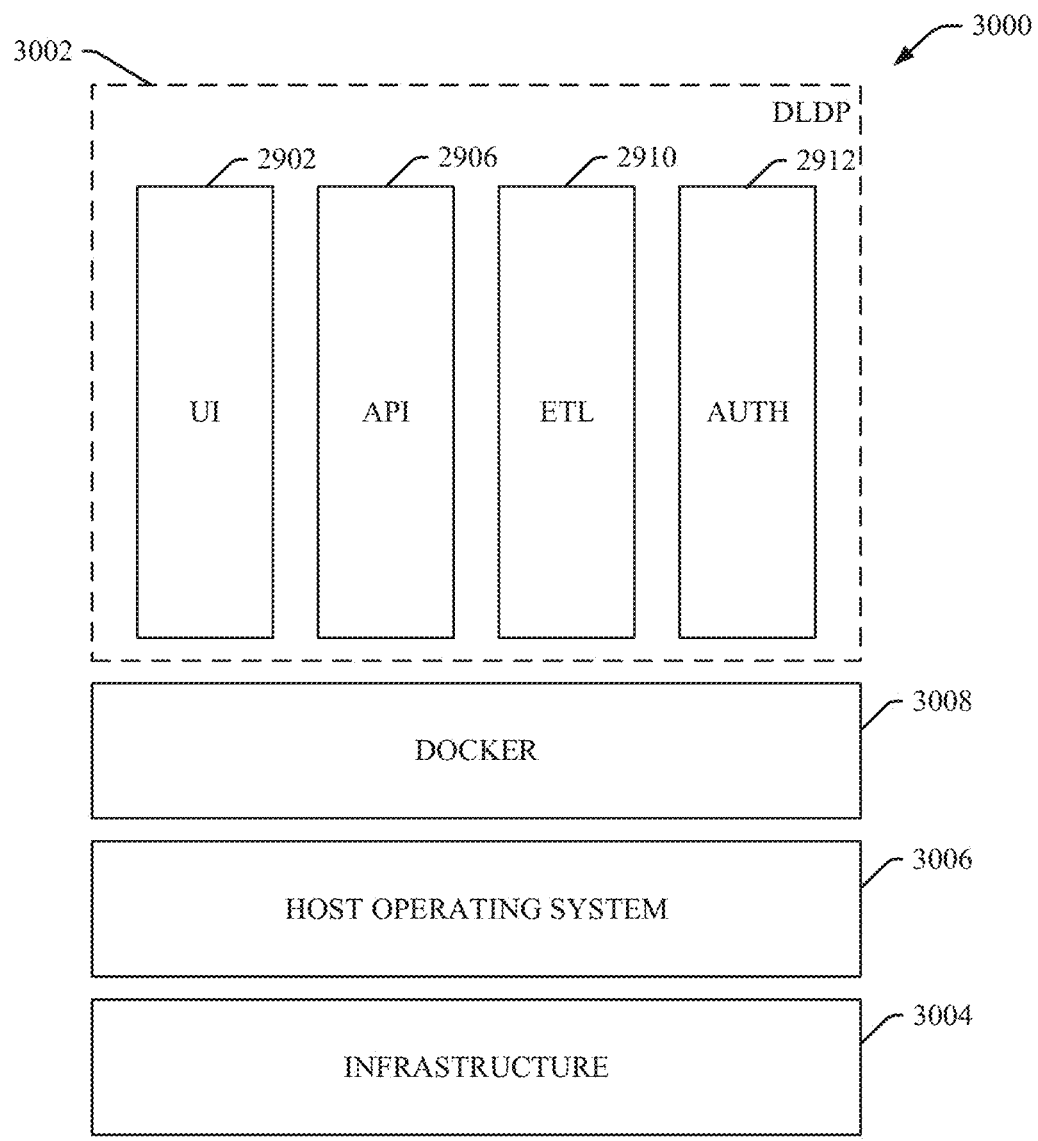
FIG. 30 depicts a block diagram of an example system that can comprise a DLDP that can utilize containerized application technology, in accordance with various aspects and embodiments of the disclosed subject matter.

FIG. 30 depicts a block diagram of an example system 3000 that can comprise a DLDP that can utilize containerized application technology, in accordance with various aspects and embodiments of the disclosed subject matter.

The example system 3000 can comprise a DLDP 3002 that can perform data discovery and data tracking in a secure and efficient manner to facilitate desirable data protection of the data of users and information relating thereto, in accordance with the defined data management criteria, as more fully described herein. Every module of the application employed by the DLDP 3002 can be deployed as a container. Based on the infrastructure capacity of or associated with the system 3000, including the DLDP 3002, the deployment of the modules of the application as containers can be desirably bundled to enable more efficient use of the resources of the system 3000. The DLDP 3002 or another component associated therewith can generate and maintain a configuration file that can comprise information relating to, and that can define, application dependencies and deployment (e.g., deployment of modules of the application as containers), and can utilize (e.g., execute) the configuration file for automated deployment of the modules of the application as containers.

The DLDP 3002 can comprise the UI component 2902, API component 2906, ETL component 2910, and authentication component 2912, and/or other components, and each component can comprise respective functionality, such as more fully described herein. The system 3000 can include infrastructure 3004 that can be utilized to implement and provide resources to the DLDP 3002 and other components, devices, or sub-systems of the system 3000 to enable the operation of the DLDP 3002 and the other components, devices, or sub-systems of the system 3000. In some embodiments, the infrastructure 3004 can comprise one or more computer systems, servers, interfaces, and/or peripheral components, etc., that can provide the desired resources to the DLDP 3002 and other components, devices, or sub-systems of the system 3000, wherein the one or more computer systems, servers, interfaces, and/or peripheral components, etc., can be as more fully described herein. In some embodiments, all or part of the system 3000, including all or part of the infrastructure 3004, can be located in a cloud computing environment.

The system 3000 also can comprise a host operating system 3006 that can be associated with and can operate on the infrastructure 3004. The host operating system 3006 can comprise software components (e.g., software code) that can interact with on operate on the infrastructure 3004 (e.g., computer hardware of the infrastructure 3004) to facilitate performing various computing operations. The host operating system 3006 can be the primary operating system that can be installed on a hard drive of the computer (e.g., of the infrastructure 3004). In some embodiments, the system 3000 also can comprise one or more virtual operating systems (not shown) that can operate within or in association with the host operating system 3006. The host operating system 3006 can utilize container-based virtualization, wherein modules of the application(s) can be deployed as containers, such as described herein. Containers can allow applications on a server to share the same operating system kernel, while also still being able to provide desirable hardware isolation between the applications.

The system 3000 further can comprise a docker component 3008 that can be associated with and can operate on the host operating system 3006. The docker component 3008 can comprise all or a desired portion of the docker functionality of the docker host, docker image, docker registry, docker pull, docker build, docker run, and/or docker file, etc., to facilitate generating and implementing desired containers (e.g., docker containers) for applications, such as more fully described herein. In accordance with various embodiments, one or more components of the DLDP 3002, and/or its constituent or associated platforms (e.g., governance platform, or rights management platform, etc.), including, for example, all or part of the UI component 2902, API component 2906, ETL component 2910, and/or authentication component 2912 can be implemented as individual or independent containers.

Figure 31:
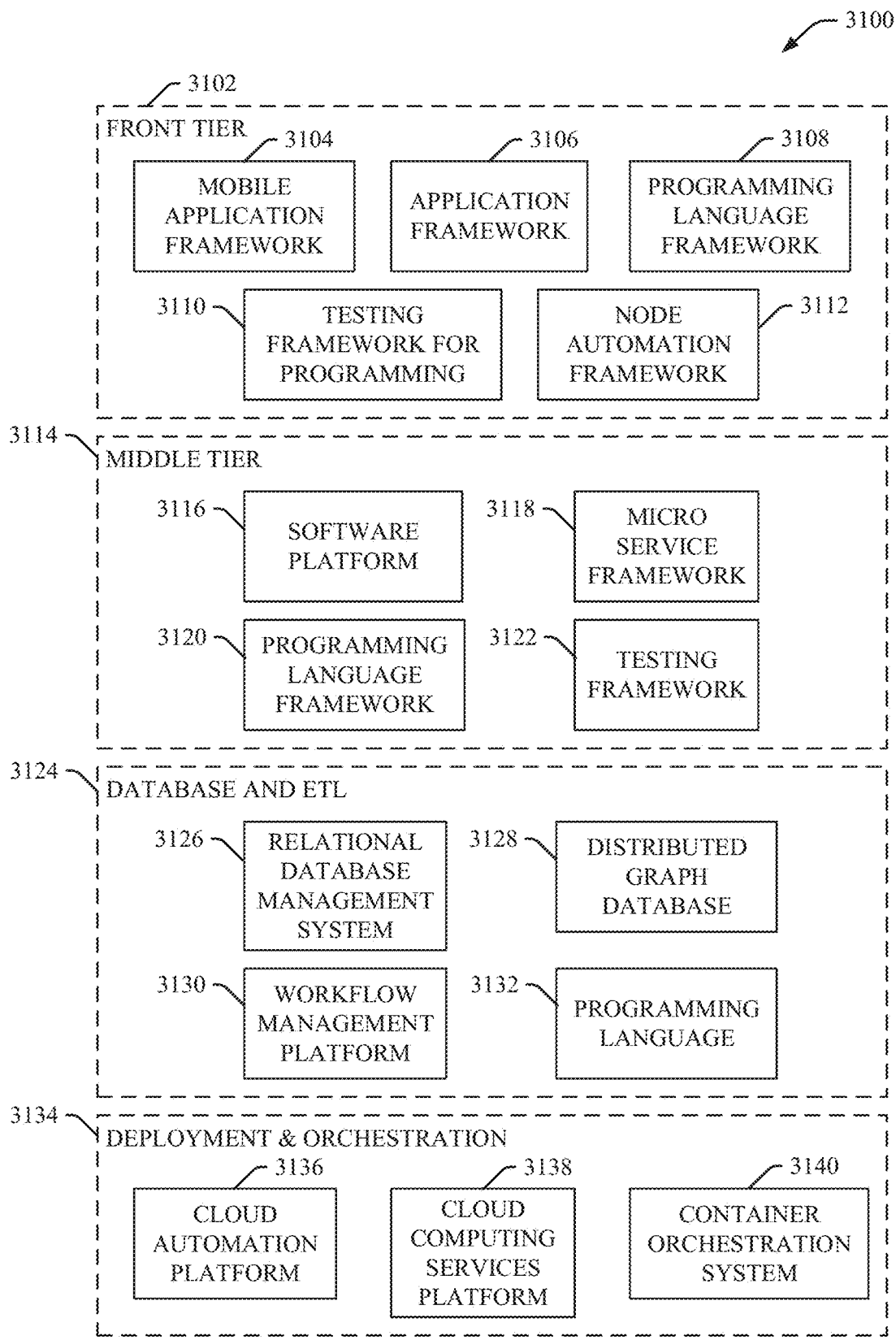
FIG. 31 illustrates a block diagram of an example open source stack that can be employed by the DLDP and its constituent or associated platforms, in accordance with various aspects and embodiments of the disclosed subject matter.

FIG. 31 illustrates a block diagram of an example open source stack 3100 that can be employed by the DLDP and its constituent or associated platforms, in accordance with various aspects and embodiments of the disclosed subject matter. The DLDP and its constituent or associated platforms can be built or formed on an approved and supported open source stack 3100 to take advantage of the cutting edge developments in software and infrastructure.

The open source stack can comprise a front tier 3102 that can include a mobile application framework 3104, an application framework 3106, a programming language framework 3108, a testing framework for programming 3110, and a node automation framework 3112. The mobile application framework 3104 can be utilized to develop applications (e.g., mobile applications) for mobile devices and mobile device operating system platforms (e.g., iOS, Android, Web, or Universal Windows Platform (UWP)). In some embodiments, the mobile application framework 3104 can be an open-source mobile application framework. The application framework 3106 can comprise a web application framework that can be utilized to develop web applications for communication devices (e.g., computers, servers, Internet of Things (IoT) devices, or other devices). The programming language framework 3108 can employ a programming language, a programming language engine, APIs, programming language libraries, and/or other components that can be utilized to facilitate developing and running applications, such as web-based applications. The testing framework for programming 3110 can facilitate ensuring correctness or integrity of a programming codebase. The testing framework for programming 3110 can be utilized to generate tests that can be utilized to test the correctness or integrity of a programming codebase, wherein an API can be utilized to facilitate developing the tests. The node automation framework 3112 can be an open-source node.js automation framework comprising tools, including browser testing tools, that can be utilized to add automation to node.js web projects and applications, for example, to facilitate testing of such web projects and applications. In accordance with various embodiments, the front tier 3102 can employ, for example, React Native, Paypal Kraken, JavaScript (JS), Jest, Nemo.js, and/or other desired frameworks. For instance, the user interface component can utilize Kraken or another desired type of application framework to facilitate generating and providing (e.g., presenting) desired user interfaces.

The open source stack 3100 can include a middle tier 3114 that can comprise a software platform 3116, a micro service framework 3118, a programming language framework 3120, and a testing framework 3122. The software platform 3116 can be utilized to develop applications and deploy applications in a computing environment. The software platform 3116 can be utilized in a variety of desired computing platforms. The micro service framework 3118 can be utilized to create applications and associated micro services. The micro service framework 3118 can be an open source Java-based framework that can be used to develop the micro services. The programming language framework 3120 can comprise an open-source data query and manipulation language that can be used for APIs. The programming language framework 3120 can be utilized to facilitate efficiently processing (e.g., responding to) queries and accessing data and/or the related information from a desired data source (e.g., data store). The testing framework 3122 can be an open-source testing framework that can be utilized for software platforms, such as, for example, Java. In accordance with various embodiments, the middle tier 3114 can employ, for example, Java, Springboot, GraphQL, Mockito, and/or other desired platforms or frameworks. For instance, various APIs and services described herein can utilize open-source Java and Springboot.

The open source stack 3100 also can include a database and ETL 3124, which can comprise a relational database management system 3126, a distributed graph database 3128, a workflow management platform 3130, and a programming language 3132. The relational database management system 3126 can be utilized for relational databases, such as relational databases that can be stored in a data store of an entity or in the secure data store of the DLDP. In some embodiments, the relational database management system 3126 can be an open-source relational database management system. The distributed graph database 3128 can be an open-source, distributed, and/or scalable graph database that can be utilized for storing and querying graphs, including relatively large graphs comprises a large number (e.g., thousands, millions, or billions) of vertices and edges distributed across a multi-machine cluster. The workflow management platform 3130 can be an open-source workflow management platform that can programmatically author, schedule, and monitor workflows and tasks, such as workflows or tasks of or associated with the DLDP or its constituent or associated platforms. The programming language 3132 can be a desired high level and general purpose programming language. The programming language 3132 can be a multi-paradigm programming language that can support object-oriented programming, structured programming, functional programming, and/or aspect-oriented programming. In accordance with various embodiments, the database and ETL 3124 can employ, for example, Percona server, JanusGraph, Apache Airflow, Python, and/or other desired database and ETL functions, systems, and databases. For instance, the back end of the DLDP can employ open-source Percona for MySQL.

The open source stack 3100 can further comprise deployment and orchestration 3134 that can include cloud automation platform 3136, a cloud computing services platform 3138, and a container orchestration system 3140. The cloud automation platform 3136 can be used for process automation, such as automation of business processes, and can comprise a desirable process management environment, which can include a design-time environment and a runtime environment, wherein the process management environment can include development, testing, production, and management of processes that can be performed in the cloud. The cloud computing services platform 3138 can provide a suite of cloud computing services, which can be modular cloud services that can include, for example, various services relating to computing, data storage, data analytics, and machine learning, and also can provide various management tools. The container orchestration system 3140 can be an open-source container orchestration system that can automate application deployment, scaling, and management (e.g., management of containerized workloads and services). For instance, the container orchestration system 3140 can facilitate automating deployment, scaling, and operations of application containers. The container orchestration system 3140 can comprise a variety of services, support, and tools that can facilitate such automating of application deployment, scaling, and management. In accordance with various embodiments, the deployment and orchestration 3134 can comprise and utilize Process Cloud Service (PCS), Google Cloud, Kubernetes, or other desired platforms and systems for deployment and orchestration associated with the DLDP and its constituent or associated platforms (e.g., governance platform, or rights management platform, etc.).

The open source stack 3100 can provide a variety of benefits, such as, for example, desirable flexibility and agility in forming the DLDP and its constituent or associated platforms, cost effectiveness, utilization of productive and cutting edge industry technologies, and desirable externalization.

Figure 32:
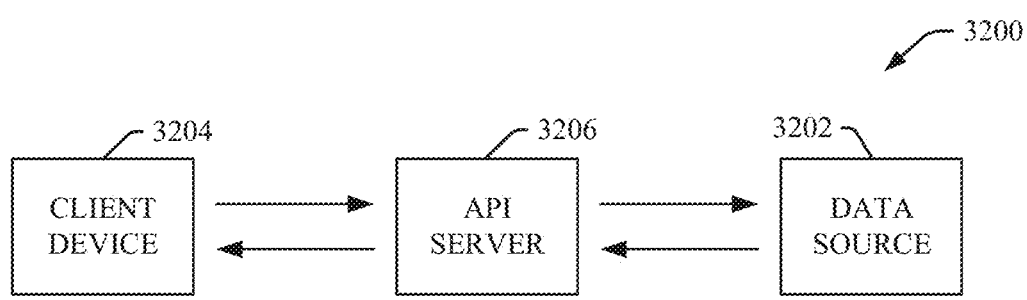
FIG. 32 illustrates a block diagram of an example system that can employ an application programming interface (API) and server to facilitate enabling client applications and devices to query and access data, to facilitate desirable processing and communication of data of users in connection with the DLDP, in accordance with various aspects and embodiments of the disclosed subject matter.

FIG. 32 illustrates a block diagram of an example system 3200 that can employ an API and server to facilitate enabling client applications and devices to query and access data, to facilitate desirable processing and communication of data of users in connection with the DLDP, in accordance with various aspects and embodiments of the disclosed subject matter. The system 3200 can comprise a data source 3202, which can be or can comprise one or more data stores associated with an entity, such as described herein. The data source 3202 can store data of users and information relating to the data of users (e.g., information derived from the processing of data of users or otherwise based at least in part on the data of users). The system 3200 also can comprise a client device 3204 that can comprise and/or utilize a client application to access data of users and/or information relating to the data of users from the data source 3202, for example, as the client device 3204 or associated user is permitted (e.g., authorized) to access such data and/or related information.

To enable desirable access to the data and/or related information, the system 3200 further can comprise an API server component 3206 that can be associated with (e.g., communicatively connected to) the data source 3202 and the client device 3204. The API server component 3206 can be part of the DLDP (not shown in FIG. 32; and as more fully described herein). In some embodiments, the API server component 3206 can be a GraphQL server that can utilize a GraphQL language, which can be an open-source data query and manipulation language that can be used for APIs of the system 3200, and can be utilized to facilitate processing (e.g., responding to) queries and accessing data and/or the related information from the data source 3202. In other embodiments, another desired data query and data manipulation language and protocol can be utilized for the APIs of the system 3200. The user interfaces and APIs of the various modules of the DLDP and its constituent or associated platforms (e.g., governance component, or rights management component, etc.) can be integrated using GraphQL or other desired data query and data manipulation language and protocol. Employing GraphQL or the other desired data query and data manipulation language and protocol can provide a desirable (e.g., robust or powerful) capability to expose and manipulate the underlying data from the data source 3202 to desirably satisfy (e.g., to desirably suit or meet) the data, business, or personal demands (e.g., wants, desires, or needs) of users.

In response to a data request or query for data of users and/or related information received from the client device 3204, the API server component 3206 can desirably process the data request or query to efficiently retrieve desired data of users and/or related information that can be responsive to the data request or query from the data source 3202 (which can comprise one or more data sources in one or more locations) without retrieving or providing extraneous or undesired data (or at least substantially minimizing or mitigating the retrieving and communicating of extraneous or undesired data) in response to the data request or query. The API server component 3206 can provide the desired data and/or related information responsive to the data request or query to the client device 3204.

Employing the API server component 3206 can provide a number of benefits. For instance, there can be increased API reusability. There can be no, or at least minimal, over-fetching and under-fetching of data and/or related information from the data source 3202. The API server component 3206, by employing GraphQL or other language and protocol, can allow users to select and choose the fields in the response object with regard to a data request or query. Since there can be no, or at least minimal, over-fetching and under-fetching of data and/or related information from the data source 3202, network data traffic can be desirably reduced. Another benefit can be that the API server component 3206, by employing GraphQL or other language and protocol, can enable validation and type-checking of fields to be inbuilt. Also, there can be desirable developer productivity through enhanced (e.g., improved, easier, or more efficient) API exploration. Tools, such as GraphQL or the other desired language and protocol that can be employed by the API server component 3206, can enable developers to desirably (e.g., quickly and efficiently) understand and be effective in using the APIs of the system 3200.

Figure 33:
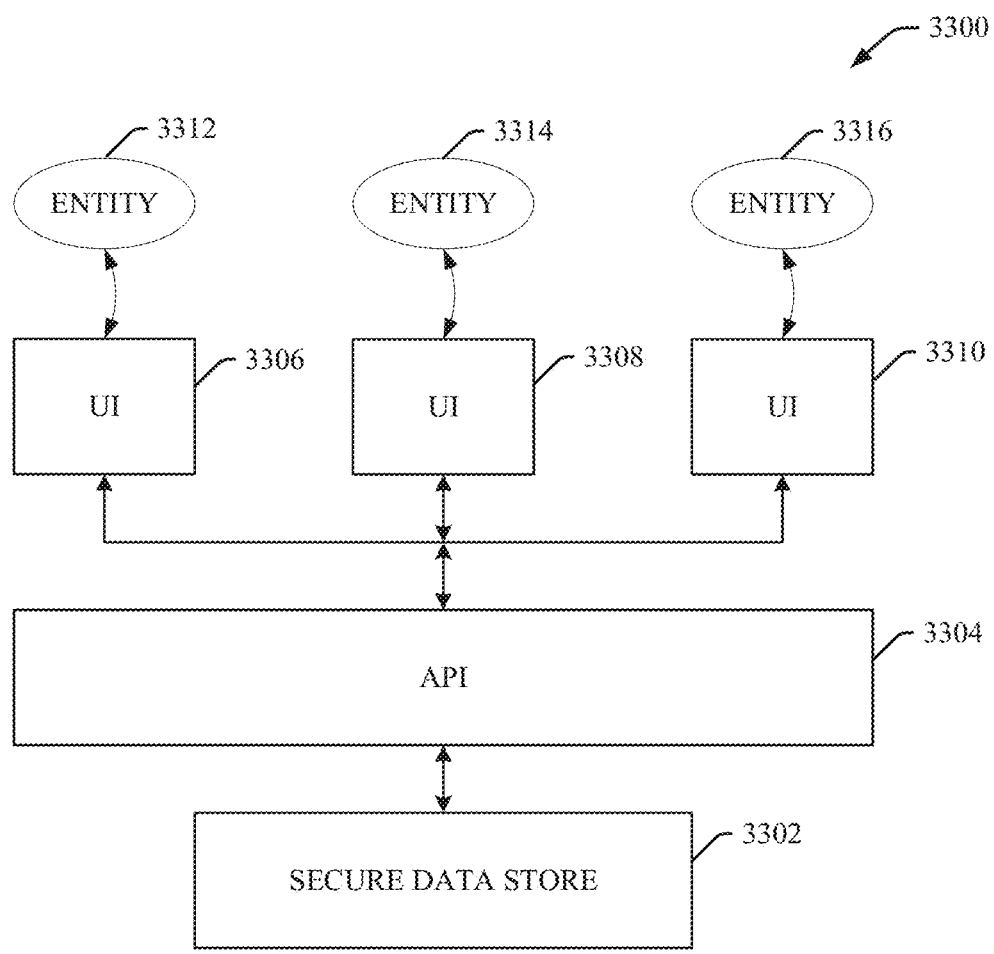
FIG. 33 depicts a block diagram of an example system that can support multiple tenant entities to facilitate desirably managing data of users and information relating thereto with regard to multiple tenant entities associated with the DLDP, in accordance with various aspects and embodiments of the disclosed subject matter.

FIG. 33 depicts a block diagram of an example system 3300 that can support multiple tenant entities to facilitate desirably managing data of users and information relating thereto with regard to multiple tenant entities associated with the DLDP, in accordance with various aspects and embodiments of the disclosed subject matter. The system 3300 can comprise a multi-tenant data store 3302 that can store data of users and/or information relating to the data of users, which can be collected or derived in connection with multiple tenant entities (e.g., multiple organizations, business, or merchants), wherein respective users can be associated with respective entities. The multi-tenant data store 3302 can be associated with (e.g., communicatively connected to) or part of the DLDP, as more fully described herein. The multi-tenant data store 3302 can be designed or structured to support a centralized data aggregation model to facilitate supporting multiple tenant entities.

The system 3300 also can comprise an API component 3304 that can be associated with (e.g., communicatively connected to) the multi-tenant data store 3302. The API component 3304 can comprise various APIs that can be utilized to enable desirable interfacing and communication of information between various components (e.g., secure data store, UI component, data management component, governance platform, rights management platform, or notification component, etc.) of or associated with the DLDP (not shown in FIG. 33), in accordance with various protocols and data formats supported by the API component 3304, such as described herein. The API component 3304 can employ GraphQL or other desired language and protocol to facilitate desirably (e.g., efficiently) retrieving data of users and/or information relating thereto from the multi-tenant data store 3302 in response to data requests or queries from clients, such as more fully described herein.

The system 3300 can comprise multiple user interfaces, including user interface component 3306, user interface component 3308, and user interface component 3310, that can be associated with (e.g., communicatively connected to) the API component 3304 and can be respectively associated with tenant entities, including entity 3312, entity 3314, and entity 3316. The user interface components (e.g., 3306, 3308, and 3310, etc.) can generate and provide various desired user interfaces that can enable the entities (e.g., 3312, 3314, and 3316, etc.), when authenticated and as permitted, to access, perceive (e.g., view, hear, or otherwise experience), and retrieve data, including respective data of users that are associated with the respective entities (e.g., 3312, 3314, and 3316, etc.) and/or respective information relating to the respective data from the multi-tenant data store 3302 via the API component 3304.

At various times, the respective entities (e.g., 3312, 3314, and 3316, etc.) can utilize the respective user interface components (e.g., 3306, 3308, and 3310, etc.) to communicate respective data requests or queries to the API component 3304 in order to request respective data of users or respective information relating thereto. The API component 3304 can process the respective data requests or queries and, in response to the respective data requests or queries, can access the multi-tenant data store 3302 to retrieve the respective data of users or respective information relating thereto from the multi-tenant data store 3302. At the various times, the API component 3304 can communicate the respective data of users or respective information relating thereto, which can be respectively responsive to the respective data requests or queries, to the respective user interface components (e.g., 3306, 3308, and 3310, etc.) of the respective entities (e.g., 3312, 3314, and 3316, etc.).

The system 3300, by being able to support centralized data aggregation of multiple tenant entities, efficient processing of data requests or queries, and efficient processing of data of users and information relating thereto, can provide a number of benefits. For instance, the system 3300 can provide a desirably streamlined deployment process, can enable desirable (e.g., easier or more efficient) application maintenance, can facilitate desirable onboarding of new tenant entities, can desirably reduce data duplication, can enable desirable patching and upgrades, and can provide a single source (e.g., data source) of desired data.

In view of the example systems and/or devices described herein, example methods that can be implemented in accordance with the disclosed subject matter can be further appreciated with reference to flowcharts in FIGS. 34-45. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 34:
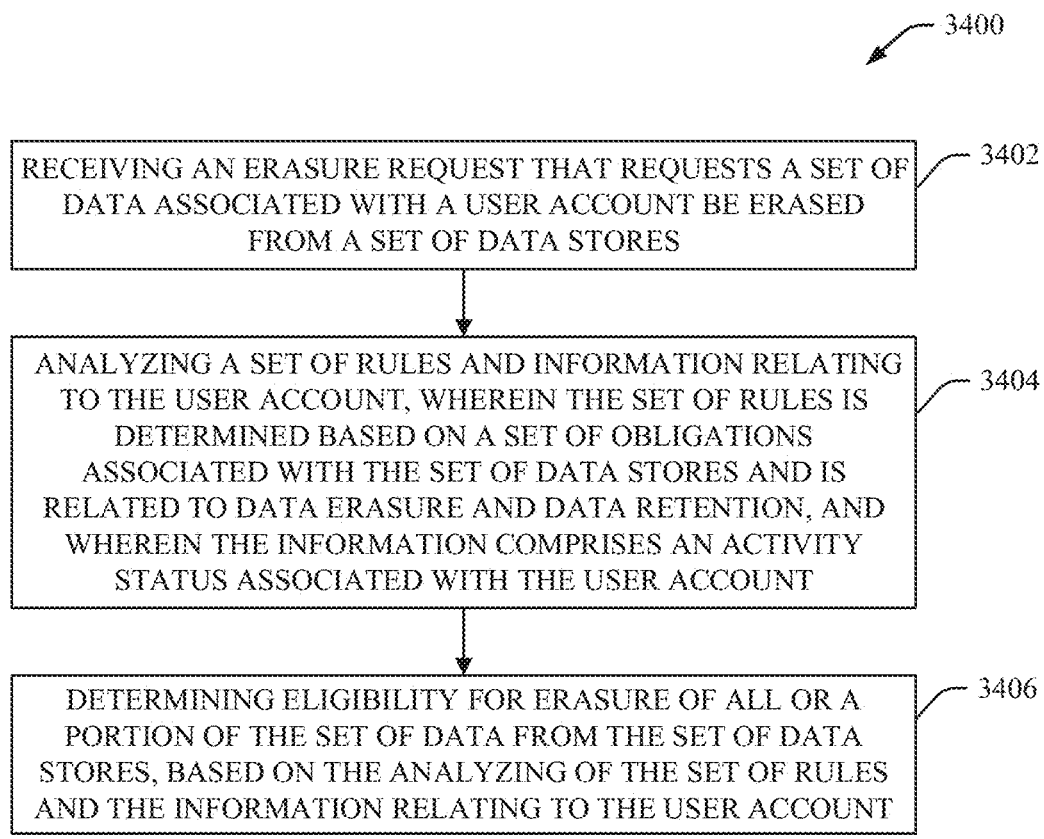
FIG. 34 depicts a flow diagram of an example, non-limiting method that can desirably manage erasure of data from data stores associated with one or more entities, in accordance with various aspects and embodiments described herein.

FIG. 34 depicts a flow diagram of an example, non-limiting method 3400 that can desirably (e.g., efficiently or optimally) manage erasure of data from data stores associated with one or more entities, in accordance with various aspects and embodiments described herein. The method 3400 can be employed by, for example, a system comprising the erasure component, its constituent or associated platforms (e.g., erasure platform or governance platform), a processor component (e.g., of or associated with the erasure component), and/or a data store (e.g., of or associated with the erasure component).

At 3402, an erasure request can be received, wherein the erasure request can request that a set of data associated with a user account be erased from a set of data stores. The erasure component can receive the erasure request from a user associated with the user (e.g., via a communication device associated with the user), wherein the erasure request can request that the set of data associated with the user account be erased from the set of data stores associated with one or more entities (e.g., one or more service entities).

At 3404, a set of rules and information relating to the user account can be analyzed, wherein the set of rules can be determined based at least in part on a set of obligations associated with the set of data stores and can be related to data erasure and data retention, and wherein the information can comprise an activity status associated with the user account. The erasure component can analyze the set of rules and the information relating to the user account. The erasure component, governance component, or rights management component can determine the set of rules based at least in part on the set of obligations associated with the set of data stores, wherein the set of obligations can comprise legal obligations associated with (e.g., that can arise out of) one or more laws applicable to the set of data stores (e.g., applicable to the jurisdiction associated with the set of data stores) and/or contractual obligations associated with the set of data stores and/or the user. The set of rules can indicate or specify various conditions under which data associated with a user account of a user can be eligible to be erased, and can be erased, from the set of data stores and/or a data vault repository associated with one or more entities (e.g., service entities).

At 3406, eligibility for erasure of all or a portion of the set of data from the set of data stores can be determined based at least in part on the analyzing of the set of rules and the information relating to the user account. The erasure component can determine the eligibility for erasure of all or a portion of the set of data associated with the user account (e.g., data of or associated with the user) from the set of data stores based at least in part on the results of analyzing of the set of rules and the information relating to the user account, comprising the activity status associated with the user account, as more fully described herein. The activity status can relate to whether the user account is open or closed, how long the user account has been closed (if the user account is closed), whether there is an erasure hold that indicates that the set of data is to be retained in the set of data stores and not erased therefrom, and/or other factors relating to activity associated with the user account.

Figure 35:
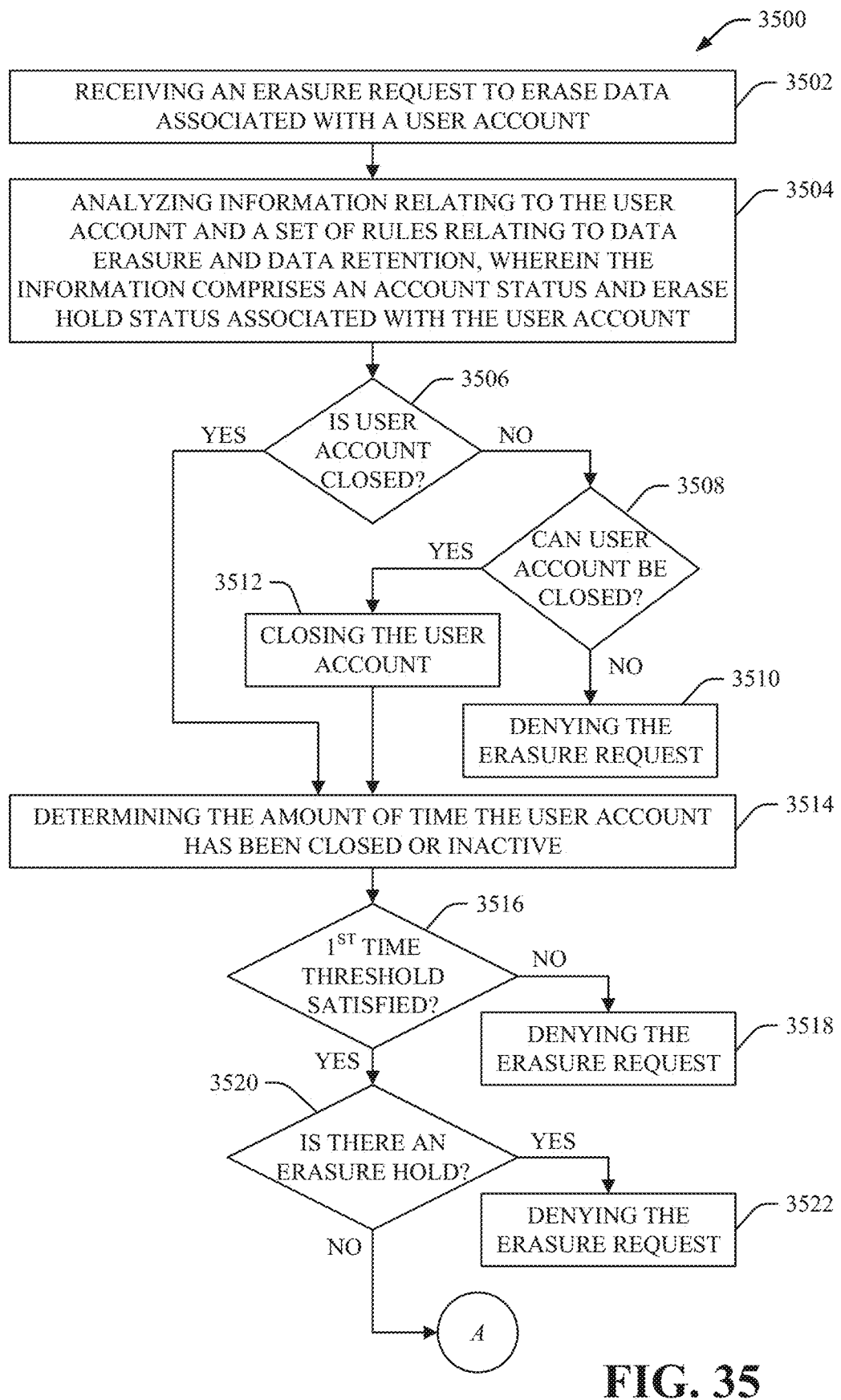
FIGS. 35 and 36 illustrate a flow diagram of another example, non-limiting method that can desirably manage erasure and/or retention of data from data stores associated with one or more entities, in accordance with various aspects and embodiments described herein.
Figure 36:
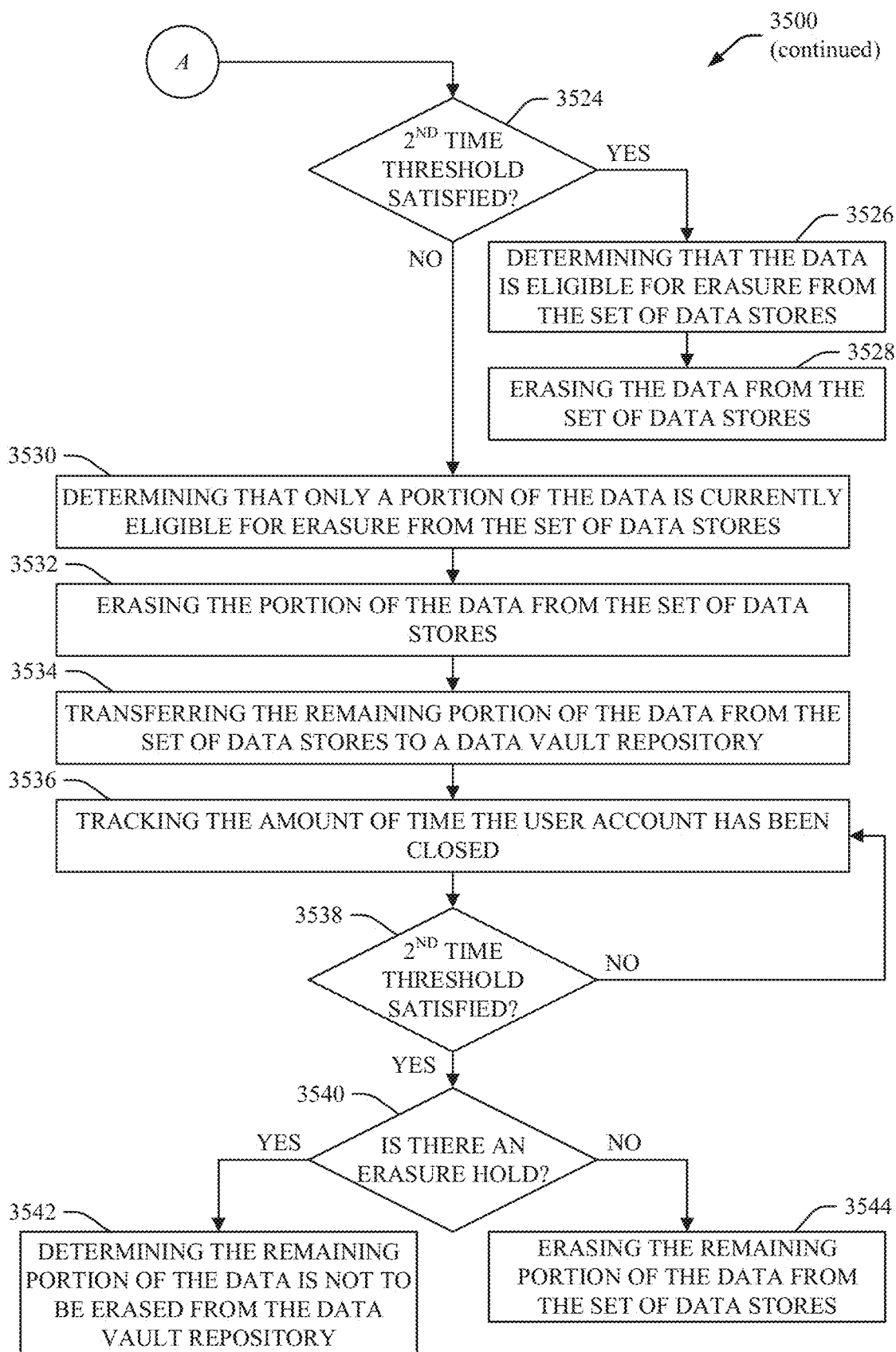

FIGS. 35 and 36 illustrate a flow diagram of an example, non-limiting method 3500 that can desirably (e.g., efficiently or optimally) manage erasure and/or retention of data from or in data stores associated with one or more entities, in accordance with various aspects and embodiments described herein. The method 3500 can be employed by, for example, a system comprising the erasure component, its constituent or associated platforms (e.g., erasure platform or governance platform), a processor component (e.g., of or associated with the erasure component), and/or a data store (e.g., of or associated with the erasure component).

At 3502, an erasure request can be received, wherein the erasure request can request that data associated with a user account be erased from a set of data stores. The erasure component can receive the erasure request from a user associated with the user account (e.g., via communication device associated with the user).

At 3504, information relating to the user account and a set of rules relating to data erasure and data retention can be analyzed, wherein the information can comprise an account status and erasure hold status associated with the user account. The erasure component can analyze the information relating to the user account and the set of rules relating to data erasure and data retention, wherein the information can comprise an activity status associated with the user account, wherein the activity status can include the account status and the erasure hold status associated with the user account.

At 3506, a determination can be made regarding whether the user account is closed. The erasure component can determine whether the user account is closed based at least in part on the results of analyzing the information relating to the account status, wherein the account status can indicate whether or not the user account is closed, whether the user account, if open, is permitted to be closed, and/or, if the user account is closed, how long the user account has been closed or inactive.

In response to determining that the user account is not closed, at 3508, a determination can be made regarding whether the user account is permitted to be closed. In response to determining that the user account is not closed, the erasure component can determine whether the user account is permitted (e.g., allowed) to be closed based at least in part on the results of analyzing the information relating to the account status, wherein the account status can indicate whether the user account is permitted to be closed. For instance, the erasure component can determine whether there is a legal, contractual, or other restriction (e.g., legal, contractual, or other hold) associated with the user account, as more fully described herein. In some embodiments, if there is a legal, contractual, or other restriction associated with the user account, a user account (or other type of) restriction tag, flag, or indicator can be associated with the user account.

If the user account is not closed and is determined to not be permitted to be closed, at 3510, the erasure request can be denied based at least in part on the set of rules. If the erasure component determines that the user account is not closed, the erasure component can determine that the data associated with the user account is not eligible for erasure, based at least in part on the analysis results and the set of rules, wherein a first rule of the set of rules can indicate that data, which is associated with a user account that is not closed and not permitted to be closed, is not eligible for erasure from the set of data stores. Accordingly, the erasure component can deny the erasure request.

Referring again to reference numeral 3508, if, at 3508, the user account is not closed and is determined to be permitted to be closed, at 3512, the user account can be closed. If the user account is not closed and is determined to be permitted to be closed, the erasure component (or another component of the system) can close the user account.

Referring again to reference numeral 3506 and reference numeral 3512, if, at 3506 or 3512, it is determined that the user account is closed, at 3514, the amount of time that the user account has been closed or inactive can be determined based at least in part on the results of analyzing the information relating to the account status. If the erasure component determines that the user account is closed (either previously closed, or closed in connection with the erasure request), the erasure component can determine the amount (e.g., the length) of time that the user account has been closed or inactive based at least in part on the results of analyzing the information relating to the account status associated with the user account.

At 3516, a determination can be made regarding whether the amount of time the user account has been closed or inactive satisfies a first defined threshold amount of time. The erasure component can determine and/or set the first defined threshold amount of time based at least in part on a second rule of the set of rules. In some embodiments, the first defined threshold amount of time can be two years (e.g., in accordance with an applicable law, contractual provision, or a defined data management criterion), although, in other embodiments, the first defined threshold amount of time can be a desired period of time that can be greater than or less than two years (e.g., in accordance with a different applicable law, different contractual provision, or a different defined data management criterion). The erasure component can determine whether the amount of time that the user account has been closed or inactive satisfies (e.g., meets or exceeds; is greater than or equal to) the first defined threshold amount of time based at least in part on the results of analyzing the information relating to the account status associated with the user account.

In response to determining that the first defined threshold amount of time is not satisfied, at 3518, the erasure request can be denied. In response to the erasure component determining that the amount of time that the user account has been closed does not satisfy (e.g., does not meet or exceed; is less than) the first defined threshold amount of time, the erasure component can determine that the erasure request can be denied, in accordance with the second rule, and can deny the erasure request.

Referring again to reference numeral 3516, if, at 3516, it is determined that the first defined threshold amount of time is satisfied, at 3520, a determination can be made regarding whether there is an erasure hold associated with the user account. If the erasure component determines that the amount of time that the user account has been closed satisfies the first defined threshold amount of time, the erasure component can determine whether there is an erasure hold associated with the user account. A third rule of the set of rules can indicate or specify that data, which is associated with a user account that has an erasure hold associated with it, is not permitted to be erased from the set of data stores. An erasure hold can indicate that there is a legal, criminal, contractual, and/or other (e.g., an applicable and/or sufficient) reason for retaining the data in the set of data stores and not erasing the data from the set of data stores.

In response to determining that there is an erasure hold associated with the user account, at 3522, the erasure request can be denied. If the erasure component determines that there is an erasure hold associated with the user account, the erasure component can determine that erasure of the data associated with the user account is not permitted and the erasure request is to be denied, in accordance with the third rule. Accordingly, the erasure component can deny the erasure request.

Referring again to reference numeral 3520, if, at 3520, it is determined that there is no erasure hold associated with the user account, the method 3500 can proceed to reference point A, wherein the method 3500 can proceed from reference point A, as depicted in FIG. 36 and as described herein.

If it is determined that there is no erasure hold associated with the user account, at 3524, a determination can be made regarding whether the amount of time the user account has been closed satisfies a second defined threshold amount of time. If the erasure component determines that there is no erasure hold associated with the user account, the erasure component can determine whether the amount of time the user account has been closed satisfies (e.g., meets or exceeds; is greater than or equal to) the second defined threshold amount of time. A fourth rule of the set of rules can indicate or specify that data (e.g., personal data or other data associated with a user), which is associated with a user account that does not have an erasure hold associated with it, is permitted to be erased (e.g., is eligible to be erased), and/or is to be erased, from the set of data stores, if the second defined threshold amount of time is satisfied; and, if the second defined threshold amount of time is not satisfied, and there is no erasure hold associated with the user account, a certain portion of the data is permitted to be erased, and/or is to be erased, from the set of data stores. The erasure component (or another component) can determine or set the second defined threshold amount of time, in accordance with the fourth rule. In some embodiments, the second defined threshold amount of time can be ten years (e.g., in accordance with an applicable law, contractual provision, or a defined data management criterion), although, in other embodiments, the second defined threshold amount of time can be a desired period of time that can be greater than or less than ten years (e.g., in accordance with a different applicable law, different contractual provision, or a different defined data management criterion).

If it is determined that the amount of time the user account has been closed satisfies the second defined threshold amount of time, at 3526, a determination can be made that the data is eligible for erasure from the set of data stores. For instance, if the erasure component determines that the amount of time the user account has been closed satisfies the second defined threshold amount of time, the erasure component can determine that the data (e.g., personal data and/or other data of or associated with the user) associated with the user account is eligible for erasure from the set of data stores.

At 3528, the data can be erased from the set of data stores. In response to the erasure component determining that the data associated with the user account is eligible for erasure from the set of data stores, the erasure component can erase the data associated with the user account from the set of data stores.

If, instead, it is determined that the amount of time the user account has been closed does not satisfy the second defined threshold amount of time, at 3530, a determination can be made that only a portion of the data can be erased from the set of data stores. For instance, if the erasure component determines that the amount of time the user account has been closed does not satisfy the second defined threshold amount of time, the erasure component can determine that only a certain portion (e.g., marketing-related information) of the data associated with the user account can be erased (e.g., is eligible to be erased) from the set of data stores, in accordance with the fourth rule.

At 3532, the portion of the data can be erased from the set of data stores. For instance, if the erasure component determines that only a certain portion of the data associated with the user account is eligible to be erased from the set of data stores, in accordance with the fourth rule, the erasure component can erase the certain portion of the data from the set of data stores. The erasure component can retain a remaining portion (e.g., a copy of the personal data of or associated with the user) of the data associated with the user account.

At 3534, the remaining portion (e.g., a copy of the personal data of or associated with the user) of the data associated with the user account can be transferred from the set of data stores to a data vault repository. For instance, if the erasure component determines that only a certain portion of the data associated with the user account is eligible to be erased from the set of data stores, in connection with erasing the certain portion of the data from the set of data stores, the erasure component also can transfer the remaining portion of the data associated with the user account from the set of data stores to the data vault repository. In some embodiments, the data vault repository can be separate from the set of data stores, and can have a higher security level than the set of data stores. In other embodiments, the data vault repository can be part of the set of data stores, but can be a separate data storage partition that can have a higher security level than the other partition(s) of the set of data stores.

At 3536, the amount of time that the user account has been closed can be tracked. For instance, with the remaining portion of the data associated with the user account being stored in the data vault repository and not yet eligible for erasure, the erasure component can track the amount of time that the user account has been closed.

At 3538, a determination can be made regarding whether the amount of time the user account has been closed satisfies the second defined threshold amount of time. Based at least in part on the tracking of the amount of time the user account has been closed, the erasure component can determine whether the amount of time that the user account has been closed satisfies the second defined threshold amount of time.

If it is determined that the amount of time the user account has been closed does not satisfy the second defined threshold amount of time, the method 3500 can return to reference numeral 3534, wherein the amount of time that the user account has been closed can continue to be tracked, and the method 3500 can proceed from that point. For instance, if the erasure component determines that the amount of time the user account has been closed does not satisfy the second defined threshold amount of time, the erasure component determine that the remaining portion of the data associated with the user account is not eligible for erasure from the data vault repository, and can continue to track the amount of time that the user account has been closed.

Referring again to reference numeral 3538, if, at 3538, it is determined that the amount of time the user account has been closed satisfies the second defined threshold amount of time, at 3540, a determination can be made regarding whether there is an erasure hold associated with the user account. If the erasure component determines that the amount of time the user account has been closed satisfies the second defined threshold amount of time, the erasure component can determine whether there is an erasure hold associated with the user account. That is, the erasure component can determine whether an erasure hold associated with the user account has been instituted, since the last time the erasure component checked to see if there was an erasure hold associated with the user account.

If it is determined that an erasure hold associated with the user account exists, at 3542, a determination can be made that the remaining portion of the data is not to be erased from the data vault repository. For instance, if the erasure component determines that an erasure hold is associated with the user account (e.g., an erasure hold has been applied to the user account since the last time the erasure component checked to see if there was an erasure hold associated with the user account), the erasure component can determine that the remaining portion of the data is not to be erased from the data vault repository, and can decline to erase the remaining portion of the data from the data vault repository to thereby retain the remaining portion of the data in the data vault repository, in accordance with the fourth rule.

Referring again to reference numeral 3540, if, at 3540, it is determined that there is no erasure hold associated with the user account, at 3544, the remaining portion of the data can be erased from the data vault repository. If the erasure component determines that there is no erasure hold associated with the user account, the erasure component can determine that the remaining portion of the data can be erased from the data vault repository, and can erase the remaining portion of the data from the data vault repository, in accordance with the fourth rule.

Figure 37:
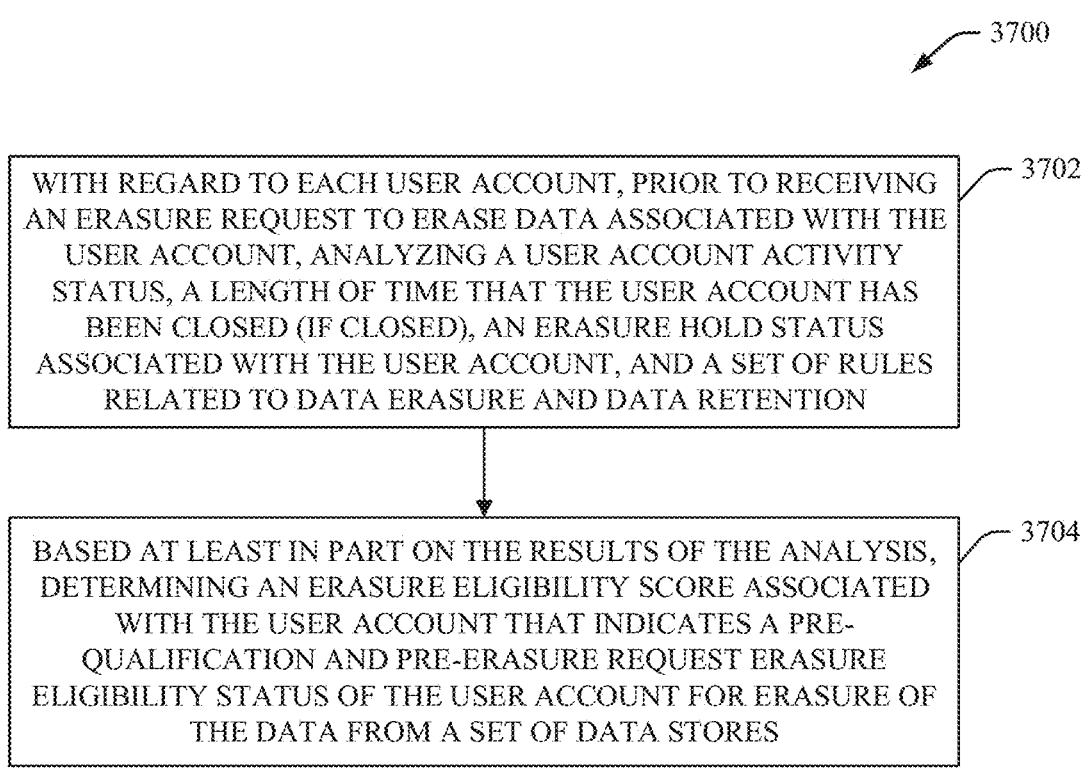
FIG. 37 depicts a flow diagram of an example, non-limiting method that can desirably determine erasure eligibility scores associated with user accounts to facilitate managing erasure and/or retention of data from or in data stores associated with one or more entities, in accordance with various aspects and embodiments described herein.

FIG. 37 depicts a flow diagram of an example, non-limiting method 3700 that can desirably (e.g., efficiently or optimally) determine erasure eligibility scores associated with user accounts to facilitate managing erasure and/or retention of data from or in data stores associated with one or more entities, in accordance with various aspects and embodiments described herein. The method 3700 can be employed by, for example, a system comprising the erasure component, its constituent or associated platforms (e.g., erasure platform or governance platform), a processor component (e.g., of or associated with the erasure component), and/or a data store (e.g., of or associated with the erasure component).

At 3702, with regard to each user account, prior to receiving an erasure request to request that data associated with the user account be erased, a user account activity status, a length of time that the user account has been closed (if closed), an erasure hold status associated with the user account, and a set of rules related to data erasure and data retention can be analyzed. For instance, with regard to each user account associated with each user, prior to receiving an erasure request from a user to request that data associated with the user account be erased, the erasure component can analyze the user account activity status, the length of time that the user account has been closed (if closed), the erasure hold status associated with the user account, and the set of rules related to data erasure and data retention. The erasure component (or other components, such as, e.g., the governance component or rights management component) can determine the set of rules based at least in part on the set of obligations (e.g., legal and/or contractual obligations) associated with the set of data stores, as more fully described herein. The set of rules can indicate or specify various conditions under which data associated with a user account of a user can be eligible to be erased, and can be erased, from the set of data stores and/or the data vault repository associated with one or more entities (e.g., service entities).

At 3704, with regard to each user account, based at least in part on the results of the analysis, an erasure eligibility score associated with the user account can be determined, wherein the erasure eligibility score can indicate a pre-qualification and pre-erasure request erasure eligibility status of the user account for erasure of the data from a set of data stores. With regard to each user account, based at least in part on the analysis results, the erasure component can determine (e.g., calculate) an erasure eligibility score associated with the user account, wherein the erasure eligibility score can indicate a pre-qualification and pre-erasure request erasure eligibility status of the user account for erasure of the data from the set of data stores and/or associated data vault repository. A relatively high erasure eligibility score associated with a user account can indicate that the data associated with the user account can be eligible or can be more likely to be eligible for erasure from the set of data stores and/or the data vault repository, whereas a relatively lower erasure eligibility score associated with a user account can indicate that the data associated with the user account may not be eligible or can be more likely to not be eligible for erasure from the set of data stores and/or the data vault repository.

Figure 38:
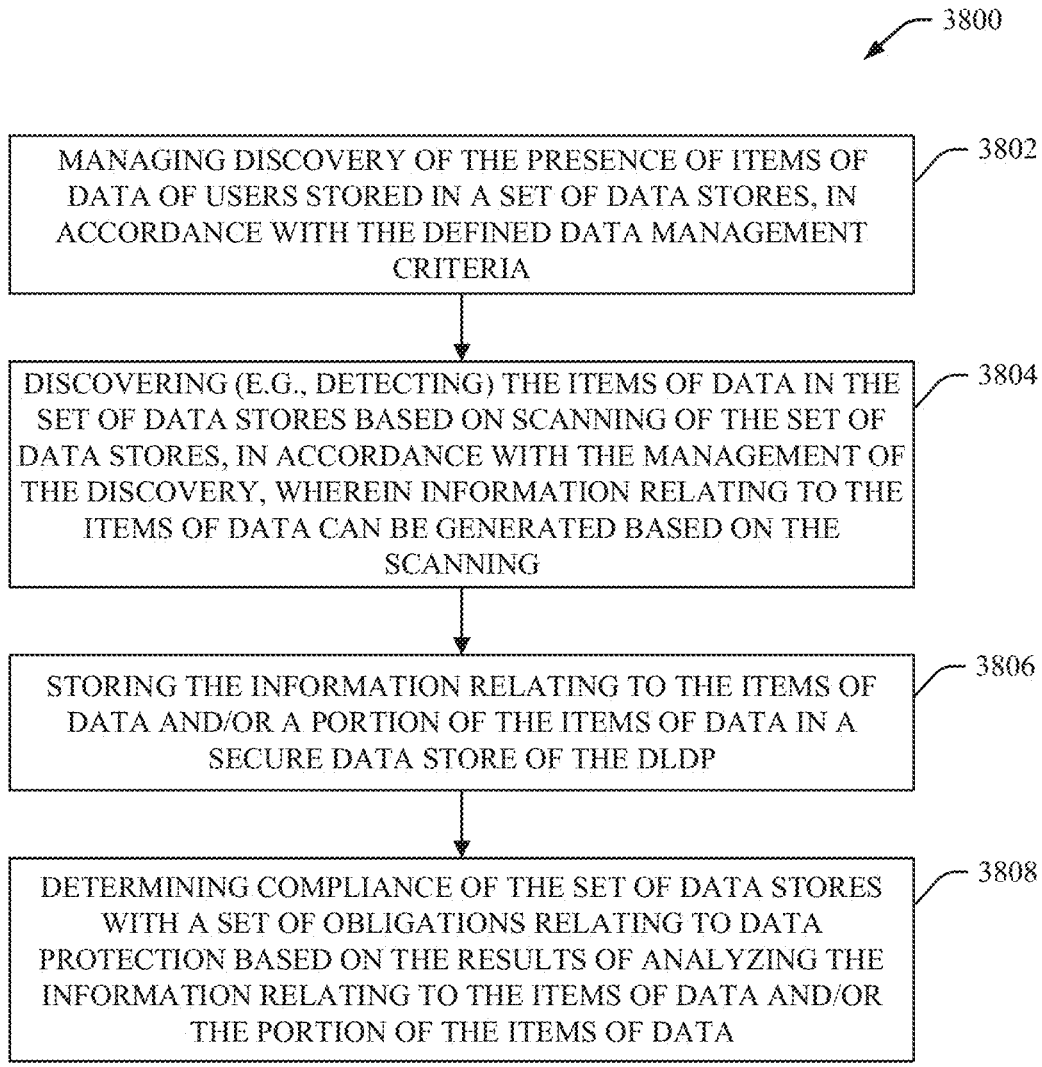
FIG. 38 depicts a flow diagram of an example, non-limiting method that can desirably manage data discovery of data stored in data stores associated with one or more entities to facilitate determining compliance of the data stores and entities with obligations arising out laws and/or agreements relating to data protection, in accordance with various aspects and embodiments described herein.

FIG. 38 depicts a flow diagram of an example, non-limiting method 3800 that can desirably (e.g., efficiently or optimally) manage data discovery of data stored in data stores associated with one or more entities to facilitate determining compliance of the data stores and entities with obligations arising out laws and/or agreements relating to data protection, in accordance with various aspects and embodiments described herein. The method 3800 can be employed by, for example, a system comprising the DLDP, its constituent or associated platforms (e.g., governance platform), a processor component (e.g., of or associated with the DLDP), and/or a data store (e.g., of or associated with the DLDP).

At 3802, discovery of the presence of items of data of users stored in a set of data stores can be managed, in accordance with the defined data management criteria. At 3804, the items of data can be discovered in the set of data stores based at least in part on scanning of the set of data stores, in accordance with the management of the discovery, wherein information relating to the items of data can be generated based at least in part on the scanning. The data management component of or associated with the DLDP can manage (e.g., control) the discovery (e.g., detection) of the presence of items of data of users stored in the set of data stores associated with an entity, in accordance with the defined data management criteria. A scanner component of or associated with the DLDP can scan the set of data stores and can detect the items of data stored in the set of data stores, based at least in part on the scanning. The scanner component, a machine learning component of or associated with the DLDP, or the data management component can generate the information relating to the items of data based at least in part on the results (e.g., scanning results) of the scanning of the set of data stores.

At 3806, the information relating to the items of data and/or a portion of the items of data can be stored in a secure data store of the DLDP. The data management component can store the information relating to the items of data and/or the portion of the items of data in the secure data store of the DLDP.

At 3808, a determination can be made regarding compliance of the set of data stores with a set of obligations relating to data protection based at least in part on the results of analyzing the information relating to the items of data and/or the portion of the items of data. The data management component can determine the compliance (e.g., the extent or level of compliance) of the set of data stores with the set of obligations relating to data protection based at least in part on the results of analyzing the information relating to the items of data and/or the portion of the items of data.

In that regard, the data management component (e.g., the governance component of the data management component) can analyze laws, regulations, and/or agreements determined to be applicable to the set of data stores, the one or more entities, and/or the users. For instance, the data management component can determine or identify a first subset of laws, regulations, and/or agreements relating to data protection that can be applicable to the set of data stores. Based at least in part on the results of analyzing the first subset of laws, regulations, and/or agreements, the data management component can determine the set of obligations (e.g., legal and/or contractual requirements, responsibilities, duties, constraints, or provisions). The data management component can determine a set of rules that can correspond to the set of obligations and can be used to facilitate enforcing the set of obligations against the set of data stores, the DLDP, and/or the entity, and determining the extent or level of compliance of the set of data stores, the DLDP, and/or the entity with the set of obligations. The data management component can determine the compliance of the set of data stores, the DLDP, and/or the entity with the set of obligations based at least in part on the results of analyzing the information relating to the items of data, the portion of the items of data, and/or the set of rules.

Figure 39:
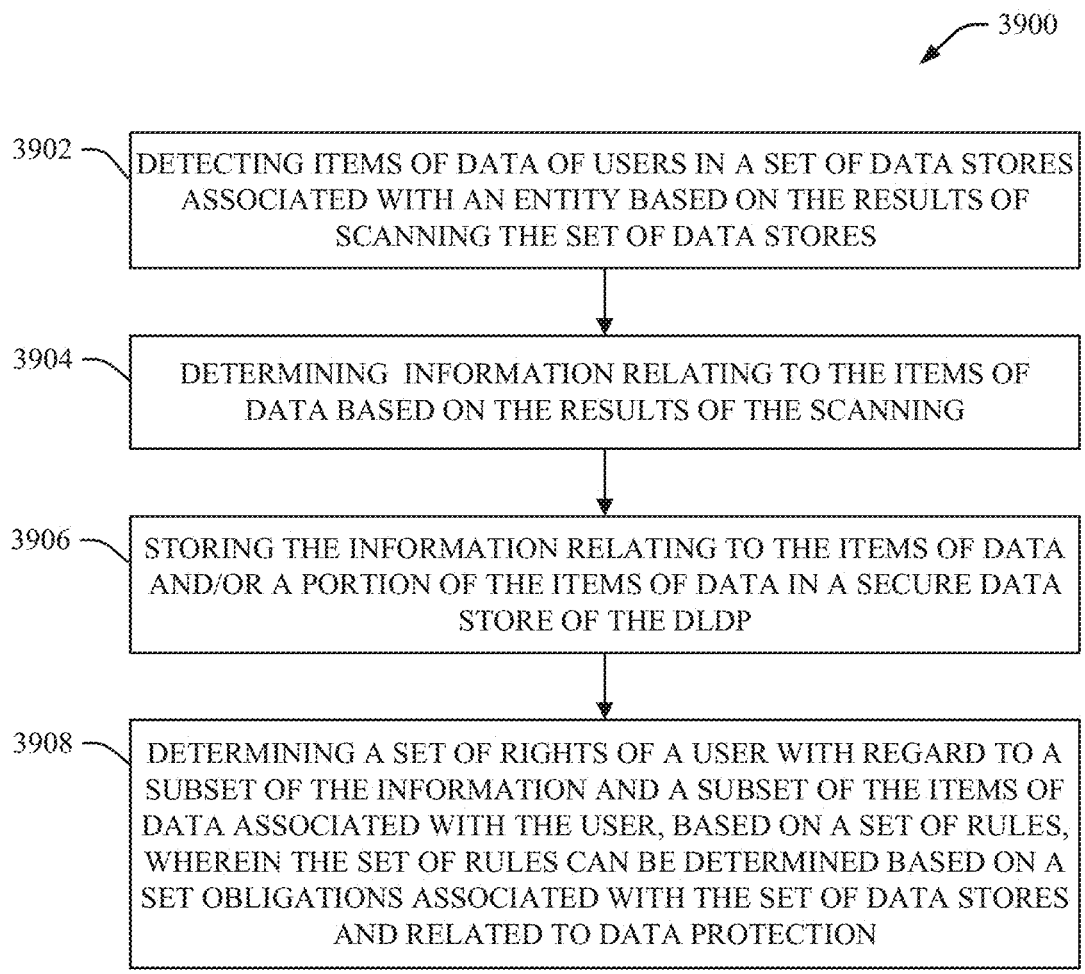
FIG. 39 illustrates a flow diagram of an example, non-limiting method that can desirably determine a set of rights of a user with regard to data of the user that is stored in a set of data stores associated with an entity, in accordance with various aspects and embodiments described herein.

FIG. 39 illustrates a flow diagram of an example, non-limiting method 3900 that can desirably (e.g., efficiently or optimally) determine a set of rights of a user with regard to data of the user that is stored in a set of data stores associated with an entity, in accordance with various aspects and embodiments described herein. The method 3900 can be employed by, for example, a system comprising the DLDP, its constituent or associated platforms (e.g., rights management platform, or governance platform, etc.), a processor component (e.g., of or associated with the DLDP), and/or a data store (e.g., of or associated with the DLDP).

At 3902, items of data of users can be detected in a set of data stores associated with an entity based at least in part on the results of scanning the set of data stores. At 3904, information relating to the items of data can be determined based at least in part on the results of the scanning. A scanner component of or associated with the DLDP can scan the set of of data stores. Based at least in part on the results of scanning the set of data stores, the scanner component can detect the items of data of the users that are stored in the set of data stores. The scanner component, machine learning component, or data management component can determine and generate the information relating to the items of data based at least in part on the results of the scanning and analysis of the scanning results.

At 3906, the information relating to the items of data and/or a portion of the items of data can be stored in a secure data store of the DLDP. The data management component can store the information relating to the items of data and/or the portion of the items of data in the secure data store of the DLDP.

At 3908, a set of rights of a user, with regard to a subset of the information and a subset of the items of data associated with the user, can be determined based at least in part on a set of rules, wherein the set of rules can be determined based at least in part on a set obligations associated with the set of data stores and related to data protection. The rights management platform can determine the set of rights of the user (and the scope of the set of rights) with regard to the subset of the information and the subset of the items of data associated with the user, based at least in part on the set of rules. The governance platform can determine the set of obligations based at least in part on the results of analyzing a first subset of laws, regulations, and/or agreements determined to be applicable to the set of data stores and associated entity, at least with regard to the user. The laws and regulations of the first subset can be associated with at least a first jurisdiction of the set of data stores and/or the entity, and/or can be associated with the user. The agreement(s) in the first subset can be associated with the set of data stores, entity, and/or user.

The set of rights of the user can relate to, for example, one or more of the right to information, the right of access, the right of rectification, the right of erasure, the right to restriction of processing, the right to data portability, the right to object, the right to avoid automated decision making, and/or other rights, with regard to the subset of data of the user and/or the subset of the information relating thereto, as such rights are more fully described herein. The DLDP, rights management platform, and/or governance platform can facilitate enabling the user to exercise the set of rights with regard to the subset of data of the user and/or the subset of the information relating thereto, as more fully described herein.

Figure 40:
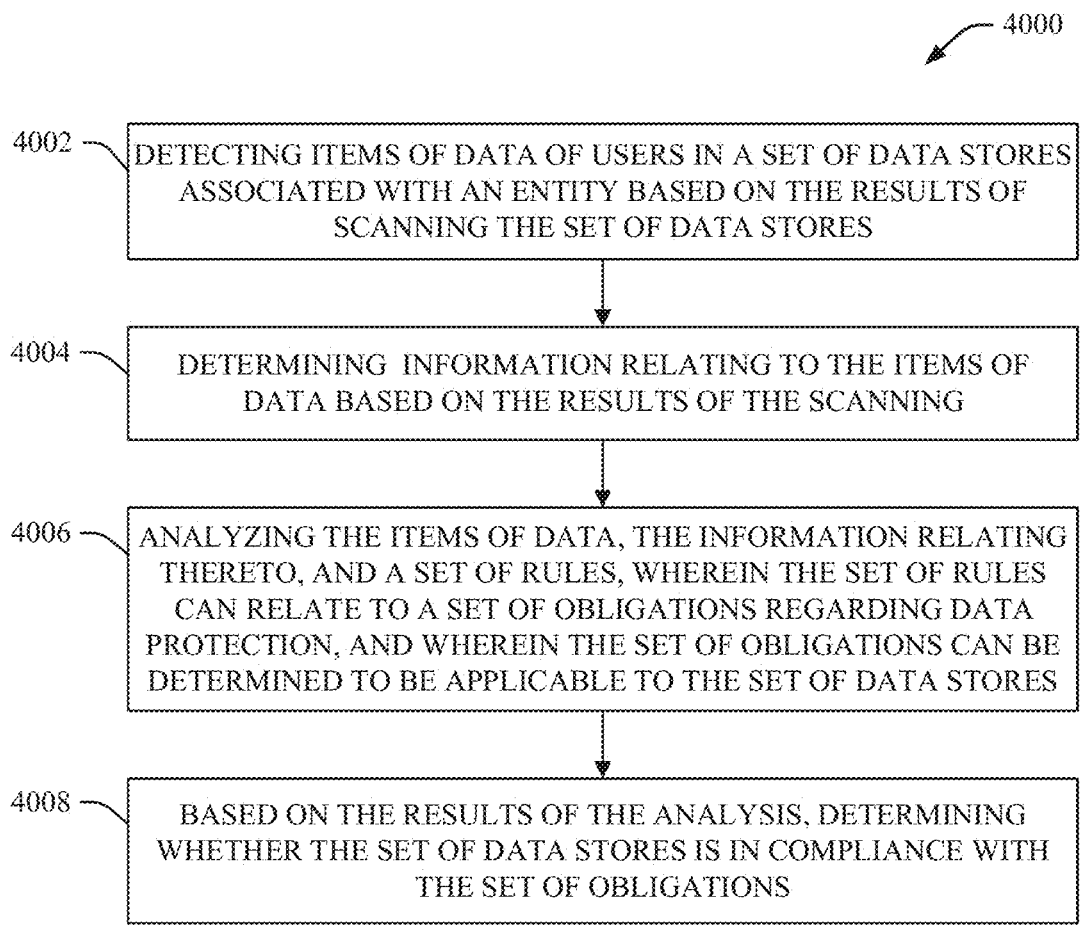
FIG. 40 illustrates a flow diagram of an example, non-limiting method that can desirably determine a set of obligations and corresponding set of rules relating to data protection, and determine compliance with the set of obligations by a set of data stores and associated entity, in accordance with various aspects and embodiments described herein.

FIG. 40 illustrates a flow diagram of an example, non-limiting method 4000 that can desirably (e.g., efficiently or optimally) determine a set of obligations and corresponding set of rules relating to data protection, and determine compliance with the set of obligations by a set of data stores and associated entity, in accordance with various aspects and embodiments described herein. The method 4000 can be employed by, for example, a system comprising the DLDP, its constituent or associated platforms (e.g., governance platform), a processor component (e.g., of or associated with the DLDP), and/or a data store (e.g., of or associated with the DLDP).

At 4002, items of data of users can be detected in a set of data stores associated with an entity based at least in part on scanning of the set of data stores. At 4004, information relating to the items of data can be generated based at least in part on the results of the scanning. The scanner component can scan the set of data stores associated with an entity. Based at least in part on the results of scanning the set of data stores, the scanner component can detect the items of data of the users that are stored in the set of data stores. The scanner component, machine learning component, or data management component can determine and generate the information relating to the items of data based at least in part on the results of the scanning and analysis of the scanning results.

At 4006, the items of data, the information relating thereto, and a set of rules can be analyzed, wherein the set of rules can relate to a set of obligations regarding data protection, and wherein the set of obligations can be determined to be applicable to the set of data stores. The governance component can determine the set of obligations based at least in part on the results of analyzing a subset of laws, regulations, and/or agreements determined to be applicable to the set of data stores and the entity. The governance component also can determine the set of rules based at least in part on the set of obligations.

For instance, the governance component can employ the rules engine, which can analyze the laws and regulations relating to data protection that are determined to be application to the jurisdiction (e.g., legal and/or geographical jurisdiction) associated with the set of data stores (e.g., the jurisdiction in which the set of data stores resides or with regard to which the set of data stores and/or items of data of users stored therein are subject or governed). The rules engine also can analyze an agreement (e.g., SLA) that is determined to be applicable to the set of data stores, the entity, and/or the users. Based at least in part on the results of analyzing the subset of laws, regulations, and/or agreements, the rules engine can determine the set of obligations, comprising legal obligations and/or contractual obligations, that stem from the subset of laws, regulations, and/or agreements. The rules engine can determine and generate the set of rules based at least in part on the set of obligations, as more fully described herein.

At 4008, based at least in part on the results of the analysis, a determination can be made regarding whether the set of data stores is in compliance with the set of obligations. Based at least in part on the analysis results, the governance component can determine whether the set of data stores and associated entity are in compliance with the set of obligations. For instance, the governance component can perform a compliance assessment on the set of data stores to determine the extent or level of compliance of the set of data stores with the set of rules and correspondingly the set of obligations. Based at least in part on the results of the compliance assessment, the governance component can determine the extent or level of compliance of the set of data stores, and associated entity, with the set of rules and corresponding set of obligations, in accordance with the defined data management criteria. The compliance assessment also can indicate an extent or level of compliance of the DLDP and/or its constituent or associated platforms with the set of rules and corresponding set of obligations as well. Depending in part on the results of the compliance assessment, the governance component or DLDP, for example can present (e.g., report or display) information relating to the compliance assessment (e.g., via a user interface component) and indicating the extent or level of compliance of the set of data stores and associated entity (and/or the DLDP and/or its constituent or associated platforms), or can generate a notification message or exception ticket to indicate an anomaly that can indicate that there is a non-compliance or potential non-compliance issue, or another anomaly that is to be evaluated and/or resolved (e.g., checked out and/or remediated by an appropriate representative of or associated with the entity).

Figure 41:
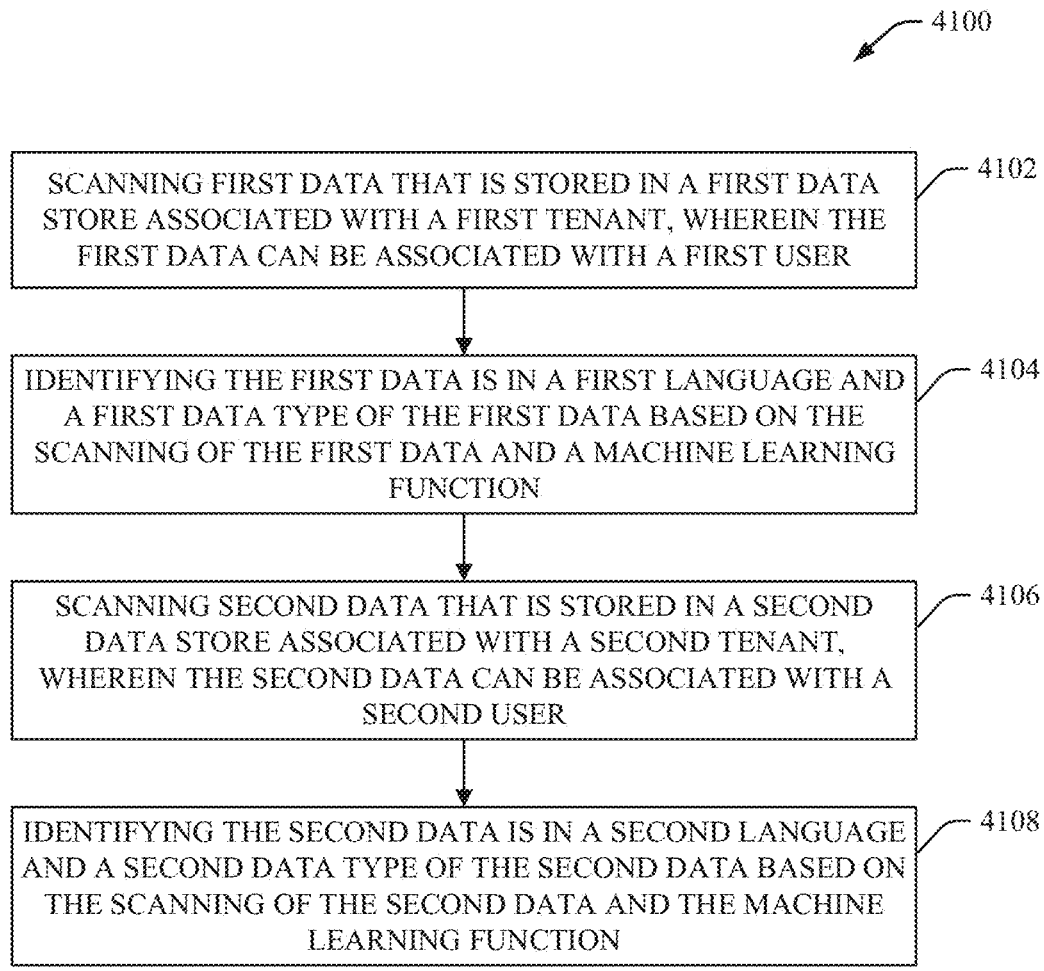
FIG. 41 illustrates a flow diagram of an example, non-limiting method that can desirably identify data, data types of data, and languages of data stored in data stores associated with entities, in accordance with various aspects and embodiments described herein.

FIG. 41 illustrates a flow diagram of an example, non-limiting method 4100 that can desirably identify data, data types of data, and languages of data stored in data stores associated with entities, in accordance with various aspects and embodiments described herein. The method 4100 can be employed by, for example, a system comprising the DLDP, its constituent or associated platforms (e.g., governance platform, rights management platform, etc.), a processor component (e.g., of or associated with the DLDP), and/or a data store (e.g., of or associated with the DLDP).

At 4102, first data stored in a first data store associated with a first tenant entity can be scanned, wherein the first data can be associated with a first user. At 4104, a first language and a first data type of the first data can be identified based at least in part on the scanning of the first data and a machine learning function. The scanner component can scan the first data store associated with the first tenant entity. Based at least in part on the results of scanning the first data store, the scanner component can detect the first data of the first user that is stored in the first data store. The scanner component or data management component, employing the machine learning component, can identify or determine the first language and the first data type of the first data, based at least in part on the scanning results and the machine learning function of the machine learning component.

At 4106, second data stored in a second data store associated with a second tenant entity can be scanned, wherein the second data can be associated with a second user. At 4108, a second language and a second data type of the second data can be identified based at least in part on the scanning of the second data and the machine learning function. The scanner component can scan the second data store associated with the second tenant entity. Based at least in part on the results of scanning the second data store, the scanner component can detect the second data of the second user that is stored in the second data store. The scanner component or data management component, employing the machine learning component, can identify or determine the second language and the second data type of the second data, based at least in part on the scanning results and the machine learning function of the machine learning component.

Figure 42:
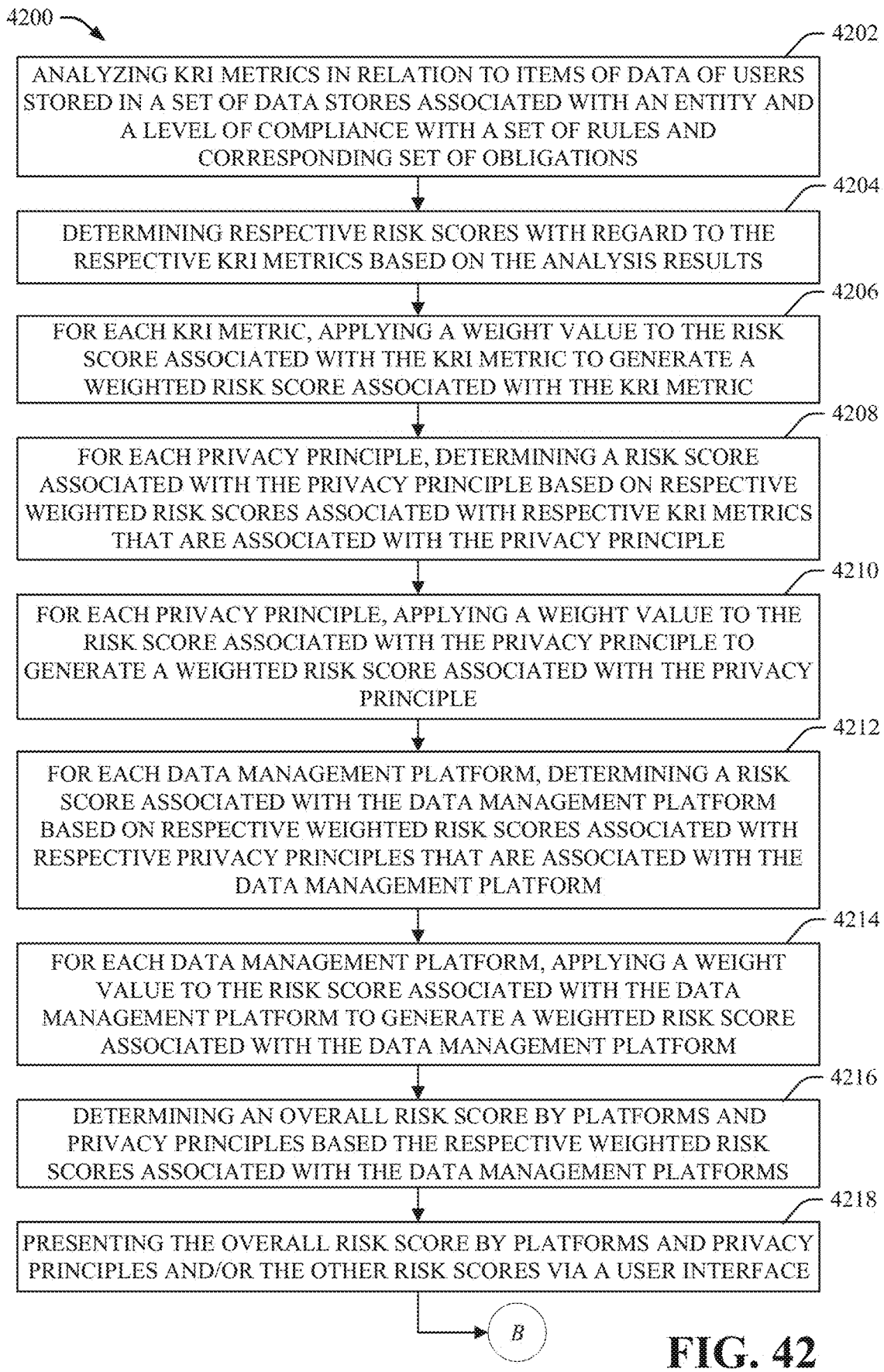
FIG. 42 illustrates a flow diagram of an example, non-limiting method that can desirably determine respective risk scores associated with KRI metrics, privacy principles, and/or data management platforms, in accordance with various aspects and embodiments described herein.

FIG. 42 illustrates a flow diagram of an example, non-limiting method 4200 that can desirably (e.g., efficiently or optimally) determine respective risk scores associated with KRI metrics, privacy principles, and/or data management platforms, in accordance with various aspects and embodiments described herein. The method 4200 can be employed by, for example, a system comprising the DLDP, its constituent or associated platforms (e.g., governance platform), a processor component (e.g., of or associated with the DLDP), and/or a data store (e.g., of or associated with the DLDP).

At 4202, KRI metrics can be analyzed in relation to items of data of users stored in a set of data stores associated with an entity and a level of compliance with a set of rules and corresponding set of obligations. The governance component (e.g., employing a risk assessment component) can analyze the KRI metrics in relation to items of data stored in the set of data stores associated with the entity and the level of compliance with the set of rules and corresponding set of obligations by the set of data stores, the entity, and/or the DLDP or its constituent or associated platforms. The governance component (e.g., employing a rules engine) can determine the set of obligations (e.g., legal and/or contractual obligations) based at least in part on the results of analyzing information relating to a law(s) and/or an agreement(s) that is applicable to the entity and/or the set of data stores. The governance component can determine the set of rules based at least in part on the set of obligations. Respective KRI metrics can relate to respective privacy principles, one or more respective source or data management platforms (e.g., DLDP, governance platform, rights management platform, DSR platform, consent management platform, third party management platform, and/or custom sources platform, etc.), and/or the set of data stores associated with the entity.

At 4204, respective risk scores can be determined with regard to the respective KRI metrics based at least in part on the results of the analysis at reference numeral 4202. The governance component can determine the respective risk scores associated with respective KRI metrics based at least in part on the results of such analysis. For each KRI metric, based at least in part on the analysis, the governance component can determine the amount of impact that one or more occurrences of one or more anomalies relating to the one or more obligations of the set of obligations can have, with respect to the KRI metric, associated data management platform and/or the entity; and, for each of the one or more occurrences of the one or more anomalies, can determine the likelihood that an occurrence of an anomaly relating to an obligation.

At 4206, for each KRI metric, a weight value can be applied to the risk score associated with the KRI metric to generate a weighted risk score associated with the KRI metric. The governance component can determine respective weight values to apply to the KRI metrics, wherein a weight value for one KRI metric can be different from or same as another weight value of another KRI metric depending on various factors (e.g., an amount of influence or importance a particular KRI metric has relative to another KRI metric), in accordance with the defined data management criteria. For each KRI metric, the governance component can determine (e.g., calculate) or generate the weighted risk score associated with the KRI metric based at least in part on the application of the weight value to the risk score associated with the KRI metric.

At 4208, for each privacy principle, a risk score associated with the privacy principle can be determined based at least in part on respective weighted risk scores associated with respective KRI metrics that are associated with the privacy principle. For each privacy principle, the governance component can determine the risk score associated with the privacy principle based at least in part on (e.g., as a function of) respective weighted risk scores associated with respective KRI metrics that are associated with (e.g., related or applicable to) the privacy principle. For example, for each privacy principle, the governance component can determine the risk score associated with the privacy principle as an average risk score, a median risk score, a trimmed average or mean risk score, or a normalized risk score derived from the applicable weighted risk scores of KRI metrics associated with the privacy principle, or as a peak weighted risk score of all the applicable weighted risk scores associated with the privacy principle. The defined data management criteria can indicate which type of risk score determination (e.g., average, median, trimmed average, trimmed mean, normalized, or peak) is to be used.

At 4210, for each privacy principle, a weight value can be applied to the risk score associated with the privacy principle to generate a weighted risk score associated with the privacy principle. The governance component can determine respective weight values to apply to the respective privacy principles, wherein a weight value for one privacy principle can be different from or same as another weight value of another privacy principle depending on various factors (e.g., an amount of influence or importance a particular privacy principle has relative to another privacy principle), in accordance with the defined data management criteria. For each privacy principle, the governance component can determine (e.g., calculate) or generate the weighted risk score associated with the privacy principle based at least in part on the application of the weight value to the risk score associated with the privacy principle.

At 4212, for each data management platform, a risk score associated with the data management platform can be determined based at least in part on respective weighted risk scores associated with respective privacy principles that are associated with the data management platform. For each data management platform, the governance component can determine the risk score associated with the data management platform based at least in part on (e.g., as a function of) respective weighted risk scores associated with respective privacy principles that are associated with (e.g., related or applicable to) the data management platform. For example, for each data management platform, the governance component can determine the risk score associated with the data management platform as an average, a median, a trimmed average, a trimmed mean, or a normalized risk score derived from the applicable weighted risk scores associated with the data management platform, or as a peak weighted risk score of all the applicable weighted risk scores associated with the privacy principle. The defined data management criteria can indicate which type of risk score determination (e.g., average, median, trimmed average, trimmed mean, normalized, or peak) is to be used At 4214, for each data management platform, a weight value can be applied to the risk score associated with the data management platform to generate a weighted risk score associated with the data management platform. The governance component can determine respective weight values to apply to the respective data management platforms, wherein a weight value for one data management platform can be different from or same as another weight value of another data management platform depending on various factors (e.g., an amount of influence or importance a particular data management platform has relative to another data management platform). For each data management platform, the governance component can determine (e.g., calculate) or generate the weighted risk score associated with the data management platform based at least in part on the application of the weight value to the risk score associated with the data management platform.

At 4216, an overall risk score by platforms and privacy principles can be determined based at least in part on the respective weighted risk scores associated with the data management platforms. The governance component can determine (e.g., calculate) the overall risk score by platforms and privacy principles based at least in part on (e.g., as a function of) the respective weighted risk scores associated with the respective data management platforms, wherein the respective weighted risk scores associated with the respective data management platforms can be derived in part from the respective weighted risk scores associated with the respective privacy principles, such as described herein.

At 4218, the overall risk score by platforms and privacy principles, the risk scores associated with the data management platforms, the risk scores associated with the privacy principles, and/or the risk scores associated with the KRI metrics can be presented via a user interface. The governance platform can facilitate presenting (e.g., displaying or conveying), via the user interface component, the overall risk score by platforms and privacy principles and/or risk scores associated with the data management platforms, privacy principles, and/or the KRI metrics. An authorized and/or authenticated user can view, via the user interface component, the overall risk score by platforms and privacy principles and/or risk scores associated with the data management platforms, privacy principles, and/or the KRI metrics. Additionally or alternatively, the authorized and/or authenticated user can view, via the user interface component, the underlying data that was utilized to determine the respective risk scores.

Figure 43:
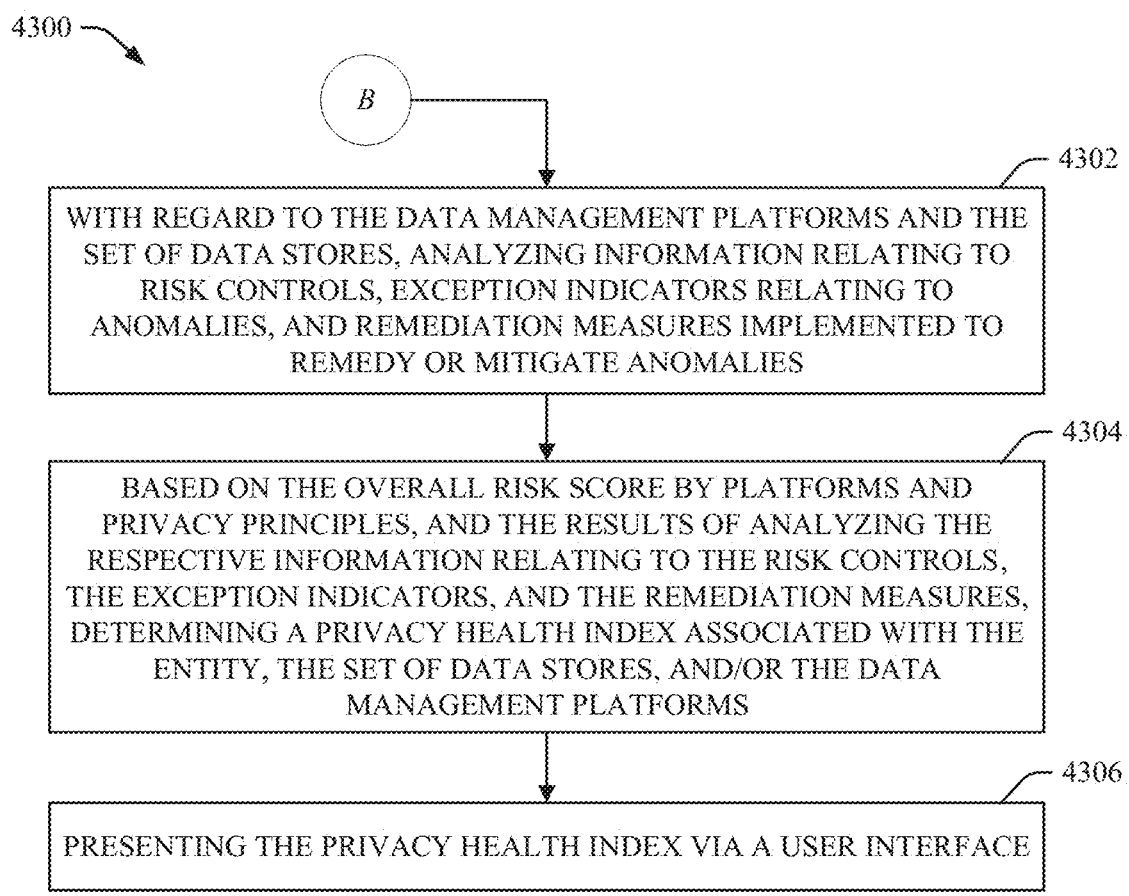
FIG. 43 illustrates a flow diagram of an example, non-limiting method that can desirably determine a privacy health index associated with an entity that is associated with a set of data stores that store data of users, in accordance with various aspects and embodiments described herein.

At this point, the method 4200 can proceed to reference point B, wherein, in some embodiments, the method 4300 of FIG. 43 can proceed from reference point B, as more fully described herein.

FIG. 43 illustrates a flow diagram of an example, non-limiting method 4300 that can desirably (e.g., efficiently or optimally) determine a privacy health index associated with an entity that is associated with a set of data stores that store data of users, in accordance with various aspects and embodiments described herein. The method 4300 can be employed by, for example, a system comprising the DLDP, its constituent or associated platforms (e.g., governance platform), a processor component (e.g., of or associated with the DLDP), and/or a data store (e.g., of or associated with the DLDP). In some embodiments, the method 4300 can proceed from reference point B of the method 4200 of FIG. 42.

At 4302, with regard to the data management platforms and the set of data stores, information relating to risk controls associated with the data management platforms and the set of data stores, exception indicators relating to anomalies associated with the data management platforms and the set of data stores, and remediation measures implemented to remedy or mitigate anomalies associated with the data management platforms and the set of data stores can be analyzed. With regard to the data management platforms and the set of data stores, the governance component can analyze the information relating to the risk controls, the exception indicators, and the remediation measures associated with the data management platforms and the set of data stores.

At 4304, based at least in part on the overall risk score by platforms and privacy principles, and the results of analyzing the respective information relating to the risk controls, the exception indicators, and the remediation measures, a privacy health index associated with the entity, the set of data stores, and/or the data management platforms overall can be determined. In some embodiments, for each data management platform or data store, the governance component can quantify (e.g., determine or calculate a value for) the results of analyzing respective information relating to the risk controls, the exception indicators, and the remediation measures associated with the data management platform or data store. The governance component can determine (e.g., calculate) the privacy health index (e.g., privacy health index value, rating, or score) associated with the entity, the set of data stores, and/or the data management platforms overall based at least in part on (e.g., as a function of) the overall risk score by platforms and privacy principles, and the one or more quantifying values associated with the risk controls, the exception indicators, and the remediation measures, as derived from the analysis of the information.

At 4306, the privacy health index associated with the entity can be presented via a user interface. The governance platform can facilitate presenting (e.g., displaying or conveying), via the user interface component, the privacy health index (e.g., the privacy health index value) associated with the entity, the set of data stores, and/or the data management platforms overall. An authorized and/or authenticated user can view, via the user interface component, the privacy health index. In some embodiments, the privacy health index can be presented, via the user interface component, along with the overall risk score by platforms and privacy principles, risk scores associated with the data management platforms, privacy principles, or KRI metrics, information or quantifying values associated with the risk controls, the exception indicators, and the remediation measures, and/or other desired underlying or related information.

Figure 44:
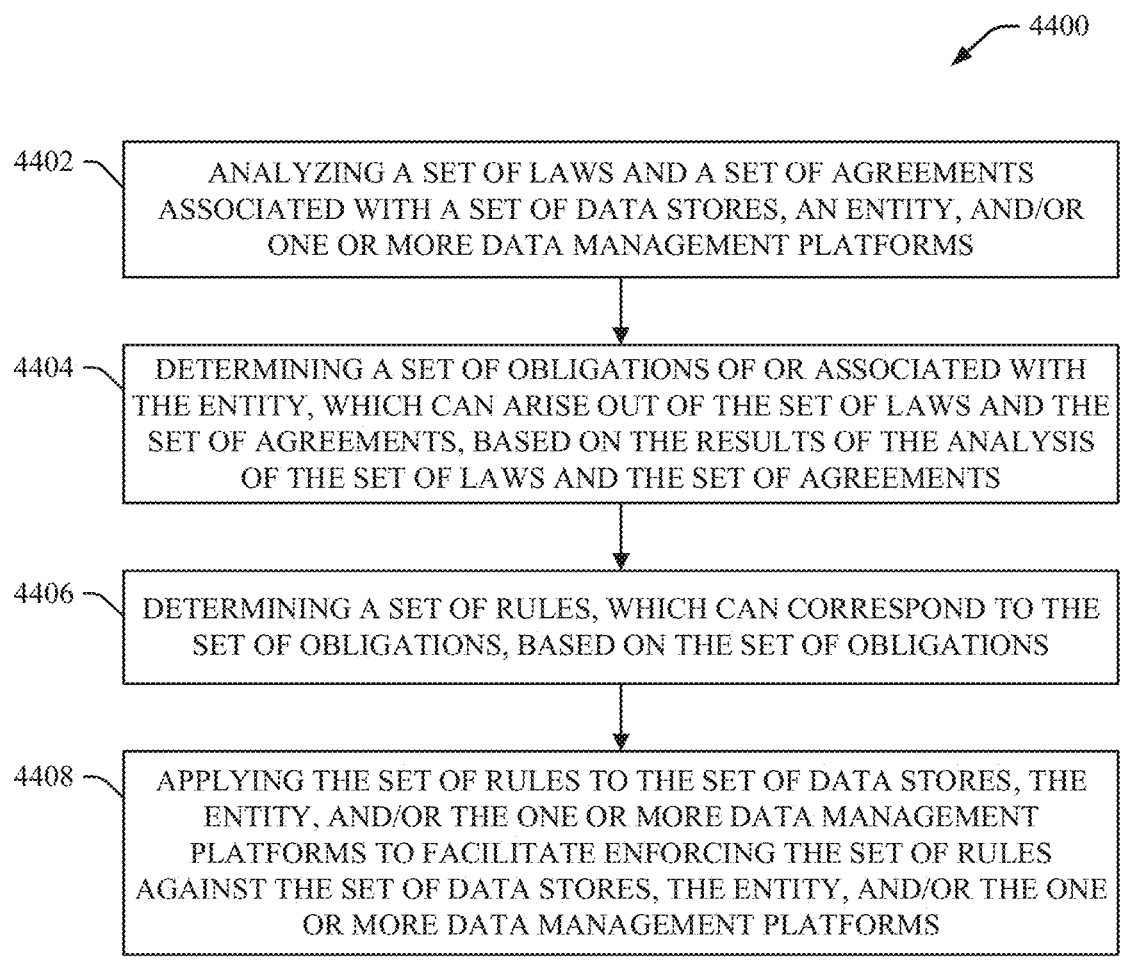
FIG. 44 presents a flow diagram of an example, non-limiting method that can determine and utilize a set of rules that can correspond to the set of obligations application to a set of data stores, an associated entity, and/or the DLDP and its constituent or associated platforms, in accordance with various aspects and embodiments of the disclosed subject matter.

FIG. 44 presents a flow diagram of an example, non-limiting method 4400 that can determine and utilize a set of rules that can correspond to the set of obligations application to a set of data stores, an associated entity, and/or the DLDP and its constituent or associated platforms, in accordance with various aspects and embodiments of the disclosed subject matter. The method 4400 can be employed by, for example, a system comprising the DLDP, its constituent or associated platforms (e.g., rights management platform, governance platform, etc.), a processor component (e.g., of or associated with the DLDP), and/or a data store (e.g., of or associated with the DLDP).

At 4402, a set of laws and a set of agreements associated with a set of data stores, an entity, and/or one or more data management platforms can be analyzed. The one or more data management platforms can be associated with the set of data stores in which items of data associated with users can be stored, wherein the set of data stores can comprise one or more data stores. The set of data stores can be associated with the entity. The set of laws can comprise one or more laws that can relate to data protection, and can be applicable to the jurisdiction(s) (e.g., legal or geographical jurisdiction) associated with the set of data stores, the entity, and/or the one or more data management platforms associated with the entity. The set of agreements can comprise one or more agreements (e.g., contracts) that can relate to data protection, and can be applicable to the set of data stores, the entity, and/or the one or more data management platforms. For instance, the set of laws and/or set of agreements can comprise various provisions that can indicate what the entity is obliged (e.g., required) to do in order to comply with the set of laws and/or set of agreements. The governance component (e.g., employing a rules engine) can analyze the set of laws and the set of agreements to facilitate determining a set of obligations (e.g., legal obligations, such as legal requirements or conditions, and/or contractual obligations, such as contractual requirements or conditions) of or associated with the entity that arise out of the set of laws and the set of agreements.

At 4404, a set of obligations of or associated with the entity, which can arise out of the set of laws and the set of agreements, can be determined based at least in part on the results of the analysis of the set of laws and the set of agreements. Based at least in part on the results of analyzing the set of laws and/or set of agreements, the governance component can identify or determine the set of obligations of or associated with the entity and/or the set of data management platforms.

At 4406, a set of rules, which can correspond to the set of obligations, can be determined based at least in part on the set of obligations. The governance component can determine the set of rules based at least in part on the set of obligations. For example, if a legal or contractual obligation indicates that a particular type of information (e.g., Social Security Number, financial account number, etc.) of users is to be secured from being accessed by unauthorized users, the governance component (e.g., employing the rules engine) can determine and generate a rule that can indicate or provide that the particular type of information of users is to be secured from being accessed by unauthorized users and only can be accessed by users who satisfy certain authorization and/or authentication conditions.

At 4408, the set of rules can be applied to the set of data stores, the entity, and/or the one or more data management platforms to facilitate enforcing the set of rules against the set of data stores, the entity, and/or the one or more data management platforms. The governance platform can apply and enforce the set of rules against the set of data stores, the entity, and/or the one or more data management platforms to facilitate securing (e.g., protecting) items of data associated with users, in accordance with the set of obligations, and accordingly, the set of laws and/or the set of agreements.

Figure 45:
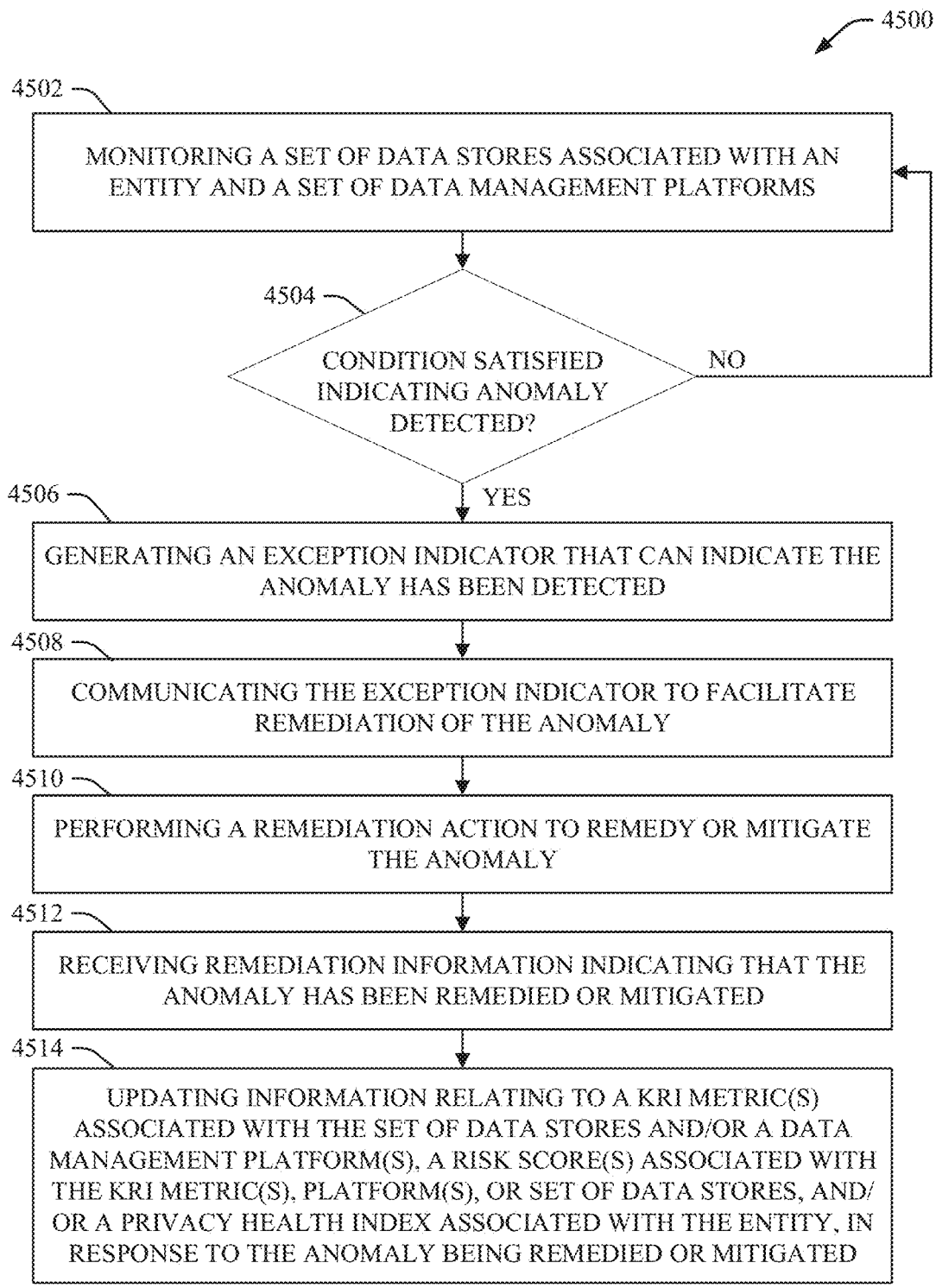
FIG. 45 depicts a flow diagram of an example, non-limiting method that can determine an anomaly with regard to data of users has been detected and initiate a remediation action to remedy or mitigate the anomaly, in accordance with various aspects and embodiments of the disclosed subject matter.

FIG. 45 depicts a flow diagram of an example, non-limiting method 4500 that can determine an anomaly with regard to data of users has been detected and initiate a remediation action to remedy or mitigate the anomaly, in accordance with various aspects and embodiments of the disclosed subject matter. The method 4500 can be employed by, for example, a system comprising the DLDP, its constituent or associated platforms (e.g., governance platform, rights management platform, etc.), a processor component (e.g., of or associated with the DLDP), and/or a data store (e.g., of or associated with the DLDP).

At 4502, a set of data stores associated with an entity and a set of data management platforms can be monitored. The governance component can monitor and/or track activity (e.g., requests for data, access of data, usage of data, etc.) of or associated with the set of data stores and the set of data management platforms. The entity that operates, owns, or manages the set of data management platforms can be same or different entity than the one that operates, owns, or manages the set of data stores. Such monitoring and/or tracking can be performed by the governance component to determine whether items of data of users that are stored in or associated with the set of data stores, and/or information relating to the items of data, are being secured in accordance with a set of rules relating to data protection. The governance component can determine the set of rules based at least in part on obligations (e.g., legal and/or contractual obligations) determined from a law(s) or agreement(s) relating to data protection, and associated with the entity and/or the set of data management platforms, as more fully described herein.

At 4504, based at least in part on the monitoring and/or tracking, a determination can be made regarding whether a condition has been satisfied that indicates an anomaly relating to data protection associated with the set of data stores or the set of data management platforms is detected. Based at least in part on the monitoring and/or tracking, the governance component can determine whether a condition has been satisfied (e.g., a defined threshold value of a condition has been met, breached, or exceeded) that indicates that an anomaly (e.g., a non-compliance issue, potential non-compliance issue, or other anomaly) has occurred and has been detected. The condition can relate to a rule relating to data protection being breached or potentially being breached. For example, a breach of a condition and associated rule can relate to an undesirable number of users (e.g., a defined threshold number of users) continuing to receive solicitation emails from the entity, via a platform of or associated with the entity, beyond a defined period of time (e.g., 30 days) after the users have requested to no longer receive such solicitation emails. As some other examples, a breach of a condition and associated rule can relate to a sensitive or private type of information associated with a user being improperly (e.g., illegally or without authorization) collected by a data management platform or improperly accessed from the platform by another user.

If it is determined that the condition has not been satisfied, which can indicate that no anomaly has been detected, the method 4500 can return to reference numeral 4502 wherein the set of data stores and the set of data management platforms can continue to be monitored. If, instead, at reference numeral 4504, it is determined that the condition has been satisfied (e.g., breached), which can indicate that an anomaly has been detected, the method 4500 can proceed to reference numeral 4506.

At 4506, in response to detecting that the condition has been satisfied indicating the anomaly is detected, an exception indicator can be generated, wherein the exception indicator can indicate that the anomaly has been detected. In response to detecting that the condition has been satisfied indicating the anomaly is detected, the governance component, employing an exception engine, can generate the exception indicator (e.g., exception ticket or message).

At 4508, the exception indicator can be communicated to facilitate remediation of the anomaly. In some embodiments, the exception engine can communicate the exception indicator to a remediation component and/or a person associated with the entity to facilitate remediation of the anomaly.

At 4510, a remediation action can be performed to remedy or mitigate the anomaly. The remediation component, of or associated with the governance component, and/or the person can perform a desired remediation action (e.g., remediation measure) to remedy or mitigate the anomaly. For example, if the anomaly involves an undesirable number of users (e.g., a defined threshold number of users) continuing to receive solicitation emails from the entity, via a platform of or associated with the entity, beyond a defined period of time after the users have requested to no longer receive such solicitation emails, the desired remediation action can comprise instructing the person of or associated with the entity to review code relating to the sending of solicitation emails and, if appropriate, to modify the code to ensure that undesired solicitation emails are no longer sent to users who have requested to no longer receive such solicitation emails. For instance, a notification component can send a notification message, comprising information relating to the exception indicator, to the person to notify the person of the anomaly and request that a remediation action be taken or performed to remedy or mitigate the anomaly.

In some embodiments, the exception ticket or notification message can request that the person validate (e.g., verify) the anomaly to ensure that an actual anomaly exists and has to be addressed (e.g., remediated). If the person determines that the anomaly is not valid, the person can send a message (e.g., using communication device) to the governance platform, wherein the message can indicate the anomaly was determined to not be valid, so no remediation action was taken.

At 4512, remediation information, which can indicate that the anomaly has been remedied or mitigated, can be received. In response to the anomaly being remedied or mitigated, the remediation component can communicate the remediation information, which can indicate that the anomaly has been remedied or mitigated, to the exception engine or other component of the governance component to indicate that the anomaly has been remedied or mitigated to bring the entity and/or associated data management platform into compliance with the rule(s) and associated obligation(s).

At 4514, information relating to a KRI metric(s) associated with the set of data stores and/or a data management platform(s), a risk score(s) associated with the KRI metric(s), platform(s), or set of data stores, and/or a privacy health index associated with the entity can be updated in response to the anomaly being remedied or mitigated. In response to the remediation information indicating that the anomaly has been remedied or mitigated, the governance component can update the information relating to the KRI metric(s), the risk score(s) associated with the KRI metric(s), platform(s), or set of data stores, and/or the privacy health index associated with the entity to indicate or reflect that (e.g., to take into account that) the anomaly has been remedied or mitigated. For example, the governance component can update a risk score associated with the KRI metric or associated platform to decrease the risk score and/or can update the privacy health index to increase the privacy health index based at least in part on the remediation information indicating that the anomaly has been remedied or mitigated.

Figure 46:
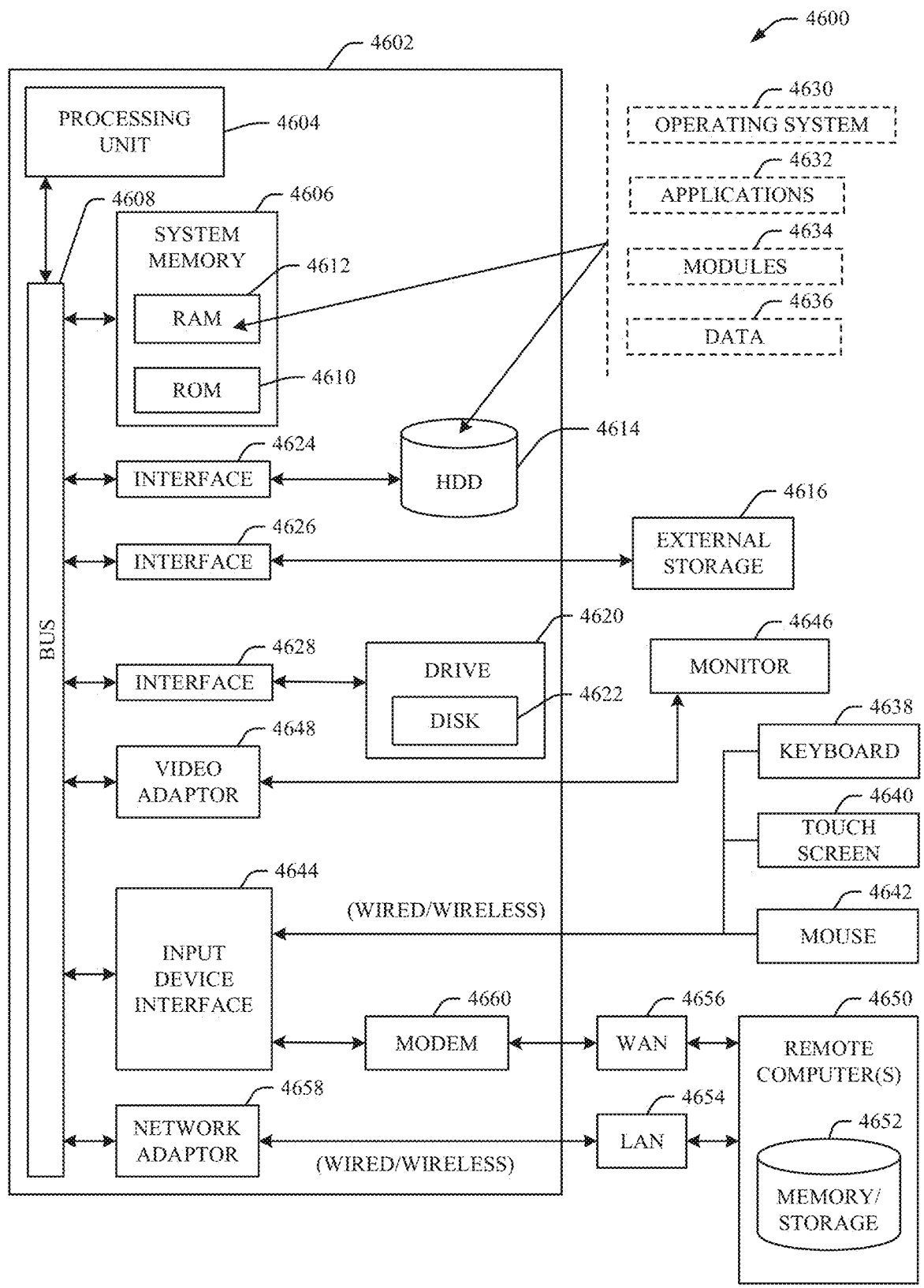
FIG. 46 illustrates a block diagram of an example, non-limiting operating environment in which one or more embodiments described herein can be facilitated.

In order to provide additional context for various embodiments described herein, FIG. 46 and the following discussion are intended to provide a brief, general description of a suitable computing environment 4600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 46, the example environment 4600 for implementing various embodiments of the aspects described herein includes a computer 4602, the computer 4602 including a processing unit 4604, a system memory 4606 and a system bus 4608. The system bus 4608 couples system components including, but not limited to, the system memory 4606 to the processing unit 4604. The processing unit 4604 can be any of various commercially available processors. Dual microprocessors and other multi-processor architectures can also be employed as the processing unit 4604.

The system bus 4608 can be any of several types of bus structure that can further interconnect to a memory bus (with or without a memory controller), a peripheral bus, and a local bus using any of a variety of commercially available bus architectures. The system memory 4606 includes ROM 4610 and RAM 4612. A basic input/output system (BIOS) can be stored in a non-volatile memory such as ROM, erasable programmable read only memory (EPROM), EEPROM, which BIOS contains the basic routines that help to transfer information between elements within the computer 4602, such as during startup. The RAM 4612 can also include a high-speed RAM such as static RAM for caching data.

The computer 4602 further includes an internal hard disk drive (HDD) 4614 (e.g., EIDE, SATA), one or more external storage devices 4616 (e.g., a magnetic floppy disk drive (FDD) 4616, a memory stick or flash drive reader, a memory card reader, etc.) and a drive 4620, e.g., such as a solid state drive, an optical disk drive, which can read or write from a disk 4622, such as a CD-ROM disc, a DVD, a BD, etc. Alternatively, where a solid state drive is involved, disk 4622 would not be included, unless separate. While the internal HDD 4614 is illustrated as located within the computer 4602, the internal HDD 4614 can also be configured for external use in a suitable chassis (not shown). Additionally, while not shown in environment 4600, a solid state drive (SSD) could be used in addition to, or in place of, an HDD 4614. The HDD 4614, external storage device(s) 4616 and drive 4620 can be connected to the system bus 4608 by an HDD interface 4624, an external storage interface 4626 and a drive interface 4628, respectively. The interface 4624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 4602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 4612, including an operating system 4630, one or more application programs 4632, other program modules 4634 and program data 4636. All or portions of the operating system, applications, modules, and/or data can also be cached in the RAM 4612. The systems and methods described herein can be implemented utilizing various commercially available operating systems or combinations of operating systems.

Computer 4602 can optionally comprise emulation technologies. For example, a hypervisor (not shown) or other intermediary can emulate a hardware environment for operating system 4630, and the emulated hardware can optionally be different from the hardware illustrated in FIG. 46. In such an embodiment, operating system 4630 can comprise one virtual machine (VM) of multiple VMs hosted at computer 4602. Furthermore, operating system 4630 can provide runtime environments, such as the Java runtime environment or the .NET framework, for applications 4632. Runtime environments are consistent execution environments that allow applications 4632 to run on any operating system that includes the runtime environment. Similarly, operating system 4630 can support containers, and applications 4632 can be in the form of containers, which are lightweight, standalone, executable packages of software that include, e.g., code, runtime, system tools, system libraries and settings for an application.

Further, computer 4602 can be enable with a security module, such as a trusted processing module (TPM). For instance with a TPM, boot components hash next in time boot components, and wait for a match of results to secured values, before loading a next boot component. This process can take place at any layer in the code execution stack of computer 4602, e.g., applied at the application execution level or at the operating system (OS) kernel level, thereby enabling security at any level of code execution.

A user can enter commands and information into the computer 4602 through one or more wired/wireless input devices, e.g., a keyboard 4638, a touch screen 4640, and a pointing device, such as a mouse 4642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 4604 through an input device interface 4644 that can be coupled to the system bus 4608, but can be connected by other interfaces, such as a parallel port, an IEEE 1394 serial port, a game port, a USB port, an IR interface, a BLUETOOTH® interface, etc.

A monitor 4646 or other type of display device can be also connected to the system bus 4608 via an interface, such as a video adapter 4648. In addition to the monitor 4646, a computer typically includes other peripheral output devices (not shown), such as speakers, printers, etc.

The computer 4602 can operate in a networked environment using logical connections via wired and/or wireless communications to one or more remote computers, such as a remote computer(s) 4650. The remote computer(s) 4650 can be a workstation, a server computer, a router, a personal computer, portable computer, microprocessor-based entertainment appliance, a peer device or other common network node, and typically includes many or all of the elements described relative to the computer 4602, although, for purposes of brevity, only a memory/storage device 4652 is illustrated. The logical connections depicted include wired/wireless connectivity to a local area network (LAN) 4654 and/or larger networks, e.g., a wide area network (WAN) 4656. Such LAN and WAN networking environments are commonplace in offices and companies, and facilitate enterprise-wide computer networks, such as intranets, all of which can connect to a global communications network, e.g., the Internet.

When used in a LAN networking environment, the computer 4602 can be connected to the local network 4654 through a wired and/or wireless communication network interface or adapter 4658. The adapter 4658 can facilitate wired or wireless communication to the LAN 4654, which can also include a wireless access point (AP) disposed thereon for communicating with the adapter 4658 in a wireless mode.

When used in a WAN networking environment, the computer 4602 can include a modem 4660 or can be connected to a communications server on the WAN 4656 via other means for establishing communications over the WAN 4656, such as by way of the Internet. The modem 4660, which can be internal or external and a wired or wireless device, can be connected to the system bus 4608 via the input device interface 4644. In a networked environment, program modules depicted relative to the computer 4602 or portions thereof, can be stored in the remote memory/storage device 4652. It will be appreciated that the network connections shown are example and other means of establishing a communications link between the computers can be used.

When used in either a LAN or WAN networking environment, the computer 4602 can access cloud storage systems or other network-based storage systems in addition to, or in place of, external storage devices 4616 as described above, such as but not limited to a network virtual machine providing one or more aspects of storage or processing of information. Generally, a connection between the computer 4602 and a cloud storage system can be established over a LAN 4654 or WAN 4656 e.g., by the adapter 4658 or modem 4660, respectively. Upon connecting the computer 4602 to an associated cloud storage system, the external storage interface 4626 can, with the aid of the adapter 4658 and/or modem 4660, manage storage provided by the cloud storage system as it would other types of external storage. For instance, the external storage interface 4626 can be configured to provide access to cloud storage sources as if those sources were physically connected to the computer 4602.

The computer 4602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 47:
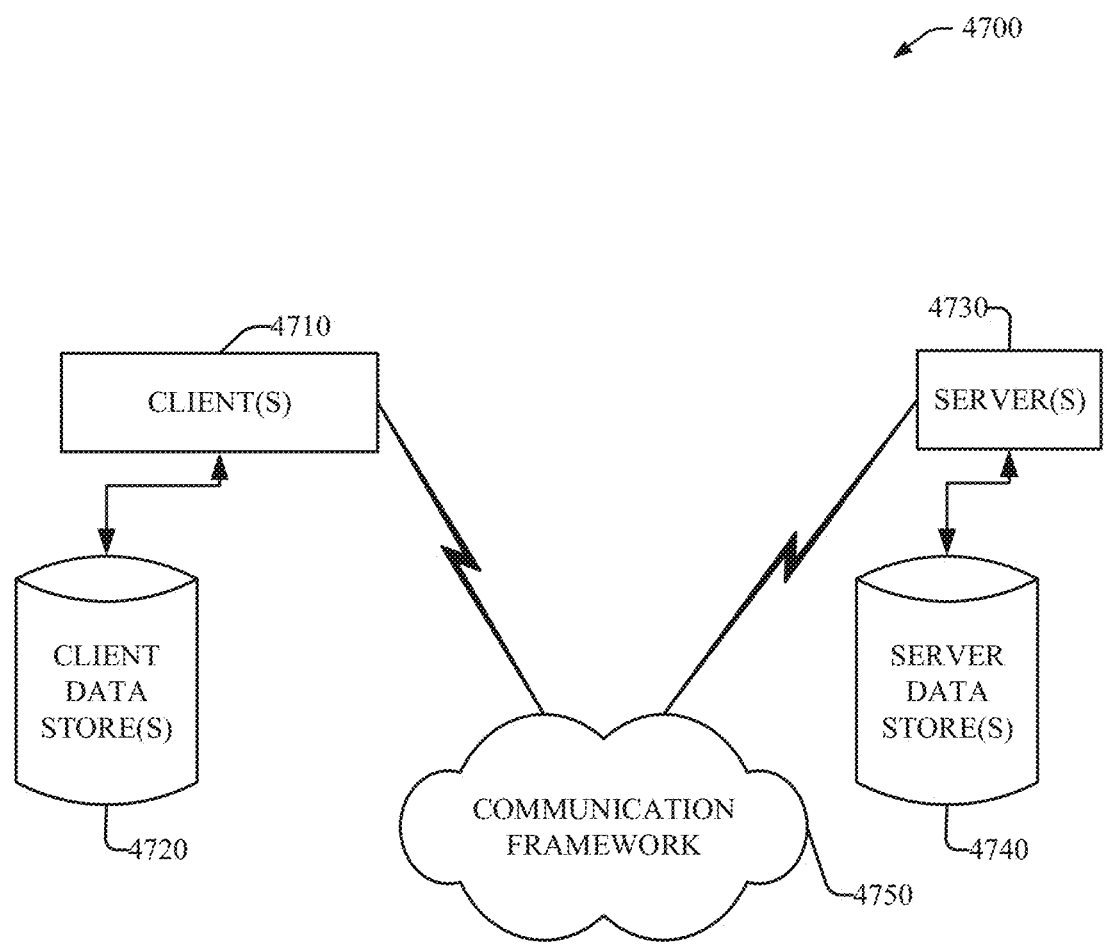
FIG. 47 illustrates an example networking environment operable to execute various implementations described herein.

FIG. 47 is a schematic block diagram of a sample computing environment 4700 with which the disclosed subject matter can interact. The sample computing environment 4700 includes one or more client(s) 4710. The client(s) 4710 can be hardware and/or software (e.g., threads, processes, computing devices). The sample computing environment 4700 also includes one or more server(s) 4730. The server(s) 4730 can also be hardware and/or software (e.g., threads, processes, computing devices). The servers 4730 can house threads to perform transformations by employing one or more embodiments as described herein, for example. One possible communication between a client 4710 and a server 4730 can be in the form of a data packet adapted to be transmitted between two or more computer processes. The sample computing environment 4700 includes a communication framework 4750 that can be employed to facilitate communications between the client(s) 4710 and the server(s) 4730. The client(s) 4710 are operably connected to one or more client data store(s) 4720 that can be employed to store information local to the client(s) 4710. Similarly, the server(s) 4730 are operably connected to one or more server data store(s) 4740 that can be employed to store information local to the servers 4730.

The disclosed subject matter can be a system, a method, an apparatus and/or a computer program product at any possible technical detail level of integration. The computer program product can include a computer readable storage medium (or media) having computer readable program instructions thereon for causing a processor to carry out aspects of the disclosed subject matter. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a standalone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosed subject matter.

Aspects of the disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on standalone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

It is to be appreciated and understood that components (e.g., erasure platform, erasure component, DLDP, scanner component, data management component, DSR platform, governance platform, rights management platform, artificial intelligence component, processor component, data store, data vault repository, or other component), as described with regard to a particular system or method, can include the same or similar functionality as respective components (e.g., respectively named components or similarly named components) as described with regard to other systems or methods disclosed herein.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes computer-executable components stored in a memory, the computer-executable components comprising:
an erasure request component that receives an erasure request that requests a set of data associated with a user account to be erased from a set of data stores that stores sets of data associated with user accounts, comprising the set of data associated with the user account;
an erasure component that:
in response to the erasure request, determines, based on an analysis of a first rule of a set of rules and information relating to the user account, eligibility for erasure a first portion of the set of data from the set of data stores;
in response to the determination of the first portion, determines, based on an analysis of a second rule of the set of rules and information relating to the user account, ineligibility for erasure of a second portion of the first portion of the set of data from the set of data stores; and
in response to the determination of eligibility, automatically erases a third portion of the set of data, the third portion comprising all data in the first portion that are not in the second portion; and
a mask component that:
in response to the erasure of the third portion of the set of data, generates mask data corresponding to the third portion of the set of data; and
replaces the erased third portion in the set of data stores with the corresponding mask data, the mask data configured to maintain a validity of a link to the third portion,
wherein the set of rules is determined based on a set of obligations associated with the set of data stores and is related to data erasure and data retention, and
wherein the information comprises an activity status associated with the user account.

2. The system of claim 1, wherein, in response to the erasure request, the erasure component determines the activity status of the user account based on the analysis of the information relating to the user account, and, in response to determining that the user account is open and not permitted to be closed, or in response to determining that the user account is closed and has been closed or inactive for less than a defined threshold amount of time, the erasure component determines that the set of data is ineligible for erasure from the set of data stores based on the set of rules, denies the erasure request, and does not erase the set of data from the set of data stores.

3. The system of claim 1, wherein the information relating to the user account is first information relating to the user account, wherein, in response to the erasure request, the erasure component determines the activity status of the user account based on the analysis of the first information relating to the user account, and, in response to determining that the user account is closed and has been closed or inactive for at least a defined threshold amount of time, the erasure component determines whether there is an erasure hold on the set of data that prohibits erasure of the set of data, based on the set of rules and second information obtained from at least one database, wherein the second information relates to an erasure hold status associated with the set of data.

4. The system of claim 3, wherein, in response to determining that there is the erasure hold on the set of data based on the set of rules and based on the second information indicating that the erasure hold status is to hold the set of data, the erasure component determines that the set of data is ineligible for erasure from the set of data stores, denies the erasure request, and does not erase the set of data from the set of data stores.

5. The system of claim 3, wherein, in response to determining that there is no erasure hold on the set of data based on the set of rules and based on the second information indicating that the erasure hold status indicates there is no erasure hold, the erasure component determines that at least the portion of the set of data is eligible for erasure from the set of data stores, and erases at least the portion of the set of data from the set of data stores.

6. The system of claim 5, wherein the defined threshold amount of time is a first defined threshold amount of time, wherein the computer-executable components comprise a data vault repository that has restricted access that prevents access by communication devices and users that do not have authorization to access the data vault repository, wherein the erasure component removes a remaining portion of the set of data from the set of data stores, stores the remaining portion of the set of data in the data vault repository, and marks the remaining portion of the set of data for erasure from the data vault repository when a second defined threshold amount of time since closing of the user account is satisfied.

7. The system of claim 6, wherein, in response to determining that the second defined threshold amount of time is satisfied, the erasure component determines whether the erasure hold has been placed on the set of data while the remaining portion of the set of data has been stored in the data vault repository; and wherein, in response to determining that the erasure hold was not placed on the set of data while the remaining portion of the set of data is stored in the data vault repository, the erasure component determines that the remaining portion of the set of data is eligible for erasure and erases the remaining portion of the set of data from the data vault repository, or wherein, in response to determining that the erasure hold has been placed on the set of data while the remaining portion of the set of data is stored in the data vault repository, the erasure component determines that the remaining portion of the set of data is not eligible for erasure and does not erase the remaining portion of the set of data from the data vault repository.

8. The system of claim 5, wherein the defined threshold amount of time is a first defined threshold amount of time, wherein the erasure component determines whether the user account has been closed for at least a second defined threshold amount of time that is longer than the first defined threshold amount of time, and wherein, in response to determining that the user account has been closed for at least the second defined threshold amount of time, the erasure component determines that the set of data is eligible for erasure from the set of data stores, and erases the set of data from the set of data stores.

9. The system of claim 5, wherein the erasure of the portion of the set of data from the set of data stores results in erasure of the portion of the set of data from one or more data fields of a database associated with the set of data stores, wherein the computer-executable components comprise a mask component that replaces the portion of the set of data erased from the one or more fields in the database with generic data, random data, or pseudo-random data that is inserted into the one or more fields and is unrelated to the user account.

10. The system of claim 1, wherein the erasure component, prior to receiving erasure requests associated with user accounts, analyzes activity statuses associated with the user accounts, lengths of time that closed user accounts of the user accounts have been closed or inactive, erasure hold statuses associated with the user accounts, and the set of rules to generate erasure pre-qualification analysis results, and wherein, based at least in part on the erasure pre-qualification analysis results, the erasure component determines erasure eligibility scores associated with the user accounts that indicate pre-determined erasure eligibility statuses of the user accounts for erasure of data from the set of data stores.

11. The system of claim 1, wherein the computer-executable components comprise a search engine that, in response to the erasure request, initiates a search of the set of data stores to identify locations of items of data of the set of data in the set of data stores, and generates search results indicating the locations of the items of data in the set of data stores.

12. A computer-implemented method, comprising:
in response to a request to delete a group of data associated with a user account from a group of database components, analyzing, by a system having a processor and a memory, a group of rules and information associated with the user account, wherein the group of rules is applicable to the group of database components and relates to data deletion and data retention, and wherein the information comprises an account status associated with the user account;

based on the analyzing of a first rule of the group of rules and the information, determining, by the system, a first permissibility status for deletion of a first portion of the group of data from the group of database components, the first permissibility status indicating that the first portion of the group of data is eligible for deletion;

based on the analyzing of a second rule of the group of rules and the information, determining, by the system, a second permissibility status for deletion of a second portion of the first portion of the group of data from the group of database components, the second permissibility status indicating that the second portion of the first portion of the group of data is ineligible for deletion;

based on the determined permissibility status, automatically deleting a third portion of the group of data, the third portion comprising all data in the first portion that are not in the second portion;

in response to the erasure of the third portion of the group of data, generating mask data corresponding to the third portion of the group of data; and replacing the erased third portion in the group of database components with the corresponding mask data, the mask data configured to maintain a validity of a link to the third portion.

13. The computer-implemented method of claim 12, further comprising:

in response to the request, determining, by the system, the account status of the user account based on the analyzing of the information; and in response to the account status indicating that the user account is open and not allowed to be closed, or in response to the account status indicating that the user account is closed and has been closed or inactive for less than a defined threshold period of time:

determining, by the system, that the group of data is not eligible for deletion from the group of database components based on the group of rules; and denying, by the system, the request, wherein the group of data is not deleted from the group of database components.

14. The computer-implemented method of claim 12, wherein the group of rules is determined based on a group of provisions associated with the group of database components, and wherein the method further comprises:

in response to the request, determining, by the system, the account status based on the analyzing of the information; and in response to the account status indicating the user account is closed and has been closed or inactive for at least a defined threshold period of time, determining, by the system, whether there is a deletion restriction on the group of data that prohibits deletion of the group of data from the group of database components, based on the group of rules and a deletion restriction status associated with the group of data, wherein the deletion restriction status is obtained from at least one database.

15. The computer-implemented method of claim 14, further comprising:

in response to determining that there is the deletion restriction on the group of data based on the group of rules and the deletion restriction status indicating the group of data is to be retained in the group of database components:

determining, by the system, that the group of data is not eligible for deletion from the group of database components; and denying, by the system, the request, wherein the group of data is not deleted from the group of database components.

16. The computer-implemented method of claim 14, further comprising:
in response to determining that there is no deletion restriction on the group of data based on the group of rules and the deletion restriction status indicating there is no deletion restriction on the group of data:
determining, by the system, that at least the portion of the group of data is eligible for deletion from the group of database components; and
deleting, by the system, at least the portion of the group of data from the group of database components.

17. The computer-implemented method of claim 16, wherein the defined threshold period of time is a first defined threshold period of time, and wherein the method further comprises:
moving, by the system, a remaining portion of the group of data from the group of database components for storage in a data vault storage component that has a higher access restriction level than the group of database components to facilitate preventing access by communication devices and users that do not have permission to access the data vault storage component; and
tagging, by the system, the remaining portion of the group of data for deletion from the data vault storage component when a second defined threshold period of time is determined to have elapsed since closing of the user account.

18. The computer-implemented method of claim 17, further comprising:
in response to determining that the second defined threshold period of time is satisfied, determining, by the system, whether the deletion restriction is placed on the group of data while the remaining portion of the group of data is stored in the data vault storage component; and
one of:
in response to determining that the deletion restriction is placed on the group of data, determining, by the system, that the remaining portion of the group of data is not eligible for deletion from the data vault storage component, wherein the remaining portion of the group of data is not deleted from the data vault storage component; or
in response to determining that the deletion restriction is not placed on the group of data, determining, by the system, that the remaining portion of the group of data is eligible for deletion, and
deleting, by the system, the remaining portion of the group of data from the data vault storage component.

19. The computer-implemented method of claim 16, wherein the defined threshold period of time is a first defined threshold period of time, and wherein the method further comprises:
determining, by the system, whether the user account has been closed for at least a second defined threshold period of time that is longer than the first defined threshold period of time;
in response to determining that the user account has been closed for at least the second defined threshold period of time, determining, by the system, that the group of data is eligible for deletion from the group of database components; and
deleting, by the system, the group of data from the group of database components.

20. A machine-readable medium, comprising executable instructions that, when executed by a processor, facilitate performance of operations, comprising:
receiving an erasure request that requests a set of data associated with an entity account be erased from a set of data storage components that stores sets of data associated with entity accounts, comprising the set of data associated with the entity account;
in response to the erasure request, evaluating a set of rules and information associated with the entity account, wherein the set of rules is determined based on a set of legal or contractual obligations associated with the set of data storage components and is related to data erasure and retention, wherein the set of rules comprises a first rule and a second rule, and wherein the information comprises an account activity status and an erasure restriction status associated with the entity account;
based on the evaluating of the first rule of the set of rules and the information associated with the entity account, determining an eligibility status for erasure of a first portion of the set of data from the set of data storage components;
based on the evaluating of the second rule of the set of rules and the information associated with the entity account, determining an ineligibility status for erasure of a second portion of the first portion of the set of data from the set of data storage components;
based on the determined permissibility status, automatically deleting a third portion of the set of data, the third portion comprising all data in the first portion that are not in the second portion;
in response to the deletion of the third portion of the set of data, generating mask data corresponding to the third portion of the set of data; and
replacing the deleted third portion in the group of data storage components with the corresponding mask data, the mask data configured to maintain a validity of a link to the third portion.

* * * * *